United States Patent
Fadel et al.

(10) Patent No.: US 7,069,271 B1
(45) Date of Patent: Jun. 27, 2006

(54) METHODS AND APPARATUS FOR IMPLEMENTING INTERNET STOREFRONTS TO PROVIDE INTEGRATED FUNCTIONS

(75) Inventors: Tarek Fadel, Campbridge, MA (US); David Marc Feuerstein, Bedford, MA (US); Shawn Noyes, Westwood, MA (US); Robert Wessa, Nahant, MA (US)

(73) Assignee: Oracle International Corp., Redwood Shores, CA (US)

( * ) Notice: Subject to any disclaimer, the term of this patent is extended or adjusted under 35 U.S.C. 154(b) by 1108 days.

(21) Appl. No.: 09/706,098

(22) Filed: Nov. 3, 2000

(51) Int. Cl.
*G06F 7/00* (2006.01)

(52) U.S. Cl. .............................. 707/102; 707/9; 707/10; 707/104.1; 705/26; 717/174

(58) Field of Classification Search ...................... 707/1, 707/3, 10, 100, 102, 9, 104.1, 200; 705/1, 705/10, 26; 708/100, 131, 141, 142; 710/1, 710/5, 8, 62, 72–74; 717/174
See application file for complete search history.

(56) References Cited

U.S. PATENT DOCUMENTS

| | | | | |
|---|---|---|---|---|
| 4,319,336 A | * | 3/1982 | Anderson et al. | 705/21 |
| 6,026,440 A | * | 2/2000 | Shrader et al. | 709/224 |
| 6,058,375 A | * | 5/2000 | Park | 705/30 |
| 6,070,149 A | * | 5/2000 | Tavor et al. | 705/26 |
| 6,155,928 A | * | 12/2000 | Burdick | 463/46 |
| 6,188,401 B1 | * | 2/2001 | Peyer | 345/805 |
| 6,313,745 B1 | * | 11/2001 | Suzuki | 340/572.1 |
| 6,334,127 B1 | * | 12/2001 | Bieganski et al. | 707/5 |
| 6,366,914 B1 | * | 4/2002 | Stern | 707/10 |
| 6,529,918 B1 | * | 3/2003 | Takahashi | 707/205 |
| 6,532,488 B1 | * | 3/2003 | Ciarlante et al. | 709/205 |

* cited by examiner

*Primary Examiner*—Greta Robinson
*Assistant Examiner*—Harold E. Dodds, Jr.
(74) *Attorney, Agent, or Firm*—Charles G. Call

(57) ABSTRACT

A rapidly deployable, integrated online sales system consisting of a core storefront application that executes on a conventional web database server, a guided buying and sales configuration module for selling products and services, a content management module, a recommendation system for making recommendations during a shopping session, an advertising management system, a profiling system for customizing customer interactions based on the site visitor's demonstrated interests, and reporting system that provides an analysis of a user's behavior to create the valuable reports. The various components of the desired system are first assembled as a pre-integrated prototype system on a source computer that can be rapidly recreated using pre-written operating system installation scripts which execute during the deployment process, prompting the installer to provide data values used to modify the content of pre-written configuration template files to accommodate the special needs of each individual installation.

10 Claims, 1 Drawing Sheet

METHODS AND APPARATUS FOR IMPLEMENTING INTERNET STOREFRONTS TO PROVIDE INTEGRATED FUNCTIONS

REFERENCE TO COMPUTER PROGRAM LISTING APPENDIX

A computer program listing appendix is stored on each of two duplicate compact disks which accompany this specification. Each disk contains computer program listings that illustrate implementations of the invention. The listings are recorded as ASCII text in an IBM PC/MS DOS compatible file (478 kilobytes) having the filename "Appendix.txt" created Jun. 23, 2003.

FIELD OF THE INVENTION

This invention relates to methods and apparatus for enabling online merchants to sell complex products and services using an integrated mechanism for personalizing sales, managing content and advertising, and generating reports.

COPYRIGHT STATEMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The online sales market and its underlying technologies are quickly maturing. With the rapid market maturation, what were once competitive advantages are becoming commonplace. For example, most online consumers now expect competitive pricing, shopping carts, advance search capabilities, online status checking, email notifications, and more. These trends set lofty goals for companies who must develop more compelling online experiences, determine more ways to drive sales, and enhance their competitive advantages. Whether the intent is to sell complex or custom products over the Internet, to conduct one-on-one marketing, to understand the behavior and patterns of customers, to manage the ever-changing web store contents, or to enhance the ease of shopping, online companies must implement advanced techniques if they are to effectively compete.

The ever increasing level of competition necessitates the infusion of best practices from sales and marketing with compelling product offerings. Product Managers must be able to maintain and build complex selling models without the traditional reliance on skilled programmers. Moreover, e-commerce applications need to be rapidly deployed and must be easily maintainable, even for complex and custom products.

In order to create distinct competitive advantages, companies must integrate sales and services. To improve customer attraction and retention, companies must develop and manage customer relationship via better sales and service integration and new technology. To insure that buyers to find what they need and place an order, the online selling process must provide timely and accurate enterprise data, be structured in a way that is easy to use for the buyer, allow the buyers to find what they need without undue effort and frustration, and suggest products and services that are in the best interests of the customer.

SUMMARY OF THE INVENTION

The present invention takes the form of a rapidly deployable, integrated online sales system which comprises a core storefront application that executes on a conventional web database server, guided buying and sales configuration capabilities for selling complex custom products and services, content management functions, a recommendation system for predicting the preferences of individual customers and making specific real-time recommendations during a shopping session, an advertising management system, a profiling system for customizing customer interactions based on the site visitor's demonstrated interests, and a reporting system that provides accurate and reliable analysis of user behavior to create the valuable reports.

As contemplated by the invention, the core storefront database server system, the advertising management engine, the recommendation engine, the content manager, and the analysis report generator take the form of separate modules that can be rapidly integrated and deployed using pre-written installation and configuration scripts. The various components of the desired system are preferably first assembled as a pre-integrated prototype system that can be rapidly recreated, thereby seamlessly integrating the core storefront component with the other functional units. As the pre-written scripts execute during the deployment process, the installer is prompted to provide data values which are used to modify the content of pre-written configuration template files to accommodate the special needs of each individual installation. This rapid deployment methodology ensures a repeatable solution that allows businesses to quickly build and deploy e-commerce sites complete with guided buying and configuration capabilities.

In accordance with another feature of the invention, a web-based user interface provides centralized system administration functions. The administration system provides password protected log-in so that only authorized persons can perform the supported administration functions which include content management, content workflow, user management, product management, the creation of advertising programs, and the design and invocation of analytical reporting functions.

These and other objects, features and advantages of the present invention may be better understood through a consideration of the following detailed description in which frequent reference is made to the accompanying drawings.

DETAILED DESCRIPTION

The preferred embodiment of the invention takes the form of a fully integrated online sales system which can be used by companies that sell simple to complex products and services and which employ personalization, content management, ad management, and report generation.

Figure 1:
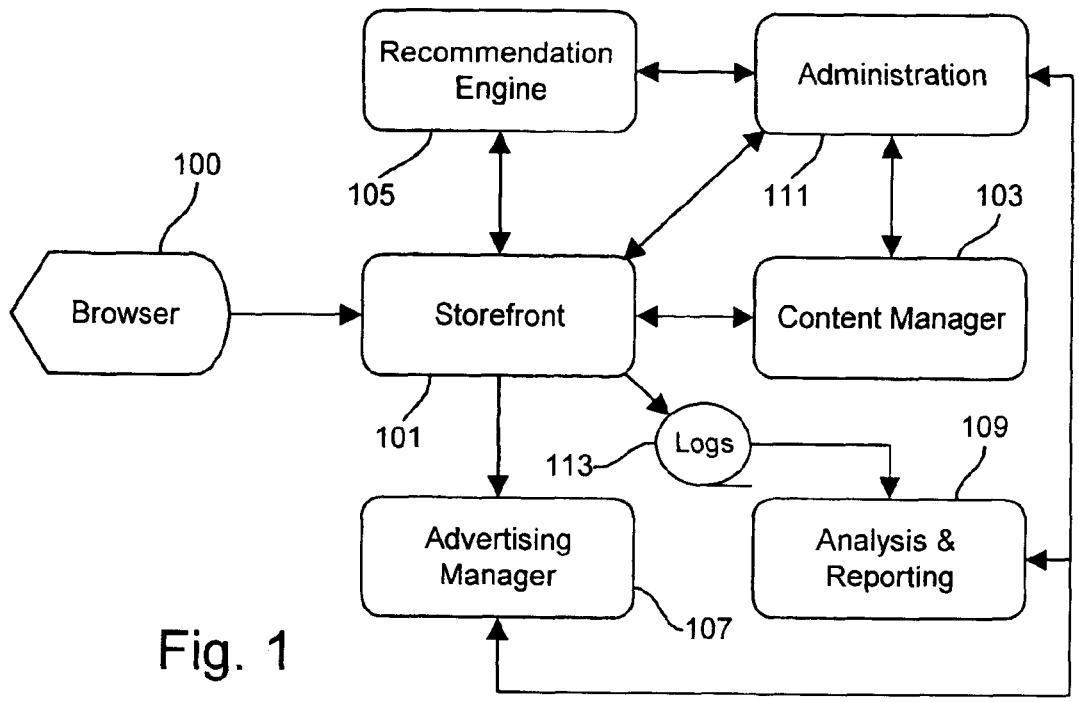
FIG. 1 is a block diagram illustrating the relationship between the application modules that together form the integrated online sales system contemplated by the invention.

The core of the system is provided by an online storefront seen at 101 in FIG. 1 which is preferably implement using iStore, a storefront application available from Oracle Corporation, Redwood Shores, Calif., which employs the Oracle 8 relational database management system and Oracle application server. In addition, the storefront 101 preferably employs Oracle's Selling Point Internet Edition to add the guided buying and sales configuration capabilities needed to sell complex products and services.

The storefront 101 is integrated with a content manager 103 such as the Vignette Story Server available from Vignette Corporation, Austin, Tex. The storefront 101 is further integrated with a recommendation engine 105 such NetPerceptions, available from Net Perceptions, Inc. of Eden Prairie, Minn., an application which provides buying recommendations to site visitors based on a prediction of each visitor's preferences. NetPerceptions is integrated with iStore by means of a pre-written Java interface called iMarketing provided by Oracle.

The system further integrates advertising management functions as indicated at 107 which are preferably performed by AdManager that delivers targeted advertising and by ProfileServer, which provides customized advertising presentations based on a visitors demonstrated interests while preserving visitor anonymity. Both AdManager and ProfileServer are available from Engage, Inc. of Raleigh, N.C. Finally, log files 113 that record visitor activity are passed to an analysis and reporting module 109 which may be implemented by the NetAnalysis program from NetGenesis Corp. of Cambridge, Mass. Each of these functional units is managed by the administration module 111. Module 111 provides a Web based menu interface to permit store employs to more easily manage the system.

The additional components integrated with the storefront applications enhance the capabilities of those applications by providing implicit and explicit personalization. Implicit personalization is achieved by observing the click-stream of the user and serving up relevant content on the store pages. Explicit personalization is achieved by asking the user to explicitly rate preferences and tastes, such as hobbies, age etc. and then using these to serve up relevant content.

In order to rapidly deploy such a comprehensive e-commerce solution, the present invention makes use of a pre-integrated prototype that is used to deploy all of the underlying components required to seamlessly integrate the various components of the system. The storefront applications 101, the recommendation engine 105, the content manager 103, the advertising manager 107, the analysis and reporting module 109, and the administration menu system 111 are first individually loaded, configured and tested on a source computer to form an operational prototype. A like system is then be installed on one or more target machines by executing operating system script files which automatically load and initially configure the separately purchased application programs which make up the system. By combining these preferred components in a rapidly deployable prototype, an easily repeatable integrated solution is provided to businesses, enabling them to quickly build e-commerce sites complete with guided buying and configuration capabilities.

Storefront 101

The core storefront 101 is preferably implemented by Oracle iStore 3.1, an application designed to enable businesses to sell non-configurable products and services over the Internet. Oracle iStore is a packaged e-commerce application that provides businesses with the necessary components to create Internet store sites for selling products and services in a secure and personalized environment. iStore supports multiple payment systems, allows the store operator to manage affiliate web links, and provides customers with coupons, discounts, and special promotions. iStore operates on the underlying technology platform of provided by the Oracle 8 relational database management system and Oracle Application Server. The iStore application can be readily integrated with back-office applications such as order entry, accounts receivable, and inventory, as well as with tax and shipping systems. Using iStore and its integrated back-office applications, customers may check inventory, place orders, and follow their orders through to delivery, all through the browser interface provided by the storefront 101.

The functionality of the storefront 101 can be further enhanced by adding the guided buying and sales configuration capabilities required to sell complex and custom products and services over the Internet. Oracle SellingPoint Internet Edition delivers these capabilities in the form of a customizable DHTML (Dynamic HyperText Markup Language) window that can be integrated into iStore. The Oracle SellingPoint adds guided buying, configuration and streamlined order submission to the core capabilities of iStore.

Content Manager 103

The Vignette StoryServer application may be advantageously integrated with the storefront to provide content management functions: this application provides a content management, personalization, decision support, and enterprise integration services to efficiently create shopping experiences that attract, engage, and retain customers. The content manager 103 simplifies the tasks performed by content authors, business users, and application developers.

Recommendation Engine 105

The recommendation engine 105 is a further application that is integrated with the storefront 105 to predict an individual shopper's preferences and make specific real-time buying recommendations during a shopping session. The recommendation engine determines each individual's preferences by observing that individual's behavior. It monitors such as click-through; analyzes past behavior; and obtains responses to queries, such as asking a shopper to rate a number of relevant items. Pooling this information with knowledge gained from a community of other individuals, the engine can makes buying recommendations with high predictive accuracy. The prototype system preferably employs the Oracle iMarketing application to provide personalized recommendations to the users, such as displaying the best selling items in the store, displaying popular items in each store section, displaying similar items bought by other users based on the items the current user has placed in his or her shopping cart.

Advertising Manager 107

The advertising manager application which forms part of the prototype system enables the site to deliver targeted advertising. The advertising manager functions are preferably performed by the AdManager and ProfileServer applications. AdManager automatically presents different advertising content in different sections of the store the user is browsing and works with ProfileServer which develops user profiles in real time so that the advertising which is presented to the user is customized based on visitor's demonstrated interests while preserving the anonymity and privacy of the visitor.

Analysis and Reporting Module 109

During each shopping session, the prototype captures the user's behavior in log files indicated at 113 in FIG. 1. The log files 113 are then processed by the analysis and reporting module 109 to analyze the behavior of the site visitors and to provide useful management reports that can be used to provide the insight needed to improve the site's performance. The preferred prototype system integrates the functions provided b the Net Genesis to NetAnalysis application to provide the desired analysis and reporting functions.

The Administration Menu System 111

The Administration Menu System 111 is a web based user interface that provides store employees with additional store management functionality to complement the basic management functionality provided by iStore, and to provide a unified mechanism for managing the other applications that are integrated with the storefront 101 to form the prototype systems.

The administration menu is password protected so that only authorized users can access its functions. As used here, the term "user" refers to employees, supervisors and administrators for a particular store which employs the combined functionality provided by the prototyped system. The user initially accesses the administration store system by entering a specific URL which then prompts the user to enter the correct user name and password. If the user name and password is valid, the user will see an "Admin Menu" screen which displays links to the following options (1) manage content, (2) manage users, or (3) manage products. This page can serve as the home page for all administrative functions on the store. It provides links to all the third party products as well as to the iStore Store Manager page.

Content management functions allow users to create new product reviews or articles. The content can be optionally associated with a URL, an image and one or more keywords. The keywords are used to classify content and personalize it to consumers based on their preferences. After the content is entered, the user can click on a "start" button which will save the data to the database and begin a workflow process to obtain necessary approvals, etc as described below. Content previously saved can be located by performing a search for the title or part of the title. Once located, the user can select the content specified by the title for viewing and editing.

When content is created or edited, it goes through a pre-defined workflow. The workflow steps are:

(1) a given content item is created, or existing content is edited.

(2) the content item is displayed on a store supervisor or administrator's tasklist which is divided into two portions: the top portion consists of a status list of all the content currently in the system and the bottom portion consists of a list of all content currently in workflow. The status list specifies the title of the content, its type, its status in the workflow process (ready to launch, live or expired, and potential actions that can be taken with respect to the item (launch content, change status to live or expired, etc.).

(3) The Store Supervisor/Administrator will click on "Edit" under the Edit column to review the content, make any necessary changes, and save the content.

(4) The Store Supervisor/Administrator will click on "Finish" under the Action column.

(5) The Store Administrator will click on "Launch" under the Action column.

(6) The Store Administrator may click on "Expire" under the Action column to remove the content from the live site. Note: Store products are not be subject to the workflow.

The "manage users" option on the main administrative menu permits the user to perform a search of a specific user. When the search results are displayed, the person managing users can the click on the user of interest to bring up the user description page. This page includes means for changing the password for the selected user.

The administrative menu system 111 provides product management tools. The Find Product function in the Administration Menu uses iStore's PowerSearch functionality to allow a Store Employee/Supervisor/Administrator find a product from the iStore tables. Results will be displayed in a window below the search fields and the user can double-click a product in order to edit its information. A Retrieve/Edit/Submit Product Information option reveals a screen that allows attributes of the product (retrieved from the step above) to be changed by Store Employees, Supervisors, and Administrators. The attributes that can be changed include product name, label, description, image and manufacturer.

The manage accounts option on the administrative menu permits the user to search for particular accounts. Search results will be returned in a window and the Employee/Supervisor/Administrator can scroll through a list of matching accounts and double-click on the one they want to manage. Double clicking on an account opens a new window where the user will be able to enter a new password and must type the same password in a "Verify Password" field. If the passwords match it will be changed to the new password.

A link in the manage accounts screen takes the user to the AdManager application that allows the user to create AdCampaigns. Based on the criteria set in these ad campaigns, the AdManager will randomly serve these ads on the Store pages.

A further link takes the user to NetAnalysis reporting that allows the user to choose the types of reports that need to be generated and run them on the Store log files.

An additional link takes the Store Administrator/Supervisor to the iStore Manager page provided by iStore for regular store management.

Deploying the Prototype

As noted earlier, the rapid deployment and initialization of a complete system which combines the functionality provided by the several integrated applications is achieved through the use of operating system script files which automatically install the various packaged software products, as purchased from each software vendor.

Performance improvements may be made by utilizing a middle tier approach in which the database functions arc handled on one server and one or more application servers are used for the various integrated applications. When this approach is used, a separate installation is performed for each application. Note that the Oracle Application Server and Vignette require the presence of the Apache Web server which means these combinations must be installed and kept together on whatever server is chosen. An installation could potentially have separate application servers for iStore and Vignette.

While there are a number of files that make up the set of scripts required to clone the prototype system on the source machine, the actual number of files which must be executed by the system administrator to install a new iPrototype Storefront consists only of one file: setup.sh. The setup.sh script will prompt the user for all the necessary information to complete the installation using the cloning scripts. It is assumed that user has first performed the proper pre-installation tasks and is familiar with the process before setup.sh is executed to call the proper scripts based on the answers provided to prompts.

Part IV of the Appendix contains a full list of all the Required Setup Information prompted by the setup.sh script. A first time install can usually use the default values that have been supplied. Part V of the Appendix contains an explanation of the supporting shell scripts and other files which comprise the cloning scripts and may be called by the setup.sh script, or by a script which was called by that script. It is not necessary to fully understand exactly how the cloning scripts work, but this is explained here for the interested user.

There are three main reasons for using the automated cloning method of installation contemplated by the present invention, rather than using the standard installation procedure for the each of the products which comprise the iPrototype Storefront: to perform the installation more rapidly, to improve consistency, and to automate the integration of the various application program which form the online sales system.

There is a significant time savings with this method as opposed to performing a standard install for each product. As described above, there are several different products which comprise the iPrototype Storefront. The total installation time for all of them using conventional procedures would typically be measured in hours or more likely days when they are separately installed. In contrast, installation time for all products using the cloning approach can be measured in minutes on most machines.

In addition to the time saving of cloning versus a standard install for each product, the installer also saves a more substantial amount of time integrating the products. The files used in the cloning process are based on a working iPrototype Storefront. All products have already been integrated and are working together. This is a substantial time savings measured in days or more likely even in weeks. Finally, after running the cloning scripts, the installer is assured of an integrated system that is working together properly.

To execute an installation, the user need merely perform the following steps:

1. Ensure that all files in the target system have a good backup.
2. Completed the pre installation steps and know the answers to the questions you will be asked by the cloning scripts.
3. Log in to the target machine as root.
4. Execute setup.sh.
5. Answer the questions properly for the target's specific. environment As previously mentioned, the iPrototype Storefront Cloning scripts perform a complete install by essentially copying an existing Storefront that has been fully integrated and is fully functional onto the user's machine. The initial iPrototype Storefront system integrating the various components is first installed and tested at a source installation. A copy of the necessary files for cloning this source installation is contained in the tar files from the installation media. The cloning scripts themselves are written and tested in at the source installation.

The task of "copying" a storefront to another machine is by no means a simple copy of source prototype's files from one machine to another. There are numerous files which contain site specific information which will not function properly in a new environment. The task of Acloning@ must therefore not only make a copy of all files, it must then reconfigure the appropriate files to contain the proper information for the new environment.

Figure 2:
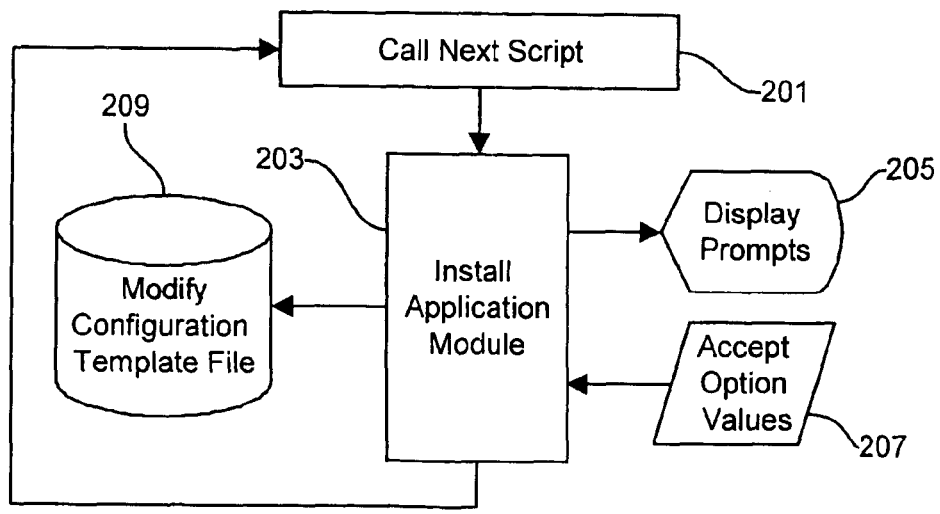
FIG. 2 is a flow diagram illustrating the method used to rapidly deploy the integrated application to a target installation using pre-written operating system script files.

The deployment method is illustrated in FIG. 2 of the drawings. A main script file calls a series of application specific script files as illustrated at 201. Each subscript or set of subscripts performs the installation of a particular application module and issues prompts to the installer indicating needed configuration data values and option choices as illustrated at 205 and accepts the values provided in response as indicate at 207.

This reconfiguration is achieved using a set of template files, which are reconfigured for the new environment. This set of template files consist of every file for all applications which contain any site specific configuration information. The template file is almost but not quite an exact copy of the original file from which it is based. Any site specific information has been replaced with a predefined string. This predefined string can be identified and located by the cloning scripts, which will then replace this string with a new value which is the actual value specific for the new machine hosting the new storefront site. These new values are derived from questions answered by the installer.when he or she runs the setup script and are posted as illustrated at 209 in FIG. 2. There are dozens of files which must be edited and reconfigured, which means there are dozens of questions posed in the initial setup phase. The content of each of these template files is listed in the Appendix.

In addition to templates files, there are SQL scripts which must run to update information in the database to complete the reconfiguration. Proper execution of the iPrototype cloning scripts should result in a working storefront. The storefront and supporting server applications should be working and should include the applications selected when executing the cloning scripts.

CONCLUSION

It is to be understood that the methods and apparatus that have been described are merely illustrative applications of the principles of the present invention. Numerous modifications may be made by those skilled in the art without departing from the true spirit and scope of the invention.

---

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

Table of Contents

| | |
|---|---|
| Script File Listings | Pages 1–290 |
| Appendix I - User and Group Names | Page 291 |

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

| | |
|---|---|
| Appendix II - Port Usage | Page 292 |
| Appendix III - Base Port Number Restrictions | Page 293 |
| Appendix IV - Required Setup Information | Page 294–297 |
| Appendix V - Shell Script Reference | Page 298–299 |

```
# !/bin/ksh
# Filename:      setup.sh
# Author:        Robert Wessa
# Parameters:    None

# Description:   This file will prompt the user for the necessary input
#                parameters to run the iPrototype installation.

This file will prompt you for directory, port number,
#                username, etc. information. Please note the following two key
#                items.

#                Install type: (Full, DB only, iStore/OAS/iMarketing only,
#                Vignette only).
#                The installation has the ability to load everything on one
#                server or split it into a multitier architecture, consisting
#                of a database tier, application server/iStore/iMarketing tier,
#                and a Vignette tier.

#                iStore, OAS and iMarketing must be on the same server. They
can be included with the database on one central server or
loaded separately onto a middle tier applications server.

If the install type is
Full:    all products will be installed
DB Only: only the database (database files and software) will
be loaded onto the current machine.
#                Application server: iStore. OAS and iMarkting are installed
#                         on the current machine.
#                Vignette only: only the Vignette and Apache piece will be
#                installed. Vignette requires the Apache server and does not
#                work with OAS currently.

#                If you do not choose a full install, you must install each
#                of the other options separately.

#                Vignette Inclusion: Vignette can be included or dropped
from the solution set.

If the solution includes Vignette
iStore templates which call Vignette will be copied.
If the solution does not include Vignette
iStore templates which do not call Vignette will be copied.
The Vignette schema will be removed from the database.
The Vignette files will be removed from the file system
The Apache files will be removed from the file system.
Apache and Vignette references will be removed from the
startup scripts.

#                After prompting for the required information, other variables
#                will be defined based on the values just received.

#listener3      1559/tcp    #Oracle ispeed db listener
#ispnodemgr3    7781/tcp    #iSpeed OAS Node mgr
#ispadminmgr3   7782/tcp    #iSpeed OAS admin mgr
#vhs_port3      56624       #iSpeed Vignette VHS Port
#storeadmin3    16000       #iSpeed store admin
#store3         16001       #iSpeed store
#iots3          16005       #iSpeed iots
#ispeed3        16007       #iSpeed store
#store3         16649       #iSpeed ORB
#storedeploy3   16999       #iSpeed store deploy
#apache3        31201       #iSpeed Apache server
#cascachemgr3   31206       #iSpeed vignette CAS Cache mgr
#casplcmgr3     31207       #iSpeed vignet CAS placement mgr
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#castmplrmgr3   31208    #iSpeed vignett CAS template mgr
#caspaggen3     31209    #iSpeed vignette CAS page gener
#cmsserver3     31210    #iSpeed vignette CMS Server
#netp4          9350     #Net Perception
# =====================================================================
# Revision History
# Date         Who       Why
# 01/31/2000   rwessa    Initial create date

# =====================================================================

# =====================================================================
# ============== Begin Main Program ===================================
# =====================================================================
date

# determine the installation type
# we can install everything on the current machine, just the database,
# or just the OAS/iStore/iMarketing piece.
# we do loop through until we get a valid response (F, I or D) to this question
ans_ok="N"
echo starting while
while ["$ans_ok" = "N"]
do
    export INSTALL_TYPE=F
    echo
    echo "Please specify 1 of the 4 installation types to be performed."
    echo "Vignette/Apache only(V)"
    echo "iStore/OAS/iMarketing only(I)"
    echo "Database only (D)"
    echo "Full solution set(F)"
    echo "Exit installer without installing anything(X)"
    echo "Please select one of the above (V,I,D,F,X) [$INSTALL_TYPE]"
    read ans
    if [$ans] ; then
        INSTALL_TYPE=echo ${ans} | tr "[a–z]" "[A–Z]"
        if ["$INSTALL_TYPE" ="V"] ; then
            ans_ok="Y"
        elif ["$INSTALL_TYPE" = "I"] ; then
            ans_ok="Y"
        elif ["$INSTALL_TYPE" = "D"] ; then
            ans_ok="Y"
        elif ["$INSTALL_TYPE" = "F"] ; then
            ans_ok="Y"
        elif ["$INSTALL_TYPE" = "X"] ; then
            ans_ok="Y"
            echo "Installing terminated, no installation tasks performed."
            exit
        else
            echo
            echo Please answer V,I,D,F or X. $INSTALL_TYPE is an invalid response.
            ans_ok="N"
        fi
    else
        ans_ok="Y"
    fi
done

# determine if we will include Vignette in the solution set
# we do loop through until we get a valid response (Y or N) to this question
ans_ok="N"
echo starting while
while ["$ans_ok" = "N"]
do
    INCLUDE_VIGNETTE=Y
    echo "Will Vignette be part of the solution set (Y or N) [$INCLUDE_VIGNETTE]"
    read ans
    if [$ans] ; then
        INCLUDE_VIGNETTE='echo ${ans} | tr "[a–z]" "[A–Z]"'
        if ["$INCLUDE_VIGNETTE" = "Y"] ; then
            ans_ok="Y"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        elif ["$INCLUDE_VIGNETTE" = "N"] ; then
            ans_ok="Y"
        else
            echo
            echo Please answer Y or N, $INCLUDE_VIGNETTE is an invalid response.
            ans_ok="N"
        fi
    else
            ans_ok="Y"
    fi
done

export SHOWDBG="NO"
echo "Would you like to see debugging information (YES/NO? [$SHOWDBG]"
read ans
if [$ans] ; then
    SHOWDBG=$ans
fi

# obtain general information
export INSTALL_HOME="`pwd`"
echo "Enter the installation home directory [$INSTALL_HOME]"
read ans
if [$ans] ; then
    INSTALL_HOME=$ans
fi

export USER_BASE_DIR=/u08/users
echo "Enter the base user home directory ($USER_BASE_DIR]"
read ans
if [$ans] ; then
    USER_BASE_DIR=$ans
fi

export BASE_DIR=/u08/app
echo "Enter the base applications directory [$BASE_DIR]"
read ans
if [$ans] ; then
    BASE_DIR=$ans
fi

# obtain previous installation information
export OLD_HOSTNAME=dallsoluctrsv01
echo "Enter the old hostname [$OLD_HOSTNAME]"
read oh
if [$oh] ; then
    OLD_HOSTNAME=$oh
fi

export OLD_ORACLE_SID=ISP01
# export OLD_ORACLE_SID=FITS
echo "Enter the old ORACLE_SID [$OLD_ORACLE_SID]"
read oos
if [$oos] ; then
    OLD_ORACLE_SID=$oos
fi
# ################################################################
# export OLD_APACHE_BASE=454
export OLD_APACHE_BASE=65
echo "Enter the old Apache case number [$OLD_APACHE_BASE]"
read oab
if [$oab] ; then
    OLD_APACHE_BASE=$oab
fi

# obtain new user information
export ORACLE=sp01ora
echo "Enter the Oracle OS username [$ORACLE]"
read ou
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [$ou] ; then
    ORACLE=$ou
fi

export APACHE=sp01ap
echo "Enter the apache OS username [$APACHE]"
read au
if [$au] ; then
    APACHE=$au
fi

export ICS=sp01ics
echo "Enter the iStore OS username [$ICS]"
read iu
if [$iu] ; then
    ICS=$iu
fi

export NETP=sp01np
echo "Enter the Net Perceptions OS username [$NETP]"
read ans
if [$ans] ; then
    NETP=$ans
fi

# export OLD_ORACLE_NP_BASE=/u02/app/fitsnp
export OLD_ORACLE_NP_BASE=/u05/app/isp01ora
echo "Enter the old Net Perceptions base directory [$OLD_ORACLE_NP_BASE]"
read ans
if [$ans] ; then
    OLD_ORACLE_NP_BASE=$ans
fi

export VIGNETTE=sp01vg
echo "Enter the Vignette OS username [$VIGNETTE]"
read ans
if [$ans] ; then
    VIGNETTE=$ans
fi
# #########################################################################
# export CAS_PORT_OLD="45440"
export CAS_PORT_OLD="6540"
echo "Enter the old Vignete CAS Port [$CAS_PORT_OLD]"
read ans
if [$ans] ; then
    CAS_PORT_OLD=$ans
fi
# export ORACLE_VGN_BASE_OLD="/u02/app/fitsvg"
export ORACLE_VGN_BASE_OLD="/u05/app/isp01vg"
echo "Enter the old Vignete base directory [$ORACLE_VGN_BASE_OLD]"
read ans
if [$ans] ; then
    ORACLE_VGN_BASE_OLD=$ans
fi

export GROUPNAME=dba
echo "Enter the new Group name for these users [$GROUPNAME]"
read ans
if [$ans] ; then
    GROUPNAME=$ans
fi

export ORACLE_SID=SP01
# create a lower case and upper case version, both are needed
export oracle_sid=`echo $ORACLE_SID | tr "[A-Z]" "[a-z]"`
ORACLE_SID=`echo $ORACLE_SID | tr "[a-z]" "A-Z]"`
echo "Enter the new ORACLE_SID [$ORACLE_SID]"
read ans
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [$ans] ; then
     ORACLE_SID=`echo $ans | tr "[a–z]" "[A–Z]"`
     oracle_sid=`echo $ans | tr "[A–Z]" "[a–z]"`
fi

export ORACLE_BASE=$BASE_DIR/$ORACLE
echo "Enter the location for your ORACLE_BASE [$ORACLE_BASE]"
read ans
if [$anS] ; then
     ORACLE_BASE=$ans
fi

export ORACLE_HOME=$ORACLE_BASE/product/805
echo "Enter the location for your ORACLE_HOME [$ORACLE_HOME]"
read ans
if [$ans] ; then
     ORACLE_HOME=$ans
fi

export ORACLE_OAS_BASE=$BASE_DIR/$ICS
echo "Enter the location for your ORACLE_OAS_BASE [$ORACLE_OAS_BASE]"
read ans
if [$ans] ; then
     ORACLE_OAS_BASE=$ans
fi

export ORACLE_OAS_PROD_BASE=$ORACLE_OAS_BASE/product/OAS4081
echo "Enter the location for your ORACLE_OAS_PROD_BASE [$ORACLE_OAS_PROD_BASE]"
read ans
if [$ans] ; then
     ORACLE_OAS_PROD_BASE=$ans
fi

export OAS_SITE_NAME=$ORACLE_SID
echo "Enter your new OAS_SITE_NAME [OAS_SITE_NAME]"
read ans
if [$ans] ; then
     OAS_SITE_NAME=$ans
fi

# obtain Vignette information

export OAS_SITE_NAME_OLD=$OLD_ORACLE_SID
echo "Enter your old OAS_SITE_NAME [$OAS_SITE_NAME_OLD]"
read ans
if [$ans] ; then
     OAS_SITE_NAME_OLD=$ans
fi

export ORACLE_VGN_BASE=$BASE_DIR/$VIGNETTE
echo "Enter the location for your Vignette base directory [$ORACLE_VGN_BASE]"
read ans
if [$ans] ; then
     ORACLE_VGN_BASE=$ans
fi

# obtain Apache information

export ORACLE_AP_BASE=$BASE_DIR/$APACHE
echo "Enter the location for your Apache base directory [$ORACLE_AP_BASE]"
read ans
if [$ans] ; then
     ORACLE_AP_BASE=$ans
fi

```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
export APACHE_BASE=245
echo "Enter the Apache Ports Base # [$APACHE_BASE]"
read apacheb
if [$apacheb] ; then
     APACHE_BASE=$apacheb
fi

# obtain NetP information

export ORACLE_NP_BASE=$BASE_DIR/$NETP
echo "Enter the location for your Net Perceptions base directory [$ORACLE_NP_BASE]"
read ans
if [$ans] ; then
     ORACLE_NP_BASE=$ans
fi

# ###############################################################
export NETP_PORT=${APACHE_BASE}35
echo "Enter the new Net Perceptions port # [$NETP_PORT]"
read np
if [$np] ; then
     NETP_PORT=$np
fi
# obtain DB file information

export DB_ROOT_DIR=/u08/oradata
echo "Enter the parent Oracle database file directory[$DB_ROOT_DIR]"
read ans
if [$ans] ; then
     DB_ROOT_DIR=$ans
fi

export DB_DATA_DIR=${DB_ROOT_DIR}/$ORACLE_SID
echo "Enter the base Oracle database file directory [$DB_DATA_DIR]"
read ans
if [$ans] ; then
     DB_DATA_DIR=$ans
fi

export DB_HOSTNAME="`hostname`"
echo "Enter the database server hostname if different [$DB_HOSTNAME]"
read ans
if [$ans] ; then
     DB_HOSTNAME=$ans
fi

# obtain environment information

export DOMAIN=us.oracle.com
echo "Enter the new domain [$DOMAIN]"
read dom
if [$dom] ; then
     DOMAIN=$dom
fi

export proxyserver=www-proxy.us.oracle.com
echo "Enter the new proxy server [$proxyserver]"
read ps
if [$ps] ; then
     proxyserver=$ps
fi

export proxyport=80
echo "Enter the new proxy port [$proxyport]"
read pp
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [$pp] ; then
    proxyport=$pp
fi

# obtain OAS information

# ################################################################
export OAS_BASE=245
echo "Enter the OAS Ports Base # [$OAS_BASE]"
read oasb
if [$oasb] ; then
    OAS_BASE=$oasb
fi

export OAS_NODE_PORT=${OAS_BASE}12
echo "Enter your OAS_NODE_PORT [$OAS_NODE_PORT]"
read ans
if [$ans] ; then
    OAS_NODE_PORT=$ans
fi

export OAS_NODE=${OAS_NODE_PORT}
echo "Enter the new OAS Node port number [$OAS_NODE]"
read oasn
if [$oasn] ; then
    OAS_NODE=$oasn
fi

export TNS_PORT=${OAS_BASE}37
echo "Enter the new TNS Port number [$TNS_PORT]"
read tnsp
if [$tnsp] ; then
    TNS_PORT=$tnsp
fi

export VHS_PORT=${OAS_BASE}36
echo "Enter the VHS Port number [$VHS_PORT]"
read vhsp
if [$vhsp] ; then
    VHS_PORT=$vhsp
fi

export OAS_ORB_BASE=${OAS_BASE}14
echo "Enter the OAS ORB Base [$OAS_ORB_BASE]"
read oasob
if [$oasob] ; then
    OAS_ORB_BASE=$oasob
fi

export OAS_ADMIN=${OAS_BASE}13
echo "Enter the new OAS Admin port # [$OAS_ADMIN]"
read oasa
if [$oasa] ; then
    OAS_ADMIN=$oasa
fi

# obtain tar file information

# export TAR_DIR=/u14/cdimage/iPrototype/WithoutEMU
export TAR_DIR=/u13/stage/SellingPoint.com
echo "Enter the directory location containing the TAR files [$TAR_DIR]"
read tdir
if [$tdir] ; then
    TAR_DIR=$tdir
fi

export ORACLETS_FILE=oraclets.tar.Z
echo "Enter the Oracle technology stack tar file [$ORACLETS_FILE]"
read ans
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [$ans] ; then
    ORACLETS_FILE-$ans
fi

export ORADATA_FILE=oradata.tar.Z
echo "Enter the Oracle data tar file [$ORADATA_FILE]"
read ans
if [$ans] ; then
    ORADATA_FILE=$ans
fi

export MIDTIER_FILE=middletier.tar.Z
echo "Enter the Middle Tier tar file [$MIDTIER_FILE]"
read ans
if [$ans] ; then
    MIDTIER_FILE=$ans
fi

export NETP_FILE=netp.tar.Z
echo "Enter the Net Perceptions tar file [$NETP_FILE]"
read ans
if [$ans] ; then
    NETP_FILE=$ans
fi

export APACHE_FILE=apache.tar.Z
echo "Enter the Apache tar file [$APACHE_FILE]"
read ans
if [$ans] ; then
    APACHE_FILE=$ans
fi

export VIGNETTE_FILE=vignette.tar.Z
echo "Enter the Vignette tar file [$VIGNETTE_FILE]"
read ans
if [$ans] ; then
    VIGNETTE_FILE=$ans
fi

# Need to know db usernames
export DB_USER_NETP=netp
echo "Enter the Net P Database username[$DB_USER_NETP]"
read ans
if [$ans] ; then
    DB_USER_NETP=$ans
fi

export DB_PW_NETP=netp
echo "Enter the Net P Database password [DB_PW_NETP]"
read ans
if [$ans] ; then
    DB_PW_NETP=$ans
fi
# #######################
# export STARTUP_LOCATION=$USER_BASE_DIR/$ORACLE
export STARTUP_LOCATION=$INSTALL_HOME/startup
echo "Enter the directory in which to place startup scripts [$STARTUP_LOCATION]"
read ans
if [$ans] ; then
    STARTUP_LOCATION=$ans
fi

export LOGDIR=$INSTALL_HOME/log
echo "Enter the directory to write installation log files [$LOGDIR]"
read ans
if [$ans] ; then
    LOGDIR=$ans
fi

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
export SUMMARY_FILE=$LOGDIR/summary.log
echo "Enter the summary file name [$SUMMARY_FILE]"
read ans
if [$ans] ; then
    SUMMARY_FILE=$ans
fi

export INSTALL_LOGFILE=$LOGDIR/install.log
echo "Enter the installation log file name [$INSTALL_LOGFILE]"
read ans
if [$ans] ; then
    INSTALL_LOGFILE=$ans
fi

# need $TOOLS_DIR for previous version compatibility
TOOLS_DIR="shouldnotbeused" ; export TOOLS_DIR
HOSTNAME=`hostname | tr "[a-z]" "[A-Z]"`; export HOSTNAME
hostname=`echo ${HOSTNAME} | tr "[A-Z]" "[a-z]"` ; export hostname
IP_ADDRESS=`grep ${hostname} /etc/hosts | awk '{print $1}'` ; export IP_ADDRESS
ORACLE_SID=`echo ${ORACLE_SID} | tr "[a-z]" "[A-Z]"` ; export ORACLE_SID
oracle_sid=`echo ${ORACLE_SID} | tr "[A-Z]" "[a-z]"` ; export oracle_sid
OLD_ORACLE_SID=`echo ${OLD_ORACLE_SID} | tr "[a-z]" "[A-Z]"` ; export OLD_ORACLE_SID
old_oracle_sid=`echo ${OLD_ORACLE_SID} | tr "[A-Z]" "[a-z]"` ; export old_oracle_sid
domain=`echo ${DOMAIN} | tr "A-Z" "[a-z]"` ; export domain
# export ORACLE_HOME="${ORACLE_BASE}/oracle/product/8.0.5" ; export
logged_user=`id | cut -c7-10` ; export logged_user
old_hostname=`echo ${OLD_HOSTNAME} | tr "[A-Z]" "a-z]"` ; export old_hostname

PORT_LISTENER="$TNS_PORT" ; export PORT_LISTENER                          #Oracle ispeed db listener
PORT_NODEMGR=" " ; export PORT_NODEMGR                                     #iSpeed OAS Node mgr
PORT_ADMINMGR=" " ; export PORT_ADMINMGR                                   #iSpeed OAS admin mgr
PORT_STOREADMIN=" " ; export PORT_STOREADMIN                               #iSpeed store admin
PORT_STORE=" " ; export PORT_STORE                                         #iSpeed store
PORT_IOTS=" " ; export PORT_IOTS                                           #iSpeed iots
PORT_ISPEED=" " ; export PORT_ISPEED                                       #iSpeed store
#PORT_ORB="16649" ; export                                                  #iSpeed ORB
PORT_ORB=" " ; export PORT_ORB                                             #iSpeed ORB
PORT_STOREDEPLOY="storedeploy3" ; export PORT_STOREDEPLOY #16999 #iSpeed store deploy
PORT_APACHE="${APACHE_BASE}01" ; export PORT_APACHE                        #apache3 iSpeed Apache
server
PORT_CAS_CACHEMGR="${APACHE_BASE}06" ; export PORT_CAS_CACHEMGR            #vignette CAS Cache mgr
PORT_CAS_PLCMGR="${APACHE_BASE}07" ; export PORT_CAS_PLCMGR                #vignette CAS placement
mgr
PORT_CAS_TPMLMGR="${APACHE_BASE}08" ; export PORT_CAS_TPMLMGR              #vignette CAS template
mgr
PORT_CAS_PAGGEN="${APACHE_BASE}09" ; export PORT_CAS_PAGGEN                #vignette CAS page gener
PORT_CMS_SERVER="${APACHE_BASE}10" ; export PORT_CMS_SERVER                #CMS Server
PORT_VHS_PORT="${APACHE_BASE}11" ; export PORT_VHS_PORT                    #Vignette VHS Port"
PORT_NETP=" " ; export PORT_NETP                                           #Net Perception
CAS_PORT_OLD="$CAS_PORT_OLD" export CAS_PORT_OLD                           #old Port needed to delete old
CAS
ORACLE_VGN_BASE_OLD="$ORACLE_VGN_BASE_OLD" ; export ORACLE_VGN_BASE_OLD #old Vignette
directory needed to delete CAS
# Now save settings to summary file for review
echo " " > $SUMMARY_FILE
echo "# Current Settings" >> $SUMMARY_FILE
echo " " >> $SUMMARY_FILE
echo "INSTALL_HOME=$INSTALL_HOME ; export INSTALL_HOME" >> $SUMMARY_FILE
echo "USER_BASE_DIR=$USER_BASE_DIR ; export USER_BASE_DIR" >> $SUMMARY_FILE
echo "ORACLE_SID=$ORACLE_SID ; export ORACLE_SID" >> $SUMMARY_FILE
echo "ORACLE_BASE=$ORACLE_BASE ; export ORACLE_BASE" >> $SUMMARY_FILE
echo "OLD_HOSTNAME=$OLD_HOSTNAME ; export OLD_HOSTNAME" >> $SUMMARY_FILE
echo "old_hostname=$old_hostname ; export old_hostname" >> $SUMMARY_FILE
echo "OLD_ORACLE_SID=$OLD_ORACLE_SID ; export OLD_ORACLE_SID" >> $SUMMARY_FILE
echo "OLD_APACHE_BASE=$OLD_APACHE_BASE ; export OLD_APACHE_BASE" >> $SUMMARY_FILE
echo "TOOLS_DIR=$TOOLS_DIR ; export TOOLS_DIR" >> $SUMMARY_FILE
echo "DB_ROOT_DIR=$DB_ROOT_DIR ; export DB_ROOT_DIR" >> $SUMMARY_FILE
echo "DB_DATA_DIR=$DB_DATA_DIR ; export DB_DATA_DIR" >> $SUMMARY_FILE
echo "ORACLE=$ORACLE ; export ORACLE" >> $SUMMARY_FILE
echo "APACHE=$APACHE ; export APACHE" >> $SUMMARY_FILE
echo "ICS=$ICS ; export ICS" >> $SUMMARY_FILE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo "NETP=$NETP ; export NETP" >> $SUMMARY_FILE
echo "VIGNETTE=$VIGNETTE ; export VIGNETTE" >> $SUMMARY_FILE
echo "GROUPNAME=$GROUPNAME ; export GROUPNAME" >> $SUMMARY_FILE
echo "BASE_DIR=$BASE_DIR ; export BASE_DIR" >> $SUMMARY_FILE
echo "ORACLE_BASE=$ORACLE_BASE ; export ORACLE_BASE" >> $SUMMARY_FILE
echo "ORACLE_OAS_BASE=$ORACLE_OAS_BASE ; export ORACLE_OAS_BASE" >> $SUMMARY_FILE
echo "ORACLE_OAS_PROD_BASE=$ORACLE_OAS_PROD_BASE ; export ORACLE_OAS_PROD_BASE" >> $SUMMARY_FILE
echo "OAS_NODE_PORT=$OAS_NODE_PORT ; export OAS_NODE_PORT" >> $SUMMARY_FILE
echo "OAS_SITE_NAME=$OAS_SITE_NAME ; export OAS_SITE_NAME" >> $SUMMARY_FILE
echo "OAS_SITE_NAME_OLD=$OAS_SITE_NAME_OLD ; export OAS_SITE_NAME_OLD" >> $SUMMARY_FILE
echo "ORACLE_VGN_BASE=$ORACLE_VGN_BASE ; export ORACLE_VGN_BASE" >> $SUMMARY_FILE
echo "ORACLE_VGN_BASE_OLD=$ORACLE_VGN_BASE_OLD ; export ORACLE_VGN_BASE_OLD" >> $SUMMARY_FILE
echo "ORACLE_AP_BASE=$ORACLE_AP_BASE ; export ORACLE_AP_BASE" >> $SUMMARY_FILE
echo "ORACLE_NP_BASE=$ORACLE_NP_BASE ; export ORACLE_NP_BASE" >> $SUMMARY_FILE
echo "OLD_ORACLE_NP_BASE=$OLD_ORACLE_NP_BASE export OLD_ORACLE_NP_BASE" >> $SUMMARY_FILE
echo "DB_ROOT_DIR=$DB_ROOT_DIR ; export DB_ROOT_DIR" >> $SUMMARY_FILE
echo "DOMAIN=$DOMAIN ; export DOMAIN" >> $SUMMARY_FILE
echo "domain=$domain ; export domain ; export domain" >> $SUMMARY_FILE
echo "proxyserver=$proxyserver ; export proxyserver" >> $SUMMARY_FILE
echo "proxyport=$proxyport ; export proxyport" >> $SUMMARY_FILE
echo "OAS_NODE=$OAS_NODE ; export OAS_NODE" >> $SUMMARY_FILE
echo "OAS_ADMIN=$OAS_ADMIN ; export OAS_ADMIN" >> $SUMMARY_FILE
echo "NETP_PORT=$NETP_PORT ; export NETP_PORT" >> $SUMMARY_FILE
echo "OAS_BASE=$OAS_BASE ; export OAS_BASE" >> $SUMMARY_FILE
echo "APACHE_BASE=$APACHE_BASE ; export APACHE_BASE" >> $SUMMARY_FILE
echo "OAS_ORB_BASE=$OAS_ORB_BASE ; export OAS_ORB_BASE" >> $SUMMARY_FILE
echo "TNS_PORT=$TNS_PORT ; export TNS_PORT" >> $SUMMARY_FILE
echo "VHS_PORT=$VHS_PORT ; export VHS_PORT" >> $SUMMARY_FILE
echo "HOSTNAME=$HOSTNAME ; export HOSTNAME" >> $SUMMARY_FILE
echo "hostname=$hostname ; export hostname" >> $SUMMARY_FILE
echo "IP_ADDRESS=$IP_ADDRESS ; export IP_ADDRESS" >> $SUMMARY_FILE
echo "ORACLE_SID=$ORACLE_SID ; export ORACLE_SID" >> $SUMMARY_FILE
echo "oracle_sid=$oracle_sid ; export oracle_sid" >> $SUMMARY_FILE
echo "OLD_ORACLE_SID=$OLD_ORACLE_SID ; export OLD_ORACLE_SID" >> $SUMMARY_FILE
echo "old_oracle_sid=$old_oracle_sid ; export old_oracle_sid" >> $SUMMARY_FILE
echo "ORACLE_HOME=$ORACLE_HOME ; export ORACLE_HOME" >> $SUMMARY_FILE
echo "logged_user=$logged_user ; export logged_user" >> $SUMMARY_FILE
echo "INCLUDE_VIGNETTE=$INCLUDE_VIGNETTE ; export INCLUDE_VIGNETTE" >> $SUMMARY_FILE
echo "INSTALL_TYPE=$INSTALL_TYPE ; export INSTALL_TYPE" >> $SUMMARY_FILE
echo "TAR_DIR=$TAR_DIR ; export TAR_DIR" >> $SUMMARY_FILE
echo "ORACLE_TS_FILE=$ORACLETS_FILE; export ORACLE_TS_FILE" >> $SUMMARY_FILE
echo "ORADATA_FILE=$ORADATA_FILE ; export ORADATA_FILE" >> $SUMMARY_FILE
echo "MIDTIER_FILE=$MIDTIER_FILE ; export MIDTIER_FILE" >> $SUMMARY_FILE
echo "NETP_FILE=$NETP_FILE ; export NETP_FILE" >> $SUMMARY_FILE
echo "APACHE_FILE=$APACHE_FILE ; export APACHE_FILE" >> $SUMMARY_FILE
echo "VIGNETTE_FILE=$VIGNETTE_FILE ; export VIGNETTE_FILE" >> $SUMMARY_FILE
echo "DB_USER_NETP=$DB_USER_NETP ; export DB_USER_NETP" >> $SUMMARY_FILE
echo "DB_PW_NETP=$DB_PW_NETP ; export DB_PW_NETP"          >> $SUMMARY_FILE

echo "PORT_LISTENER=$PORT_LISTENER ; export PORT_LISTENER" >> $SUMMARY_FILE
echo "PORT_NODEMGR=$PORT_NODEMGR ; export PORT_NODEMGR"          >> $SUMMARY_FILE
echo "PORT_ADMINMGR=$PORT_ADMINMGR ; export PORT_ADMINMGR" >> $SUMMARY_FILE
echo "PORT_STOREADMIN=$PORT_STOREADMIN ; export PORT_STOREADMIN" >> $SUMMARY_FILE
echo "PORT_STORE=$PORT_STORE ; export PORT_STORE"          >> $SUMMARY_FILE
echo "PORT_IOTS=$PORT_IOTS ; export PORT_IOTS"          >> $SUMMARY_FILE
echo "PORT_ISPEED=$PORT_ISPEED ; export PORT_ISPEED"          >> $SUMMARY_FILE
echo "PORT_ORB=$PORT_ORB ; export PORT_ORB"          >> $SUMMARY_FILE
echo "PORT_STOREDEPLOY=$PORT_STOREDEPLOY ; export PORT_STOREDEPLOY" >> $SUMMARY_FILE
echo "PORT_APACHE=$PORT_APACHE ; export"          >> $SUMMARY_FILE
echo "PORT_CAS_CACHEMGR=$PORT_CAS_CACHEMGR ; export PORT_CAS_CACHEMGR" >> $SUMMARY_FILE
echo "PORT_CAS_PLCMGR=$PORT_CAS_PLCMGR ; export PORT_CAS_PLCMGR" >> $SUMMARY_FILE
echo "PORT_CAS_TPMLMGR=$PORT_CAS_TPMLMGR ; export PORT_CAS_TPMLMGR" >> $SUMMARY_FILE
echo "PORT_CAS_PAGGEN=$PORT_CAS_PAGGEN ; export PORT_CAS_PAGGEN" >> $SUMMARY_FILE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo "PORT_CMS_SERVER=$PORT_CMS_SERVER ; export PORT_CMS_SERVER" >> $SUMMARY_FILE
echo "PORT_VHS_PORT=$PORT_VHS_PORT ; export PORT_VHS_PORT" >> $SUMMARY_FILE
echo "PORT_NETP=$PORT_NETP ; export PORT_NETP" >> $SUMMARY_FILE
# findme
echo "CAS_PORT_OLD=$CAS_PORT_OLD ; export CAS_PORT_OLD # old Port needed to delete old
CAS"    >> $SUMMARY_FILE
echo "ORACLE_VGN_BASE_OLD=$ORACLE_VGN_BASE_OLD ; export ORACLE_VGN_BASE_OLD #old Vignette
directory needed to delete CAS"    >> $SUMMARY_FILE
echo "LOGDIR=$LOGDIR ; export LOGDIR" >> $SUMMARY_FILE
echo "STARTUP_LOCATION=$STARTUP_LOCATION ; export STARTUP_LOCATION" >> $SUMMARY_FILE
echo "INSTALL_TYPE=$INSTALL_TYPE ; export INSTALL_TYPE" >> $SUMMARY_FILE
echo INSTALL_LOGFILE=$INSTALL_LOGFILE >> $SUMMARY_FILE
echo SUMMARY_FILE=$SUMMARY_FILE >> $SUMMARY_FILE
echo " "
cat $SUMMARY_FILE
echo " "

# =======================================================
# now start installation
# we do loop through until we get a valid response (Y or N) to this question
ans_ok="N"
while ["$ans_ok" = "N"]
do
     START_INSTALL=Y
     echo
     echo Answer Y to start install, N to rerun setup, or X to exit.
     echo "Start installation using these values (Y/N/X)"
     read START_INSTALL
START_INSTALL=`echo ${START_INSTALL} | tr "[a-z]" "[A-Z]"`
     if ["$START.INSTALL" = "Y"] ; then
          ans_ok="Y"
     elif ["$START_INSTALL" = "N"] ; then
          ans_ok="Y"
     elif ["$START_INSTALL" = "X"] ; then
          ans_ok="Y"
          echo "Installation aborted."
          exit
     else
          echo
          echo Please answer Y or N. $START_INSTALL is an invalid response.
          ans_ok="N"
     fi
done

# Call main installation script or rerun setup

if ["$START_INSTALL" = "Y"] ; then
     . $INSTALL_HOME/main.sh
else
     . $INSTALL_HOME/setup.sh
fi
$INSTALL_HOME/echodbg.sh"`date` setup.sh completed." 2
# !/bin/ksh
# Filename:     unTar
# Description:  Shell script to copy the TAR files from the TAR_DIR to the
#               TOOLS_DIR and expand them.

# Written by:   Bob Wessa 9/13/1999
#               Northeast eBusiness Center
Oracle Corporation

# Revision History
# Date       Who        Why
# 2/7/2000   rwessa     Updated for iPrototype Phase II
#                       Add ability to untar only certain pieces
# ========================================================================
echo "entering unTar.sh . . ."
echo "Untarring files for install_type=$INSTALL_TYPE"
echo
echo "TAR file directory: "$TAR_DIR
echo "Install Source directory:     $TAR_DIR"
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo "Target Base directory:         $BASE_DIR"
echo "Target DataBase file root directory: $DB_ROOT_DIR"
echo "Target DataBase file directory: $DB_DATA_DIR"

echo ORACLE_BASE=$ORACLE_BASE
echo ORACLE_OAS_BASE=$ORACLE_OAS_BASE
echo ORACLE_VGN_BASE=$ORACLE_VGN_BASE
echo DB_ROOT_DIR=$DB_ROOT_DIR

# INSTALL_TYPE=D ==============================

if ["$INSTALL_TYPE" = "D"] ; then
. $INSTALL_HOME/unTar_db.sh
# end of if $INSTALL_TYPE=D
fi

# INSTALL_TYPE=I ==============================

if ["$INSTALL_TYPE" = "I"] ; then
. $INSTALL_HOME/unTar_i.sh
# end of if $INSTALL_TYPE=I
fi

# INSTALL_TYPE=V ==============================

if ["$INSTALL_TYPE" = "V"] ; then
. $INSTALL_HOME/unTar_vgn.sh
# end of if $INSTALL_TYPE=V
fi

# INSTALL_TYPE=F ==============================

if ["$INSTALL_TYPE" = "F"] ; then
. $INSTALL_HOME/unTar_db.sh
. $INSTALL_HOME/unTar_i.sh
. $INSTALL_HOME/unTar_vgn.sh
# end of if $INSTALL_TYPE=F
fi
!/bin/ksh
# Filename       install_db.sh
# Author         RWessa
# Date           2/7/2000
# Description    Main installation script for iPrototype
#                Called be setup, which prompts for proper
#                user input.
# Parameters None
# Usage          This scripts SHOULD NOT be called directly.
#                Instead, you should call setup, answer
the necessary questions, and let setup
call this script.

# ========================================================
# Revision History
# Date        Who        Why
# 01/31/2000  rwessa     Initial create date

# ========================================================

# ****************************************************
# Do not edit this file.
# ****************************************************
$INSTALL_HOME/echodbg.sh "entering install_db.sh . . ." 2
$INSTALL_HOME/echodbg.sh " " 2
if ["$INSTALL_TYPE" = "D"] || ["$INSTALL_TYPE" = "F"] ; then
    $INSTALL_HOME/echodbg.sh "starting database install for INSTALL_TYPE=$INSTALL_TYPE . . ."
    $INSTALL_HOME/echodbg.sh "Running scripts to untar database files" 2
    $INSTALL_HOME/unTar_db.sh
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# $INSTALL_HOME/echodbg.sh " "
# $INSTALL_HOME/echodbg.sh "Running scripts to create links needed for proper operation"
#. $INSTALL_HOME/setLinks_db.sh
    $INSTALL_HOME/echodbg.sh "Creating database user $ORACLE. Be sure to set the password."
4
    $INSTALL_HOME/echodbg.sh
    . $INSTALL_HOME/createUsers_db.sh
# $INSTALL_HOME/echodbg.sh "Removing old SCCS files"
# $INSTALL_HOME/echodbg.sh" "
#. $INSTALL_HOME/fixSCCS.sh
    $INSTALL_HOME/echodbg.sh " " 4
    $INSTALL_HOME/echodbg.sh "Set file ownership to the proper users" 4
    . $INSTALL_HOME/setOwners_db.sh
    $INSTALL_HOME/echodbg.sh "Create the oratab entry . . ." 4
    $INSTALL_HOME/echodbg.sh " "
    . $INSTALL_HOME/setOratab.sh
    $INSTALL_HOME/echodbg.sh "Create initialization scripts" 4
    $INSTALL_HOME/echodbg.sh " "
    . $INSTALL_HOME/setInit.sh
    $INSTALL_HOME/echodbg.sh "Set tnsnames.ora and listener.ora parameters" 4
    $INSTALL_HOME/echodbg.sh " "
    . $INSTALL_HOME/setNet_db.sh
    $INSTALL_HOME/echodbg.sh "Configure the database and rebuild the control files" 4
    $INSTALL_HOME/echodbg.sh "Ignore copy error messages if file is being moved to the same
location" 4
    $INSTALL_HOME/echodbg.sh " "
    . $INSTALL_HOME/configureDB.sh
# $INSTALL_HOME/echodbg.sh "Shutdown database"
# $INSTALL_HOME/echodbg.sh " "
#su - ${ORACLE} -c "stopDB${oracle_sid}"
#su - ${ORACLE} -c "stopNET${oracle_sid}"
#read ans?"hit enter to continue"
# $INSTALL_HOME/echodbg.sh "Clean up the file system"
# $INSTALL_HOME/echodbg.sh " "
#. $INSTALL_HOME/cleanupScripts.sh
#read ans?"hit enter to continue"
# $INSTALL_HOME/echodbg.sh "Startup ispeed instance"
# $INSTALL_HOME/echodbg.sh " "
#/etc/rc3.d/S90${oracle_sid}
#read ans?"hit enter to continue"
# $INSTALL_HOME/echodbg.sh "Ports used by this instance ${oracle_sid}" >
$TOOLS_DIR/${oracle_sid}ports
# $INSTALL_HOME/echodbg.sh "OAS Node $OAS_NODE" >> $TOOLS_DIR/${oracle_sid}ports
# $INSTALL_HOME/echodbg.sh "OAS Admin $OAS_ADMIN" >> $TOOLS_DIR/${oracle_sid}ports
# $INSTALL_HOME/echodbg.sh "NetP $NETP_PORT" >> $TOOLS_DIR/${oracle_sid}ports
# $INSTALL_HOME/echodbg.sh "OAS Base $OAS_BASE" >> $TOOLS_DIR/${oracle_sid}ports
# $INSTALL_HOME/echodbg.sh "Apache Base $APACHE_BASE" >> $TOOLS_DIR/${oracle_sid}ports
# $INSTALL_HOME/echodbg.sh "OAS ORB Base $OAS_ORB_BASE" >> $TOOLS_DIR/${oracle_sid}ports
# $INSTALL_HOME/echodbg.sh "TNS Listener $TNS_PORT" >> $TOOLS_DIR/${oracle_sid}ports
# $INSTALL_HOME/echodbg.sh "change passwords"
# $INSTALL_HOME/echodbg.sh " "
#. $INSTALL_HOME/setPasswords.sh
fi
!/bin/ksh
# Filename      install_full.sh
# Author        RWessa
# Date          2/7/2000
# Description   installation script for iPrototype
#               Called by main, and installs all components
#               of iPrototype on the same machine.

# Parameters    None
# Usage         This script SHOULD NOT be called directly.
#               Instead, you should call setup, answer
the necessary questions, and let setup
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#              call main which calls this script.
#              This script will in turn call the installation
#              script for each iPrototype component.

# =========================================================================

# ***********************************************************
# Do not edit this file.
***********************************************************
. $INSTALL_HOME/echodbg.sh "entering install_full.sh . . ."
if ["$INSTALL_TYPE" = "F"] ; then
. $INSTALL_HOME/echodbg.sh "starting install for INSTALL_TYPE=F . . ."
      echo "Performing full installation procedure . . ."
. $INSTALL_HOME/install_db.sh
. $INSTALL_HOME/install_i.sh
. $INSTALL_HOME/install_vgn.sh
else
      echo "install_full.sh was called incorrectly. INSTALL_TYPE=$INSTALL_TYPE"
fi
exit
#!/bin/ksh
# Filename       install_i.sh
# Author         RWessa
# Date           2/7/2000
# Description    Main installation script for iPrototype
#                components iStore, OAS, and iMarketing and
#                Net Perceptions.
#                Called by setup->main.
#                which prompts for proper user input.
# Parameters None
# Usage          This scripts SHOULD NOT be called directly.
#                Instead, you should call setup, answer
the necessary questions, and let this
#                script be called

# =========================================================================

# ***********************************************************
# Do not edit this file.
***********************************************************
$INSTALL_HOME/echodbg.sh "entering install_i.sh . . ." 1
if ["$INSTALL_TYPE" = "I"] || ["$INSTALL_TYPE" = "F"] ; then
      $INSTALL_HOME/echodbg.sh "Performing iStore/OAS/iMarketing install for
INSTALL_TYPE=$INSTALL_TYPE . . ." 2
$INSTALL._HOME/echodbg.sh "Running scripts to untar middle tier setup files" 4
. $INSTALL_HOME/unTar_i.sh
$INSTALL_HOME/echodbg.sh "Running scripts to create links needed for proper operation" 4
. $INSTALL_HOME/setLinks_i.sh
$INSTALL_HOME/echodbg.sh "Running createUsers_i.sh . . ." 4
. $INSTALL_HOME/createUsers_i.sh
$INSTALL_HOME/echodbg.sh "running setOwners i.sh" 4
. $INSTALL_HOME/setOwners_i.sh
#. $INSTALL_HOME/setInit
$INSTALL_HOME/echodbg.sh "running setNet_i.sh" 4
. $INSTALL_HOME/setNet_i.sh
$INSTALL_HOME/echodbg.sh "running configureOAS.sh" 4
. $INSTALL_HOME/configureOAS.sh
$INSTALL_HOME/echodbg.sh "running configureNetp.sh" 4
. $INSTALL_HOME/configureNetp.sh
$INSTALL_HOME/echodbg.sh "running configureICS.sh" 4
. $INSTALL_HOME/configureICS.sh
#echo "Update Netp and startup database and listener"
#echo " "
#. $INSTALL_HOME/updateNetp
#su - ${ORACLE} -c "startNET${oracle_sid}"
#echo "Shutdown database"
#echo " "
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#su - ${ORACLE} -c "stopDB${oracle_sid}"
#su - ${ORACLE} -c "stopNET${oracle_sid}"
#echo "Clean up the file system"
#echo " "
#. $INSTALL_HOME/cleanupScripts
#echo "Startup iSpeed instance"
#echo " "
#/etc/rc3.d/S90${oracle_sid}]
#. $INSTALL_HOME/setPasswords_i.sh
fi
!/bin/ksh
# Filename:      unTar_db.sh
# Description:   Shell script to unTar complete database (datafiles and code)

# Written by:    Bob Wessa 9/13/1999
#                Northeast eBusiness Center
Oracle Corporation

# Revision History
# Date         Who       Why
# 2/7/2000     rwessa    Updated for iPrototype Phase II
#                        Add ability to untar only certain pieces
# 8/27/2000    rwessa    modified to use zcat command instead of tar -z option
# ======================================================================

# INSTALL_TYPE=D ======================================

echo "entering unTar_db.sh . . ."
date
date > $LOGDIR/unTar_db.log
if ["$INSTALL_TYPE" = "D"] || ["$INSTALL_TYPE" = "F"] ; then
# make sure proper directories exist
    if [-s "$BASE_DIR"]
    then
        echo "The directory $BASE_DIR already exists."
    else
        echo "$BASE_DIR will be created."
        mkdir -p $BASE_DIR
# .exit 2
    fi
    if [-s "$DB_DATA_DIR"]
    then
        echo "The directory $DB_DATA_DIR already exists."
    else
        echo "$DB_DATA_DIR will be created."
        mkdir -p $DB_DATA_DIR
        #exit 3
    fi
    if [-s "$ORACLE_BASE"]
    then
        echo "The directory $ORACLE_BASE already exists."
    else
        echo "$ORACLE_BASE will be created."
        mkdir -p $ORACLE_BASE
# exit 2
    fi
    echo "untarring db files $TAR_DIR/$ORADATA_FILE to ${DB_DATA_DIR} . . ."
    cd ${DB_DATA_DIR}
    pwd >> $LOGDIR/unTar_db.log
    echo "untarring tar -xvzf $TAR_DIR/$ORADATA_FILE" >> $LOGDIR/unTar_db.log
    #use zcat command instead of tar -z which does not always work
    #tar -xvzf $TAR_DIR/$ORADATA_FILE >> $LOGDIR/unTar_db.log
    zcat $TAR_DIR/$ORADATA_FILE | tar -xvf - >>$LOGDIR/unTar_db.log
    echo "untarring Oracle technology file ${TAR_DIR}/${ORACLETS_FILE} to ${ORACLE_BASE} . . ."
    cd ${ORACLE_BASE}
    pwd >> $LOGDIR/unTar_db.log
    echo "untarring tar -xvzf ${TAR_DIR}/$(ORACLETS_FILE}" >> $LOGDIR/unTar_db.log
    #use zcat command instead of tar -z which does not always work
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    #tar -xvzf ${TAR_DIR}/$(ORACLETS_FILE) >> $LOGDIR/unTar_db.log
    zcat ${TAR_DIR}/${ORACLETS_FILE} | tar -xvf - >> $LOGDIR/unTar_db.log

# end of if $INSTALL_TYPE=D
fi
!/bin/ksh
# Filename:      unTar_vgn.sh
# Description:   Shell script to unTar Vignette code and Apache listener
#                Vignette requires Apache and therefore these two products
#                are handled together.

# Written by:    Bob Wessa 9/13/1999
#                Northeast eBusiness Center
Oracle Corporation

# Revision History
# Date         Who      Why
# 2/7/2000     rwessa   Updated for iPrototype Phase II
#                       Add ability to untar only certain pieces
# 8/27/2000    rwessa   modified to use zcat command instead of tar -z option
# =========================================================================
echo "entering unTar_vgn.sh . . ."
date
date > $LOGDIR/unTar_vgn.log
# INSTALL_TYPE=V =======================================
# Vignette and Apache must be installed together
if ["$INSTALL_TYPE" = "V"] || ["$INSTALL_TYPE" = "F"] ; then
# make sure proper directories exist
# check the existence of the base Vignette directory and create if needed
    if [-s "$ORACLE_VGN_BASE"]
    then
        echo "The directory $ORACLE_VGN_BASE already exists."
    else
        echo "$ORACLE_VGN_BASE will be created."
        mkdir -p $ORACLE_VGN_BASE
        #exit 3
    fi
# check the existence of the base Apache directory and create if needed
    if [-s "$ORACLE_AP_BASE"]
    then
        echo "The directory $ORACLE_AP_BASE already exists."
    else
        echo "$ORACLE_AP_BASE will be created."
        mkdir -p $ORACLE_AP_BASE
        #exit 3
    fi
echo "Untarring files for install_type=$INSTALL_TYPE"
echo
echo "TAR file directory:             $TAR_DIR"
echo "Install Source directory:       $INSTALL_HOME"
echo "Vignette source TAR file:       $VIGNETTE_FILE"
echo "Apache source TAR file:         $APACHE_FILE"
echo "Target Vignette Base directory: $ORACLE_VGN_BASE"
echo "Target Apache Base directory:   $ORACLE_AP_BASE"
# extract Vignette
    echo "untarring Vignette file $VIGNETTE_FILE to ${ORACLE_VGN_BASE} . . ."
    cd ${ORACLE_VGN_BASE}
    pwd >> $LOGDIR/unTar_vgn.log
    echo "untarring tar -xvzf $TAR_DIR/$VIGNETTE_FILE" >> $LOGDIR/unTar_vgn.log
    #use zcat command instead of tar -z which does not always work
    #tar -xvzf $TAR_DIR/$VIGNETTE_FILE >> $LOGDIR/unTar_vgn.log
    zcat $TAR_DIR/$VIGNETTE_FILE | tar -xvf - >> $LOGDIR/unTar_vgn.log
# extract Apache
    echo "untarring Apache file ${TAR_DIR}/${APACHE_FILE} to ${ORACLE_AP_BASE} . . ."
    cd ${ORACLE_AP_BASE}
    pwd >> $LOGDIR/unTar_vgn.log
    echo "untarring tar -xvzf ${TAR_DIR}/${APACHE_FILE}" >> $LOGDIR/unTar_vgn.log
    #use zcat command instead of tar -z which does not always work
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    #tar -xvzf ${TAR_DIR}/${APACHE_FILE} >> $LOGDIR/unTar_vgn.log
    zcat ${TAR_DIR}/${APACHE_FILE} | tar -xvf - >> $LOGDIR/unTar_vgn.log

# end of if $INSTALL_TYPE=V
fi
!/bin/ksh

# Routine to setup the oratab files for iStore

#                 Oracle Corporation
if [-a/var/opt/oracle/oratab]
then
    if {'grep -ci "$ORACLE_SID:" /var/opt/oracle/oratab' -eq 0]
    then
    echo "$ORACLE_SID:$ORACLE_HOME:Y" >> /var/opt/oracle/oratab
    else
    echo " "
    grep -i "$ORACLE_SID:" /var/opt/oracle/oratab
    echo "WARNING: The /var/opt/oracle/oratab already contains the above entry for"
    echo ". . . this instance. Verify that the oratab file is the correct."
    echo " "
    fi
else
    mkdir /var/opt/oracle
    echo "$oracle_sid:$ORACLE_HOME:Y" > /var/opt/oracle/oratab
fi
chgrp $GROUPNAME /var/opt/oracle/oratab
chmod 664 /var/opt/oracle/oratab
#!/bin/ksh

# Routine to setup the listener and tnsnames files far iStore

# Written by:     Lane Findley 8/1/99
#                 Oracle Corporation
# ################################################################
# Date      Who      Why
# 2/10/2000  rwessa   Modified to use new variables for iPrototype
#                     Phase II

# ################################################################
echo " "
echo "A listener.ora file is being created. If you have more"
echo "than one database on the system, check the listener.ora"
echo "file for accuracy."
echo " "
cat << EOF > /tmtp/listener.ora
${ORACLE_SID} =
    (ADDRESS_LIST =
        (ADDRESS= (PROTOCOL= IPC) (KEY= ${ORACLE_SID}))
        (ADDRESS= (PROTOCOL= TCP) (Host= ${hostname}) (Port= ${TNS_PORT}))
    )
SID_LIST_$ {ORACLE_SID} =
    (SID_LIST =
        (SID_DESC =
            (ORACLE_HOME= ${ORACLE_HOME})
            (SID_NAME = ${ORACLE_SID})
        )
        (SID_DESC =
            (SID_NAME = extproc)
            (ORACLE_HOME = ${ORACLE_HOME})
            (PROGRAM = extproc)
        )
    )
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
EOF
cp /tmp/listener.ora "${ORACLE_HOME}/network/admin/listener.ora"
cat << EOP > "${ORACLE_HOME}/network/admin/tnsnames.ora"
extproc_connection_data =
    (DESCRIPTION =
        (ADDRESS = (PROTOCOL = IPC) (KEY = ${oracle_sid}))
        (CONNECT_DATA = (SID = extproc))
    )
${oracle_sid} =
    (DESCRIPTION =
        (ADDRESS = (PROTOCOL = TCP) (Host= ${hostname}${domain}) (Port= ${TNS_PORT}))
        (CONNECT_DATA = {SID = ${oracle_sid}))
    )
${oracle_sid}_BEQ =
    (DESCRIPTION =
        (ADDRESS = (PROTOCOL = BEQ) (PROGRAM = ${ORACLE_HOME})
            (argv0 = oracle${oracle_sid})
            (args = '(DESCRIPTION = (LOCAL=YES) (ADDRESS=(PROTOCOL=BEQ)))')
            (envs = 'ORACLE_HOME=${ORACLE_HOME}, ORACLE_SID=${oracle_sid}')
        )
    )
EOF
# create links so that there is only one set of tnsnames.ora and listener.ora files
#rm "$TOOLS_DIR/oracle/product/ics/network/admin/listener.ora"
#rm "$TOOLS_DIR/oracle/product/ics/network/admin/tnsnames.ora"
#ln -s \
# "$TOOLS_DIR/oracle/product/8.0.5/network/admin/listener.ora"\
# "$TOOLS_DIR/oracle/product/ics/network/admin/listener.ora"
#ln -s \
# "$TOOLS_DIR/oracle/product/8.0.5/network/admin/tnsnames.ora"\
# "$TOOLS_DIR/oracle/product/ics/network/admin/tnsnames.ora"
#!/bin/ksh
# Filename:      unTar_i.sh
# Description:   Shell script to unTar OAS, iStore and IMarketing

# Written by:    Bob Wessa 9/13/1999
#                Northeast eBusiness Center
Oracle Corporation

# Revision History
# Date        Who      Why
# 2/7/2000    rwessa   Updated for iPrototype Phase II
#                      Add ability to untar only certain pieces
# 8/27/2000   rwessa   modified to use zcat command instead of tar -z option
# ========================================================================

# INSTALL_TYPE=I =========================================

$INSTALL_HOME/echodbg.sh "'date' entering unTar_i.sh" 1
if ["$INSTALL_TYPE" = "I"] || ["$INSTALL_TYPE" = "F"] ; then
$INSTALL_HOME/echodbg.sh "Untarring Middle Tier files for install_type=$INSTALL_TYPE" 2
    $INSTALL_HOME/echodbg.sh "Tar File Source directory:      $TAR_DIR" 2
    $INSTALL_HOME/echodbg.sh "Source TAR file:                $MIDTIER_FILE" 2
    $INSTALL_HOME/echodbg.sh "Target OAS and iStore Destination directory: $ORACLE_OAS_BASE" 2
    $INSTALL_HOME/echodbg.sh "Target NP Destination directory:  $ORACLE_NP_BASE" 2

    if [-s "$ORACLE_OAS_BASE"]
    then
        $INSTALL_HOME/echodbg.sh "The directory $ORACLE_OAS_BASE already exists and will be used." 2
    else
        $INSTALL_HOME/echodbg.sh "$ORACLE_OAS_BASE will be created." 2
        mkdir -p $ORACLE_OAS_BASE
# exit 2
    fi

```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        if [-s "$ORACLE_NP_BASE"]
        then
            $INSTALL_HOME/echodbg.sh "The directory $ORACLE_NP_BASE already exists and will be
used." 2
        else
            $INSTALL_HOME/echodbg.sh "$ORACLE_NP_BASE will be created." 2
            mkdir -p $ORACLE_NP_BASE
        fi
        $INSTALL_HOME/echodbg.sh "untarring middle tier files ${TAR_DIR}/${MIDTIER_FILE} to
$ORACLE_OAS_BASE . . ." 2
        cd $ORACLE_OAS_BASE
        $INSTALL_HOME/echodbg.sh "pwd='pwd'" 1
        $INSTALL_HOME/echodbg.sh "untarring tar -xvzf $TAR_DIR/$MIDTIER_FILE" 1
        #use zcat command instead of tar -z which does not always work
        #tar -xvzf $TAR_DIR/$MIDTIER_FILE >> $LOGDIR/unTar_i.log
        zcat $TAR_DIR/$MIDTIER_FILE | tar -xvf - >> $LOGDIR/unTar_i.log
        $INSTALL_HOME/echodbg.sh "untarring NetP files ${TAR_DIR}/${NETP_FILE} to
$ORACLE_NP_BASE . . ." 1
        cd $ORACLE_NP_BASE
        $INSTALL_HOME/echodbg.sh "pwd='pwd'" 1
        $INSTALL_HOME/echodbg.sh "untarring tar -xvzf $TAR_DIR/$NETP_FILE" 1
        #use zcat command instead of tar -z which does not always work
        #tar -xvzf $TAR_DIR/$NETP_FILE >> $LOGDIR/unTar_i.log
        zcat $TAR_DIR/$NETP_FILE | tar -xvf - >> $LOGDIR/unTar_i.log
fi
!/bin/ksh
# Filename       check_ports.sh
# Author         RWessa
# Date           2/7/2000
# Description    Script to check availability of ports for iPrototype setup.
#                Called by setup, which prompts for proper
#                user input.
# Parameters None
# Usage          This scripts SHOULD NOT be called directly.
#                Instead, you should call setup, answer
the necessary questions, and let setup
call this script.

# ======================================================================

# *********************************************************
# Do not edit this file.
# *********************************************************
for i in 'netstat -a | grep $hostname | cut -f5 -d. | cut -f1 -d" "'
do
if [$OAS_NODE = $i]
then
echo OAS_NODE $i port is already in use
#exit
elif [$OAS_ADMIN = $i]
then
echo OAS_ADMIN $i port is already in use
#exit
elif [${OAS_BASE}000 = $i]
then
echo OAS_BASE $i port is already in use
#exit
elif [${APACHE_BASE}201 = $i]
then
echo APACHE_BASE $i port is already in use
#exit
elif [${OAS_ORB_BASE}49 = $i]
then
echo OAS_ORB_BASE $i port is already in use
#exit
elif [$TNS_PORT = $i]
then
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo TNS_PORT $i port is already in use
#exit
fi
done
for i in 'netstat -a | grep LISTEN|cut -f2 -d.| cut -f1 -d" "'
do
if [$OAS_NODE = $i]
then
echo OAS_NODE $1 port is already in use
#exit
elif [$OAS_ADMIN = $i]
then
echo OAS_ADMIN $i port is already in use
#exit
elif [${OAS_BASE}000 = $i]
then
echo OAS_BASE $i port is already in use
#exit
elif [${APACHE_BASE}201 = $i]
then
echo APACHE_BASE $i port is already in use
#exit
elif [${OAS_ORB_BASE}49 = $i]
then
echo OAS_ORB_BASE $i port is already in use
#exit
elif [$TNS_PORT = $i ]
then
echo TNS_PORT $i port is already in use
#exit
fi
done
#!/bin/ksh
# Filename        check_access.sh
# Author          RWessa
# Date            2/7/2000
# Description     Script called my main setup script for iPrototype.
#                 Verifies that we have root access.
# Parameters None
# Usage           This scripts SHOULD NOT be called directly.
#                 Instead, you should call setup, answer
the necessary questions, and let setup
call this script.

# ========================================================================
# Revision History
# Date         Who     Why
# 02/11/2000   rwessa  Initial create date

# ========================================================================

# ***************************************************
# Do not edit this file.
# ***************************************************
# First run some necessary checks on the answers to the questions
echo
echo "Checking for proper user privileges . . ."
export logged_user='id | cut -c7-10'
if [$logged_user = 'root']
then
echo "You are running this script as root"
else
echo "You must run this script as root"
exit
fi
!/bin/ksh
# Filename        check_sid.sh
# Author          RWessa
# Date            2/7/2000
# Description     Script called my main setup script for iPrototype.
#                 Verifies that we are not using the same ORACLE_SID which
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#                  the iPrototype was initially developed under.
# Parameters   None
# Usage            This scripts SHOULD NOT be called directly.
#                  Instead, you should call setup, answer
the necessary questions, and let setup
call this script.

# ==========================================================================
# Revision History
# Date         Who      Why
# 02/11/2000   rwessa   Initial create date

# ==========================================================================

# **********************************************************
# Do not edit this file.
# **********************************************************
# First run some necessary checks on the answers to the questions
echo
echo "Checking for duplicate ORACLE_SID usage . . ."
if [$oracle_sid = "$OLD_ORACLE_SID"]
then
echo "Please do not use $ORACLE_SID as the Oracle SID"
exit
fi
!/bin/ksh
# Filename         check_setup.sh
# Author           RWessa
# Date             2/7/2000
# Description      Script called my main setup script for iPrototype.
#                  Displays final variable definitions for review.
# Parameters   None
# Usage            This scripts SHOULD NOT be called directly.
#                  Instead, you should call setup, answer
the necessary questions, and let setup
call this script.

# ==========================================================================
# Revision History
# Date         Who      Why
# 02/11/2000   rwessa   Initial create date

# ==========================================================================

# **********************************************************
# Do not edit this file.
# **********************************************************
echo " "
echo "The old tools directory from where the snapshot was taken is"
echo "set to $TOOLS_OLD_DIR"
echo "The old Hostname from where the snapshot was taken is"
echo "set to $OLD_HOSTNAME"
echo "The old ORACLE_SID from where the snapshot was taken is"
echo "set to $old_oracle_sid"
echo " "
echo " "
echo "The new tools directory has been set to $TOOLS_DIR"
echo "The new database directory has been set to $DB_DIR"
echo "The new ORACLE_SID has been set to $oracle_sid"
echo " "
echo "The owner of the Oracle files is $ORACLE"
echo "The owner of the Apache files is $APACHE"
echo "The owner of the ICS files is $ICS"
echo "The owner of the Vignette files is $VIGNETTE"
echo " "
echo "The host name was detected to be $hostname"
echo "The IP Address was detected to be $IP_ADDRESS"
# LOGFILE is defined in setup.sh
#LOGFILE=/usr/local/maint/setupii/setup.log
#export LOGFILE
echo
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo Current Settings
echo ORACLE_SID=$ORACLE_SID >> $LOGFILE
echo ORACLE_BASE=$ORACLE_BASE
echo TOOLS_OLD_DIR=$TOOLS_OLD_DIR
echo OLD_HOSTNAME=$OLD_HOSTNAME
echo OLD_ORACLE_SID=$OLD_ORACLE_SID
echo OLD_APACHE_BASE=$OLD_APACHE_BASE
echo TOOLS_DIR=$TOOLS_DIR
echo DB_DIR=$DB_DIR
echo ORACLE=$ORACLE
echo APACHE=$APACHE
echo ICS=$ICS
echo VIGNETTE=$VIGNETTE
echo ORACLE_BASE=$ORACLE_BASE
echo ORACLE_OAS_BASE=$ORACLE_OAS_BASE
echo ORACLE_VGN_BASE=$ORACLE_VGN_BASE
echo DB_ROOT_DIR=$DB_ROOT_DIR
echo DOMAIN=$DOMAIN
echo proxyserver=$proxyserver
echo proxyport=$proxyport
echo OAS_NODE=$OAS_NODE
echo OAS_ADMIN=$OAS_ADMIN
echo NETP_PORT=$NETP_PORT
echo OAS_BASE=$OAS_BASE
echo APACHE_BASE=$APACHE_BASE
echo OAS_ORB_BASE=$OAS_ORB_BASE
echo TNS_PORT=$TNS_PORT
echo VHS_PORT=$VHS_PORT
echo HOSTNAME=$HOSTNAME
echo hostname=$hostname
echo IP_ADDRESS=$IP_ADDRESS
echo ORACLE_SID=$ORACLE_SID
echo oracle_sid=$oracle_sid
echo OLD_ORACLE_SID=$OLD_ORACLE_SID
echo old_oracle_sid=$old_oracle_sid
echo domain=$domain
echo ORACLE_HOME=$ORACLE_HOME
echo logged_user=$logged_user
echo INCLUDE_VIGNETTE=$INCLUDE_VIGNETTE
echo INSTALL_TYPE=$INSTALL_TYPE
echo TAR_DIR=$TAR_DIR
echo ORACLE_TS_FILE=$ORACLETS_FILE
echo ORADATA_FILE=$ORADATA_FILE
echo MIDTIER_FILE=$MIDTIER_FILE
echo NETP_FILE=$NETP_FILE
echo APACHE_FILE=$APACHE_FILE
echo VIGNETTE_FILE=$VIGNETTE_FILE
read ans?"hit enter to continue or Ctrl C to quit"
#!/bin/ksh

# Routine to setup NetPerceptions for iSpeed

# Written by: Lane Findley 8/1/99
#              Oracle Corporation

# ====================================================================
# Revision History

# 03-09-2000 rwessa Modified to work for iPrototype 2
#              Updated to use new variables
# ====================================================================
. $INSTALL_HOME/echodbg.sh "entering configureNetp.sh"
netp_source=$INSTALL_HOME/templates/netp
netp_dest="$ORACLE_NP_BASE"
. $INSTALL_HOME/echodbg.sh "netp_dest: $netp_dest"
. $INSTALL_HOME/echodbg.sh "netp_source: $netp_source"
rm "$netp_dest/iona/ImpRep/NS.imp"
. $INSTALL_HOME/echodbg.sh "configuring $netp_dest/config/S98orb"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
cat "$netp_source/S98orb" | \
    sed "s+O_R_A_C_L_E_S_I_D+${oracle_sid}+"g | cat | \
    sed "s+O_R_A_C_L_E_N_P_B_A_S_E+${ORACLE_NP_BASE}+"g \
    > "$netp_dest/config/S98orb"
. $INSTALL_HOME/echodbg.sh "configuring $netp_dest/config/S99netp"
cat "$netp_source/S99netp" | \
    sed "s+O_R_A_C_L_E_S_I_D+${oracle_sid}+"g | cat | \
    sed "s+O_R_A_C_L_E_N_P_B_A_S _E+${ORACLE_NP_BASE}+"g \
    > $netp_dest/config/S99netp"
. $INSTALL_HOME/echodbg.sh "configuring $netp_dest/config/env.cfg"
cat "$netp_source/env.cfg" | \
    sed "s+O_R_A_C_L_E_S_I_D+${ORACLE_SID}+"g | cat | \
    sed "s+N_E_T_P_P_O_R_T+${NETP_PORT}+"g | cat | \
    sed "s+N_P_D_B_U_S_E_R+${DB_USER_NETP}+"g | cat | \
    sed "s+N_P_D_B_P_A_S_S+${DB_PW_NETP}+"g | cat | \
    sed "s+O_R_A_C_L_E_N_P_B_A_S_E+${ORACLE_NP_BASE}+"g \
    > $netp_dest/config/env.cfg"
# $INSTALL_HOME/echodbg.sh "configuring $netp_dest/config/shprofile"
cat "$netp_source/cshprofile" | \
    sed "s+O_R_A_C_L_E_O_A_S_B_A_S_E+${ORACLE_OAS_BASE}+"g | cat | \
    sed "s+O_R_A_C_L_E_S_I_D+${ORACLE_SID}+"g | cat | \
    sed "s+O_R_A_C_L_E_N_P_B_A_S_E+${ORACLE_NP_BASE}+"g \
    > "${netp_dest}/config/cshprofile"
. $INSTALL_HOME/echodbg.sh "configuring $netp_dest/config/shprofile"
cat "$netp_source/cshprofile" | \
    sed "s+O_R_A_C_L_E_S_I_D+${oracle_sid}+"g | cat | \
    sed "s+O_R_A_C_L_E_O_A_S_B_A_S_E+${ORACLE_OAS_BASE}+"g | cat | \
    sed "s+O_R_A_C_L_E_N_P_B_A_S_E+${ORACLE_NP_BASE)+"g \
    > "$netp_dest/config/shprofile"
. $INSTALL_HOME/echodbg.sh "configuring $netp_dest/iona/Orbix.cfg"
cat "$netp_source/Orbix.cfg" | \
    sed "s+O_R_A_C_L_E_S_I_D+${oracle_sid}+"g | cat | \
    sed "s+O_R_A_C_L_E_N_P_B_A_S_E+${ORACLE_NP_BASE}+"g | cat | \
    sed "s+N_E_T_P_P_O_R_T+${NETP_PORT}+"g | cat | \
    sed "s+D_O_M_A_I_N+$(DOMAIN}+"g \
    > "$netp_dest/iona/Orbix.cfg"
. $INSTALL_HOME/echodbg.sh "configuring $netp_dest/iona/OrbixWeb.properties"
cat "$netp_source/OrbixWeb.properties" | \
    sed "s+O_R_A_C_L_E_S_I_D+${oracle_sid}+"g | cat | \
    sed "s+O_R_A_C_L_E_N_P_B_A_S_E+${ORACLE_NP_BASE)+"g | cat | \
    sed "s+D_O_M_A_I_N+${DOMAIN})+"g | cat | \
    sed "s+N_E_T_P_P_O_R_T+${NETP_PORT}+"g | cat | \
    sed "s+H_O_S_T_N_A_M_E+${hostname}+"g \
    > "$netp_dest/iona/OrbixWeb.properties"
. $INSTALL_HOME/echodbg.sh "configuring $netp_dest/iona/Locator/Orbix.hosts"
cat "$netp_source/Orbix.hosts" | \
    sed "s+O_R_A_C_L_E_S_I_D+${oracle_sid}+"g | cat | \
    sed "s+D_O_M_A_I_N+${DOMAIN}+"g | cat | \
    sed "s+O_R_A_C_L_E_N_P_B_A_S_E+${ORACLE_NP_BASE}+"g | cat | \
    sed "s+H_O_S_T_N_A_M_E+${hostname}+"g \
    > "$netp_dest/iona/Locator/Orbix.hosts"
. $INSTALL_HOME/echodbg.sh "configuring $USER_BASE_DIR/${NETP}/update_netp.sq1"
cat "$netp_source/update_netp.sq1" | \
    sed "s+O_R_A_C_L_E_S_I_D+${oracle_sid}+"g | cat | \
    sed "s+O_R_A_C_L_E_N_P_B_A_S_E+${ORACLE_NP_BASE}+"g | cat | \
    sed "s+O_L_D_O_R_A_C_L_E_N_P_B_A_S_E+${OLD_ORACLE_NP_BASE}+"g | cat | \
    sed "s+D_B_U_S_E_R_N_E_T_P+${DB_USER_NETP}+"g \
    > "$USER_BASE_DIR/${NETP}/update_netp.sql"
# Discovered that we need to remove the old orb data for proper setup
# This data will be automatically generated if it doesn't exist, but
# interferes when it exists and the hostname has been changed.
'rm $netp_dest/iona/NamesRep/*'
# execute the update netp script just created under the netp user.
# The database and listener must be up and running for this to work
su - ${NETP} -c "sqlplus ${DB_USER_NETP}/${DB_PW_NETP}@${ORACLE_SID} @update_netp.sql"
#!/bin/ksh
echo "Attempting to run svrmgr to update Netp tables . . ."
#su - ${ORACLE} -c"
#ORACLE_SID=${ORACLE_SID}
ORAENV_ASK=NO
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#cat "${DB_DIR}/oradata/${oracle_sid}/cr${oracle_sid}ctrl.sql" | svrmgrl
#"
su - ${ORACLE} -c"
svrmgrl << EOF
connect internal
startup
connect D_B_U_S_E_R_N_E_T_P/D_B_P_W_N_E_T_P
@$USER_BASE_DIR/${NETP}/update_netp.sql
"
exit
EOF
#!/bin/ksh
# Filename: configureApache.sh

# Description:
#           Reconfigures the Apache listener for iPrototype
#           Once done, this script will start Apache by calling
#           the startApache script just created. Apache
#           must be up for the Vignette reconfiguration script
#           to work properly.

# ==========================================================================
# Revision History
# Date         Who      Why
# 03/07/2000   rwessa   Created for iPrototype Version 2
# ==========================================================================

. $INSTALL_HOME/echodbg.sh "entering configureApache.sh" 2
grep loghost /etc/hosts
if ["$?" = 1] ; then
. $INSTALL_HOME/echodbg.sh "WARNING: You hosts file must have the following type of
entry" 2
. $INSTALL_HOME/echodbg.sh ". . . ${IP_ADDRESS} ${hostname}.${DOMAIN} ${hostname}
loghost" 2
. $INSTALL_HOME/echodbg.sh ". . ." 2
. $INSTALL_HOME/echodbg.sh ". . . Without this entry, httpd will not start." 2
. $INSTALL_HOME/echodbg.sh ". . . You must make this entry and restart the
installation." 5
exit
fi
apache_source=$INSTALL_HOME/templates/apache
apache_dest="$ORACLE_AP_BASE/conf"
. $INSTALL_HOME/echodbg.sh "Updating ${apache_dest}/access.conf" 4
cat "$apache_source/access.conf" | \
    sed "s+H_O_S_T_N_A_M_E+${hostname}+"g | cat | \
    sed "s+D_O_M_A_I_N+${domain}+"g | cat | \
    sed "s+O_R_A_C_L_E_A_P_B_A_S_E+${ORACLE_AP_BASE}+"g | cat | \
    sed "s+O_R_A_C_L_E_V_G_N_B_A_S_E+${ORACLE_VGN_BASE}+"g \
    > "${apache_dest{/access.conf"
. $INSTALL_HOME/echodbg.sh "Updating ${apache_dest}/srm.conf" 4
cat "$apache_source/srm.conf" | \
    sed "s+H_O_S_T_N_A_M_E+${hostname}+"g | cat | \
    sed "s+D_O_M_A_I_N+${domain}+"g | cat | \
    sed "s+O_R_A_C_L_E_A_P_B_A_S_E+${ORACLE_AP_BASE}+"g | cat | \
    sed "s+O_R_A_C_L_E_V_G_N_B_A_S_E+${ORACLE_VGN_BASE}+"g \
    > ¢${apache_dest}/srm.conf"
. $INSTALL_HOME/echodbg.sh "Updating ${apache_dest}/httpd.conf" 4
cat "$apache_source/httpd.conf" | \
    sed "s+H_O_S_T_N_A_M_E+${hostname}+"g | cat | \
    sed "s+D_O_M_A_I_N+${domain}+"g | cat | \
    sed "s+O_R_A_C_L_E_A_P_B_A_S_E+${ORACLE_AP_BASE}+"g | cat | \
    sed "s+O_R_A_C_L_E_V_G_N_B_A_S_E+${ORACLE_VGN_BASE}+"g | cat | \
    sed "s+A_P_A_C_H_E_B_A_S_E+${APACHE_BASE}+"g \
    > "${apache_dest}/httpd.conf"
. $INSTALL_HOME/echodbg.sh "Updating ${apache_dest}/. . ./sbin/apachectl" 4
cat "$apache_source/apachectl" | \
    sed "s+H___S_T_N_A_M_E+${hostname}+"g | cat | \
    sed "s+D_O_M_A_I_N_+${domain}+"g | cat | \
    sed "s+O_R_A_C_L_E_A_P_B_A_S_E+${ORACLE_AP_BASE}+"g | cat | \
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        sed "s+O_R_A_C_L_E_V_G_N_B_A_S_E+${ORACLE_VGN_BASE}+"g \
        > "$ (apache_dest}/. . ./sbin/apachectl"
. $INSTALL_HOME/echodbg.sh "Updating ${apache_dest}/. . ./sbin/apxs" 4
cat "$apache_source/apxs" | \
        sed "s+H_O_S_T_N_A_M_E+${hostname}+"g | cat | \
        sed "s+D_O_M_A_I_N+${domain}+"g | cat | \
        sed "s+O_R_A_C_L_E_A_P_B_A_S_E+${ORACLE_AP_BASE}+"g | cat | \
        sed "s+O_R_A_C_L_E_V_G_N_B_A_S_E+${ORACLE_VGN_BASE}+"g \
        > "${apache_dest}/. . ./sbin/apxs"
. $INSTALL_HOME/echodbg.sh "Starting apache . . ." 2
su - ${APACHE} -c "startApache"
echo "listing apache processes, should see httpd listener started." >> $INSTALL_LOGFILE
ps -ef | grep $APACHE >> $INSTALL_LOGFILE
. $INSTALL_HOME/echodbg.sh "configureApache.sh completed." 2
#!/bin/ksh
# Filename: fixSCCS.sh

# This script calls the appropriate script to remove dangling links
# for SCCS embedded in the directories.
. $INSTALL_HOME/fixSCCS_full.sh
#!/bin/ksh
# Filename       main.sh
# Author         RWessa
# Date           2/7/2000
# Description    Main installation script for iPrototype
#                Called be setup, which prompts for proper
#                user input.
# Parameters None
# Usage          This scripts SHOULD NOT be called directly.
#                Instead, you should call setup, answer
the necessary questions, and let setup
call this script.

# ==========================================================================
# Revision History
# Date        Who     Why
# 01/31/2000  rwessa  Initial create date

# ==========================================================================
# ***********************************************************
# Do not edit this file.
***********************************************************
#echo "Checking for proper user privileges . . ."
#. $INSTALL_HOME/check_access.sh
#echo "Checking for duplicate ORACLE_SID . . ."
#. $INSTALL_HOME/check_sid.sh
#echo "checking availability of port numbers chosen . . ."
#. $INSTALL_HOME/check_ports
#echo "Review environment variable setup . . ."
. $INSTALL_HOME/check_setup.sh
if ["$INSTALL_TYPE" = "F"] ; then
     . $INSTALL_HOME/install_full.sh
fi
if ["$INSTALL_TYPE" = "D"] ; then
     . $INSTALL_HOME/install_db.sh
fi
if ["$INSTALL_TYPE" = "V"] ; then
     . $INSTALL_HOME/install_vgn.sh
fi
if ["$INSTALL_TYPE" = "I"] ; then
     . $INSTALL_HOME/install_i.sh
fi
$INSTALL_HOME/echodbg.sh "'date' main.sh completed." 2
#!/bin/ksh

# Filename:    setNet_i.sh
# Author:      rwessa
#              Oracle Corporation
# Description:
#              This file will create the tnsnames.ora and listener.ora file
#              needed in the network admin directory for the $ORACLE_HOME
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#          for OAS.
#          We no longer use links to create the OAS ORACLE_HOME version,
#          since OAS and DB may now be on separate machines.
#          Instead, create two identical files based on the same
template, with separate create scripts for each. There is a
#          corresponding setNet_db.sh script to create the tnsnames and
#          listener files for the database ORACLE_HOME.

###########################################################
# Date              Who       Why
# Apr. 19, 2000     rwessa    Created.

# ###########################################################
echo " "
. $INSTALL_HOME/echodbg.sh "setNet_i.sh: Creating listener.ora and tnsnames.ora. . . "
cat ${INSTALL_HOME}/templates/oracle/listener.ora | \
    sed "s+T_N_S_P_O_R_T+${TNS_PORT}+"g | cat | \
    sed "s+h_o_s_t_n_a_m_e+${hostname}+"g | cat | \
    sed "s+O_R_A_C_L_E_H_O_M_E+${ORACLE_HOME}+"g | cat | \
    sed "s+O_R_A_C_L_E_S_I_D+${ORACLE_SID}+"g \
    > "${ORACLE_OAS_PROD_BASE}/network/admin/listener.ora"
chown ${ORACLE}:${GROUPNAME} "${ORACLE_OAS_PROD_BASE}/network/admin/listener.ora"
chown ${ORACLE}:${GROUPNAME} "${ORACLE_OAS_PROD_BASE}/network/admin/listener.ora" >>
$scriptfile
cat ${INSTALL_HOME}/templates/oracle/tnsnames.ora | \
    sed "s+T_N_S_P_O_R_T+${TNS_PORT}+"g | cat | \
    sed "s+d_o_m_a_i_n+${domain}+"g | cat | \
    sed "s+h_o_s_t_n_a_m_e+${hostname}+"g | cat | \
    sed "s+O_R_A_C_L_E_H_O_M_E+${ORACLE_HOME}+"g | cat | \
    sed "s+O_R_A_C_L_E_S_I_D+${ORACLE_SID}+"g \
    > "${ORACLE_OAS_PROD_BASE}/network/admin/tnsnames.ora"
chown ${ORACLE}:${GROUPNAME} "${ORACLE_OAS_PROD_BASE}/network/admin/tnsnames.ora"
chown ${ORACLE}:${GROUPNAME} "${ORACLE_OAS_PROD_BASE}/network/admin/tnsnames.ora" >>
$scriptfile
. $INSTALL_HOME/echodbg.sh "setNet_i.sh: done"
#!/bin/ksh
# Filename:     setLinks_i.sh

# Author:       Robert Wessa
#               Northeast eBusiness Center
Oracle Corporation

# Description:

# This script recreates the appropriate links
# within the middle tier directory structure for iPrototype to work after
# cloning.
# The cloning process will change the directory structure and
# and links must be recreated to match.

# Do not call this script directly. It should be called form the main
# setup.sh script.

# ==========================================================
# Revision History
# Date
# Mar. 14, 2000    rwessa    Created
# ==========================================================
rm $ORACLE_OAS_PROD_BASE/network/agent/library/libosm.so
ln -s $ORACLE_OAS_PROD_BASE/lib/libosm.so \
$ORACLE_OAS_PROD_BASE/network/agent/library/libosm.so
rm $ORACLE_OAS_PROD_BASE/ows/mesg/owsus.msb
ln -s $ORACLE_OAS_PROD_BASE/ows/4.0/mesg/owsus.msb \
$ORACLE_OAS_PROD_BASE/ows/mesg/owsus.msb
rm $ORACLE_OAS_PROD_BASE/ows/mesg/owsus.msg
ln -s $ORACLE_OAS_PROD_BASE/ows/4.0/mesg/owsus.msg \
$ORACLE_OAS_PROD_BASE/ows/mesg/owsus.msg
# LTF Sept. 27, 1999 Suspect problem with link commands, and using the code below
# to be safe
rm $ORACLE_OAS_PROD_BASE/network/jre11/lib/sparc/green_threads/libXm.so
ln -s \
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
$ORACLE_OAS_PROD_BASE/network/jre11/lib/sparc/green_threads/libXm.so.3 \
$ORACLE_OAS_PROD_BASE/network/jre11/lib/sparc/green_threads/libXm.so
#rm $ORACLE_OAS_PROD_BASE/jre1.1.4/lib/sparc/green_threads/libXm.so
#ln -s \
#$ORACLE_OAS_PROD_BASE/jre1.1.4/lib/sparc/green_threads/libXm.so.3 \
#$ORACLE_OAS_PROD_BASE/jre1.1.4/lib/sparc/green_threads/libXm.so
#!/bin/ksh
# Filename      setOwners.sh
# Author        RWessa
# Date          Feb. 7, 2000
# Description   Master script to set ownership.
#               Calls proper script based on install_type
#               Called by iPrototype installation script.

# Parameters
None
# Usage         This script SHOULD NOT be called directly.
#               Instead, you should call setup, answer
the necessary questions, and let this
#               be called at the proper time.

# =====================================================================
# Revision History
# Date              who         why
# Feb. 10, 2000     rwessa      Created
# =====================================================================
#***********************************************************
# Do not edit this file.
***********************************************************
if [ "$INSTALL_TYPE" = "D" ] ; then
    .$INSTALL_HOME/setOwners_db.sh
fi
if [ "$INSTALL_TYPE" = "V" ] ; then
    .$INSTALL_HOME/setOwners_vgn.sh
fi
if [ "$INSTALL_TYPE" = "I" ] ; then
    .$INSTALL_HOME/setOwners_i.sh
fi
if [ "$INSTALL_TYPE" = "F" ] ; then
    .$INSTALL_HOME/setOwners_full.sh
fi
!/bin/ksh
#Filename:      setInit.sh
# Routine to setup the the startup and shutdown scripts for iSpeed

# Written by:   Lane Findley Aug. 1, 1999
#               Oracle Corporation
. $INSTALL_HOME/echodbg.sh "Configuring $STARTUP_LOCATION/S90${oracle_sid}"
cat ${INSTALL_HOME}/templates/init/S90ispeed | \
    sed "s+D_O_M_A_I_N+${domain}+"g | cat | \
    sed "s+H_O_S_T_N_A_M_E+${hostname}+"g | cat | \
    sed "s+O_R_A_C_L_E_S_I_D+${oracle_sid}+"g | cat | \
    sed "s+O_R_A_C_L_E_I_D+${ORACLE}+"g | cat | \
    sed "s+V_I_G+${VIGNETTE}+"g | cat | \
    sed "s+T_O_O_L_S_D_I_R+${TOOLS_DIR}+"g | cat | \
    sed "s+I_C_S+${ICS}+"g > "$STARTUP_LOCATION/S90${oracle_sid}"
. $INSTALL_HOME/echodbg.sh "Configuring $STARTUP_LOCATION/K02${oracle_sid}"
cat ${INSTALL_HOME}/templates/init/K02ispeed | \
    sed "s+D_O_M_A_I_N+${domain}+"g | cat | \
    sed "s+H_O_S_T_N_A_M_E+${hostname}+"g | cat | \
    sed "s+O_R_A_C_L_E_S_I_D+${oracle_sid}+"g | cat | \
    sed "s+O_R_A_C_L_E_I_D+${ORACLE}+"g | cat | \
    sed "s+V_I_G+${VIGNETTE}+"g | cat | \
    sed "s+T_O_O_L_S_D_I_R+${TOOLS_DIR}+"g | cat | \
    sed "s+I_C_S+${ICS}+"g > "$STARTUP_LOCATION/K02${oracle_sid}"
chmod +x "$STARTUP_LOCATION/S90${oracle_sid}"
chmod +x "$STARTUP_LOCATION/K02${oracle_sid}"
#!/bin/ksh
# Filename:     setLinks_db.sh

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# Author:      Robert Wessa
#              Northeast eBusiness Center
Oracle Corporation

# Description:

# This script calls the appropriate scripts to recreate the appropriate links
# within the Oracle directory structure for iPrototype to work after cloning.
# The cloning process will change the directory structure and
# and links must be recreated to match.

# Do not call this script directly. It should be called form the main
# setup.sh script.

# ======================================================================
# Revision History
# Date
# Mar. 14, 2000     rwessa     Created
# ======================================================================
if [ "$INSTALL_TYPE" = "D" ] ; then
    . $INSTALL_HOME/setLinks_db.sh
fi
if [ "$INSTALL_TYPE" = "I" ] ; then
    . $INSTALL_HOME/setLinks_i.sh
fi
if [ "$INSTALL_TYPE" = "F" ] ; then
    . $INSTALL_HOME/setLinks_db.sh
    . $INSTALL_HOME/setLinks_i.sh
fi
!/bin/ksh
# Filename:     configureDB.sh

# Description:  Reconfigures a cloned database.
#               This script should NOT be called directly but needs
to be called from the main setup.sh installation script
for iPrototype Version 2.

# ############################################################
# Date              Who       Why
# Feb. 10, 2000     rwessa    Modified to use new variables for iPrototype
#                             Phase II

# ############################################################
. $INSTALL_HOME/echodbg.sh " entering configureDB.sh . . . " 2
scriptfile=$INSTALL_LOGFILE
echo DB_DATA_DIR=$DB_DATA_DIR >> $scriptfile
ls -la $DB_DATA_DIR >> $scriptfile
date >> $scriptfile
set >> $scriptfile
echo " " >> $scriptfile
pwd >> $scriptfile
#mv "$DB_ROOT_DIR/${OLD_ORACLE_SID}" "${DB_DATA_DIR}/${ORACLE_SID}"
# echo mv "$DB_ROOT_DIR/${OLD_ORACLE_SID}" "${DB_DATA_DIR}/${ORACLE_SID}" >> $scriptfile
#chown "${ORACLE}":$GROUPNAME "${DB_DATA_DIR}/${ORACLE_SID}"
#   echo chown "${ORACLE}":$GROUPNAME "${DB_DATA_DIR}/${ORACLE_SID}" >> $scriptfile
mv "${ORACLE_BASE}/admin/${OLD_ORACLE_SID}" "${ORACLE_BASE}/admin/${ORACLE_SID}"
    echo mv "${ORACLE_BASE}/admin/${OLD_ORACLE_SID}" "${ORACLE_BASE}/admin/${ORACLE_SID}" >> $scriptfile
rm "${DB_DATA_DIR}/rdo11${OLD_ORACLE_SID}.dbf"
    echo rmstat $?"${DB_DATA_DIR}/rdo11${OLD_ORACLE_SID}.dbf" >> $scriptfile
rm "${DB_DATA_DIR}/rdo12${OLD_ORACLE_SID}.dbf"
    echo rmstat $? "${DB_DATA_DIR}/rdo12${OLD_ORACLE_SID}.dbf" >> $scriptfile
rm "${DB_DATA_DIR}/rdo${OLD_ORACLE_SID}13.dbf"
    echo rmstat $? "${DB_DATA_DIR}/rdo13${OLD_ORACLE_SID}.dbf" >> $scriptfile
rm "${DB_DATA_DIR}/rdo21${OLD_ORACLE_SID}.dbf"
    echo rmstat $? "${DB_DATA_DIR}/rdo21${OLD_ORACLE_SID}.dbf" >> $scriptfile
rm "${DB_DATA_DIR}/rdo22${OLD_ORACLE_SID}.dbf"
    echo rmstat $? "${DB_DATA_DIR}/rdo22${OLD_ORACLE_SID}.dbf" >> $scriptfile
rm "${DB_DATA_DIR}/rdo23${OLD_ORACLE_SID}.dbf"
    echo rmstat $? "${DB_DATA_DIR}/rdo23${OLD_ORACLE_SID}.dbf" >> $scriptfile
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
rm "${DB_DATA_DIR}/ctl1${OLD_ORACLE_SID}.ctl"
    echo rmstat $? "${DB_DATA_DIR}/ctl1${OLD_ORACLE_SID}.ctl" >> $scriptfile
rm "${DB_DATA_DIR}/ctl2${OLD_ORACLE_SID}.ctl"
    echo rmstat $? "${DB_DATA_DIR}/ctl2${OLD_ORACLE_SID}.ctl" >> $scriptfile
cd "${DB_DATA_DIR}"
cd "${DB_DATA_DIR}" >> $scriptfile
pwd >> $scriptfile
for source in *.dbf
do
    destination= `echo ${source} | sed "s/${OLD_ORACLE_SID}/${ORACLE_SID}/"`
    if [ "${source}" != "${destination}" ]
    then
        echo "\tRenaming ${source} to ${destination} . . . " >> $scriptfile
        echo mv ${source} "${destination}" >> $scriptfile
        mv ${source} "${destination}"
        echo $? Move status for ${source} "${destination}" >> $scriptfile
    fi
    chown ${ORACLE}:$GROUPNAME "${destination}"
    chown ${ORACLE}:$GROUPNAME "${destination}" >> $scriptfile
done
. $INSTALL_HOME/echodbg.sh "creating
${ORACLE_BASE}/admin/${ORACLE_SID}/pfile/config${ORACLE_SID}.ora . . . " 4
cat ${INSTALL_HOME}/templates/oracle/configDB.ora | \
    sed "s+D_B_D_A_T_A_D_I_R+${DB_DATA_DIR}+"g | cat | \
    sed "s+O_R_A_C_L_E_S_I_D+${ORACLE_SID}+"g | cat | \
    sed "s+O_R_A_C_L_E_B_A_S_E+${ORACLE_BASE}+"g \
    > "${ORACLE_BASE}/admin/${ORACLE_SID}/pfile/config${ORACLE_SID}.ora"
chown ${ORACLE}:$GROUPNAME
"${ORACLE_BASE}/admin/${ORACLE_SID}/pfile/config${ORACLE_SID}.ora"
echo chown ${ORACLE}:$GROUPNAME
"${ORACLE_BASE}/admin/${ORACLE_SID}/pfile/config${ORACLE_SID}.ora" >> $scriptfile
ln -s "${ORACLE_BASE}/admin/${ORACLE_SID}/pfile/config${ORACLE_SID}.ora" \
       "${ORACLE_HOME}/dbs/config${ORACLE_SID}.ora"
    echo ln -s "${ORACLE_BASE}/admin/${ORACLE_SID}/pfile/config${ORACLE_SID}.ora" \
        "${ORACLE_HOME}/dbs/config${ORACLE_SID}.ora" >> $scriptfile
. $INSTALL_HOME/echodbg.sh "creating
${ORACLE_BASE}/admin/${ORACLE_SID}/pfile/init${ORACLE_SID}.ora" 4
cat ${INSTALL_HOME}/templates/oracle/initDB.ora | \
    sed "s+D_B_D_A_T_A_D_I_R+${DB_DATA_DIR}+"g | cat | \
    sed "s+O_R_A_C_L_E_S_I_D+${ORACLE_SID}+"g | cat | \
    sed "s+O_R_A_C_L_E_B_A_S_E+${ORACLE_BASE}+"g \
    > "${ORACLE_BASE}/admin/${ORACLE_SID}/pfile/init${ORACLE_SID}.ora"
chown ${ORACLE}:$GROUPNAME
"${ORACLE_BASE}/admin/${ORACLE_SID}/pfile/init${ORACLE_SID}.ora"
echo chown ${ORACLE}:$GROUPNAME
"${ORACLE_BASE}/admin/${ORACLE_SID}/pfile/init${ORACLE_SID}.ora" >> $scriptfile
ln -s "${ORACLE_BASE}/admin/${ORACLE_SID}/pfile/init${ORACLE_SID}.ora" \
       "${ORACLE_HOME}/dbs/init${ORACLE_SID}.ora"
    echo ln -s "${ORACLE_BASE}/admin/${ORACLE_SID}/pfile/init${ORACLE_SID}.ora" \
        "${ORACLE_HOME}/dbs/init${ORACLE_SID}.ora" >> $scriptfile
. $INSTALL_HOME/echodbg.sh "creating ${DB_DATA_DIR}/cr${ORACLE_SID}ctrl.sql" 4
cat ${INSTALL_HOME}/templates/oracle/crctrl.sql | \
    sed "s+D_B_D_A_T_A_D_I_R+${DB_DATA_DIR}+"g | cat | \
    sed "s+O_R_A_C_L_E_S_I_D+${ORACLE_SID}+"g | cat | \
    sed "s+O_R_A_C_L_E_B_A_S_E+${ORACLE_BASE}+"g \
    > "{DB_DATA_DIR}/cr${ORACLE_SID}ctrl.sql"
chown ${ORACLE}:$GROUPNAME "${DB_DATA_DIR}/cr${ORACLE_SID}ctrl.sql"
# Use svrmgr to create new control files
. $INSTALL_HOME/echodbg.sh "Attempting to run svrmgr to create control files. . . " 4
su - ${ORACLE} -c "
ORACLE_SID=${ORACLE_SID}
ORAENV_ASK=NO
cat "${DB_DATA_DIR}/cr${ORACLE_SID}ctrl.sql" | svrmgrl
"
# Now start database and tns listener
su - ${ORACLE} -c "startDB${oracle_sid}"
su - ${ORACLE} -c "startNET${oracle_sid}"
. $INSTALL_HOME/echodbg.sh "configureDB.sh completed." 2
#!/bin/ksh
#Filename:    setOwners_db.sh
#Author:      RWessa
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#Description:  Sets proper ownership of Oracle files during
#              iPrototype installation.

#              Do not call this script directly. Instead, you
should run the setup.sh script which will eventually
call this script.

# ============================================================================
# remove references to old ORACLE_SID in $ORACLE_HOME/dbs directory
echo " "
echo "removing references to old ORACLE_SID $OLD_ORACLE_SID in $ORACLE_HOME/dbs
directory"
rm "$ORACLE_HOME/dbs/config${OLD_ORACLE_SID}.ora"
rm "$ORACLE_HOME/dbs/init${OLD_ORACLE_SID}.ora"
rm "$ORACLE_HOME/dbs/init${OLD_ORACLE_SID}_0.ora"
#rm "$ORACLE_HOME/dbs/init${OLD_ORACLE_SID}_0.ora"
#set database file ownership
echo "Setting ownership of $DB_ROOT_DIR/$ORACLE_SID to $ORACLE:$GROUPNAME"
chown -R "$ORACLE:$GROUPNAME" "$DB_ROOT_DIR/$ORACLE_SID"
#chgrp -R dba "$DB_DIR"
#set Oracle Technology set files ownership
echo "Setting ownership of $ORACLE_BASE to $ORACLE:$GROUPNAME"
chown -R "$ORACLE:$GROUPNAME" "$ORACLE_BASE"
#!/bin/ksh
# Filename:    createUsers.sh
# Utility for creating user accounts for iSpeed systems
# Robert Wessa
# Oracle Corporation

# This script calls the proper scripts to perform the installation
# for iPrototype.
# Do not call this script directly, rather it is called from the
# main setup.sh script during the iPrototype installation.

# INSTALL_TYPE=D =======================================

if [ "$INSTALL_TYPE" = "D" ]  ; then
. $INSTALL_HOME/createUsers_db.sh
# end of if $INSTALL_TYPE=D
fi

# INSTALL_TYPE=I =======================================

if [ "$INSTALL_TYPE" = "I" ] ; then
. $INSTALL_HOME/createUsers_i.sh
. $INSTALL_HOME/createUsers_np.sh
# end of if $INSTALL_TYPE=I
fi

# INSTALL_TYPE=V =======================================

if [ "$INSTALL_TYPE" = "V" ] ; then
. $INSTALL_HOME/createUsers_vgn.sh
. $INSTALL_HOME/createUsers_ap.sh
# end of if $INSTALL_TYPE=V
fi

# INSTALL_TYPE=F =======================================

if [ "$INSTALL_TYPE" = "F" ] ; then
. $INSTALL_HOME/createUsers_db.sh
. $INSTALL_HOME/createUsers_i.sh
. $INSTALL_HOME/createUsers_np.sh
. $INSTALL_HOME/createUsers_vgn.sh
. $INSTALL_HOME/createUsers_ap.sh
# end of if $INSTALL_TYPE=F
fi
!/bin/ksh
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#Filename:      setOwners_vgn.sh
#Author:        RWessa
#Description:   Sets proper ownership of files during iPrototype
#               installation

#               Do not call this script directly. Instead, you
should run the setup.sh script which will eventually
call this script.

# ========================================================================
. $INSTALL_HOME/echodbg.sh " "
. $INSTALL_HOME/echodbg.sh "Changing owner of $ORACLE_VGN_BASE to $VIGNETTE:$GROUPNAME"
# LTF added Sept. 17, 1999 remove dangling links in $ORACLE_HOME/dbs directory
#rm "$ORACLE_HOME/dbs/config${old_oracle_sid}.ora"
#rm "$ORACLE_HOME/dbs/init${old_oracle_sid}.ora"
#rm "$ORACLE_HOME/dbs/init${old_oracle_sid}_0.ora"
chown -R "$VIGNETTE":$GROUPNAME "$ORACLE_VGN_BASE"
. $INSTALL_HOME/echodbg.sh " "
. $INSTALL_HOME/echodbg.sh "Changing owner of $ORACLE_AP_BASE to $APACHE:$GROUPNAME"
chown -R "$APACHE":$GROUPNAME "$ORACLE_AP_BASE"
#!/bin/ksh
#Filename:      setOwners_i.sh
#Author:        RWessa
#Description:   Sets proper ownership of files during iPrototype
#               installation

#               Do not call this script directly. Instead, you
should run the setup.sh script which will eventually
call this script.

# ========================================================================
echo " "
# Set the ownership of the iStore/iMarketing/OAS directories
echo "Changing owner of $BASE_DIR/$ICS directory files"
chown -R "$ICS:$GROUPNAME" "$BASE_DIR/$ICS"
# Set the ownership of the netp directories
echo "Changing owner of $BASE_DIR/$NETP directory files"
chown -R "$NETP:$GROUPNAME" "$BASE_DIR/$NETP"
#!/bin/ksh
#Filename:      setOwners_full.sh
#Author:        RWessa
#Description:   Sets proper ownership of files during iPrototype
#               installation

#               Do not call this script directly. Instead, you
should run the setup.sh script which will eventually
call this script.

#               This file sets all ownership for the full
#               installation and simply calls each individual
#               file.

# ========================================================================
echo "entering setOwners_full.sh . . . "
. $INSTALL_HOME/setOwners_i.sh
. $INSTALL_HOME/setOwners_db.sh
. $INSTALL_HOME/setOwners_vgn.sh
#!/bin/ksh
# Filename:     setup.sh
# Author:       Robert Wessa
# Parameters:   None

# Description:  This file will prompt the user for the necessary input
#               parameters to run the iPrototype installation.

This file will prompt you for directory, port number,
#               username, etc., information and the following two key
#               items.
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```

#            Install type: (Full, DB only, iStore/OAS/iMarketing only).
#            The installation has the ability to load everything on one
#            server or split it into a database and application server.

#            iStore, OAS and iMarketing must be on the same server. They
can be included with the database on one central server or
loaded separately onto a middle tier applications server.

If the install type is
Full:    all products will be installed
DB Only: only the database (database files and software) will
be loaded onto the current machine.
#            Application server: iStore, OAS, and iMarketing are installed
#                     on the current machine.

#            If you do not choose a full install, you must install each
#            of the other two options separately.

#            Vignette Inclusion: Vignette can be included or dropped
from the solution set.

If the solution includes Vignette
iStore templates which call Vignette will be copied.
If the solution does not include Vignette
iStore templates which do not call Vignette will be copied.
The Vignette schema will be removed from the database.
The Vignette files will be removed from the file system
The Apache files will be removed from the file system.
Apache and Vignette references will be removed from the
startup scripts.

#========================================================================
# Revision History
# Date                Who      Why
# Jan. 31,2000        rwessa   Initial create date

#========================================================================
# =============  Begin Main Program  =================================
#========================================================================

# determine the installation type
# we can install everything on the current machine, just the database,
# or just the OAS/iStore/iMarketing piece.
# we do loop through until we get a valid response (F, I or D) to this question
ans_ok="N"
echo starting while
while [ "$ans_ok" = "N" ]
do
    export INSTALL_TYPE=F
    echo
    echo "Please specify 1 of the 4 installation types to be performed."
    echo " Vignette/Apache only(V)"
    echo " iStore/OAS/iMarketing only(I)"
    echo " Database only (D)"
    echo " Full solution set(F)"
    echo " Exit installer without installing anything(X)"
    echo "Please select one of the above (F, I, D) [$INSTALL_TYPE]"
    read ans
    if [ $ans ] ; then
        INSTALL_TYPE=`echo ${ans} | tr "[a-z]" "[A-Z]"`
        if [ "$INSTALL_TYPE" = "V" ] ; then
            ans_ok="Y"
        elif [ "$INSTALL_TYPE" = "I" ] ; then
            ans_ok="Y"
        elif [ "$INSTALL_TYPE" = "D" ] ; then
            ans_ok="Y"
        elif [ "$INSTALL_TYPE" = "F" ] ; then
            ans_ok="Y"
        elif [ "$INSTALL_TYPE" = "X" ] ; then
            ans_ok="Y"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
                echo "Installing terminated, no installation tasks performed."
                exit
        else
                echo
                echo Please answer V, I, D, F or X. $INSTALL_TYPE is an invalid response.
                ans_ok="N"
        fi
    else
                ans_ok="Y"
    fi
done

# determine if we will include Vignette in the solution set
# we do loop through until we get a valid response (Y or N) to this question
ans_ok="N"
echo starting while
while [ $ans_ok"= "N" ]
do
    INCLUDE_VIGNETTE=Y
    echo "Will Vignette be part of the solution set (Y or N) [$INCLUDE_VIGNETTE]"
    read ans
    if [ $ans ] ; then
        INCLUDE_VIGNETTE=`echo $[ans] | tr "[a-z]" "[A-Z]"`
        if [ "$INCLUDE_VIGNETTE" = "Y" ] ; then
            ans_ok="Y"
        elif [ "$INCLUDE_VIGNETTE" = "N" ] ; then
            ans_ok="Y"
        else
            echo
            echo Please answer Y or N, $INCLUDE_VIGNETTE is an invalid response.
            ans_ok="N"
        fi
    else
        ans_ok="Y"
    fi
done

export TOOLS_OLD_DIR=/u02/app/
echo "Enter the old tools directory[$TOOLS_OLD_DIR]"
read ans
if [ $ans ] ; then
    TOOLS_OLD_DIR=$ans
fi

export BASE_DIR=/u02/app
echo "Enter the base applications directory [$BASE_DIR]"
read ans
if [ $ans ] ; then
    BASE_DIR=$ans
fi

export OLD_HOSTNAME=dallsoluctrsv01
echo "Enter the old hostname [$OLD_HOSTNAME]"
read oh
if [ $oh ] ; then
    OLD_HOSTNAME=$oh
fi

export OLD_ORACLE_SID=FITS
echo "Enter the old ORACLE_SID [$OLD_ORACLE_SID]"
read oos
if [ $oos ] ; then
    OLD_ORACLE_SID=$oos
fi

export OLD_APACHE_BASE=454
echo "Enter the old Apache Base number [$OLD_APACHE_BASE]"
read oab
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [ $oab ] ; then
     OLD_APACHE_BASE=$oab
fi

export ORACLE=oraii
echo "Enter the Oracle username [$ORACLE]"
read ou
if [ $ou ] ; then
     ORACLE=$ou
fi

export APACHE=apaii
echo "Enter the apache username [$APACHE]"
read au
if [ $au ] ; then
     APACHE=$au
fi

export ICS=icsii
echo "Enter the iStore username [$ICS]"
read iu
if [ $iu ] ; then
     ICS=$iu
fi

export VIGNETTE=vignii
echo "Enter the Vignette username [$VIGNETTE]"
read ans
if [ $ans ] ; then
     VIGNETTE=$ans
fi

export GROUPNAME=dba
echo "Enter the new Group name for these users [$GROUPNAME]"
read ans
if [ $ans ] ; then
     GROUPNAME=$ans
fi

export ORACLE_SID=ISPDII;
export oracle_sid=`echo $ORACLE_SID | tr "[A-Z]" "[a-z]"`
echo "Enter the new ORACLE_SID [$ORACLE_SID]"
read ans
if [ $ans ] ; then
     ORACLE_SID =`echo $ans | tr "[a-z]" "[A-Z]"`
     oracle_sid =`echo $ans | tr "[A-Z]" "[a-z]"`
fi

export ORACLE_BASE=$BASE_DIR/$ORACLE
echo "Enter the location for your ORACLE_BASE [$ORACLE_BASE]"
read ans
if [ $ans ] ; then
     ORACLE_BASE=$ans
fi

export ORACLE_HOME=$ORACLE_BASE/product/805
echo "Enter the location for your ORACLE_HOME [$ORACLE_HOME]"
read ans
if [ $ans ] ; then
     ORACLE_HOME=$ans
fi

export ORACLE_OAS_BASE=$BASE_DIR/$ICS
echo "Enter the location for your OAS ORACLE_BASE [$ORACLE_OAS_BASE]"
read ans
if [ $ans ] ; then
     ORACLE_OAS_BASE=$ans
fi

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
export ORACLE_VGN_BASE=$BASE_DIR/$VIGNETTE
echo "Enter the location for your Vignette base directory [$ORACLE_VGN_BASE]"
read ans
if [ $ans ] ; then
     ORACLE_VGN_BASE=$ans
fi

export DB_ROOT_DIR=/u02/oradata
echo "Enter the parent Oracle database file directory[$DB_ROOT_DIR]"
read ans
if [ $ans ] ; then
     DB_ROOT_DIR=$ans
fi

export DB_DATA_DIR=/u02/oradata/$ORACLE_SID
echo "Enter the base Oracle database file directory[$DB_DATA_DIR]"
read ans
if [ $ans ] ; then
     DB_DATA_DIR=$ans
fi

export DOMAIN=us.oracle.com
echo "Enter the new domain [$DOMAIN]"
read dom
if [ $dom ] ; then
     DOMAIN=$dom
fi

export proxyserver=www-proxy.us.oracle.com
echo "Enter the new proxy server [$proxyserver]"
read ps
if [ $ps ] ; then
     proxyserver=$ps
fi

export proxyport=80
echo "Enter the new proxy port [$proxyport]"
read pp
if [ $pp ] ; then
     proxyport=$pp
fi

export OAS_NODE=46407
echo "Enter the new OAS Node port number [$OAS_NODE]"
read oasn
if [ $oasn ] ; then
     OAS_NODE=$oasn
fi

export OAS_ADMIN=46406
echo "Enter the new OAS Admin port # [$OAS_ADMIN]"
read oasa
if [ $oasa ] ; then
     OAS_ADMIN=$oasa
fi

export NETP_PORT=46435
echo "Enter the new Net Perceptions port # [$NETP_PORT]"
read np
if [ $np ] ; then
     NETP_PORT=$np
fi

export OAS_BASE=464
echo "Enter the OAS Ports Base # [$OAS_BASE]"
read oasb
if [ $oasb ] ; then
     OAS_BASE=$oasb
fi

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
export APACHE_BASE=464
echo "Enter the Apache Ports Base #[$APACHE_BASE]"
read apacheb
if [ $apacheb ] ; then
     APACHE_BASE=$apacheb
fi

export OAS_ORB_BASE=46408
echo "Enter the OAS ORB Base [$OAS_ORB_BASE]"
read oasob
if [ $oasob ] ; then
     OAS_ORB_BASE=$oasob
fi

export TNS_PORT=46437
echo "Enter the new TNS Port number [$TNS_PORT]"
read tnsp
if [ $tnsp ] ; then
     TNS_PORT=$tnsp
fi

export VHS_PORT=46436
echo "Enter the VHS Port number [$VHS_PORT]"
read vhsp
if [ $vhsp ] ; then
     VHS_PORT=$vhsp
fi

export TAR_DIR=/u14/cdimage/iPrototype/WithoutEMU
echo "Enter the directory location containing the TAR files [$TAR_DIR]"
read tdir
if [ $tdir ] ; then
     TAR_DIR=$tdir
fi

export ORACLETS_FILE=oraclets.tar
echo "Enter the Oracle technology stack tar file [$ORACLETS_FILE] "
read ans
if [ $ans ] ; then
     ORACLETS_FILE=$ans
fi

export ORADATA_FILE=oradata.tar
echo "Enter the Oracle data tar file [$ORADATA_FILE] "
read ans
if [ $ans ] ; then
     ORADATA_FILE=$ans
fi

export MIDTIER_FILE=middletier.tar
echo "Enter the Middle Tier tar file [$MIDTIER_FILE] "
read ans
if [ $ans ] ; then
     MIDTIER FILE=$ans
fi

export NETP_FILE=netp.tar
echo "Enter the Net Perceptions tar file [$NETP_FILE] "
read ans
if [ $ans ] ; then
     NETP_FILE=$ans
fi

export APACHE_FILE=apache.tar
echo "Enter the Apache tar file [$APACHE_FILE] "
read ans
if [ $ans ] ; then
     APACHE_FILE=$ans
fi

```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
export VIGNETTE_FILE=vignette.tar
echo "Enter the Vignette tarfile [$VIGNETTE_FILE] "
read ans
if [ $ans ] ; then
    VIGNETTE_FILE=$ans
fi

# need $TOOL_DIR for previous version compatibility
export TOOLS_DIR=$BASE_DIR/$ORACLE
export HOSTNAME=`hostname | tr "[a–z]" "[A–Z]"`
export hostname=`echo ${HOSTNAME} | tr "[A–Z]" "[a–z]"`
export IP_ADDRESS=`grep ${hostname} /etc/hosts | awk '{print $1}'`
export ORACLE_SID=`echo ${ORACLE_SID} | tr "[a–z]" "[A–Z]"`
export oracle_sid=`echo ${ORACLE_SID} | tr "[A–Z]" "[a–z]"`
export OLD_ORACLE_SID=`echo ${OLD_ORACLE_SID} | tr "[a–z]" "[A–Z]"`
export old_oracle_sid=`echo ${OLD_ORACLE_SID} | tr "[A–Z]" "[a–z]"`
export domain=`echo ${DOMAIN} | tr "A–Z" "[a–z]"`
#export ORACLE_HOME="${ORACLE_BASE}/oracle/product/8.0.5"
export logged_user=`id | cut –c7–10`

# Now print settings for review
echo
echo Current Settings
echo ORACLE_SID=$ORACLE_SID
echo ORACLE_BASE=$ORACLE_BASE
echo TOOLS_OLD_DIR=$TOOLS_OLD_DIR
echo OLD_HOSTNAME=$OLD_HOSTNAME
echo OLD_ORACLE_SID=$OLD_ORACLE_SID
echo OLD_APACHE_BASE=$OLD_APACHE_BASE
echo TOOLS_DIR=$TOOLS_DIR
echo DB_ROOT_DIR=$DB_ROOT_DIR
echo DB_DATA_DIR=$DB_DATA_DIR
echo ORACLE=$ORACLE
echo APACHE=$APACHE
echo ICS=$ICS
echo VIGNETTE=$VIGNETTE
echo GROUPNAME=$$GROUPNAME
echo BASE_DIR=$BASE_DIR
echo ORACLE_BASE=$ORACLE_BASE
echo ORACLE_OAS_BASE=$ORACLE_OAS_BASE
echo ORACLE_VGN_BASE=$ORACLE_VGN_BASE
echo DB_ROOT_DIR=$DB_ROOT_DIR
echo DOMAIN=$DOMAIN
echo proxyserver=$proxyserver
echo proxyport=$proxyport
echo OAS_NODE=$OAS_NODE
echo OAS_ADMIN=$OAS_ADMIN
echo NETP_PORT=$NETP_PORT
echo OAS_BASE=$OAS_BASE
echo APACHE_BASE=$APACHE_BASE
echo OAS_ORB_BASE=$OAS_ORB_BASE
echo TNS_PORT=$TNS_PORT
echo VHS_PORT=$VHS_PORT
echo HOSTNAME=$HOSTNAME
echo hostname=$hostname
echo IP_ADDRESS=$IP_ADDRESS
echo ORACLE_SID=$ORACLE_SID
echo oracle_sid=$oracle_sid
echo OLD_ORACLE_SID=$OLD_ORACLE_SID
echo old_oracle_sid=$old_oracle_sid
echo domain=$domain
echo ORACLE_HOME=$ORACLE_HOME
echo logged_user=$logged_user
echo INCLUDE_VIGNETTE=$INCLUDE_VIGNETTE
echo INSTALL_TYPE=$INSTALL_TYPE
echo TAR_DIR=$TAR_DIR
echo ORACLE_TS_FILE=$ORACLETS_FILE
echo ORADATA_FILE=$ORADATA_FILE
echo MIDTIER_FILE=$MIDTIER_FILE
echo NETP_FILE=$NETP_FILE
echo APACHE_FILE=$APACHE_FILE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo VIGNETTE_FILE=$VIGNETTE_FILE

# ========================================================================
# now start installation
# we do loop through until we get a valid response (Y or N) to this question
ans_ok="N"
while [ "$ans_ok" = "N" ]
do
    START_INSTALL=Y
    echo
    echo Answer Y to start install, N to rerun setup, or X to exit.
    echo "Start installation using these values (Y/N/X) "
    read START_INSTALL
    START_INSTALL=`echo ${START_INSTALL} | tr "[a-z]" "[A-Z]"`
        if [ "$START_INSTALL" = "Y" ] ; then
            ans_ok="Y"
        elif [ "$START_INSTALL" = "N" ] ; then
            ans_ok="Y"
        elif [ "$START_INSTALL" = "X" ] ; then
            ans_ok="Y"
            echo "Installation aborted. "
            exit
        else
            echo
            echo Please answer Y or N. $START_INSTALL is an invalid response.
            ans_ok="N"
        fi
done

# Call main installation script or rerun setup

if [ "$START_INSTALL" = "Y" ] ; then
    . ./mainii.sh
    else
        . ./setup.sh
fi
!/bin/ksh
echo " entering configureICS.sh"

echo "configuring cnls.en.msg "
cat $INSTALL_HOME/templates/ics/cnls.en.msg | \
    sed "s+D_O_M_A_I_N+${domain}+"g | cat | \
    sed "s+H_O_S_T_N_A_M_E+${hostname}+"g | cat |\
    sed "s+A_P_A_C_H_E_B_A_S_E+${APACHE_BASE}+"g | cat |\
    sed "s+O_A_S_B_A_S_E+${OAS_BASE}+"g | cat |\
    sed "s+P_R_O_X_Y_S_E_R_V_E_R+${proxyserver}+"g | cat |\
    sed "s+I_P_A_D_D_R_E_S_S+${IP_ADDRESS}+"g | cat |\
    sed "s+P_R_O_X_Y_P_O_R_T+${proxyport}+"g \
    > "$ORACLE_OAS_PROD_BASE/stage/store/mesg/cnls.en.msg"
chown ${ICS}:${GROUPNAME} "$ORACLE_OAS_PROD_BASE/stage/store/mesg/cnls.en.msg"

echo "configuring primary.dat "
cat $INSTALL_HOME/templates/ics/primary.dat | \
    sed "s+D_O_M_A_I_N+${domain}+"g | cat | \
    sed "s+H_O_S_T_N_A_M_E+${hostname}+"g | cat |\
    sed "s+O_A_S_N_O_D_E_P_O_R_T+${OAS_NODE_PORT}+"g | cat |\
    sed "s+O_A_S_S_I_T_E_N_A_M_E+${OAS_SITE_NAME}+"g | cat |\
    sed "s+A_P_A_C_H_E_B_A_S_E+${APACHE_BASE}+"g \
    > "$ORACLE_OAS_PROD_BASE/ows/4.0/admin/primary.dat"

echo "configuring cstage.cfg "
cat $INSTALL_HOME/templates/ics/cstage.cfg | \
    sed "s+O_R_A_C_L_E_O_A_S_P_R_O_D_B_A_S_E+${ORACLE_OAS_PROD_BASE}+"g | cat | \
    sed "s+D_O_M_A_I_N+${domain}+"g | cat | \
    sed "s+O_R_A_C_L_E_S_I_D+${ORACLE_SID}+"g | cat | \
    sed "s+H_O_S_T_N_A_M_E+${hostname}+"g | cat |\
    sed "s+A_P_A_C_H_E_B_A_S_E+${APACHE_BASE}+"g \
    > "$ORACLE_OAS_PROD_BASE/oec/config/cstage.cfg"

echo "configuring mstage.cfg "
cat $INSTALL_HOME/templates/ics/mstage.cfg | \
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    sed "s+O_R_A_C_L_E_O_A_S_P_R_O_D_B_A_S_E+${ORACLE_OAS_PROD_BASE}+"g | cat | \
    sed "s+O_R_A_C_L_E_S_I_D+${oracle_sid}+"g \
    > "$ORACLE_OAS_PROD_BASE/oec/config/mstage.cfg"

echo "configuring oecinvitm.cfg"
cat $INSTALL_HOME/templates/ics/oecinvitm.cfg | \
    sed "s+O_R_A_C_L_E_S_I_D+${oracle_sid}+"g \
    > "$ORACLE_OAS_PROD_BASE/oec/config/oecinvitm.cfg"

echo "configuring owsenv_bsh.sh"
cat $INSTALL_HOME/templates/ics/owsenv_bsh.sh | \
    sed "s+O_R_A_C_L_E_O_A_S_P_R_O_D_B_A_S_E+${ORACLE_OAS_PROD_BASE}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_B_A_S_E+${ORACLE_OAS_BASE}+"g \
    > "$ORACLE_OAS_PROD_BASE/ows/4.0/install/owsenv_bsh.sh"

echo "configuring gatekeeper.ior "
cat $INSTALL_HOME/templates/ics/gatekeeper.ior | \
    sed "s+O_R_A_C_L_E_O_A_S_P_R_O_D_B_A_S_E+${ORACLE_OAS_PROD_BASE}+"g \
    > "$ORACLE_OAS_PROD_BASE/ows/4.0/bin/gatekeeper.ior"
# can't seem to find perlidlc in this version
#cat $INSTALL_HOME/templates/ics/perlidlc | \
#   sed "s+T_O_O_L_S_D_I_R+${TOOLS_DIR}+"g \
#   > "$ORACLE_OAS_PROD_BASE/ows/4.0/bin/perlidlc"

echo "configuring rmproxy.ior"
cat $INSTALL_HOME/templates/ics/rmproxy.ior | \
    sed "s+O_R_A_C_L_E_O_A_S_P_R_O_D_B_A_S_E+${ORACLE_OAS_PROD_BASE}+"g \
    > "$ORACLE_OAS_PROD_BASE/ows/4.0/bin/rmproxy.ior"

echo "configuring server.dfl "
cat $INSTALL_HOME/templates/ics/server.dfl | \
    sed "s+O_R_A_C_L_E_O_A_S_P_R_O_D_B_A_S_E+${ORACLE_OAS_PROD_BASE}+"g \
    > "$ORACLE_OAS_PROD_BASE/ows/4.0/admin/config/server.dfl"
# The following templates don't exist yet
#cp $INSTALL_HOME/templates/ics/ieclogininv.en.htm \
#   "$ORACLE_OAS_PROD_BASE/stage/store/templates/ieclogininv.en.htm"
#chown $ICS:$GROUPNAME "$ORACLE_OAS_PROD_BASE/stage/store/templates/ieclogininv.en.htm"
#cp $INSTALL_HOME/templates/ics/ispdecwalkin.en.htm \
#   "$ORACLE_OAS_PROD_BASE/stage/store/templates/ispdecwalkin.en.htm"
#chown $ICS:$GROUPNAME "$ORACLE_OAS_PROD_BASE/stage/store/templates/ispdecwalkin.en.htm"
#cp $INSTALL_HOME/templates/ics/ispdstoreindex.en.htm \
#   "$ORACLE_OAS_PROD_BASE/stage/store/templates/ispdstoreindex.en.htm"
#chown $ICS:$GROUPNAME
"$ORACLE_OAS_PROD_BASE/stage/store/templates/ispdstoreindex.en.htm"
#!/bin/ksh
# Filename: fixSCCS_full.sh

# Remove dangling links for SCCS embedded in the Oracle home
# directory tree.

# INSTALL_TYPE=D =====================================

if [ "$INSTALL_TYPE" = "D" ] ; then
. $INSTALL_HOME/fixSCCS_db.sh
# end of if $INSTALL_TYPE=D
fi

# INSTALL_TYPE=I =====================================

if [ "$INSTALL_TYPE" = "I" ] ; then
. $INSTALL_HOME/fixSCCS_i.sh
# end of if $INSTALL_TYPE=I
fi

# INSTALL_TYPE=V =====================================

if [ "$INSTALL_TYPE" = "V" ] ; then
. $INSTALL_HOME/fixSCCS_vgn_.sh
. $INSTALL_HOME/fixSCCS_ap_.sh
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# end of if $INSTALL_TYPE=V
fi

# INSTALL_TYPE=F =========================================

if [ "$INSTALL_TYPE" = "F" ] ; then
. $INSTALL_HOME/fixSCCS_db.sh
. $INSTALL_HOME/fixSCCS_i.sh
. $INSTALL_HOME/fixSCCS_ap_.sh
. $INSTALL_HOME/fixSCCS_vgn_.sh
# end of if $INSTALL_TYPE=F
fi
!/bin/ksh

# Remove dangling links for SCCS embedded in the Oracle home
# directory tree.
rm 'find "${ORACLE_BASE}" -local -name SCCS -print'
exit
#!/bin/ksh

# Remove dangling links for SCCS embedded in the Oracle home
# directory tree.
rm 'find "${TOOLS_DIR}" -local -name SCCS -print'
exit
#!/bin/ksh

# Routine to set OAS to work with iStore and new nodename

# Written by:    Lane Findley Sept. 1, 1999
#                Oracle Corporation

# Revision History
# Date            Who?    why?
# ======================================================================
# Feb. 24, 2000 rwessa modified for iSpeed Phase using new directory setup

# ======================================================================
#update the WebSite Name
mv ${ORACLE_OAS_BASE}/admin/ows/${OAS_SITE_NAME_OLD}
${ORACLE_OAS_BASE}/admin/ows/${OAS_SITE_NAME}
mv ${ORACLE_OAS_BASE}/admin/orb/${OAS_SITE_NAME_OLD}
${ORACLE_OAS_BASE}/admin/orb/${OAS_SITE_NAME}
$INSTALL_HOME/echodbg.sh "mv ${ORACLE_OAS_BASE}/admin/ows/${OAS_SITE_NAME_OLD} 4
${ORACLE_OAS_BASE}/admin/ows/${OAS_SITE_NAME}"
$INSTALL_HOME/echodbg.sh "mv ${ORACLE_OAS_BASE}/admin/orb/${OAS_SITE_NAME_OLD}
${ORACLE_OAS_BASE}/admin/orb/${OAS_SITE_NAME}" 4
#update the http directory name
mv "${ORACLE_OAS_BASE}/admin/ows/${OAS_SITE_NAME}/httpd_"*
"${ORACLE_OAS_BASE}/admin/ows/${OAS_SITE_NAME}/httpd_${hostname}"
$INSTALL_HOME/echodbg.sh "mv ${ORACLE_OAS_BASE}/admin/ows/${OAS_SITE_NAME}/httpd_"
${ORACLE_OAS_BASE}/admin/ows/${OAS_SITE_NAME}/httpd_${hostname}" 4

# Remove old log files

rm "${ORACLE_OAS_BASE}/admin/ows/${OAS_SITE_NAME}/log/*"

# Change host name in .omnaddr file

$INSTALL_HOME/echodbg.sh "TCP:${hostname}:${OAS_ORB_BASE}49" >
"${ORACLE_OAS_BASE}/admin/ows/${OAS_SITE_NAME}/wrb/.omnaddr" 4
chown "${ICS}:$(GROUPNAME)" "${ORACLE_OAS_BASE}/admin/ows/${OAS_SITE_NAME}/wrb/.omnaddr"
# Edit and copy the .app files to the wrb directory
$INSTALL_HOME/echodbg.sh "configuring site.app" 4
cat $INSTALL_HOME/templates/web/site.app | \
    sed "s+D_O_M_A_I_N+${domain}+"g | cat | \
    sed "s+O_A_S_B_A_S_E+${OAS_BASE}+"g | cat | \
    sed "s+O_A_S_N_O_D_E+${OAS_NODE}+"g | cat | \
    sed "s+N_O_D_E_P_O_R_T+${OAS_NODE}+"g | cat | \
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+I_C_S+${ICS}+"g \
    > "${ORACLE_OAS_BASE}/admin/ows/${OAS_SITE_NAME}/wrb/site.app"
chown ${ICS}:${GROUPNAME} "${ORACLE_OAS_BASE}/admin/ows/${OAS_SITE_NAME}/wrb/site.app"

$INSTALL_HOME/echodbg.sh "configuring wrb.app" 4
cat $INSTALL_HOME/templates/web/wrb.app | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat |\
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "$ {ORACLE_OAS_BASE}/admin/ows/${OAS_SITE_NAME}/wrb/wrb.app"
chown ${ICS}:${GROUPNAME} "${ORACLE_OAS_BASE}/admin/ows/${OAS_SITE_NAME}/wrb/wrb.app"

$INSTALL_HOME/echodbg.sh "configuring site_s.app" 4
cat $INSTALL_HOME/templates/web/site_s.app | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+O_A_S_N_O_D_E+${OAS_NODE}+"g | cat | \
    sed "s+N_O_D_E_P_O_R_T+${OAS_NODE}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/wrb/site_s.app"
chown ${ICS}:${GROUPNAME} "${ORACLE_OAS_BASE}/admin/ows/${OAS_SITE_NAME}/wrb/site_s.app"

$INSTALL_HOME/echodbg.sh "configuring site_e.app" 4
cat $INSTALL_HOME/templates/web/site_e.app | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+O_A_S_N_O_D_E+${OAS_NODE}+"g | cat | \
    sed "s+N_O_D_E_P_O_R_T+${OAS_NODE}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/wrb/site_e.app"
chown ${ICS}:${GROUPNAME} "${ORACLE_OAS_BASE}/admin/ows/${OAS_SITE_NAME}/wrb/site_e.app"

$INSTALL_HOME/echodbg.sh "configuring adapter.app" 4
cat $INSTALL_HOME/templates/web/adapter.app | \
    sed "s+O_R_A_C_L_E_O_A_S_P_R_O_D_B_A_S_E+${ORACLE_OAS_PROD_BASE}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/httpd_${hostname}/adapter.app"
chown ${ICS}:${GROUPNAME}
"${ORACLE_OAS_BASE}/admin/ows/${OAS_SITE_NAME}/httpd_${hostname}/adapter.app"

$INSTALL_HOME/echodbg.sh "configuring owl.cfg" 4
cat $INSTALL_HOME/templates/web/owl.cfg | \
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    sed "s+D_O_M_A_I_N+${domain}+"g | cat | \
    sed "s+A_D_M_I_N_P_O_R_T+${OAS_ADMIN}+"g | cat | \
    sed "s+I_P_A_D_D_R_E_S_S+${ip_address}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/httpd_${hostname}/owl.cfg"
chown ${ICS}:${GROUPNAME}
"${ORACLE_OAS_BASE}/admin/ows/${OAS_SITE_NAME}/httpd_${hostname}/owl.cfg"

$INSTALL_HOME/echodbg.sh "configuring svadmin.cfg" 4
cat $INSTALL_HOME/templates/web/svadmin.cfg | \
    sed "s+D_O_M_A_I_N+${domain}+"g | cat | \
    sed "s+A_D_M_I_N_P_O_R_T+${OAS_ADMIN}+"g | cat | \
    sed "s+N_O_D_E_P_O_R_T+${OAS_NODE}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/httpd_${hostname}/admin/svadmin.cfg"
chown ${ICS}:${GROUPNAME}
"${ORACLE_OAS_BASE}/admin/ows/${OAS_SITE_NAME}/httpd_${hostname}/admin/svadmin.cfg"

$INSTALL_HOME/echodbg.sh "configuring svwww.cfg" 4
cat $INSTALL_HOME/templates/web/svwww.cfg | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/httpd_${hostname}/www/svwww.cfg"
chown ${ICS}:${GROUPNAME}
"${ORACLE_OAS_BASE}/admin/ows/${OAS_SITE_NAME}/httpd_${hostname}/www/svwww.cfg"

$INSTALL_HOME/echodbg.sh "configuring svnode.cfg" 4
cat $INSTALL_HOME/templates/web/svnode.cfg | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+O_A_S_N_O_D_E_P_O_R_T+${OAS_NODE_PORT}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${OAS_SITE_NAME}/httpd_${hostname}/node/svnode.cfg"
chown ${ICS}:${GROUPNAME}
"${ORACLE_OAS_BASE}/admin/ows/${OAS_SITE_NAME}/httpd_${hostname}/node/svnode.cfg"

$INSTALL_HOME/echodbg.sh "configuring svcdeply.cfg" 4
cat $INSTALL_HOME/templates/web/svcdeply.cfg | \
    sed "s+D_O_M_A_I_N+${domain}+"g | cat | \
    sed "s+o_r_a_c_l_e_s_i_d+${oracle_sid}+"g | cat | \
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    >
"${ORACLE_OAS_BASE}/admin/ows/${OAS_SITE_NAME}/httpd_${hostname}/cdeploy/svcdeploy.cfg"
chown ${ICS}:${GROUPNAME}
"${ORACLE_OAS_BASE}/admin/ows/${OAS_SITE_NAME}/httpd_${hostname}/cdeploy/svcdeploy.cfg"

$INSTALL_HOME/echodbg.sh "configuring svcstage.cfg" 4
cat $INSTALL_HOME/templates/web/svcstage.cfg | \
    sed "s+D_O_M_A_I_N+${domain}+"g | cat | \
    sed "s+I_P_A_D_D_R_E_S_S+${ip_address}+"g | cat | \
    sed "s+H_O_S_T_N_A_M_E+${hostname}+"g | cat | \
    sed "s+o_r_a_c_l_e_s_i_d+${oracle_sid}+"g | cat | \
    sed ¢s+O_R_A_C_L_E_S_I_D+${ORACLE_SID}+"g | cat | \
    sed "s+O_A_S_S_I_T_E_N_A_M_E+${OAS_SITE_NAME}+"g | cat| \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    >
"${ORACLE_OAS_BASE}/admin/ows/${OAS_SITE_NAME}/httpd_${hostname}/cstage/svcstage.cfg"
chown ${ICS}:${GROUPNAME}
"${ORACLE_OAS_BASE}/admin/ows/${OAS_SITE_NAME}/httpd_${hostname}/cstage/svcstage.cfg"
# to be done once ispeed listener in OAS is defined
#mkdir "${ORACLE_OAS_BASE}/admin/ows/${OAS_SITE_NAME}/httpd_${hostname}/${oracle_sid}"
#chown ${ICS}:${GROUPNAME}
"${ORACLE_OAS_BASE}/admin/ows/${OAS_SITE_NAME}/httpd_${hostname}/${oracle_sid}"
#cat $INSTALL_HOME/templates/web/svispeed.cfg | \
#    sed "s+D_O_M_A_I_N+${domain}+"g | cat | \
sed "s+o_r_a_c_l_e_s_i_d+${oracle_sid}+"g | cat | \
sed "s+O_R_A_C_L_E_S_I_D+${ORACLE_SID}+"g | cat | \
sed "s+H_O_S_T_N_A_M_E+${hostname}+"g | cat | \
sed "s+O_A_S_S_I_T_E_N_A_M_E+${OAS_SITE_NAME}+"g | cat | \
#    sed "s+T_O_O_L_S_D_I_R+${TOOLS_DIR}+"g | cat | \
#    sed "s+G_R_O_U_P_N_A_M_E+${GROUPNAME}+"g | cat | \
sed "s+O_A_S_B_A_S_E+${OAS_BASE}+"g | cat | \
sed "s+I_C_S+${ICS}+"g \
>
"${ORACLE_OAS_BASE}/admin/ows/${OAS_SITE_NAME}/httpd_${hostname}/${oracle_sid}/sv${oracle_sid}.cfg"
#chown ${ICS}:${GROUPNAME}
"${ORACLE_OAS_BASE}/admin/ows/${OAS_SITE_NAME}/httpd_${hostname}/${oracle_sid}/sv${oracle_sid}.cfg"

$INSTALL_HOME/echodbg.sh "configuring svmstage.cfg" 4
cat $INSTALL_HOME/templates/web/svmstage.cfg | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${ORACLE_SID}/httpd_${hostname}/mstage/svmstage.cfg"
chown ${ICS}:${GROUPNAME}
"${ORACLE_OAS_BASE}/admin/ows/${ORACLE_SID}/httpd_${hostname}/mstage/svmstage.cfg"

$INSTALL_HOME/echodbg.sh "configuring svots.cfg" 4
cat $INSTALL_HOME/templates/web/svots.cfg | \
    sed "s+D_O_M_A_I_N+${domain}+"g | cat | \
    sed "s+o_r_a_c_l_e_s_i_d+${oracle_sid}+"g | cat | \
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_R_A_C_L_E_O_A_S_B_A_S_E+${ORACLE_OAS_BASE}+"g | cat | \
    sed "s+O_R_A_C_L_E_O_A_S_P_R_O_D_B_A_S_E+${ORACLE_OAS_PROD_BASE}+"g | cat | \
    sed "s+G_R_O_U_P_N_A_M_E+${GROUPNAME}+"g | cat | \
    sed "s+O_A_S_B_A_S_E+${OAS_BASE}+"g | cat | \
    sed "s+I_C_S+${ICS}+"g \
    > "${ORACLE_OAS_BASE}/admin/ows/${ORACLE_SID}/httpd_${hostname}/ots/svots.cfg"
chown ${ICS}:${GROUPNAME}
"${ORACLE_OAS_BASE}/admin/ows/${ORACLE_SID}/httpd_${hostname}/ots/svots.cfg"

$INSTALL_HOME/echodbg.sh "configuring resources.ora" 4
cat $INSTALL_HOME/templates/web/resources.ora | \
    sed "s+D_O_M_A_I_N+${domain}+"g | cat | \
    sed "s+o_r_a_c_l_e_s_i_d+${oracle_sid}+"g | cat | \
    sed "s+O_R_A_C_L_E_S_I_D+${ORACLE_SID}+"g | cat | \
    sed "s+H_O_S_T_N_A_M_E+${hostname}+"g | cat | \
    sed "s+O_A_S_S_I_T_E_N_A_M_E+${OAS_SITE_NAME}+"g | cat | \
    sed "s+O_A_S_O_R_B_B_A_S_E+${OAS_ORB_BASE}+"g | cat | \
    sed "s+O_R_A_C_L_E_O_A_S_P_R_O_D_B_A_S_E+${ORACLE_OAS_PROD_BASE}+"g | cat | \
    sed "s+I_C_S+${ICS}+"g \
    > "${ORACLE_OAS_BASE}/admin/orb/${ORACLE_SID}/resources.ora"
chown ${ICS}:${GROUPNAME} "${ORACLE_OAS_BASE}/admin/orb/${ORACLE_SID}/resources.ora"
$INSTALL_HOME/echodbg.sh "Starting OAS. . . " 4
su - ${ICS} -c "startWEB"
$INSTALL_HOME/echodbg.sh "configureOAS.sh complete." 2
#!/bin/ksh
#Filename     configureVignette.sh

# Routine to setup Vignette files

# Written by:  Lane Findley Aug. 1, 1999
#              Oracle Corporation
# Revision History
# ======================================================================
# Date              Who      Why
# March 2000        rwessa   Updated to work with iPrototype Version 2

# ======================================================================
. $INSTALL_HOME/echodbg.sh " "
. $INSTALL_HOME/echodbg.sh ""entering configureVignette.sh . . . "
vig_dir="$ORACLE_VGN_BASE/StoryServer/R4.2"; export vig_dir
vig_source=${INSTALL_HOME}/templates/vignette
vig_solaris=$ORACLE_VGN_BASE/StoryServer/R4.2/bin/solaris
mkdir "${vig_dir}/conf/${hostname}-${APACHE_BASE}01-1"
mkdir "${vig_dir}/conf/${hostname}-${APACHE_BASE}01-1/PadArchiveDir"
mkdir "${vig_dir}/conf/${hostname}-${APACHE_BASE}01-1/PadWorkDir"
mkdir "${vig_dir}/conf/${hostname}-${APACHE_BASE}01-1/metafiles"
# Untar the template files. These files may not be needed, but it
# does not appear to hurt to have them
current_dir=`pwd`
cd "${vig_dir}/conf/${hostname}-${APACHE_BASE}01-1"
tar xf "$ {vig_source }/templates.tar"
cd $current_dir
chown -R nobody:nobody "${vig_dir}/conf/${hostname}-${APACHE_BASE}01-1"
chown -R nobody:nobody "${ORACLE_VGN_BASE}/StoryServer"
chown -R nobody:nobody "${ORACLE_VGN_BASE}/cas-docs"
. $INSTALL_HOME/echodbg.sh "configuring
${vig_dir}/conf/${hostname}-${APACHE_BASE}01-1/StoryServer.cfg"
cat "${vig_source}/StoryServer.cfg" | \
    sed "s+V_I_G+${VIGNETTE}+"g | cat| \
    sed "s+O_R_A_C_L_E_S_I_D+${ORACLE_SID}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+D_O_M_A_I_N+${domain}+"g | cat | \
    sed "s+A_P_A_C_H_E_B_A_S_E+${APACHE_BASE}+"g | cat | \
    sed "s+P_O_R_T_A_P_A_C_H_E+${PORT_APACHE}+"g | cat | \
    sed "s+O_R_A_C_L_E_H_O_M_E+${ORACLE_HOME}+"g \
    > "${vig_dir}/conf/${hostname}-${APACHE_BASE}01-1/StoryServer.cfg"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
chown ${VIGNETTE}:$GROUPNAME
"${vig_dir}/conf/${hostname}-${APACHE_BASE}01-1/StoryServer.cfg"
. $INSTALL_HOME/echcdbg.sh "configuring
${vig_dir}/conf/${hostname}-${APACHE_BASE}01-1/admin"
cat "${vig_source}/admin" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+D_O_M_A_I_N+${domain}+"g | cat | \
    sed "s+A_P_A_C_H_E_B_A_S_E+${APACHE_BASE}+"g | cat | \
    sed "s+O_R_A_C_L_E_H_O_M_E+${ORACLE_HOME}+"g \
    > "${vig_dir}/conf/${hostname}-${APACHE_BASE}01-1/admin"
chown ${VIGNETTE}:$GROUPNAME "${vig_dir}/conf/${hostname}-${APACHE_BASE}01-1/admin"
. $INSTALL_HOME/echodbg.sh "configuring ${vig_dir}/conf/delivery.tcl"
cat "${vig_source}/delivery.tcl" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+A_P_A_C_H_E_B_A_S_E+${APACHE_BASE}+"g | cat | \
    sed "s+D_O_M_A_I_N+${domain}+"g | cat | \
    sed "s+O_R_A_C_L_E_H_O_M_E+${ORACLE_HOME}+"g \
    > "${vig_dir}/conf/delivery.tcl"
chown ${VIGNETTE}:$GROUPNAME "${vig_dir}/conf/delivery.tcl"
. $INSTALL_HOME/echodbg.sh "configuring ${vig_dir}/conf/Production/pm.cfg"
cat "${vig_source}/pm.cfg" | \
    sed "s+O_R_A_C_L_E_S_I_D+${ORACLE_SID}+"g | cat | \
    sed "s+O_R_A_C_L_E_H_O_M_E+${ORACLE_HOME}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+A_P_A_C_H_E_B_A_S_E+${APACHE_BASE}+"g | cat | \
    sed "s+D_O_M_A_I_N+${domain}+"g | cat | \
    sed "s+V_H_S_P_O_R_T+${VHS_PORT}+"g | cat | \
    sed "s+O_R_A_C_L_E_H_O_M_E+${ORACLE_HOME}+"g \
    > "${vig_dir}/conf/Production/pm.cfg"
chown ${VIGNETTE}:$GROUPNAME "${vig_dir}/conf/Production/pm.cfg"
. $INSTALL_HOME/echodbg.sh "configuring ${vig_dir}/conf/Production/admin"
cat "${vig_source}/Prod_admin" | \
    sed "s+V_I_G+${VIGNETTE}+"g | cat| \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+A_P_A_C_H_E_B_A_S_E+${APACHE_BASE}+"g | cat | \
    sed "s+H_O_S_T_N_A_M_E+${hostname}+"g | cat | \
    sed "s+D_O_M_A_I_N+${domain}+"g | cat | \
    sed "s+O_R_A_C_L_E_H_O_M_E+${ORACLE_HOME}+"g \
    > "${vig_dir}/conf/Production/admin"
chown ${VIGNETTE}:$GROUPNAME "${vig_dir}/conf/Production/admin"
. $INSTALL_HOME/echodbg.sh "configuring ${vig_solaris}/S97StoryServer4"
cat "${vig_source}/S97StoryServer4" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+A_P_A_C_H_E_B_A_S_E+${APACHE_BASE}+"g | cat | \
    sed "s+H_O_S_T_N_A_M_E+${hostname}+"g | cat | \
    sed "s+D_O_M_A_I_N+${domain}+"g | cat | \
    sed "s+O_R_A_C_L_E_H_O_M_E+${ORACLE_HOME}+"g \
    > "${vig_solaris}/S97StoryServer4?
. $INSTALL_HOME/echodbg.sh "configuring ${vig_solaris}/S97StoryServer5"
cat "${vig_source}/S97StoryServer5"
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+A_P_A_C_H_E_B_A_S_E+${APACHE_BASE}+"g | cat | \
    sed "s+H_O_S_T_N_A_M_E+${hostname}+"g | cat | \
    sed "s+D_O_M_A_I_N+${domain}+"g | cat | \
    sed "s+O_R_A_C_L_E_H_O_M_E+${ORACLE_HOME}+"g \
    > ${vig_solaris}/S97StoryServer5"
#cp "${vig_solaris}/S97StoryServer4"/etc/init.d/StoryServer4
#ln -s "${vig_solaris}/S97StoryServer4"/etc/rc3.d/S97StoryServer4
#ln -s "${vig_solaris}/S97StoryServer5"/etc/rc3.d/S97StoryServer5
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#ln -s "${vig_solaris}/S97StoryServer4"/etc/rc1.d/K01StoryServer4
#ln -s "${vig_solaris}/S97StoryServers"/etc/rc1.d/K01StoryServer5
#chmod +x /etc/rc3.d/S97StoryServer4
#chmod +x /etc/rc1.d/K01StoryServer4
chown ${VIGNETTE}:$GROUPNAME "${vig_solaris}/stopCASVIGN"
. $INSTALL_HOME/echodbg.sh "configuring ${vig_solaris}/stopCASVIGN"
cat "${vig_source}/stopCASVIGN" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+D_O_M_A_I_N+${domain}+"g | cat | \
    sed "s+A_P_A_C_H_E_B_A_S_E+${APACHE_BASE}+"g | cat | \
    sed "s+O_R_A_C_L_E_H_O_M_E+${ORACLE_HOME}+"g \
    > "${vig_solaris}/stopCASVIGN"
chown ${VIGNETTE}:$GROUPNAME "${vig_solaris}/stopCASVIGN"
. $INSTALL_HOME/echodbg.sh "configuring ${vig_solaris}/startCASVIGN"
cat "${vig_source}/startCASVIGN" | \
    sed "S+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+A_P_A_C_H_E_B_A_S_E+${APACHE_BASE}+"g | cat | \
    sed "s+D_O_M_A_I_N+${domain}+"g | cat | \
    sed "s+O_R_A_C_L_E_H_O_M_E+${ORACLE_HOME}+"g \
    > "$ {vig_solaris}/startCASVIGN"
chown ${VIGNETTE}:$GROUPNAME "$ {vig_solaris}/startCASVIGN"
. $INSTALL_HOME/echodbg.sh "configuring ${vig_solaris}/startCMSVIGN"
cat "${vig_source}/startCMSVIGN" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+A_P_A_C_H_E_B_A_S_E+${APACHE_BASE}+"g | cat | \
    sed "s+D_O_M_A_I_N+${domain}+"g | cat | \
    sed "s+O_R_A_C_L_E_H_O_M_E+${ORACLE_HOME}+"g \
    > "${vig_solaris}/startCMSVIGN"
chown ${VIGNETTE}:$GROUPNAME "${vig_solaris}/startCMSVIGN"
. $INSTALL_HOME/echodbg.sh "configuring ${vig_solaris}/stopCMSVIGN"
cat "${vig_source}/stopCMSVIGN" | \
    sed "s+V_I_G+${VIGNETTE}+"g | cat | \
    sed "s+O_R_A_C_L_E_S_I_D+${oracle_sid}+"g | cat | \
    sed "s+O_R_A_C_L_E_V_G_N_B_A_S_E+${ORACLE_VGN_BASE}+"g | cat | \
    sed "s+H_O_S_T_N_A_M_E+${hostname}+"g | cat | \
    sed "s+A_P_A_C_H_E_B_A_S_E+${APACHE_BASE}+"g | cat | \
    sed "s+D_O_M_A_I_N+${domain}+"g | cat | \
    sed "s+O_R_A_C_L_E_H_O_M_E+${ORACLE_HOME}+"g \
    > "${vig_solaris}/stopCMSVIGN"
    chown ${VIGNETTE}:$GROUPNAME "${vig_solaris}/stopCMSVIGN"
    . $INSTALL_HOME/echodbg.sh "configureVignette.sh completed"
    #!/bin/ksh
# Filename     install_vgn.sh
# Author       RWessa
# Date         Feb. 7, 2000
# Description  installation script for iPrototype
#              Called by main, and installs the Apache and
#              Vignette components.

# Parameters   None
# Usage        This script SHOULD NOT be called directly.
#              Instead, you should call setup, answer
the necessary questions, and let setup
#              call main which calls this script.

# ======================================================================

# ======================================================================
# Do not edit this file.
# ======================================================================
. $INSTALL_HOME/echodbg.sh " entering install_vgn.sh ..."
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [ "$INSTALL_TYPE" = "V" ] || [ "$INSTALL_TYPE" = "F" ] ; then
    . $INSTALL_HOME/echodbg.sh " starting install for INSTALL_TYPE=$INSTALL_TYPE ..."
    . $INSTALL_HOME/echodbg.sh "Performing Apache and Vignette install ..."
        . $INSTALL_HOME/echodbg.sh "Running scripts to untar setup files"
        . $INSTALL_HOME/echodbg.sh " "
    . $INSTALL_HOME/unTar_vgn.sh
# . $INSTALL_HOME/echodbg.sh "Running scripts to create links needed for proper
operation"
# . $INSTALL_HOME/echodbg.sh " "
#. $INSTALL_HOME/setLinks.sh
#read ans?"hit enter to continue "
        . $INSTALL_HOME/echodbg.sh " "
        . $INSTALL_HOME/echodbg.sh "Running scripts to create users. Be sure to set passwords
for these"
        . $INSTALL_HOME/echodbg.sh "accounts"
    . $INSTALL_HOME/createUsers_vgn.sh
    . $INSTALL_HOME/createUsers_ap.sh
        . $INSTALL_HOME/echodbg.sh " "
    . $INSTALL_HOME/echodbg.sh "Removing old SCCS files"
#. $INSTALL_HOME/fixSCCS
        . $INSTALL_HOME/echodbg.sh " "
        . $INSTALL_HOME/echodbg.sh "POZ" "Setting file ownership to the proper users"
    . $INSTALL_HOME/setOwners_vgn.sh
#. $INSTALL_HOME/echodbg.sh "Create initialization scripts"
#. $INSTALL_HOME/echodbg.sh " "
#. $INSTALL_HOME/setInit.sh
#read ans?"hit enter to continue "
        . $INSTALL_HOME/echodbg.sh "Configuring Vignette" 4
    . $INSTALL_HOME/configureVignette.sh
        . $INSTALL_HOME/echodbg.sh "Configuring Apache Web Server" 4
        . $INSTALL_HOME/echodbg.sh " "
    . $INSTALL_HOME/configureApache.sh
#. $INSTALL_HOME/echodbg.sh "Update Netp and startup database and listener"
#. $INSTALL_HOME/echodbg.sh " "
#. $INSTALL_HOME/updateNetp
#su - ${ORACLE} -c "startNET${oracle_sid}"
#read ans?"hit enter to continue "
        . $INSTALL_HOME/echodbg.sh "Re-configuring Vignette" 4
    . $INSTALL_HOME/reconfigVignette.sh
#. $INSTALL_HOME/echodbg.sh "Shutdown database"
#. $INSTALL_HOME/echodbg.sh " "
#su - ${ORACLE} -c "stopDB${oracle_sid}"
#su - ${ORACLE} -c "stopNET${oracle_sid}"
#read ans?"hit enter to continue "
#. $INSTALL_HOME/echodbg.sh "Clean up the file system"
#. $INSTALL_HOME/echodbg.sh " "
#. $INSTALL_HOME/cleanupScripts.sh
#read ans?"hit enter to continue "
#. $INSTALL_HOME/echodbg.sh "Startup ispeed instance"
#. $INSTALL_HOME/echodbg.sh " "
#/etc/rc3.d/S90${oracle_sid}
#read ans?"hit enter to continue "
    echo "Vignette VMS Port $VHS_PORT" >> $SUMMARY_FILE
#. $INSTALL_HOME/echodbg.sh "change passwords"
#. $INSTALL_HOME/echodbg.sh " "
#. $INSTALL_HOME/setPasswords.sh
else
    echo "install_vgn.sh was called incorrectly: INSTALL_TYPE=$INSTALL_TYPE"
fi
!/bin/ksh
# Filename:     createUsers_i.sh
# Utility for creating Middle Tier user accounts for iSpeed systems

# Description:
This script is called by the setup.sh script, the main script
which performs the iPrototype installation. It creates the
user, user directory, shell scripts and group. If any of these
# exist already, it displays a message to that effect and continue.
# It will cause an error and stop the setup.sh script.

# This script should not be called directly. It relies on
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# variables defined by the setup.sh script.

# The issue is what do you do if the user account already exists
# At this point nothing. :)

echo " "
echo "Adding the user group $GROUPNAME. Ignore warnings if the group already exists"
echo " "
groupadd $GROUPNAME
if ! [-d $USER_BASE_DIR]
then
    mkdir $USER_BASE_DIR
fi
echo " "
echo "Adding users . . . if there are any errors creating users, verify that"
echo ". . . that the problem is not critical"
echo " "
useradd -g $GROUPNAME -d $USER_BASE_DIR/$ICS -s /bin/ksh $ICS
mkdir $USER_BASE_DIR/$ICS -s /bin/ksh $ICS
echo "Completed adding user $ICS"
echo ". . . now adding profiles"
echo " "

# Copy startup and shutdown scripts over to the ICS home directory

cp    ${INSTALL_HOME}/templates/ics/startWEB $USER_BASE_DIR/$ICS
cp    ${INSTALL_HOME}/templates/ics/stopWEB $USER_BASE_DIR/$ICS
chmod +x "$USER_BASE_DIR/${ICS}/startWEB"
chmod +x "$USER_BASE_DIR/${ICS}/stopWEB"
cat     ${INSTALL_HOME}/templates/ics/profile | \
    sed "s+D_O_M_A_I_N+${domain}+"g | cat | \
    sed "s+O_R_A_C_L_E_S_I_D+${oracle_sid}+"g | cat | \
    sed "s+H_O_S_T_N_A_M_E+${hostname}+"g | cat | \
    sed "s+O_R_A_C_L_E_O_A_S_B_A_S_E+${ORACLE_OAS_BASE}+"g | cat | \
    sed "s+O_A_S_S_I_T_E_N_A_M_E+${OAS_SITE_NAME}+"g | cat | \
    sed "s+O_R_A_C_L_E_O_A_S_P_R_O_D_B_A_S_E_+${ORACLE_OAS_PROD_BASE}+"g | cat | \
    sed "s+I_C_S+${ICS}+"g \
    > "$USER_BASE_DIR/${ICS}/.profile"
# Change ownership of the files just created
chown -R $ICS:$GROUPNAME    $USER_BASE_DIR/$ICS
#!/bin/ksh
# Filename:     createUsers_ap.sh
# Utility for creating Apache user account for iSpeed systems

# Description:
This script is called by the setup.sh script, the main script
which performs the iPrototype installation. It creates the
user, user directory, shell scripts and group. If any of these
#       exist already it displays a message to that effect and continues.
#       It will not cause an error and stop the setup.sh script.

#       This script should not be called directly. It relies on
#       variables defined by the setup.sh script.

#       The issue is what do you do if the user account already exists?
At this point nothing. :)

echo " "
echo "Adding the user group $GROUPNAME. Ignore warnings if the group already exists" #
LTF - spelling error 9/17/99
echo " "
groupadd $GROUPNAME
if ! [ -d $USER_BASE_DIR ]
then
    mkdir $USER_BASE_DIR
fi
echo " "
echo "Adding users . . . if there are any errors creating users, verify that"
echo ". . . that the problen is not critical"
echo " "
useradd -g $GROUPNAME -d $USER_BASE_DIR/$APACHE -s /bin/ksh $APACHE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
mkdir $USER_BASE_DIR/$APACHE
echo "Completed adding user $APACHE"
echo ". . . now adding profiles"
echo " "
cat      ${INSTALL_HOME}/templates/apache/startApache | \
    sed "s+O_R_A_C_L_E_A_P_B_A_S_E+${ORACLE_AP_BASE}+"g \
    > "$USER_BASE_DIR/${APACHE}/startApache"
chmod +x "$USER_BASE_DIR/${APACHE}/startApache"
cat      ${INSTALL_HOME}/templates/apache/stopApache | \
    sed "s+O_R_A_C_L_E_A_P_B_A_S_E+${ORACLE_AP_BASE}+"g \
    > "$USER_BASE_DIR/${APACHE}/stopApache"
chmod +x "$USER_BASE_DIR/${APACHE}/stopApache"
# Change ownership of the files just created
chown -R $APACHE:$GROUPNAME   $USER_BASE_DIR/$APACHE
#!/bin/ksh
# Filename:       createUsers_np.sh
# Utility for creating NetP user account for iSpeed systems

# Description:
This script is called by the setup.sh script, the main script
which performs the iPrototype installation. It creates the
user, user directory, shell scripts and group. If any of these
#       exist already, it displays a meesage to that effect and continues.
#       It will not cause an error and stop the setup.sh script.

#       This script should not be called directly. It relies on
#       variables defined by the setup.sh script.

#       The issue is what do you do if the user account already exists?
#       At thie point nothing. :)

echo " "
echo "Adding the user group $GROUPNAME. Ignore warnings if the group already exists"
echo " "
groupadd $GROUPNAME
if ! [ -d $USER_BASE_DIR ]
then
    mkdir $USER_BASE_DIR
fi
echo " "
echo "Adding users . . . if there are any errors creating users, verify that"
echo ". . . that the problem is not critical"
echo " "
useradd -g $GROUPNAME -d $USER_BASE_DIR/$NETP -s /bin/ksh $NETP
mkdir $USER_BASE_DIR/$NETP
echo "Completed adding the user $NETP"
echo ". . . now adding profiles"
echo " "
cat      ${INSTALL_HOME)/templates/netp/stopNETP | \
    sed "s+O_R_A_C_L_E_N_P_B_A_S_E+${ORACLE_NP_BASE}+"g \
    > "$USER_BASE_DIR/${NETP}/stopNETP"
cat      ${INSTALL_HOME}/templates/netp/startNETP | \
    sed "s+O_R_A_C_L_E_N_P_B_A_S_E+${ORACLE_NP_BASE}+"g | cat | \
    sed "s+O_R_A_C_L_E_S_I_D+${oracle_sid}+"g | cat | \
    sed "s+I_C_S+${ICS}+"g | cat | \
    sed "s+O_R_A_C_L_E_U_S_E_R+${ORACLE}+"g \
    > "$USER_BASE_DIR/${NETP}/startNETP"
chmod +x "$USER_BASE_DIR/${NETP}/startNETP"
chmod +x "$USER_BASE_DIR/${NETP}/stopNETP"

#change ownership of the files just created
chown -R $NETP:$GROUPNAME   $USER_BASE_DIR/$NETP
#!/bin/ksh
# Filename:       createUsers_db.sh
# Utility for creating Oracle user account for iSpeed systems
# Description:
This script is called by the setup.sh script, the main script
which performs the iPrototype installation. It creates the
user, user directory, shell scripts and group. If any of these
#       exist already, it displays a message to that effect and continues.
#       It will not cause an error and stop the setup.sh script.
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```

#       ThiS script should not be called directly. It relies on
#       variables defined by the setup.sh script.

#       The issue is what do you do if the user account already exists?
At this point nothing. :)

# ==========================================================================
# Revision History
# Date          Who        Why
# 01/31/2000   rwessa      Initial create date

# ==========================================================================
$INSTALL_HOME/echodbg.sh "Adding user group $GRDUPNAME. Ignore warnings if the group
already exists." 4
groupadd $GROUPNAME
if ! [ -d $USER_BASE_DIR ]
then
    $INSTALL_HOME/echodbg.sh "The base user directory $USER_BASE_DIR will be created . . . " 4
    mkdir $USER_BASE_DIR
else
    $INSTALL_HOME/echodbg.sh "The base user directory $USER_BASE_DIR already exists . . . " 4
fi
    $INSTALL_HOME/echodbg.sh "Adding user $ORACLE . . . " 4
useradd -g $GROUPNAME -d $USER_BASE_DIR/$ORACLE -s /bin/ksh $ORACLE
if [ "$?" = "9" ) ; then
    $INSTALL_HOME/echodbg.sh "User $ORACLE exists. Verify that is the desired username!" 4
fi
mkdir $USER_BASE_DIR/$ORACLE
    $INSTALL_HOME/echodbg.sh "User $ORACLE created." 4
    $INSTALL_HOME/echodbg.sh "Creating $USER_BASE_DIR/${ORACLE}/.profile." 4
cat     ${INSTALL_HOME}/templates/oracle/profile | \
    sed "s+D_O_M_A_I_N+${domain}+"g | cat | \
    sed "s+O_R_A_C_L_E_S_I_D+${ORACLE_SID}+"g | cat | \
    sed "s+O_R_A_C_L_E_B_A_S_E+${ORACLE_BASE}+"g | cat | \
    sed "s+O_R_A_C_L_E_H_O_M_E+${ORACLE_HOME}+"g | cat | \
    sed "s+H_O_S_T_N_A_M_E+${hostname}+"g | cat | \
    sed "s+I_C_S+${ICS}+"g \
    > "$USER_BASE_DIR/${ORACLE}/.profile"

# Copy startup and shutdown scripts over to the Oracle home directory

    $INSTALL_HOME/echodbg.sh "Creating startCTX and stopCTX scripts . . . " 4
cp ${INSTALL_HOME}/templates/oracle/startCTX $USER_BASE_DIR/$ORACLE
cp ${INSTALL_HOME}/templates/oracle/stopCTX $USER_BASE_DIR/$ORACLE
    $INSTALL_HOME/echodhg.sh "Creating $USER_BASE_DIR/${ORACLE}/startNET${oracle_sid} . . . " 4
cat     ${INSTALL_HOME)/templates/oracle/startNET | \
    sed "s+O_R_A_C_L_E_S_I_D+${ORACLE_SID}+"g \
    > "$USER_BASE_DIR/${ORACLE}/startNET${oracle_sid}"
    $INSTALL_HOME/echodbg.sh "Creating $USER_BASE_DIR/${ORACLE}/stopNET${oracle_sid} . . . " 4
cat     ${INSTALL_HOME)/templates/oracle/stopNET | \
    sed "s+O_R_A_C_L_E_S_I_D+${ORACLE_SID}+"g \
    > "$USER_BASE_DIR/${ORACLE}/stopNET${oracle_sid}"
    $INSTALL_HOME/echodbg.sh "Creating $USER_BASE_DIR/${ORACLE}/startDB${oracle_sid} . . . " 4
cat     ${INSTALL_HOME}/templates/oracle/startDB | \
    sed "s+O_R_A_C_L_E_S_I_D+${ORACLE_SID}+"g | cat | \
    sed "s+o_r_a_c_l_e_s_i_d+${oracle_sid}+"g |cat |\
    sed "s+O_R_A_C_L_E_H_O_M_E+${ORACLE_HOME}+"g \
    > "$USER_BASE_DIR/${ORACLE}/startDB${oracle_sid)"
    $INSTALL_HOME/echodbg.sh "Creating $USER_BASE_DIR/${ORACLE=/stopDB${oracle_sid} . . . " 4
cat     ${INSTALL_HOME)/templates/oracle/stopDB | \
    sed "s+O_R_A_C_L_E_S_I_D+${ORACLE_SID}+"g \
    > "$USER_BASE_DIR/${ORACLE}/stopDB${oracle_sid}"
    $INSTALL_HOME/echodbg.sh "Adding execute privilege . . . " 4
chmod +x "$USER_BASE_DIR/${ORACLE}/stopCTX"
chmod +x "$USER_BASE_DIR/${ORACLE}/stopNET$(oracle_sid}"
chmod +x "$USER_BASE_DIR/${ORACLE}/stopDB${oracle_sid}"
chmod +x "$USER_BASE_DIR/${ORACLE}/startCTX"
chmod +x "$USER_BASE_DIR/${ORACLE}/startNET${oracle_sid}"
chmod +x "$USER_BASE_DIR/${ORACLE}/startDB${oracle_sid}"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# Change ownership of the files just created
    $INSTALL_HOME/echodbg.sh "Setting proper ownership of these files . . . " 4
chown -R $ORACLE:$GROUPNAME    $USER_BASE_DIR/$ORACLE
    $INSTALL_HOME/echodbg.sh "User $ORACLE setup complete." 4
# !/bin/ksh
# Filename:      createUsers_vgn.sh
# Utility for creating the Vignette user accounts for iSpeed systems
# Written by Lane Findley 8/1/99
#       Oracle Corporation

# This is a very simple routine that will generate errors in many cases.
# The issue is what do you do if the user account already exists?
At this point nothing. :)

# Do not call this script directly. It should be called from the main
# setup.sh script.

# ===========================================================================
# Revision History
# Date
# 03/14/2000 rwessa       Redone for iPrototype Phase 2.
# ===========================================================================
echo " "
echo "Adding the $GROUPNAME group. Ignore warnings if the group already exists"
echo " "
groupadd $GROUPNAME
if ! [ -d $USER_BASE_DIR ]
then
    mkdir $USER_BASE_DIR
fi
echo " "
echo "Adding users . . . if there are any errors creating users, verify that"
echo ". . . that the problem is not critical"
echo " "
useradd -g $GROUPNAME -d $USER_BASE_DIR/$VIGNETTE -s /bin/ksh $VIGNETTE
mkdir $USER_BASE_DIR/$VIGNETTE
echo "Completed adding the user $VIGNETTE"
echo ". . . now adding profiles"
echo " "
cat      ${INSTALL_HOME}/templates/vignette/startVignette | \
    sed "s+O_R_A_C_L_E_V_G_N_B_A_S_E+${ORACLE_VGN_BASE}+"g \
    > u$USER_BASE_DIR/$ {VIGNETTE}/startVignette"
chmod +x "$USER_BASE_DIR/${VIGNETTE}/startVignette"
cat      $(INSTALL_HOME}/templates/vignette/stopVignette | \
    sed "s+O_R_A_C_L_E_V_G_N_B_A_S_E+${ORACLE_VGN_BASE}+"g \
    > "$USER_BASE_DIR/${VIGNETTE)}/stopVignette"
chmod +x "$USER_BASE_DIR/${VIGNETTE}/stopVignette"
# Change ownership of the files just created
chown -R $VIGNETTE:$GROUPMAME $USER_BASE_DIR/$VIGNETTE
#!/bin/ksh
# Filename: echodbg.sh

# Author:   Robert Wessa
#           Northeast eBusiness Center
Oracle Corporation

# Description:

# This script is may be called from the main setup.sh script
# which installs iPrototype. It should not be called directly

# This script can be used to pause the installation process and
# to echo information during the installation process.

# Parameters:
#           $1 = string to echo if
#           $2 = POZ, (for previous version) 1,2,3, 4
#           or string to echo without pausing
#       Explanation of value for $2
#   1 Always and only echo to logfile
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#       2 Always echo to logfile and screen
#       3 echo to logfile and screen only if debugging
#       4 echo to logfile and screen, pause if debugging
#       5 echo to logfile and screen, always pause
#       Any other value will log $1 to log file
# =========================================================================
# Revision History
# Date
# 03/14/2000 rwessa      Created
# =========================================================================
if [ $# = "0" ] ; then
# shouldn't happen
        echo "echodbg routine received no parameters, aborting . . ."
        date
        echo "Error: echoobg routine received no paraneters . . . " >> $INSTALL_LOGFILE
        date >> $INSTALL_LOGFILE
        exit 1
fi
if [ $# = "1" ] ; then
# simply echo to logfile if only one parameter
        echo $1 >> $INSTALL_LOGFILE
else
    if [ "$2" = "1" ] ; then
        echo $1 >> $INSTALL_LOGFILE
    elif [ "$2" = "2" ] ; then
        echo $1
    elif [ "$2" = "3" ] ; then
        if [ "$SHOWDBG" = "YES" ] ; then
        echo $1
        echo $1 >> $INSTALL_LOGFILE
            if [ "$DBGLEVEL" = "1" ] ; then
                echo "Hit return to continue . . . "
                read ans
            fi
        fi
        echo $1
    elif [ "$2" = "4" ] ; then
        echo $1 >> $INSTALL_LOGFILE
        echo $1
        if [ "$SHOWDBG" = "YES" ] ; then
                echo "Hit return to continue . . . "
                read ans
        fi
    elif [ "$2" = "5" ] ; then
        echo $1 >> $INSTALL_LOGFILE
        echo $1
        echo "Hit return to continue . . . "
        read ans
    fi
fi
!/bin/ksh
# Filenane: setLinks_full.sh

# Author:        Robert wessa
#                Northeast eBusiness Center
Oracle Corporation
# Description:

# This script calls tbe appropriate scripts to remove and recreate the
# necessary links to make iPrototype work after cloning.
# The cloning process will change the directory structure and
# and links must be recreated to match.

# =========================================================================
# Revision History
# Date
# 03/14/2000 rwessa      Created
# =========================================================================
if [ $INSTALL_TYPE = "F" ] ; then
. $INSTALL_HOME/setLinks_db.sh
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
. $INSTALL_HOME/setLinks_i.sh
fi
!/bin/ksh

# Remove dangling links for SCCS embedded in the Oracle hone
# directory tree.
rm `find "*${ORACLE_VGN_BASE}" -local -name SCCS -print`
#!/bin/ksh
# Filename: setLinks_db.sh

# Author:        Robert Wessa
#                Northeast eBusiness Center
Oracle Corporation

# Description:

# This script removes and recreates the appropriate links
# within the Oracle directory structure for iPrototype to work after cloning.
# The cloning process will change the directory structure and
# and links must be recreated to match.

# ======================================================================
# Revision History
# Date
# 03/14/2000 rwessa Created
# ======================================================================
rm $ORACLE_HOME/network/agent/library/libosm.so
ln -s $ORACLE_HOME/lib/libosm.so \
$ORACLE_HOME/network/agent/library/libosm.so
#!/bin/ksh

# Remove dangling links for SCCS embedded in the Apache
# directory tree.
rm `find "${ORACLE_AP_BASE}" -local -name SCCS -print`
#!/bin/ksh
# Filename: reconfigureVignette.sh

# Author:        Robert Wessa
#                Northeast eBusiness Center
Oracle Corporation

# Description:

# This script reconfigures Vignette as part of the cloning process
# It must start up CMS, update the CAS entries, and remove the old
# ones which are invalid and remove the old directories. The new
# CAS directory should,have been created during the cloning process
# removes and recreates the appropriate links

# Usage:

# This script has to run as root and should not be called directly.
# The setup.sh procedure executed at cloning will eventually call this
# if the Vignette option has been chosen.

# ======================================================================
# Revision History
# Date
# 03/14/2000 rwessa      Created
# ======================================================================
CAS_PORT=${PORT_APACHE
$INSTALL_HOME/echodbg.sh "Entering reconfigVignette.sh" 2
$INSTALL_HOME/echodbg.sh "Starting the CMS & CAS Servers " 4
# use scripts in vignette user home directory
# scripts perform a stop first, then a start
cd $USER_BASE_DIR/$VIGNETTE
$INSTALL_HOME/echodbg.sh "`pwd`" 3
./startVignette # we should start and stop Vignette as root
cd $ORACLE_VGN_BASE/StoryServer/R4.2/bin/solaris
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
$INSTALL_HOME/echodbg.sh "'pwd'" 3
./sspm listinstalls >> $INSTALL_LOGFILE
set > $INSTALL_HOME/set.log
$INSTALL_HOME/echodbg.sh "Adding the new CAS to the CMS" 3
$INSTALL_HOME/echodhg.ah "cd
$ORACLE_VGN_BASE/StoryServer/R4.2/conf/${hostname}-${PORT_APACHE}-1" 4
cd $ORACLE_VGN_BASE/StoryServer/R4.2/conf/${hostname}-${PORT_APACHE}-1
$INSTALL_HOME/echodbg.sh "running admin updatepe" 4
$INSTALL_HOME/echodbg.sh "pwd for updatepe= 'pwd'" 4
chmod 775 ./admin
./admin updatepe
$INSTALL_HOME/echodbg.sh "updatepe completed" 3
$INSTALL_HOME/echodbg.sh "Removing the old CAS from the CMS " 3
cd $ORACLE_VGN_BASE/StoryServer/R4.2/bin/solaris
# Note if the sspm ssp command prompts you to delete the install,
# You should simply enter <RETURN> at this prompt.

$INSTALL_HOME/echodbg.sh " listing sspm commands to delete config and installs . . . " 4
$INSTALL_HOME/echodbg.sh "'pwd'" 4
$INSTALL_HOME/echodbg.sh "./ssps deleteconfig
${old_hostname}:${ORACLE_VGN_BASE_OLD}/StoryServer/R4.2
${old_hostname}-${CAS_PORT_OLD}-1" 4
$INSTALL_HOME/echodbg.sh "./sspm deleteinstall
${old_hostname}:${ORACLE_VGN_BASE_OLD}/StoryServer/R4.2" 4
./sspm deleteconfig ${old_hostname}:${ORACLE_VGN_BASE_OLD}/StoryServer/R4.2
${old_hostname}-${CAS_PORT_OLD)-1
./sspm deleteinstall ${old_hostname}:${ORACLE_VGN_BASE_OLD}/StoryServer/R4.2
$INSTALL_HOME/echodbg.sh "old CAS entry has been deleted and new entry added." 4
./sspm listinstalls >> $INSTALL_LOGFILE
$INSTALL_HOME/echodbg.sh "reconfigVignette.sh done. 'date'" 2
#!/bin/ksh
# Filename: setPasswords.sh

# Description
# This file is called during the iPrototype cloning process.
# It accepts a parameter representing a username for which to set a password.
# If no parameter is supplied, it aborts with an error.

# This file is interactive in that you will be prompted for the password.

. $INSTALL_HOME/echodbg.sh "Setting password for the user $1"
if [ "$1" ] ; then
    passwd $1
else
    echo " No parameter supplied for setPasswords.sh routine"
    echo " Program aborted."
    exit 1
fi
# create links so that there is only one set of tnsnames.ora and listener.ora files
rm $ORACLE_OAS_PROD_BASE/network/admin/listener.ora
rm $ORACLE_OAS_PROD_BASE/network/admin/tnsnames.ora
ln -s $ORACLE_HOME/network/admin/listener.ora
$ORACLE_OAS_PROD_BASE/network/admin/listener.ora
ln -s $ORACLE_HOME/network/admin/tnsnames.ora
$ORACLE_OAS_PROD_BASE/network/admin/tnsnames.ora
chown $ICS:$GROUPNAME $ORACLE_OAS_PROD_BASE/network/admin/listener.ora
chown $ICS:$GROUPNAME $ORACLE_OAS_PROD_BASE/network/admin/tnsnames.ora
#!/bin/ksh

# Filename:    setNet_db.sh
# Author:      rwessa
#              Oracle Corporation
# Description:
#              This file will create the tnsnames.ora and listener.ora file
#              needed in the network admin directory for the $ORACLE_HOME
#              for the database.
#              We no longer use links to create the OAS ORACLE_HOME version,
#              since they may now be on separate machines.
#              Instead, create two identical files based on the same
template, with separate create scripts for each. There is a
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#             corresponding setNet_i.sh script to create the tnsnames and
#             listener files for CAS.

# ############################################################
Date     Who      Why
# 4/19/2000   rwessa    Created.
# ############################################################
echo " "
. $INSTALL_HOME/echodbg.sh "setNet_db.sh: Creating listener.ora and tnsnames.ora . . . "
cat ${INSTALL_HOME}/templates/oracle/listener.ora | \
    sed "s+T_N_S_P_O_R_T+S{TNS_PORT)+"g | cat | \
    sed "s+h_o_s_t_n_a_m_e+${hostname}+"g | cat | \
    sed "s+O_R_A_C_L_E_H_O_M_E+${ORACLE_HOME}+"g | cat | \
    sed "s+O_R_A_C_L_E_S_I_D+${ORACLE_SID}+"g \
    > "${ORACLE_HOME}/network/admin/listener.ora"
chown ${ORACLE}:${GROUPNAME} "${ORACLE_HOME}/network/admin/listener.ora"
chown ${ORACLE}:${GROUPNAME} "${ORACLE_HOME}/network/admin/listener.ora" >> $scriptfile
cat ${INSTALL_HOME}/templates/oracle/tnsnames.ora | \
    sed "s+T_N_S_P_O_R_T+${TNS_PORT}+"g | cat | \
    sed "s+d_o_m_a_i_n+${domain}+"g | cat | \
    sed "s+h_o_s_t_n_a_m_e)+${hostname)+"g | cat | \
    sed "s+O_R_A_C_L_E_H_O_M_E+${ORACLE_HOME}+"g | cat | \
    sed "s+O_R_A_C_L_E_S_I_D+${ORACLE_SID}+"g \
    > \${ORACLE_HOME}/network/admin/tnanames.ora"
chown ${ORACLE}:${GROUPNAME} "${ORACLE_HOME}/network/admin/tnsnames.ora"
chown ${ORACLE}:${GROUPNAME} "${ORACLE_HOME}/network/admin/tnsnames.ora" >> $scriptfile
. $INSTALL_HOME/echodbg.sh "setNet_db.sh: done"
#!/bin/ksh
# Filename[1]: configureDBna.Bh

# Description:   Reconfigures the cloned database (nademo) for net.genesis.
#                This script should NOT be called directly but needs
to be called from the main setup.sh installation script
for iPrototype Version 2.

# Parameters:    Requires special parameters
#                ORACLE_SID_NA
#                oracle_sid_na
#                DB_DATA_DIR_NA
#                DB_ROOT_DIR_NA

# ############################################################
Date     Who      Why
# 5/10/2000   rwessa    Created, based on standard configureDB script

# ############################################################
. $INSTALL_HOME/echodbg.sh " entering configureDB.Bh . . . " 2
scriptfile=$INSTALL_LOGFILE
echo DB_DATA_DIR=$DB_DATA_DIR_NA >> $scriptfile
ls -la $DB_DATA_DIR_NA >> $scriptfile
date >> $scriptfile
set >> $scriptfile
echo " " >> $scriptfile
pwd >> $scriptfile
#mV "DB_ROOT_DIR_NA/${OLD_ORACLE_SID}" "${DB_DATA_DIR}/${ORACLE_SID_NA}"
# echo mv "$DS_ROOT_DIR_NA/${OLD_ORACLE_SID}" "${DB_DATA_DIR_NA}/${ORACLE_SID_NA} >>
$scriptfile
#chown "${ORACLE}":$GROUPNAME "${DB_DATA_DIR_NA}/${ORACLE_SID_NA}"
# echo chown "${ORACLE}:$GROUPNAME "${DB_DATA_DIR_NA}/${ORACLE_SID_NA}" >> $scriptfile
mv "${ORACLE_BASE}/admin/${OLD_ORACLE_SID}" "${ORACLE_BASE}/admin/${ORACLE_SID_NA}"
    echo mv "${ORACLE_BASE}/admin/${OLD_ORACLE_SID}" "${ORACLE_BASE}/admin/${ORACLE_SID_NA}"
>> $scriptfile
rm "${DB_DATA_DIR_NA}/rdo11${OLD_ORACLE_SID}.dbf"
    echo rmstat $?"${DB_DATA_DIR_NA}/rdo11${OLD_ORACLE_SID}.dbf" >> $scriptfile
rm "${DB_DATA_DIR_NA}/rdo12${OLD_ORACLE_SID}.dbf"

echo rmstat $? "${DB_DATA_DIR_NA}/rdo12${OLD_ORACLE_SID}.dbf" >> $scriptfile
rm "${DB_DATA_DIR_NA}/rdo${OLD_ORACLE_SID}13.dbf"
    echo rmstat $? "${DB_DATA_DIR_NA}/rdo13${OLD_ORACLE_SID}.dbf" >> $scriptfile
rm "${DB_DATA_DIR_NA56 /rdo21${OLD_ORACLE_SID}.dbf"
    echo rmstat $? "${DB_DATA_DIR_NA}/rdo21${OLD_ORACLE_SID}.dbf" >> $scriptfile
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
rm "${DB_DATA_DIR_NA56 /rdo22${OLD_ORACLE_SID}.dbf"
    echo rmstat $? "${DB_DATA_DIR_NA}/rdo22${OLD_ORACLE_SID}.dbf" >> $scriptfile
rm "${DB_DATA_DIR_NA}/rdo23${OLD_ORACLE_SID}.dbf"
    echo rmstat $? "${DB_DATA_DIR_NA}/rdo23${OLD_ORACLE_SID}.dbf" >> $scriptfile
rm "${DB_DATA_DIR_NA}/ctl1${OLD_ORACLE_SID}.ctl"
    echo rmstat $? "${DB_DATA_DIR_NA}/ctl1${OLD_ORACLE_SID}.ctl" >> $scriptfile
rm "${DB_DATA_DIR_NA}/ctl2${OLD_ORACLE_SID}.ctl"
    echo rmstat $? "${DB_DATA_DIR_NA}/ctl2${OLD_ORACLE_SID}.ctl" >> $scriptfile
cd "${DB_DATA_DIR_NA}"
cd "${DB_DATA_DIR_NA}" >> $scriptfile
pwd >> $scriptfile
for source in * .dbt
do
    destination=`echo ${source} | sed "s/${OLD_ORACLE_SID}/${ORACLE_SID_NA}/"`
    if [ "${source}" != "${destination}" ]
    then
        echo "\tRenaming ${source} to ${destination} . . . " >> $scriptfile
        echo mv ${source} "${destination}" >> $scriptfile
        mv ${source} "${destination}"
        echo $? Move status for ${source} "${destination}" >> $scriptfile
    fi
    chown ${ORACLE}:$GROUPNAME "${destination}"
    chown ${ORACLE}:$GROUPNAME "${destination}" >> $scriptfile
done
. $INSTALL_HOME/echodbg.sh "creating
${ORACLE_BASE}/admin/${ORACLE_SID_NA}/pfile/config${ORACLE_SID_NA}.ora . . . " 4
cat ${INSTALL_HOME}/templates/oracle/configDB.ora | \
        sed "s+D_B_D_A_T_A_D_I_R+${DB_DATA_DIR_NA}+"g | cat | \
        sed "s+O_R_A_C_L_E_S_I_D+${ORACLE_SID_NA}+"g | cat | \
        sed "s+O_R_A_C_L_E_B_A_S_E+${ORACLE_BASE}+"g \
        > "${ORACLE_BASE}/admin/${ORACLE_SID_NA}/pfile/config${ORACLE_SID_NA}.ora"
chown ${ORACLE}:$GROUPNAME
"${ORACLE_BASE}/admin/${ORACLE_SID_NA}/pfile/config${ORACLE_SID_NA}.ora"
echo chown ${ORACLE}:$GROUPNAME
"${ORACLE_BASE}/admin/${ORACLE_SID_NA}/pfile/config${ORACLE_SID_NA}.ora" >> $scriptfile
ln -s "${ORACLE_BASE}/admin/${ORACLE_SID_NA}/pfile/config${ORACLE_SID_NA}.ora" \
        "${ORACLE_HOME}/dbs/config${ORACLE_SID_NA}.ora"
    echo ln -s "${ORACLE_BASE}/admin/${ORACLE_SID_NA}/pfile/config${ORACLE_SID_NA}.ora" \
        "${ORACLE_HOME}/dbs/config${ORACLE_SID_NA}.ora" >> $scriptfile
. $INSTALL_HOME/echodbg.sh "creating
${ORACLE_BASE}/admin/${ORACLE_SID_NA}/pfile/init${ORACLE_SID_NA}.ora" 4
cat ${INSTALL_HOME}/templates/oracle/initDB.ora | \
        sed "s+D_B_D_A_T_A_D_I_R+${DB_DATA_DIR_NA}+"g | cat | \
        sed "s+O_R_A_C_L_E_S_I_D+${ORACLE_SID_NA}+"g | cat | \
        sed "s+O_R_A_C_L_E_B_A_S_E+${ORACLE_BASE}+"g \
        > "${ORACLE_BASE}/admin/${ORACLE_SID_NA}/pfile/init${ORACLE_SID_NA}.ora"
chown ${ORACLE}:$GROUPNAME
"${ORACLE_BASE}/admin/${ORACLE_SID_NA}/pfile/init${ORACLE_SID_NA}.ora"
    echo chown ${ORACLE}:$GROUPNAME
        "${ORACLE_BASE}/admin/${ORACLE_SID_NA}/pfile/init${ORACLE_SID_NA}.ora" >>$scriptfile
    ln -s "${ORACLE_BASE}/admin/${ORACLE_SID_NA}/pfile/init${ORACLE_SID_NA}.ora" \
        "${ORACLE_HOME}/dbs/init${ORACLE_SID_NA}.ora"
    echo ln -s "${ORACLE_BASE}/admin/${ORACLE_SID_NA}/pfile/init${ORACLE_SID_NA}.ora" \
        "${ORACLE_HOME}/dbs/init${ORACLE_SID_NA}.ora" >> $scriptfile
. $INSTALL_HOME/echodbg.sh "creating ${DB_DATA_DIR_NA}/cr${ORACLE_SID_NA}ctrl.sql" 4
cat ${INSTALL_HOME}/templates/oracle/crctrl.sql | \
        sed "s+D_B_D_A_T_A_D_I_R+${DB_DATA_DIR_NA}+"g |cat | \
        sed "s+O_R_A_C_L_3E_S_I_D+${ORACLE_SID_NA)+"g | cat | \
        sed "s+O_R_A_C_L_E_B_A_S_E+${ORACLE_BASE)+"g \
        > "${DB_DATA_DIR_NA}/cr${ORACLE_SID_NA}ctrl.sql"
chown ${ORACLE}:$GROUPNAME "${DS_DATA_DIR_NA}/cr${ORACLE_SID_NA}ctrl.sql"
# Use svrmgr to create new control files
. $INSTALL_HOME/echodbg.sh "Attempting to run svrmgr to create control files . . . " 4
su - ${ORACLE} -c "
ORACLE_SID=${ORACLE_SID_NA}
ORAENV_ASK=NO
cat "${DB_DATA_DIR_NA}/cr${ORACLE_SID_NA}ctrl.sql" | svrmgrl
# Now start database and tns listener
su - ${ORACLE} -c "startDB${oracle_sid_na}"
su - ${ORACLE} -c "startNET${oracle_sid_na}"
. $INSTALL_HOME/echodbg.sh "configureDBna.sh completed." 2
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
~DIRECTORY: templates\apache\
~~~TEMPLATE: \apache\access.conf
~~~access.conf
access.conf: Global access configuration
Online docs at http://www.apache.org/
This file defines server settings which affect which types of services
are allowed, and in what circumtances.
Each directory to which Apache has access, can be configured with respect
to which services and features are allowed and/or disabled in that
directory (and its subdirectories).
Originally by Rob McCool
First, we configure the "default" to be a very restrictive set of
permissions.
<Directory />
Options FollowSymLinks
AllowOverride None
</Directory>
Note that from this point forward you must specifically allow
particular features to be enabled - so if something's not working as
you might expect, make sure that you have specifically enabled it
below.
This should be changed to whatever you set DocumentRoot to.
<Directory "O_R_A_C_L_E_A_P_B_A_S_E/htdocs">
<Directory "O_R_A_C_L_E_V_G_N_B_A_S_E/cas-docs">
This may also be "None", "All", or any conbination of "Indexes",
"Includes", "FollowSymLinks", "ExecCGI", or "MultiViews".
Note that "Multiviews" must be named *explicitly* --- "Options All"
doesn't give it to you.
Options Indexes FollowSymLinks
********* VIGNETTE ADDITIONS **********
Options Indexes FollowSymLinks Includes
********* VIGNETTE ADDITIONS **********
This controls which options the .htaccess files in directories can
override. Can also be "All", or any conbination of "options", "FileInfo",
"AuthConfig", and "Limit"
AllowOverride None
Controls who can get stuff fron this server.
order allow,deny
allow fron all
</Directory>
O_R_A_C_L_E_A_P_B_A_S_E/cgi-bin should be changed to whatever your ScriptAliased
CGI directory exists, if you have that configured.
Directory "O_R_A_C_L_E_A_P_B_A_S_E/cgi-bin">
AllowOverride None
Options None
</Directory>
Allow server status reports, with the URL of http://servernane/server-status
Change the ".your_domain.com" to match your domain to enable.
<Location /server-status>
SetHandler server-status
order deny,allow
deny from all
allow from .your_domain.com
</Location>
Allow remote server configuration reports, with the URL of
http://servername/server-info (requires that mod_info.c be loaded).
Change the ".your_domain.com" to match your domain to enable.
<Location /server-info>
SetHandler server-info
order deny,allow
deny from all
allow from .your_domain.com
</Location>
There have been reports of people trying to abuse an old bug from pre-1.1
days. This bug involved a CGI script distributed as a part of Apache.
By uncommenting these lines you can redirect these attacks to a logging
script on phf.apache.org. Or, you can record them yourself, using the script
support/phf_abuse_log.cgi.
<Location /cgi-bin/phf*>
deny from all
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
ErrorDocument 403 http://phf.apache.org/phf_abuse_log.cgi
*</Location>
You may place any other directories or locations you wish to have
access information for after this one.
******** VIGNETTE ADDITIONS **********
<Location /ServerSideFunction/>
SetHandler ServerSideFunction
allow from all
</Location>
******** VIGNETTE ADDITIONS **********
~~~TEMPLATE: \apache\apachectl
~~~apachectl
!/bin/sh

Apache control script designed to allow an easy command line interface
to controlling Apache. Written by Marc Slemko, 1997/08/23

The exit codes returned are:
0 - operation completed successfully
1 -
2 - usage error
3 - httpd could not be started
4 - httpd could not be stopped
5 - httpd could not be started during a restart
6 - httpd could not be restarted during a restart
7 - httpd could not be restarted during a graceful restart
8 - configuration syntax error

When multiple arguments are given, only the error from the __last__
one is reported. Run "apachectl help" for usage info

- - - - - - - - - - - - - - - - - - - -           - - - - - - - - - - - - - - - - - - - -
| | | | | | | | | || | | | | | | | | END CONFIGURATION SECTION       | | | | | | | | | || | | | | | | | |

the path to your PID file
PIDFILE=O_R_A_C_L_E_A_P_B_A_S_E/var/run/httpd.pid
PIDFILE=O_R_A_C_L_E_A_P_B_A_S_E/logs/httpd.pid

the path to your httpd binary, including options if necessary
HTTPD=O_R_A_C_L_E_A_P_B_A_S_E/sbin/httpd

a command that outputs a formatted text version of the HTML at the
url given on the command line. Designed for lynx, however other
programs may work.
LYNX="lynx –dump"

the URL to your server's mod_status status page. If you do not
have one, then status and fullstatus will not work.
STATUSURL="http://localhost/server-status"

- - - - - - - - - - - - - - - - - - - -           - - - - - - - - - - - - - - - - - - - -
| | | | | | | | | | | | | | | | | | | |END CONFIGURATION SECTION       | | | | | | | | | | | | | | | | | |
ERROR=0
ARGV="$@"
if [ "x$ARGV" = "x" ] ; then
    ARGS="help"
fi
for ARG in $@ $ARGS
do
        # check for pidfile
        if [ -f $PIDFILE ] ; then
            PID=`cat $PIDFILE`
            if kill -0 $PID; then
                STATUS="httpd (pid $PID) running"
                RUNNING=1
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        else
            STATUS="httpd (pid $PID?) not running"
            RUNNING=0
        fi
    else
        STATUS="httpd (no pid file) not running"
        RUNNING=O
    fi
case $ARG in
start)
    if [ $RUNNING -eq 1 ] ; then
        echo "$0 $ARG: httpd (pid $PID) already running"
        continue
    fi
    if $HTTPD ; then
        echo "$0 $ARG: httpd started"
    else
        echo "$0 $ARG: httpd could not be started"
        ERROR=3
    fi
    ;;
stop)
    if [ $RUNNING -eq 0 ] ; then
        echo "$0 $ARG: $STATUS"
        continue
    fi
    if kill $PID ; then
        echo "$0 $ARG: httpd stopped"
    else
        echo "$0 $ARG: httpd could not be stopped"
        ERROR=4
    fi
    ;;
restart)
    if [ $RUNNING -eq 0 ] ; then
        echo "$0 $ARG: httpd not running, trying to start"
        if $HTTPD ; then
            echo "$0 $ARG: httpd started"
        else
            echo "$0 $ARG: httpd could not be started"
            ERROR=5
        fi
    else
        if $HTTPD -t >/dev/null 2>&1; then
            if kill -HUP $PID ; then
                echo "$0 $ARG: httpd restarted"
            else
                echo "$0 $ARG: httpd could not be restarted"
                ERROR=6
            fi
        else
            echo "$0 $ARG: configuration broken, ignoring restart"
            echo "$0 $ARG: (run 'apachectl configtest' for details)"
            ERROR=6
        fi
    fi
    ;;
graceful)
    if [ $RUNNING -eq 0 ] ; then
        echo "$0 $ARG: httpd not running, trying to start"
        if $HTTPD ; then
            echo "$0 $ARG: httpd started"
        else
            echo "$0 $ARG: httpd could not be started"
            ERROR=5
        fi
    else
        if $HTTPD -t >/dev/null 2>&1; then
            if kill -USR1 $PID ; then
                echo "$0 $ARG: httpd gracefully restarted"
            else
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
                        echo "$0 $ARG: httpd could not be restarted"
                        ERROR=7
                fi
            else
                echo "$0 $ARG: configuration broken, ignoring restart"
                echo "$0 $ARG: (run 'apachectl configtest' for details)"
                ERROR=7
            fi
        fi
        ;;
    status)
        $LYNX $STATUSURL | awk ' /process$/ { print; exit } { print } '
        ;;
    fullstatus)
        $LYNX $STATUSURL
        ;;
    configtest)
        if $HTTPD -t; then
            :
        else
            ERROR=8
        fi
        ;;
    *)
        echo "usage: $0 (start|stop|restart|fullstatus|status|graceful|configtest|help)"
        cat <<EOF
start      - start httpd
stop       - stop httpd
restart    - restart httpd if running by sending a SIGHUP or start if
             not running
fullstatus - dump a full status screen; requires lynx and mod_status enabled
status     - dump a short status screen; requires lynx and mod_status enabled
graceful   - do a graceful restart by sending a SIGUSR1 or start if not running
configtest - do a configuration syntax test
help       - this screen
EOF
        ERROR=2
        ;;
    esac
done
exit $ERROR
# ====================================================================
# copyright (c) 1995–1998 The Apache Group. All rights reserved.

# Redistribution and use in source and binary forms, with or without
modification, are permitted provided that the following conditions
are met:

1.  Redistributions of source code must retain the above copyright
notice, this list of conditions and the following disclaimer.

2.  Redistributions in binary form must reproduce the above copyright
notice, this list of conditions and the following disclaimer in
the documentation and/or other materials provided with the
distribution.

# 3.  All advertising materials nentioning features or use of this
#     software must display the following acknowledgment:
"This product includes software developed by the Apache Group
for use in the Apache HTTP server project (http://www.apache.org/)."

4.  The names "Apache Server" and "Apache Group" must not be used to
endorse or promote products derived from this software without
prior written permission. For written permission, please contact
apache@apache.org.

5.  Products derived from this software may not be called "Apache"
nor may "Apache" appear in their names without prior written
permission of the Apache Group.

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
6.    Redistributions of any form whatsoever must retain the following
acknowledgment:
\This product includes software developed by the Apache Group
for use in the Apache HTTP server project (http://www.apache.org/)."

THIS SOFTWARE IS PROVIDED BY THE APACHE GROUP "AS IS" AND ANY
EXPRESSED OR IMPLIED WARRANTIES, INCLUDING, BUT NOT LIMITED TO, THE
IMPLIED WARRANTIES OF MERCHANTABILITY AND FITNESS FOR A PARTICULAR
PURPOSE ARE DISCLAIMED. IN NO EVENT SHALL THE APACHE GROUP OR
ITS CONTRIBUTORS BE LIABLE FOR ANY DIRECT, INDIRECT, INCIDENTAL,
SPECIAL, EXEMPLARY, OR CONSEQUENTIAL DAMAGES (INCLUDING, BUT
NOT LIMITED TO, PROCUREMENT OF SUBSTITUTE GOODS OR SERVICES;
LOSS OF USE, DATA, OR PROFITS; OR BUSINESS INTERRUPTION)
HOWEVER CAUSED AND ON ANY THEORY OF LIABILITY, WHETHER IN CONTRACT,
STRICT LIABILITY, OR TORT (INCLUDING NEGLIGENCE OR OTHERWISE)
ARISING IN ANY WAY OUT OF THE USE OF THIS SOFTWARE, EVEN IF ADVISED
OF TME POSSIBILITY OF SUCH DAMAGE.
======================================================================

This software consists of voluntary contributions made by many
individuals on behalf of the Apache Group and was originally based
on public domain software written at the National Center for
Supercomputing Applications, University of Illinois, Urbana-Champaign.
For more information on the Apache Group and the Apache HTTP server
project, please see <http: //www.apache.org/>.

~~~TEMPLATE: \apache\apxs
~~~apxs
!no-perl-on-this-system
======================================================================
Copyright (c) 1998 The Apache Group. All rights reserved.

Redistribution and use in source and binary forms, with or without
modification, are permitted provided that the following conditions
are met:

1.   Redistributions of source code must retain the above copyright
notice, this list of conditions and the following disclaimer.

2.   Redistributions in binary form must reproduce the above copyright
notice, this list of conditions and the following disclaimer in
the documentation and/or other materials provided with the
distribution.

3.   All advertising materials mentioning features or use of this
software must display the following acknowledgment:
"This product includes software developed by the Apache Group
for use in the Apache HTTP server project (http://www.apache.org/)."

4.   The names "Apache Server" and "Apache Group" must not be used to
endorse or promote products derived from this software without
prior written permission. For written permission, please contact
apache@apache.org.

5.   Products derived from this software may not be called "Apache"
nor may "Apache" appear in their names without prior written
permission of the Apache Group.

6.   Redistributions of any form whatsoever must retain the following
acknowledgment:
"This product includes software developed by the Apache Group
for use in the Apache HTTP server project (http://www.apache.org/)."

THIS SOFTWARE IS PROVIDED BY THE APACHE GROUP "AS IS" AND ANY
EXPRESSED OR IMPLIED WARRANTIES, INCLUDING, BUT NOT LIMITED TO, THE
IMPLIED WARRANTIES OF MERCHANTABILITY AND FITNESS FOR A PARTICULAR
PURPOSE ARE DISCLAIMED. IN NO EVENT SHALL THE APACME GROUP OR
ITS CONTRIBUTORS BE LIABLE FOR ANY DIRECT, INDIRECT, INCIDENTAL,
SPECIAL, EXEMPLARY, OR CONSEQUENTIAL DAMAGES (INCLUDING, BUT
NOT LIMITED TO, PROCUREMENT OF SUBSTITUTE GOODS OR SERVICES;
LOSS OF USE, DATA, OR PROFITS; OR BUSINESS INTERRUPTION)
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
HOWEVER CAUSED AND ON ANY THEORY OF LIABILITY, WHETHER IN CDNTRACT,
STRICT LIABILITY, OR TORT (INCLUDING NEGLIGENCE OR OTHERWISE)
ARISING IN ANY WAY OUT OF THE USE OF THIS SOFTWARE, EVEN IF ADVISED
OF THE POSSIBILITY OF SUCH DAMAGE.
====================================================================

This software consists of voluntary contributions made by many
individuals on behalf of the Apache Group and was originally based
on public domain software written at the National Center for
Supercomputing Applications, University of Illinois, Urbana-Champaign.
For more information on the Apache Group and the Apache HTTP server
project, please see (http..//www.apache.org/>.

apxs -- APache eXtenSion tool
Written by Ralf S. Engelschall <rse@apache.org>

require 5.003;
use strict;
package apxs;

Configuration

my $CFG_CC            = 'gcc';      # substituted via Makefile.tmpl
my $CFG_CFLAGS        = ' -DSOLARIS2=260 '../apaci'';    # substituted via Makefile.tmpl
my $CFG_CFLAGS_SHLIB  = ' ';  # substituted via Makefile.tmpl
my $CFG_LD_SHLIB      = ' ';    #substituted via Makefile.tmpl
my $CFG_LDFLAGS_SHLIB = ' '; # substituted via Makefile.tmpl
my $CFG_LIBS_SHLIB    = ' ';    #substituted via Makefile.tmpl
my $CFG_PREFIX        = 'O_R_A_C_L_E_A_P_B_A_S_E';         # substituted via APACI install
my $CFG_SBINDIR       = 'O_R_A_C_L_E_A_P_B_A_S_E/sbin';    # substituted via APACI install
my $CFG_INCLUDEDIR    = 'O_R_A_C_L_E_A_P_B_A_S_E/include'; # substituted via APACI install
my $CFG_LIBEXECDIR    = 'O_R_A_C_L_E_A_P_B_A_S_B/libexec'; # substituted via APACI install
my $CFG_SYSCONFDIR    = 'O_R_A_C_L_E_A_P_B_A_S_E/etc';     # substituted via APACI install

Cleanup the above stuff

$CFG_CFLAGS =~ s|^\s+||;
$CFG_CFLAGS =~ s|\s+$||;
$CFG_CFLAGS =~ s|\s+'.+apaci'||;

Initial shared object support check

if    (not grep(/mod_so/, '$CFG_SBINDIR/httpd -1')) {
    print STDERR "apxs:Error: Sorry, no shared object support for Apache\n";
    print STDERR "apxs:Error: available under your platform. Make sure\n";
    print STDERR "apxs:Error: the Apache module mod_so is compiled into\n";
    print STDERR "apxs:Error: your server binary '$CFG_SBINDIR/httpd'.\n";
    exit {1} ;
}

parse argument line

defaults for parameters
my $opt_n = ' ';
my $opt_g = ' ';
my $opt_c = 0;
my $opt_o = ' ';
my @opt_D = ( );
my @opt_I = ( );
my @opt_L = ( );
my @opt_l = ( );
ny $opt_i = 0;
my $opt_a = 0;
my $opt_A = 0;
my $opt_q = 0;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
# this subroutine is derived from Perl's getopts.pl with the enhancement of
# the "+" metacharater at the format string to allow a list to be build by
# subsequent occurance of the same option.
sub Getopts {
    my ($argumentative, @ARGV) = @_;
    my (@args, $first, $rest, $pos) ;
    my ($errs) = 0;
    local ($_) ;
    local ($[) = 0;
    @args = split( / */, $argumentative) ;
    while(@ARGV && ($_ = $ARGV[0]) =~ /^-(.)(.*)/) {
        ($first, $rest) = ($1,$2) ;
        if ($_=~ m|^--$|) {
            shift (@ARGV) ;
            last;
        {
        $pos = index($argumentative,$first) ;
        if($pos >= $[) {
            if($args[$pos+1] eq ':') {
                shift (@ARGV) ;
                if($rest eq ' ') {
                    unless (@ARGV) {
                        print STDERR "apxs:Error: Incomplete option: $first (needs an
argument)\n";
                        ++$errs;
                    }
                    $rest = shift(@ARGV) ;
                }
                eval "\$opt_$first = \$rest;";
            {
            elsif ($args[$pos+1] eq '+') {
                shift(@ARGV) ;
                if($rest eq ' ') {
                    unless (@ARGV) {
                        print STDERR "apxs:Error: Incomplete option: $first (needs an
argument)\n";
                        ++$errs;
                    }
                    $rest = shift(@ARGV) ;
                }
                eval "push(\@opt_$first, \$rest) ;";
            }
            else {
                eval "\$opt_$first = 1";
                if($rest eq ' ') {
                    shift(@ARGV) ;
                }
                else {
                    $ARGV[0] = "-$rest";
                }
            }
        }
        else {
            print STDERR "apxs:Error: Unknown option: $first\n";
            ++$errs;
            if ($rest ne ' ') {
                $ARGV[0] = "-$rest";
            }
            else {
                shift (@ARGV) ;
            }
        }
    }
    return ($errs == 0, @ARGV) ;
}
sub usage {
    print STDERR "usage:  apxs -g  -n <modname>\n";
    print STDERR "        apxs -q  <query> . . .\n";
    print STDERR "        apxs -c  [-o <dsofile>] [-D <name>[=<value>]] [-I <incdir>]\n";
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        print STDERR "              [-L <libdir>] [-1 <libname>] <files> . . .\n";
        print STDERR "       apxs -i [-a] [-n <modname>] <dsofile> . . .\n";
        exit(1);
}
option handling
my $rc;
($rc, @ARGV) = $Getopts("gn:gco:I+D+L+l+iaA", @ARGV) ;
&usage if ($rc == 0) ;
&usage if ($#ARGV == -1 and not $opt_g) ;
&usage if (not $opt_g and not ($opt_g and $opt_n) and not $opt_i and not $opt_c) ;
# argument handling
my @args = @ARGV;
my $name = 'unknown' ;
$name = $opt_n if ($opt_n ne ' ') ;

Operation

helper function for executing a list of
system command with return code checks
sub execute_cmds {
    my (@cmds) = @_;
    my ($cmd, $rc) ;
    foreach $cmd (@cnds) {
        print STDERR "$cmd\n";
        $rc = system("$cmd") ;
        if ($rc != 0) {
            printf(STDERR "apxs:Break: Command failed with rc=%d\n", $rc << 8) ;
            exit(1) ;
        }
    }
}
if ($opt_g) {
    ##
    ## SANPLE MODULE SOURCE GENERATION
    ##
    if (-d $name) {
        print STDERR "apxs:Error: Directory '$name' already exists. Remove first\n";
        exit(1) ;
    }
    my $data = join(' ', <DATA>) ;
    $data =~ s|%NAME% |$name|sg;
    my ($mkf, $src) = ($data =~ m|^(.+)-=#=-\m(.+)|s) ;
    print STDERR "Creating [DIR] $name\n";
    system("mkdir $name") ;
    print STDERR "Creating [FILE] $name/Makefile\n";
    open(FP, ">${name}/Makefile") || die;
    print FP $mkf;
    close(FP) ;
    print STDERR "Creating [FILE] $name/mod_$name.c\n";
    open(FP, ">${name}/mod_${name}.c") || die;
    print FP $src;
    close(FP);
    exit(0) ;
}
if ($opt_q) {
    ##
    ## QUERY INFORMATION
    ##
    my $result = ' ';
    my $arg;
    foreach $arg (@args) {
        my $ok = 0;
        my $name;
        foreach $name (gw(
            CC LD_SHLIB CFLAGS CFLAGS_SHLIB LDFLAGS_SHLIB
            PREFIX SBINDIR INCLUDEDIR LIBEXECDIR SYSCONFDIR
        )) {
            if ($arg eq $name or $arg eq lc($name) ) {
                my $val = eval "\$CFG_$name";
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
                $result .= "${val}::";
                $ok = 1;
            }
        }
        if (not $ok) {
            printf(STDERR "apxs:Error: Invalid query string '%s'\n", $arg) ;
            exit(1) ;
        }
    }
    $result =~ s|::$||;
    $result =~ s|::| |;
    print $result;
}
if ($opt_c) {
    ##
    ## SHARED OBJECT COMPILATION
    ##
    #   split files into sources and objects
    my @srcs = ( ) ;
    my @objs = ( ) ;
    my $f;
    foreach $f (@args) {
        if ($f =~ n|\.c$|) {
            push(@srcs, $f) ;
        }
        else {
            push(@objs, $f) ;
        }
    }
    # determine output file
    my $dso_file;
    if ($opt_o eq ' ') {
        if ($#srcs > -1) {
            $dso_file = $srcs[0] ;
            $dso_file =~s|\.[ .]+$|.so| ;
        }
        elsif ($#objs > -1) {
            $dso_file = $objs[0] ;
            $dso_file =~ s|\.[ .]+$|.so| ;
        }
        else {
            $dso_file = "mod_unknown.so";
        }
    }
    else {
        $dso_file = $opt_o;
    }
    # create compilation commands
    my @cmds = ( ) ;
    my $opt = ' ';
    my ($opt_I, $opt_D) ;
    foreach $opt_I (@opt_I) {
        $opt .= "-I$opt_I ";
    }
    foreach $opt_D (@opt_D) {
        $opt .= "-D$opt_D ";
    }
    my $cflags = "$CFG_CFLAGS $CFG_CFLAGS_SHLIB";
    my $s;
    foreach $s (@srcs) {
        my $o = $s;
        $o =~ s|\.c$|.o|;
        push(@cmds, "$CFG_CC $cflags -I$CFG_INCLUDEDIR $opt -c $s") ;
        unshift(@objs, $o) ;
    }
    # create link command
    my $cmd = "$CFG_LD_SHLIB $CFG_LDFLAGS_SHLIB -o $dso_file";
    my $o;
    foreach $o (@objs) {
        $cmd .= " $o";
    }
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
        $opt = ' ';
        my ($opt_L, $opt_l) ;
        foreach $opt_L (@opt_L) {
            $opt .= " -L$opt_L";
        }
        foreach $opt_l (@opt_l) {
            $opt .= " -l$opt_l";
        }
        $cmd .= $opt;
        $cmd .= " $CFG_LIBS_SHLIB";
        push(@cmds, $cmd) ;
        # execute the commands
        &execute_cmds(@cmds) ;
        # allow one-step compilation and installation
        if ($opt_i) {
            @args = ( $dso_file ) ;
        }
    }
}
if ($opt_i) {
    ##
    ## SHARED OBJECT INSTALLATION
    ##
    #   determine installation commands
    #   and corresponding LoadMododule/AddModule directives
    my @lmd = ( ) ;
    my @amd = ( ) ;
    my @cmds = ( ) ;
    my $f;
    foreach $f (@args) {
        if ($f !~ m|\.so$|) {
            print STDERR "apxs:Error: file $f is not a shared object\n";
            exit(1) ;
        {
        my $t = $f;
        $t =~ s|^.+/([^/]+)$|$1| ;
        push(@cmds, "cp $f $CFG_LIBEXECDIR/$t") ;
        push(@cmds, "chmod 755 $CFG_LIBEXECDIR/$t") ;
        #   determine module synbolnane and filename
        my $filename = ' ';
        if ($name eq 'unknown') {
            $name = ' ';
            my $base = $f;
            $base =~ s|\.[^.]+$| |;
            if (-f "$base.c") {
                open(FP, "<$base.c") ;
                my $content = join(' ', <FP>) ;
                close(FP) ;
                if ($content =~
m|.*module\s+(?:MODULE_VAR_EXPORT\s+)?([a-zA-Z0-9_]+)_module\s*=\s*.*|s) {
                    $name = "$1";
                    $filename = "$base.c";
                    $filename =~ s|^[^/]+/| | ;
                }
            }
            if ($name eq ' ') {
                if ($base =~ m|.*mod_([1-zA-Z0-9_]+)\..+|) {
                    $name = "$1";
                    $filenane = $base;
                    $filenane =~ s|^[^/]+/| | ;
                }
            }
            if ($name eq ' ') {
                print "apxs:Error: Sorry, cannot determine bootstrap symbol name\n";
                print "apxs:Error: Please specify one with option '-n'\n";
                exit(1) ;
            }
        if ($filenane eq ' ') {
            $filename = "mod_${name}.c";
        }
        my $dir = $CFG_LIBEXECDIR;
        $dir =~ s|^$CFG_PREFIX/?| | ;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
            $dir =~ s|(.)$|$1/| ;
            push(@lmd, sprintf("LoadModule %-18s %s", "${name}_module", "$dir$t") ) ;
            push(@amd, sprintf("AddModule %s", $filename) ) ;
    {
    # execute the commands
    &execute_cmds(@cmds) ;
    # activate module via LoadModule/AddModule directive
    if ($opt_a or $opt_A) {
        if (not -f "$CFG_SYSCONFDIR/httpd.conf") {
            print "apxs:Error: Config file $CFG_SYSCONFDIR/httpd.conf not found\n";
            exit(1) ;
        }
        open(FP, "<$CFG_SYSCONFDIR/httpd.conf") || die;
        my $content = join(' ', <FP>) ;
        close (FP) ;
        if ($content !~ m|\n#?\s*LoadModule\s+|) {
            print STDERR "apxs:Error: Activation failed for custom
$CFG_SYSCONFDIR/httpd.conf file.\n";
            print STDERR "apxs:Error: At least one 'LoadModule' directive already has to
exist.\n";
            exit(1) ;
        {
        my $update = 0;
        my $lmd;
        foreach $lmd (@lmd) {
            if ($content !~ m|\n#!\s*$lmd|) {
                my $c = ' ';
                $c = '#' if ($opt_A) ;
                $content =~ s| (.*\n#?\s*LoadModule\s+[^\n]+\n) |$1$c$lmd\n|sg;
                $update = 1;
                $lmd =~ m|LoadModule\s+(.+?)_module.*| ;
                my $what = $opt_A ? "preparing" : "activating";
                print STDERR "[$what module '$1' in $CFG_SYSCONFDIR/httpd.conf]\n";
            {
        {
        my $amd;
        foreach $amd (@amd) {
            if ($content !~ m|\n#?\s*$amd|) {
                my $c =' ';
                $c = '#' if ($opt_A) ;
                $content =~ s| (.*\n#?\s*AddModule\s+(^\n]+\n) | $1$c$amd\n|sg;
                $update = 1;
            }
        }
        if ($update) {
            open(FP, ">$CFG_SYSCONFDIR/httpd.conf.new") || die;
            print FP $content;
            close (FP);
            system("cp $CFG_SYSCONFDIR/httpd.conf $CFG_SYSCONFDIR/httpd.conf.bak && " .
                   "cp $CFG_SYSCONFDIR/httpd.conf.new $CFG_SYSCONFDIR/httpd.conf && " .
                   "rm $CFG_SYSCONFDIR/httpd.conf.new") ;
        }
    }
}
##EOF##
__DATA__

Makefile - - Apache for sample %NAME% module
Autogenerated via "apxs -n %NAME% -g".

#   the used tools
APXS=apxs
APACHECTL=apachectl
additional defines, includes and libraries
#DEF=-Dmy_define=my_value
#INC=-Imy/include/dir
#LIB=-Lmy/lib/dir -lmylib
the default target
all: mod_%NAME%.so
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#   compile the shared object file
mod_%NAME%.so: mod_%NAME%.c
    $(APXS) -c $(DEF) $(INC) $(LIB) mod_%NAME%.c
install the shared object file into Apache
install: all
    $(APXS) -i -a -n '*%NAME%' mod_%NAME%.so
#   cleanup
clean:
    -rm -f mod_%NAME%.o mod_%NAME%.so
simple test
test: reload
    lynx -mime_header http://localhost/%NAME%
install and activate shared object by reloading Apache to
force a reload of the shared object file
reload: install restart
the general Apache start/restart/stop
procedures
start:
    $(APACHECTL) start
restart:
    $(APACHECTL) restart
stop:
    $(APACHECTL) stop
-=#=-
/*
**  mod_%NAME%.c - - Apache sample %NAME% module
**  [Autogenerated via "apxs -n %NAME% -g"]
**
**  To play with this sample module first compile it into a
**  DSO file and install it into Apache's libexec directory
**  by running:
**
**    $ apxs -c -i mod_%NAME%.c
**
**  Then activate it in Apache's httpd.conf file for instance
**  for the URL /%NAME% in as follows:
**
**    #   httpd.conf
**    LoadModule %NAME%_module libexec/mod_%NAME%.so
**    <Location /%NAME%>
**    SetHandler %NAME%
**    </Location>
**
**  Then after restarting Apache via
**
**    $ apachectl restart
**
**  you immediately can request the URL /%NAME and watch for the
**  output of this module. This can be achieved for instance via:
**
**    $ lynx -mime_header http://localhost/%NAME%
**
**  The output should be similar to the following one:
**
**    HTTP/1.1 200 OK
**    Date: Tue, 31 Mar 1998 14:42:22 GMT
**    Server: Apache/1.3b6-dev
**    Connection: close
**    Content-Type: text/html
**
**    The sample page from mod_%NAME%.c
*/
include "httpd.h"
include "http_config.h"
include "conf.h"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
/* The sample content handler */
static int %NAME%_handler(request_rec *r)
{
    r->content_type = "text/html";
    ap_send_http_header(r) ;
    if (|r->header_only)
        ap_rputs("The sample page from mod_%NAME%.c\n", r) ;
    return OK;
{
/* Dispatch list of content handlers */
static const handler_rec %NAME%_handlers[] = {
    { "%NAME%", %NAME%_handler },
    { NULL, NULL }
} ;
/* Dispatch list for API hooks */
module MODULE_VAR_EXPORT %NAME%_module = {
    STANDARD_MODULE_STUFF,
    NULL,                    /* module initializer
    NULL,                    /* create per-dir    config structures    */
    NULL,                    /* merge per-dir     config structures    */
    NULL,                    /* create per-server config structures    */
    NULL,                    /* merge per-server config structures     */
    NULL,                    /* table of config tile commands          */
    %NAME%_handlers,         /* [#8] MIME-typed-dispatched handlers    */
    NULL,                    /* [#1] URI to filename translation       */
    NULL,                    /* [#4] validate user id from request     */
    NULL,                    /* [#5] check if the user is ok _here_    */
    NULL,                    /* [#2] check access by host address      */
    NULL,                    /* [#6] determine MIME type               */
    NULL,                    /* [#7] pre-run fixups                    */
    NULL,                    /* [#9] log a tranasction                 */
    NULL,                    /* [#3] header parser                     */
    NULL,                    /* child_init                             */
    NULL,                    /* child_exit                             */
    NULL                     /* [#0] post read-request                 */
} ;
~~~TEMPLATE: \apache\combo
~~~TEMPLATE: \apache\access.conf
~~~access.conf
access.conf: Glcbal access configuration
Online docs at http://www.apache.org/
This file defines server settings which affect which types of services
are allowed, and in what circumstances.
Each directory to which Apache has access, can be configured with respect
to which services and features are allowed and/or disabled in that
directory (and its subdirectories) .
Originally by Rob McCool
First, we configure the "default" to be a very restrictive set of
permissions.
<Directory />
Options FollowSymLinks
AllowOverride None
</Directory>
Note that from this point forward you must specifically allow
particular features to be enabled - so if something's not working as
you might expect, make sure that you have specifically enabled it
below.
This should be changed to whatever you set DocumentRoot to.
<Directory "O_R_A_C_L_E_A_P_B_A_S_E/htdocs">
<Directory "O_R_A_C_L_E_V_G_N_B_A_S_E/cas-docs">
This may also be "None", "All", or any combination of "Indexes",
"Includes", "FollowSymLinks", "ExecCGI", or "Multiviews".
Note that "Multiviews" must be named *explicitly* - - - "Options All"
doesn't give it to you.
Options Indexes FollowSynLinks
********* VIGNETTE ADDITIONS **********
Options Indexes FollowSymLinks Includes
********* VIGNETTE ADDITIONS **********
This controls which options the .htaccess files in directories can
override. Can also be "All", or any combination of "Options", "FileInfo",
"AuthConfig", and "Limit"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
AllowOverride None
Controls who can get stuff from this server.
order allow,deny
allow from all
</Directory>
O_R_A_C_L_E_A_P_B_A_S_E/cgi-bin should be changed to whatever your ScriptAliased
CGI directory exists, if you have that configured.
<Directory "O_R_A_C_L_E_A_P_B_A_S_E/cgi-bin">
AllowOverride None
Options None
/Directory>
Allow server status reports, with the URL of http://servername/server-status
Change the ".your_domain.com" to match your domain to enable.
<Location /server-status>
SetHandler server-status
order deny,allow
deny from all
allow from .your_domain.com
</Location>
Allow remote server configuration reports, with the URL of
http://servername/server-info (requires that mod_info.c be loaded) .
Change the ".your_domain.com" to match your domain to enable.
<Location /server-info>
SetHandler server-info
order deny,allow
deny from all
allow from .your_domain.com
</Location>
There have been reports of people trying to abuse an old bug from pre-1.1
days. This bug involved a CGI script distributed as a part of Apache.
By uncommenting these lines you can redirect these attacks to a logging
script on phf.apache.org. Or, you can record them yourself, using the script
support/phf_abuse_log.cgi.
<Location /cgi-bin/phf*>
deny from all
ErrorDocument 403 http://phf.apache.org/phf_abuse_log.cgi
</Location>
You may place any other directories or locations you wish to have
access information for after this one.
********* VIGNETTE ADDITIONS **********
<Location /ServerSideFunction/>
SetHandler ServerSideFunction
allow from all
</Location>
********* VIGNETTE ADDITIONS **********
~~~TEMPLATE: \apache\apachectl
~~~apachectl
!/bin/sh

Apache control script designed to allow an easy command line interface
to controlling Apache. Written by Marc Slemko, 1997/08/23

The exit codes returned are:
0 - operation completed successfully
1 -
2 - usage error
3 - httpd could not be started
4 - httpd could not be stopped
5 - httpd could not be started during a restart
6 - httpd could not be restarted during a restart
7 - httpd could not be restarted during a graceful restart
8 - configuration syntax error

When multiple arguments are given, only the error from the __last__
one is reported. Run "apachectl help" for usage info

|||||||||||||||||||| START CONFIGURATION SECTION      ||||||||||||||||||||
--------------------                                  --------------------

the path to your PID file
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
#PIDFILE=O_R_A_C_L_E_A_P_B_A_S_E/var/run/httpd.pid
PIDFILE=O_R_A_C_L_E_A_P_B_A_S_E/logs/httpd.pid

the path to your httpd binary, including options if necessary
HTTPD=O_R_A_C_L_E_A_P_B_A_S_E/sbin/httpd

a command that outputs a formatted text version of the HTML at the
url given on the command line. Designed for lynx, however other
programs may work.
LYNX="lynx –dump"

the URL to your server's mod_status status page. If you do not
have one, then status and fullstatus will not work.
STATUSURL="http://localhost/server-status"

#-------------------                             --------------------
#||||||||||||||||||| END CONFIGURATION SECTION   |||||||||||||||||||
ERROR=0
ARGV="$@"
if [ "x$ARGV" = "x" ] ; then
    ARGS="help"
fi
for ARG in $@ $ARGS
do
    # check for pidfile
    if [ –f $PIDFILE ] ; then
        PID=`cat $PIDFILE`
        if kill –o $PID; then
            STATUS="httpd (pid $PID) running"
            RUNNING=1
        else
            STATUS="httpd (pid $PID?) not running"
            RUNNING=0
        fi
    else
        STATUS="httpd (no pid file) not running"
        RUNNING=0
    fi
    case $ARG in
    start)
        if [ $RUNNING -eq 1 ] ; then
            echo "$0 $ARG: httpd (pid $PID) already running"
            continue
        fi
        if $HTTPD ; then
            echo "$0 $ARG: httpd started"
        else
            echo "$0 $ARG: httpd could not be started"
            ERROR=3
        fi
        ;;
    stop)
        if [ $RUNNING -eq 0 ] ; then
            echo "$0 $ARG: $STATUS"
            continue
        fi
        if kill $PID ; then
            echo "$0 $ARG: httpd stopped"
        else
            echo "$0 $ARG: httpd could not be stopped"
            ERROR=4
        fi
        ;;
    restart)
        if [ $RUNNING -eq 0 ] ; then
            echo "$0 $ARG: httpd not running, trying to start"
            if $HTTPD ; then
                echo "$0 $ARG: httpd started"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
            else
                echo "$0 $ARG: httpd could not be started"
                ERROR=5
            fi
        else
            if $HTTPD -t >/dev/null 2>&1; then
                if kill -HUP $PID ; then
                    echo "$0 $ARG: httpd restarted"
                else
                    echo "$0 $ARG: httpd could not be restarted"
                    ERROR=6
                fi
            else
                echo "$0 $ARG: configuration broken, ignoring restart"
                echo "$0 $ARG: (run 'apachectl configtest' for details)"
                ERROR=6
            fi
        fi
        ;;
    graceful)
        if [ $RUNNING -eq 0 ] ; then
            echo "$0 $ARG: httpd not running, trying to start"
            if $HTTPD ; then
                echo "$0 $ARG: httpd started"
            else
                echo "$0 $ARG: httpd could not be started"
                ERROR=5
            fi
        else
            if $HTTPD -t >/dev/null 2>&1; then
                if kill -USR1 $PID ; then
                    echo "$0 $ARG: httpd gracefully restarted"
                else
                    echo "$0 $ARG: httpd could not be restarted"
                    ERROR=7
                fi
            else
                echo "$0 $ARG; configuration broken, ignoring restart"
                echo "$0 $ARG: (run 'apachectl configtest' for details)"
                ERROR=7
            fi
        fi
        ;;
    status)
        $LYNX $STATUSURL | awk ' /process$/ { print; exit } { print } '
        ;;
    fullstatus)
        $LYNX $STATUSURL
        ;;
    configtest)
        if $HTTPD -t; then
            :
        else
            ERROR=8
        fi
        ;;
    *)
        echo "usage: $0 (start|stop|restart|fullstatus|status|graceful|configtest|help)"
        cat <<EOF
start       - start httpd
stop        - stop httpd
restart     - restart httpd if running by sending a SIGHUP or start if
              not running
fullstatus  - dump a full status screen; requires lynx and mod_status enabled
status      - dump a short status screen; requires lynx and mod_status enabled
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
graceful    - do a graceful restart by sending a SIGUSR1 or start if not running
configtest  - do a configuration syntax test
help        - this screen
EOF
        ERROR=2
        ;;
        esac
done
exit $ERROR
========================================================================
Copyright (c) 1995–1996 The Apache Group. All rights reserved.

Redistribution and use in source and binary forms, with or without
modification, are permitted provided that the following conditions
are met:

1.    Redistributions of source code must retain the above copyright
notice, this list of conditions and the following disclaimer.

2.    Redistributions in binary form must reproduce the above copyright
notice, this list of conditions and the following disclaimer in
the documentation and/or other materials provided with the
distribution.

3.    All advertising materials mentioning features or use of this
software must display the following acknowledgment:
"This product includes software developed by the Apache Group
for use in the Apache HTTP server project (http://www.apache.org/)."

4.    The names "Apache Server" and "Apache Group" must not be used to
endorse or promote products derived from this software without
prior written permission. For written permission, please contact
apache@apache.org.

5.    Products derived from this software may not be called "Apache"
nor may "Apache" appear in their names without prior written
permission of the Apache Group.

6.    Redistributions of any form whatsoever must retain the following
acknowledgment:
"This product includes software developed by the Apache Group
for use in the Apache HTTP server project (http://www.apache.org/)."

THIS SOFTWARE IS PROVIDED BY THE APACHE GROUP "AS IS" AND ANY
EXPRESSED OR IMPLIED WARRANTIES, INCLUDING, BUT NOT LIMITED TO, THE
IMPLIED WARRANTIES OF MERCHANTABILITY AND FITNRSS FOR A PARTICULAR
PURPOSE ARE DISCLAIMED. IN NO EVENT SHALL THE APACHE GROUP OR
ITS CONTRIBUTORS OR LIABLE FOR ANY DIRECT, INDIRECT, INCIDENTAL,
SPECIAL, EXEMPLARY, OR CONSEQUENTIAL DAMAGES (INCLUDING, BUT
NOT LIMITED TO, PROCUREMENT OF SUBSTITUTE GOODS OR SERVICES;
LOSS OF USE, DATA, OR PROFITS; OR BUSINESS INTERRUPTION)
HOWEVER CAUSED AND ON ANY THEORY OF LIABILITY, WHETHER IN CONTRACT,
STRICT LIABILITY, OR TORT (INCLUDING NEGLIGENCE OR OTHERWISE)
ARISING IN ANY WAY OUT OF THE USE OF THIS SOFTWARE, EVEN IF ADVISED
OF THE POSSIBILITY OF SUCH DAMAGE.
========================================================================

This software consists of voluntary contributions made by many
individuals on behalf of the Apache Group and was originally based
on public domain software written at the National Center for
Supercomputing Applications, University of Illinois, Urbana-Champaign.
For more information on the Apache Group and the Apache HTTP server
project, please see <http://www.apache.org/>.

~~~TEMPLATE: \apache\apxs
~~~apxs
!no-perl-on-this-system
========================================================================
Copyright (c) 1999 The Apache Group. All rights reserved.

Redistribution and use in source and binary forms, with or without
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
modification, are permitted provided that the following conditions
are met:

1.  Redistributions of source code must retain the above copyright
notice, this list of conditions and the following disclaimer.

2.  Redistributions in binary form must reproduce the above copyright
notice, this list of conditions and the following disclaimer in
the documentation and/or other materials provided with the
distribution.

3.  All advertising materials mentioning features or use of this
software must display the following acknowledgment:
"This product includes software developed by the Apache Group
for use in the Apache HTTP server project (http://www.apache.org/)."

4.  The names "Apache Server" and "Apache Group" must not be used to
endorse or promote products derived from this software without
prior written permission. For written permission, please contact
apache@apache.org.

5.  Products derived from this software may not be called "Apache"
nor may "Apache" appear in their names without prior written
permission of the Apache Group.

6.  Redistributions of any form whatsoever must retain the following
acknowledgment:
"This product includes software developed by the Apache Group
for use in the Apache HTTP server project (http://www.apache.org/)."

THIS SOFTWARE IS PROVIDED BY THE APACHE GROUP "AS IS" AND ANY
EXPRESSED OR IMPLIED WARRANTIES, INCLUDING, BUT NOT LIMITED TO, THE
IMPLIED WARRANTIES OF MERCHANTABILITY AND FITNESS FOR A PARTICULAR
PURPOSE ARE DISCLAIMED. IN NO EVENT SHALL THE APACHE GROUP OR
ITS CONTRIBUTORS BE LIABLE FOR ANY DIRECT, INDIRECT, INCIDENTAL,
SPECIAL, EXEMPLARY, OR CONSEQUENTIAL DAMAGES (INCLUDING, BUT
NOT LIMITED TO, PROCUREMENT OF SUBSTITUTE GOODS OR SERVICES;
LOSS OF USE, DATA, OR PROFITS; OR BUSINESS INTERRUPTION)
HOWEVER CAUSED AND ON ANY THEORY OF LIABILITY, WHETHER IN CONTRACT,
STRICT LIABILITY, OR TORT (INCLUDING NEGLIGENCE OR OTHERWISE)
ARISING IN ANY WAY OUT OF THE USE OF THIS SOFTWARE, EVEN IF ADVISED
OF THE POSSIBILITY OF SUCH DAMAGE.
====================================================================

This software consists of voluntary contributions made by many
individuals on behalf of the Apache Group and was originally based
on public domain software written at the National Center for
Supercomputing Applications, University of Illinois, Urbana-Champaign.
For more information on the Apache Group and the Apache HTTP server
project, please see <http://www.apache.org/>.

apxs - - APache extension tool
Written by Ralf S. Engelschall <rse@apache.org>

require 5.003;
use strict;
package apxs;

Configuration

my $CFG_CC              = 'gcc';      # substituted via Makefile.tmpl
my $CFG_CFLAGS          = ' -DSOLARIS2=260 '. ./apaci'';      # substituted via Makefile.tmpl
my $CFG_CFLAGS_SHLIB    = ' '; # substituted via Makefile.tmpl
my $CFG_LD_SHLIB        = ' ';     # substituted via Makefile.tmpl
my $CFG_LDFLAGS_SHLIB   = ' '; # substituted via Makefile.tmpl
my $CFG_LIBS_SHLIB      = ' ';     # substituted via Makefile.tmpl
my $CFG_PREFIX          = 'O_R_A_C_L_E_A_P_B_A_S_E';          # substituted via APACI install
my $CFG_SBINDIR         = 'O_R_A_C_L_E_A_P_B_A_S_E/sbin';     # substituted via APACI install
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
my $CFG_INCLUDEDIR    = 'O_R_A_C_L_E_A_P_B_A_S_E/include';   # substituted via APACI install
my $CFG_LIBEXECDIR    = 'O_R_A_C_L_E_A_P_B_A_S_E/libexec';   # substituted via APACI install
my $CFG_3SYSCONFDIR   = 'O_R_A_C_L_E_A_P_B_A_S_E/etc';       # substituted via APACI install

Cleanup the above stuff

$CFG_CFLAGS =~ s|^\s+||;
$CFG_CFLAGS =~ s|\s+$||;
$CFG_CFLAGS =~ s|\s+'.+apaci'||;

Initial shared object support check

if (not grep(/mod_so/, '$CFG_SBINDIR/httpd -1') ) {
    print STDERR "apxs:Error: Sorry, no shared object support for Apache\n";
    print STDERR "apxs:Error: available under your platform. Make sure\n";
    print STDERR "apxs:Error: the Apache module mod_so is compiled into\n";
    print STDERR "apxs:Error: your server binary '$CFG_SBINDIR/httpd'.\n";
    exit(1) ;
}

parse argument line

defaults for parameters
my $opt_n = ' ' ;
my $opt_g = ' ' ;
my $opt_c = 0 ;
my $opt_o = ' ' ;
my @opt_D = ( ) ;
my @opt_I = ( ) ;
my @opt_L = ( ) ;
my @opt_l = ( ) ;
my $opt_i = 0 ;
my $opt_a = 0 ;
my $opt_A = 0 ;
my $opt_q = 0 ;
# this subroutine is derived from Perl's getopts.pl with the enhancement of
# the "+" metacharater at the format string to allow a list to be build by
# subsequent occurance of the same option.
sub Getopts {
    my ($argumentative, @ARGV) = @_;
    my (@args, $first, $rest, $pos) ;
    my ($errs) = 0 ;
    local ($_) ;
    local ($[) = 0 ;
    @args = split( / */, $argumentative) ;
    while(@ARGV && ($_ = $ARGV[0]) =~ /^-(.)(.*)/) {
        ($first, $rest) = ($1,$2) ;
        if ($_ =~ m|^--$|) {
            shift (@ARGV) ;
            last;
        {
        $pos = index($argumentative,$first) ;
        if($pos >= $[) {
            if($args[$pos+1] eq ':') {
                shift (@ARGV) ;
                if($rest eq ' ') {
                    unless (@ARGV) {
                        print STDERR "apxs:Error: Incomplete option: $first (needs an argument)\n";
                        ++$errs;
                    }
                    $rest = shift(@ARGV) ;
                }
                eval "[$]opt_$first = \$rest;";
            }
            elsif ($args[$pos+1] eq '+') {
                shift (@ARGV) ;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
                if($rest eq ' ') {
                    unless (@ARGV) {
                        print STDERR "apxs:Error: Incomplete option: $first (needs an argument)\n";
                        ++$errs;
                    }
                    $rest = shift(@ARGV) ;
                }
                eval "push(\@opt_$first, \$rest) ;";
            }
            else {
                eval "\$opt_$first = 1";
                if($rest eq ' ') {
                    shift(@ARGV) ;
                }
                else {
                    $ARGV[0] = "-$rest";
                }
            }
        }
        else {
            print STDERR "apxs:Error: Unknown option: $first\n";
            ++$errs;
            if($rest ne ' ') {
                $ARGV[0] = "-$rest";
            }
            else {
                shift(@ARGV);
            }
        }
    }
    return ($errs = = 0, @ARGV);
}
sub usage {
    print STDERR     "Usage:  apxs -g  -n <modname>\n";
    print STDERR     "        apxs -q  <query> . . . \n";
    print STDERR              "apxs -c  [-o <dsofile>] [-D <name> [=<value>]] [-I <incdir>]\n";
    print STDERR     "                 [-L <libdir>] [-1 <libname>] <files> . . . \n";
    print STDERR              "apxs -i  [-a] [-n <modname>] <dsofile> . . . \n";
    exit (1);
}
option handling
my $rc;
($rc, @ARGV) = &Getopts("gn:gco:I+D+L+1+iaA", @ARGV};
&usage if ($rc = = 0);
&usage if ($#ARGV = = -1 and not $opt_g);
&usage if (not $opt_q and not ($opt_g and $opt_n) and not $opt_i and not $opt_c);
#   argument handling
my @args = @ARGV;
my $name = 'unknown';
$name = $opt_n if ($opt_n ne ' ');

Operation

helper function for executing a list of
system command with return code checks
sub execute_cmds {
    my (@cmds) = @_;
    my ($cmd, $rc);
    foreach $cmd (@cmds) {
        print STDERR "$cmd\n";
        $rc = system("$cmd");
        if ($rc != 0) {
            printf(STDERR "apxs:Break: Command failed with rc=%d\n", $rc << 8);
            exit (1);
        }
    }
}
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
if ($opt_g) {
    ##
    ##  SAMPLE MODULE SOURCE GENERATION
    ##
    if (-d $name) {
        print STDERR "apxs:Error: Directory '$name' already exists. Remove first\n";
        exit(1);
    }
    my $data = join(' ', <DATA>);
    $data =~ s|%NAME%|$name|sg;
    my ($mkf, $src) = ($data =~ m|^(.+)-=#=-\n(.+)|s);
    print STDERR "Creating [DIR] $name\n";
    system("mkdir $name");
    print STDERR "Creating [FILE] $name/Makefile\n";
    open(FP, ">${name}/Makefile") || die;
    print FP $mkf;
    close(FP);
    print STDERR "Creating [FILE] $name/mod_$name.c\n";
    open(FP, ">${name}/mod_${name}.c") || die;
    print FP $src;
    close(FP);
    exit (0);
}
if ($opt_q) {
    ##
    ## QUERY INFORMATION
    ##
    my $result = ' ';
    my $arg;
    foreach $arg (@args) {
        my $ok = 0;
        my $name;
        foreach $name (qw(
            CC LD_SHLIB CFLAGS CFLAGS_SHLIB LDFLAGS_SHLIB
            PREFIX SBINDIR INCLUDEDIR LIBEXECDIR SYSCONFDIR
        )) {
            if ($arg eq $name or $arg eq lc($name)) {
                my $val = eval ¢\$CFG_$name";
                $result .= "${val}: :";
                $ok = 1;
            }
        }
        if (not $ok) {
            printf(STDERR "apxs:Error: Invalid query string '%s'\n", $arg);
            exit (1);
        }
    }
    $result =~ s|: :$| |;
    $result =~ s|: :|   |;
    print $result;
}
if ($opt_c) {
    ##
    ##   SHARED OBJECT COMPILATION
    ##
    #    split files into sources and objects
    my @srcs = ( );
    my @objs = ( );
    my $f;
    foreach $f (@args) {
        if ($f =~ m|\.c$|) {
            push (@srcs, $f);
        }
        else {
            push (@Objs, $f);
        }
    }
    #    determine output file
    my $dso_file;
    if ($opt_o eq ' ') {
        if ($#srcs > -1) {
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
            $dso_file = $srcs[0];
            $dso_file =~ s|\.[ .]+$|.so|;
        }
        elsif ($#objs > -1) {
            $dso_file = $objs[0];
            $dso_file =~ s|\.[ .]+$|.so|;
        }
        else {
            $dso_file = "mod_unknown.so";
        }
    }
    else {
        $dso_file = $opt_o;
    }
    #   create compilation commands
    my @cmds = ( );
    my $opt = ' ';
    my ($opt_I, $opt_D);
    foreach $opt_I (@opt_I) {
        $opt .= "-I$opt_I ";
    }
    foreach $opt_D (@opt_D) {
        $opt .= "-D$opt_D ";
    }
    my $cflags = "$CFG_CFLAGS $CFG_CFLAGS_SHLIB";
    my $s;
    foreach $s (@srcs) {
        my $o = $s;
        $o =~ s|\.c$|.o|;
        push (@cmds, "$CPG_CC $cflags -I$CFG_INCLUDEDIR $opt -c $s");
        unshift (@objs, $o);
    }
    #   create link command
    my $cmd = "$CFG_LD_SHLIB $CFG_LDFLAGS_SHLIB -o $dso_file";
    my $o;
    foreach $o (@objs) {
        $cmd .= " $o";
    }
    $opt = ' ';
    my ($opt_L, $opt_1);
    foreach $opt_L (@opt_L) {
        $opt .= " -L$opt_L";
    }
    foreach $opt_1 (@opt_1) {
        $opt .= " -1$opt_1";
    }
    $cmd .= $opt;
    $cmd .= " $CFG_LIBS_SHLIB";
    push (@cmds, $cmd);
    #   execute the commands
    &execute_cmds (@cmds);
    #   allow one-step compilation and installation
    if ($opt_i) {
        @args = ( $dso_file );
    }
}
if ($opt_i) {
    ##
    ## SHARED OBJECT INSTALLATION
    ##
    #   determine installation commands
    #   and corresponding LoadModule/AddModule directives
    my @lmd = ( );
    my @amd = ( );
    my @cmds = ( );
    my $f;
    foreach $f (@args) {
        if ($f !~ m|\.so$|) {
            print STDERR "apxs:Error: file $f is not a shared object\n";
            exit (1)
        }
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
        my $t = $f;
        $t =~ s|^.+/([^/]+)$|$1|;
        push(@cmds, "cp $f $CFG_LIBEXECDIR/$t");
        push(@cmds, "chmod 755 $CFG_LIBEXECDIR/$t,");
        #   determine module symbolname and filename
        my $filename = ' ';
        if ($name eq 'unknown') {
            $name = ' ';
            my $base = $f;
            $base =~ s|\.[^.]+$||;
            if (-f "$base.c") {
                open (FP, "<$base.c");
                my $content = join(' ', <FP>);
                close(FP);
                if ($content =~
m|.*module\s+(?:MODULE_VAR_EXPORT\s+)?([a-zA-Z0-9_]+)_module\s*=\s*.*|s) {
                    $name = "$1";
                    $filename = "$base.c";
                    $filename =~ s|^[^/]+/||;
                }
            }
            if ($name eq ' ') {
                if ($base =~ m|.*mod_([a-zA-Z0-9_]+)\..+|) {
                    $name = "$1";
                    $filename = $base;
                    $filename =~ s|^[^/]+/||;
                }
            }
            if ($name eq ' ') {
                print "apxs:Error: Sorry, cannot determine bootstrap symbol name\n";
                print "apxs:Error: Please specify one with option '-n'\n";
                exit(1)
            }
        }
        if ($filename eq ' ') {
            $filename = "mod_${name}.c";
        }
        my $dir = $CFG_LIBEXECDIR;
        $dir =~ s|^$CFG_PREFIX/?||
        $dir =~ s|(.)$|$1/|;
        push (@lmd, sprintf ("LoadModule %-18s %s", "$[name]_module", "$dir$t"));
        push (@amd, sprintf ("AddModule %s", $filename));
    }
    #   execute the commands
    &execute_cmds (@cmds);
    #   activate module via LoadModule/AddModule directive
    if ($opt_a or $opt_A) {
        if (not -f "$CFG_SYSCONFDIR/httpd.conf") {
            print "apxs:Error: Config file $CFG_SYSCONFDIR/httpd.conf not found\n";
            exit (1);
        }
        open(FP, "<$CFG_SYSCONFDIR/httpd.conf") || die;
        my $content = join (' ', <FP>);
        close (FP);
        if ($content !~ m|\n#?\s*LoadModule\s+|) {
            print STDERR "apxs:Error: Activation failed for custom
$CFG_SYSCONFDIR/httpd.conf file.\n";
            print STDERR "apxs:Error: At least one 'LoadModule' directive already has to
exist.\n";
            exit (1);
        }
        my $update = 0;
        my $lmd;
        foreach $lmd (@lmd) {
            if ($content !~ m|\n#?\s*$lmd|) {
                my $c = ' ';
                $c = '#' if ($opt_A);
                $content =~ s|^(.*\n#?\s*LoadModule\s+[^\n]+\n) | $1$c$lmd\n|sg;
                $update = 1;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
                $lmd =~ m|LoadModule\s+(.+?)_module.*|;
                my $what = $opt_A ? "preparing" : "activating";
                print STDERR "[$what module '$1' in $CFG_SYSCONFDIR/httpd.conf]\n";
                }
        }
        my $amd;
        foreach $amd (@amd) {
                if ($content !~ m|\n#?\s*$amd|) {
                        my $c = ' ';
                        $c = '#' if ($opt_A);
                        $content =~ s|^(.*\n#?\s*AddModule\s+[^\n]+\n) | $1$c$amd\n|sg;
                        $update = 1;
                }
        }
        if ($update) {
                open(FP, ">$CFG_SYSCONFDIR/httpd.conf.new") || die;
                print FP $content;
                close(FP);
                system ("cp $CFG_SYSCONFDIR/httpd.conf $CFG_SYSCONFDIR/httpd.conf.bak && " .
                        "cp $CFG_SYSCONFDIR/httpd.conf.new $CFG_SYSCONFDIR/httpd.conf && " .
                        "rm $CFG_SYSCONFDIR/httpd.conf.new");
        }
    }
}
##EOF##
__DATA__

Makefile - - Apache for sample %NAME% module
Autogenerated via ' 'apxs -n %NAME% -g' '.

#    the used tools
APXS=apxs
APACHECTL=apachectl
additional defines, includes and libraries
#DEF=-Dmy_define=my_value
#INC=-Imy/include/dir
#LIB=-Lmy/lib/dir -lmylib
the default target
all: mod_%NAME%.so
#    compile the shared object file
mod_%NAME%.so: mod_%NAME%.c
        $(APXS) -c $(DEF) $(INC) $(LIB) mod_%NAME%.c
install the shared object file into Apache
install: all
        $(APXS) -i -a -n '%NAME%' mod_%NAME%.so
#    cleanup
clean:
        -rm -f mod_%NAME%.o mod_%NAME%.so
simple test
test: reload
        lynx -mime_header http://localhost/%NAME%
install and activate shared object by reloading Apache to
force a reload of the shared object file
reload: install restart
the general Apache start/restart/stop
procedures
start:
        $ (APACHECTL) start
restart:
        $ (APACHECTL) restart
stop:
        $ (APACHECTL) stop
-=#=-
/*
** mod_%NAME%.c - - Apache sample %NAME% module
** [Autogenerated via ' 'apxs -n %NAME% -g' ']
**
** To play with this sample module first compile it into a
** DSO file and install it into Apache's libexec directory
** by running:
**
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
**     $ apxs -c -i mod_%NAME%.c
**
** Then activate it in Apache's httpd.conf file for instance
** for the URL /%NAME% in as follows:
**
**     #    httpd.conf
**     LoadModule %NAME%_module libexec/mod_%NAME%.so
**     Location /%NAME%>
**     SetHandler %NAME%
**     </Location>
**
** Then after restarting Apache via
**
**     $ apachectl restart
**
** you immediately can request the URL /%NAME and watch for the
** output of this module. This can be achieved for instance via:
**
**     $ lynx -mime_header http://localhost/%NAME%
**
** The output should be similar to the following one:
**
**     HTTP/1.1 200 OK
**     Date: Tue, Mar. 31, 1998 14:42:22 GMT
**     Server: Apache/1.3b6-dev
**     Connection: close
**     Content-Type: text/html
**
**     The sample page from mod_%NAME%.c
*/
include "httpd.h"
include "http_config.h"
include "conf.h"
/* The sample content handler */
static int %NAME%_handler (request_rec *r)
{
    r->content_type = "text/html";
    ap_send_http_header(r);
    if (!r->header_only)
        ap_rputs ("The sample page from mod_%NAME%.c\n", r);
    return OK;
}
/* Dispatch list of content handlers */
static const handler_rec %NAME%_handlers[ ] = {
    { "%NAME%", %NAME%_handler },
    { NULL, NULL }
};
/* Dispatch list for API hooks */
module MODULE_VAR_EXPORT %NAME%_module = {
    STANDARD_MODULE_STUFF,
    NULL,              /* module initializer                  */
    NULL,              /* create per-dir    config structures */
    NULL,              /* merge per-dir     config structures */
    NULL,              /* create per-server config structures */
    NULL,              /* merge per-server  config structures */
    NULL,              /* table of config file commands       */
    %NAME%_handlers,   /* [#8] MIME-typed-dispatched handlers */
    NULL,              /* [#1] URI to filename translation    */
    NULL,              /* [#4] validate user id fron request  */
    NULL,              /* [#5] check if the user is ok _here_ */
    NULL,              /* [#2] check access by host address   */
    NULL,              /* [#6] determine MIME type            */
    NULL,              /* [#7] pre-run fixups                 */
    NULL,              /* [#9] log a transaction              */
    NULL,              /* [#3] header parser                  */
    NULL,              /* child_init                          */
    NULL,              /* child_exit                          */
    NULL               /* [#0] post read-request              */
};
~~~TEMPLATE: \apache\httpd.conf
~~~httpd.conf
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# This is the main server configuration file. See URL http://www.apache.org/
for instructions.
Do NOT simply read the instructions in here without understanding
# what they do, if you are unsure consult the online docs. You have been
# warned.
# Originally by Rob McCool
# Dynanic Shared Object (DSO) Support

# To be able to use the functionality of a module which was built as a DSO you
# have to place corresponding 'LoadModule' lines at this location so the
# directives contained in it are actually available _before_ they are used.
# Please read the file README.DSO in the Apache 1.3 distribution for more
# details about the DSO mechanism and run 'httpd -1' for the list of already
# built-in (statically linked and thus always available) modules in your httpd
# binary.

# Example:
# LoadModule foo_module libexec/mod_foo.so
# ServerType is either inetd, or standalone.
ServerType standalone
# If you are running from inetd, go to "ServerAdmin".
# Port: The port the standalone listens to. For ports < 1023; you will
# need httpd to be run as root initially.
Port A_P_A_C_H_E_B_A_S_E01
# HostnameLookups: Log the names of clients or just their IP numbers
# e.g. www.apache.org (on) or 204.62.129.132 (off)
# The default is off because it'd be overall better for the net if people
# had to knowingly turn this feature on.
HostnameLookups off
# If you wish httpd to run as a different user or group, you must run
# httpd as root initially and it will switch.
# User/Group: The name (or #number) of the user/group to run httpd as.
#   On SCO (ODT 3) use User nouser and Group nogroup
#   On HPUX you may not be able to use shared memory as nobody, and the
#   suggested workaround is to create a user www and use that user.
#   NOTE that some kernels refuse to setgid(Group) or semctl(IPC_SET)
#   when the value of (unsigned)Group is above 60000;
#   don't use Group #-1 on these systems!
User nobody
Group nobody
# ServerAdmin: Your address, where problems with the server should be
# e-mailed.
ServerAdmin root1@H_O_S_T_N_A_M_E_D_O_M_A_I_N
# ServerRoot: The directory the server's config, error, and log files
# are kept in.
# NOTE| If you intend to place this on a NFS (or otherwise network)
# mounted filesystem then please read the LockFile documentation,
# you will save yourself a lot of trouble.
ServerRoot "O_R_A_C_L_E_A_P_B_A_S_E"
# BindAddress: You can support virtual hosts with this option. This option
# is used to tell the server which IP address to listen to. It can either
# contain "*" an IP address, or a fully qualified Internet domain name.
# See slso the VirtualHost directive.
#BindAddress *
# ErrorLog: The location of the error log file. If this does not start
# with /, ServerRoot is prepended to it.
ErrorLog logs/error_log
# LogLevel: Control the number of messages logged to the error_log.
# Possible values include: debug, info, notice, warn, error, crit,
# alert, emerg.
LogLevel warn
# The following directives define some format nicknames for use with
# a CustomLog directive (see below).
LogFormat "%h %l %u %t \"%r\"%>s %b \"%{Referer}i\" \"%{User-Agent}i\" " combined
LogFormat "%h %l %u %t \"%r\"%>s %b" common
LogFormat "%{Referer}i -> %U" referer
LogFormat "%{User-agent}i" agent
# The location of the access logfile (Common Logfile Format).
# If this does not start with /, ServerRoot is prepended to it.
CustomLog logs/access_log common
# If you would like to have an agent and referer logfile uncomment the
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# following directives.
CustomLog logs/referer_log referer
CustomLog logs/agent_log agent
# If you prefer a single logfile with access, agent and referer information
# (Combined Logfile Format) you can use the following directive.
CustomLog logs/access_log combined
# PidFile: The file the server should log its pid to
PidFile logs/httpd.pid
# ScoreBoardFile: File used to store internal server process information.
# Not all architectures require this. But if yours does (you'll know because
# this file is created when you run Apache) then you *must* ensure that
# no two invocations of Apache share the same scoreboard file.
ScoreBoardFile logs/apache_runtime_status
# The LockFile directive sets the path to the lockfile used when Apache
# is compiled with either USE_FCNTL_SERIALIZED_ACCEPT or
# USE_FLOCK_SERIALIZED_ACCEPT. This directive should normally be left at
# its default value. The main reason for changing it is if the logs
# directory is NFS mounted, since the lockfile MUST BE STORED ON A LOCAL
# DISK. The PID of the main server process is automatically appended to
# the filename.

#LockFile logs/accept.lock
# ExtendedStatus controls whether Apache will generate "full" status
# information (ExtendedStatus On) or just basic information (ExtendedStatus
# Off) when the server-status Handler is called. The default is Off.

ExtendedStatus On
# ServerName allows you to set a host name which is sent back to clients for
# your server if it's different than the one the program would get (i.e. use
# "www" instead of the host's real name).

# Note: You cannot just invent host names and hope they work. The name you
# define here must be a valid DNS name for your host. If you don't understand
# this, ask your network administrator.
# If your host doesn't have a registered DNS name, enter its IP address here.
# You will have to access it by its address (e.g., http://123.45.67.89)
# anyway, and this will make redirections work in a sensible way.
#ServerName new.host.name
# Optionally add a line containing the server version and virtual host
# name to server-generated pages (error documents, ftp directory listings,
# mod_status and mod_info output etc., but not SSI generated documents).
# Set to "EMail" to also include a mailto: link to the ServerAdmin.
# Set to one of: On | Off | EMail
ServerSignature on
# UseCanonicalName: (new for 1.3) with this setting turned on, whenever
# Apache needs to construct a self-referencing URL (a url that refers back
# to the server the response is coming from) it will use ServerName and
# Port to form a "canonical" name. With this setting off, Apache will
# use the hostname:port that the client supplied, when possible. This
# also affects SERVER_NAME and SERVER_PORT in CGIs.
UseCanonicalName on
# CacheNegotiatedDocs: By default, Apache sends Pragma: no-cache with each
# document that was negotiated on the basis of content. This asks proxy
# servers not to cache the docunent. Uncommenting the following line disables
# this behavior, and proxies will be allowed to cache the documents.
#CacheNegotiatedDocs
# Timeout: The number of seconds before receives and sends time out
Timeout 300
# KeepAlive: Whether or not to allow persistent connections (more than
# one request per connection). Set to "Off" to deactivate.
KeepAlive On
# MaxKeepAliveRequests: The maximum number of requests to allow
# during a persistent connection. Set to 0 to allow an unlimited amount.
# We reccomend you leave this number high, for maximum performance.
MaxKeepAliveRequests 100
# KeepAliveTimeout: Number of seconds to wait for the next request
KeepAliveTimeout 15
# Server-pool size regulation. Rather than making you guess how many
# server processes you need, Apache dynamically adapts to the load it
# sees - - - that is, it tries to maintain enough server processes to
# handle the current load, plus a few spare servers to handle transient
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# load spikes (e.g., multiple simultaneous requests from a single
# Netscape browser).
# It does this by periodically checking how many servers are waiting
# for a request. If there are fewer than MinSpareServers, it creates
a new spare. If there are more than MaxSpareServers, some of the
spares die off. These values are probably OK for most sites - - -
MinSpareServers 5
MaxSpareServers 10
Number of servers to start - - - should be a reasonable ballpark figure.
StartServers 5
Limit on total number of servers running, i.e., limit on the number
of clients who can simultaneously connect - - - if this limit is ever
reached, clients will be LOCKED OUT, so it should NOT BE SET TOO LOW.
It is intended mainly as a brake to keep a runaway server from taking
Unix with it as it spirals down . . .
MaxClients 150
MaxRequestsPerChild: the number of requests each child process is
allowed to process before the child dies.
The child will exit so as to avoid problems after prolonged use when
Apache (and maybe the libraries it uses) leak. On most systems, this
isn't really needed, but a few (such as Solaris) do have notable leaks
in the libraries.
MaxRequestsPerChild 30
Proxy Server directives. Uncomment the following line to
enable the proxy server:
ProxyRequests On
Enable/disable the handling of HTTP/1.1 "Via:" headers.
("Full" adds the server version; "Block" removes all outgoing Via: headers)
Set to one of: Off | On | Full | Block
ProxyVia on
To enable the cache as well, edit and uncomment the following lines:
(no cacheing without CacheRoot)
CacheRoot @@ServerRoot@@/proxy
CacheSize 5
CacheGcInterval 4
CacheMaxExpire 24
CacheLastModifiedFactor 0.1
CacheDefaultExpire 1
NoCache a_domain.com another_domain.edu joes.garage_sale.com
Listen: Allows you to bind Apache to specific IP addresses and/or
ports, in addition to the default. See also the VirtualHost command
Listen 3000
#Listen 12.34.56.79:80
# VirtualHost: Allows the daemon to respond to requests for more than one
server address, if your server machine is configured to accept IP packets
for multiple addresses. This can be accomplished with the ifconfig
alias flag, or through kernel patches like VIF.
Any httpd.conf or srm.conf directive may go into a VirtualHost command.
See also the BindAddress entry.
<VirtualHost host.some_domain.com>
#ServerAdmin webmaster@host.some_domain.com
#DocumentRoot /www/doca/host.some_domain.com
#ServerName host.some_domain.com
ErrorLog logs/host.some_domain.com-error_log
#TransferLog logs/host.some_domain.con-access_log
#</VirtualHost>
********* VIGNETTE ADDITIONS **********

AddHandler server-parsed .html
THESE ARE NON-OPTIONAL SETTINGS. You must provide values for these settings.
The location of the StoryServer.cfg file for this content application server.
Vgn_SSConfigFile
O_R_A_C_L_E_V_G_N_B_A_S_E/StoryServer/R4.2/conf/H_O_S_T_N_A_M_E-A_P_A_C_H_E_B_A_S_E01-1/S
toryServer.cfg

The location of the shared library directory of your StoryServer installation

Vgn_ShLibDir O_R_A_C_L_E_V_G_N_B_A_S_E/StoryServer/R4.2/lib/solaris

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
********* VIGNETTE ADDITIONS **********
~~~TEMPLATE: \apache\srm.conf
~~~srm.conf
With this document, you define the name space that users see of your http
server. This file also defines server settings which affect how requests are
serviced, and how results should be formatted.
See the tutorials at http://www.apache.org/ for
more information.
Originally by Rob McCool; Adapted for Apache
DocumentRoot: The directory out of which you will serve your
documents. By default, all requests are taken from this directory, but
symbolic links and aliases may be used to point to other locations.
DocumentRoot "O_R_A_C_L_E_A_P_B_A_S_E/htdocs"
DocumentRoot "O_R_A_C_L_E_V_G_N_B_A_S_E/cas-docs"
UserDir: The name of the directory which is appended onto a user's home
directory if a ~user request is recieved.
UserDir public_html
DirectoryIndex: Name of the file or files to use as a pre-written HTML
directory index. Separate multiple entries with spaces.
DirectoryIndex index.html
Fancy-Indexing is whether you want fancy directory indexing or standard
FancyIndexing on
AddIcon tells the server which icon to show for different files or filename
extensions
AddIconByEncoding (CMP, /icons/compressed.gif) x-compress x-gzip
AddIconByType (TXT, /icons/text.gif) text/*
AddIconByType (IMG, /icons/image2.gif) image/*
AddIconByType (SND, /icons/sound2.gif) audio/*
AddIconByType (VID, /icons/movie.gif) video/*
AddIcon /icons/binary.gif .bin .exe
AddIcon /icons/binhex.gif .hqx
AddIcon /icons/tar.gif .tar
AddIcon /icons/world2.gif .wrl .wrl.gz .vrml .vrm .iv
AddIcon /icons/compressed.gif .Z .z .tgz .gz .zip
AddIcon /icons/a.gif .ps .ai .eps
AddIcon /icons/layout.gif .html .shtml .htm .pdf
AddIcon /icons/text.gif .txt
AddIcon /icons/c.gif .c
AddIcon /icons/p.gif .pl .py
AddIcon /icons/f.gif .for
AddIcon /icons/dvi.gif .dvi
AddIcon /icons/uuencoded.gif .uu
AddIcon /icons/script.gif .conf .sh .shar .csh .ksh .tcl
AddIcon /icons/tex.gif .tex
AddIcon /icons/bomb.gif core
AddIcon /icons/back.gif ..
AddIcon /icons/hand.right.gif README
AddIcon /icons/folder.gif ^^DIRECTORY^^
AddIcon /icons/blank.gif ^^BLANKICON^^
DefaultIcon is which icon to show for files which do not have an icon
explicitly set.
DefaultIcon /icons/unknown.gif
AddDescription allows you to place a short description after a file in
server-generated indexes.
Format: AddDescription "description" filename
ReadmeName is the name of the README file the server will look for by
default. Format: ReadmeName name

The server will first look for name.html, include it if found, and it will
then look for name and include it as plaintext if found.

HeaderName is the name of a file which should be prepended to
directory indexes.
ReadmeName README
HeaderName HEADER
IndexIgnore is a set of filenames which directory indexing should ignore
Format: IndexIgnore name1 name2 . . .
IndexIgnore .??*~ *# HEADER* README* RCS
AccessFilName: The name of the file to look for in each directory
for access control information.
AccessFileName .htaccess
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# The following lines prevent .htaccess files from being viewed by
# Web clients. Since .htaccess files often contain authorization
# information, access is disallowed for security reasons. Comment
# these lines out if you want Web visitors to see the contents of
# .htaccess files. If you change the AccessFileName directive above,
# be sure to make the corresponding changes here.
<Files .htaccess>
order allow,deny
deny from all
</Files>
# TypesConfig describes where the mime.types file (or equivalent) is
# to be found.
TypesConfig conf/mime.types
# DefaultType is the default MIME type for documents which the server
# cannot find the type of from filename extensions.
DefaultType text/plain
# AddEncoding allows you to have certain browsers (Mosaic/X 2.1+) uncompress
# information on the fly. Note: Not all browsers support this.
AddEncoding x-compress z
AddEncoding x-gzip gz
# AddLanguage allows you to specify the language of a document. You can
# then use content negotiation to give a browser a file in a language
# it can understand. Note that the suffix does not have to be the same
# as the language keyword - - - those with documents in Polish (whose
# net-standard language code is pl) may wish to use *AddLanguage pl .po#
# to avoid the ambiguity with the common suffix for perl scripts.
AddLanguage en .en
AddLanguage fr .fr
AddLanguage de .de
AddLanguage da .da
AddLanguage el .el
AddLanguage it .it
# LanguagePriority allows you to give precedence to some languages
# in case of a tie during content negotiation.
# Just list the languages in decreasing order of preference.
LanguagePriority en fr de
# Redirect allows you to tell clients about documents which used to exist in
# your server's namespace, but do not anymore. This allows you to tell the
# clients where to look for the relocated document.
# Format: Redirect fakename url
# Aliases: Add here as many aliases as you need (with no limit). The format is
# Alias fakename realname
# Note that if you include a trailing / on fakename then the server will
# require it to be present in the URL. So "/icons" isn't aliased in this
# example.
Alias /icons/ "O_R_A_C_L_E_A_P_B_A_S_E/icons/"
# ScriptAlias: This controls which directories contain server scripts.
# Format: ScriptAlias fakename realname
# ScripAlias /cgi-bin/ "O_R_A_C_L_E_A_P_B_A_S_E/cgi-bin/*
# If you want to use server side includes, or CGI outside
# ScriptAliased directories, uncomment the following lines.
# AddType allows you to tweak mime.types without actually editing it, or to
# make certain files to be certain types.
# Format: AddType type/subtype ext1
# For example, the PHP3 module (not part of the Apache distribution)
# will typically use:
#AddType application/x-httpd-php3 .phtml
#AddType application/x-httpd-php3-source .phps
# AddHandler allows you to map certain file extensions to "handlers",
# actions unrelated to filetype. These can be either built into the server
# or added with the Action command (see below)
# Format: AddHandler action-name ext1
# To use CGI scripts:
#AddHandler cgi-acript .cgi
# To use server-parsed HTML files
#AddType text/html .shml
#AddHandler server-parsed .shtml
# Uncomment the following line to enable Apache's send-asis HTTP file
# feature
#AddHandler send-as-is asis
# If you wish to use server-parsed imagemap files, use
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
AddHandler imap-file map
To enable type maps, you might want to use
AddHandler type-map var
Action lets you define media types that will execute a script whenever
a matching file is called. This eliminates the need for repeated URL
pathnames for oft-used CGI file processors.
Format: Action media/type /cgi-script/location
Format: Action handler-name /cgi-script/location
MetaDir: specifies the name of the directory in which Apache can find
meta information files. These files contain additional HTTP headers
to include when sending the document
MetaDir .web
MetaSuffix: specifies the file name suffix for the file containing the
meta information.
MetaSuffix .meta
Customizable error response (Apache style)
these come in three flavors

1) plain text
ErrorDocument 500 "The server made a boo boo.
n.b. the (*) marks it as text, it does not get output

2) local redirects
ErrorDocument 404 /missing.html
to redirect to local url /missing.html
ErrorDocument 404 /cgi-bin/missing_handler.pl
n.b. can redirect to a script or a document using server-side-includes.

3) external redirects
ErrorDocument 402 http://some .other_server.com/subscription_info.html

mod_mine_magic allows the server to use various hints from the file itself
to determine its type.
MimeMagicFile conf/magic
The following directives disable keepalives and HTTP header flushes.
The first directive disables it for Netscape 2.x and browsers which
spoof it. There are known problems with these.
The second directive is for Microsoft Internet Explorer 4.0b2
which has a broken HTTP/1.1 implementation and does not properly
support keepalive when it is used on 301 or 302 (redirect) responses.
BrowserMatch "Mozilla/2" nokeepalive
BrowserMatch "MSIE 4\.0b2; nokeepalive downgrade-1.0 force-response-1.0
The following directive disables HTTP/1.1 responses to browsers which
are in violation of the HTTP/1.0 spec by not being able to grok a
basic 1.1 response.
BrowserMatch "RealPlayer 4\.0" force-response-1.0
BrowserMatch "Java/1\.0" force-response-1.0
BrowserMatch "JDK/1\.0" force-response-1.0
********* VIGNETTE ADDITIONS **********

Optional -   set the alias to the StoryServer documentation root if this
is the first development content application server
Alias /StoryServer O_R_A_C_L_E_V_G_N_B_A_S_E/StoryServer/R4.2/docroot

********* VIGNETTE ADDITIONS **********
~~~TEMPLATE: \apache\startApache
~~~startApache
!/bin/ksh
O_R_A_C_L_E_A_P_B_A_S_E/sbin/httpd \
    -f O_R_A_C_L_E_A_P_B_A_S_E/conf/httpd.conf
exit
~~~TEMPLATE: \apache\stopApache
~~~stopApache
!/bin/ksh
kill -TERM 'cat O_R_A_C_L_E_A_P_B_A_S_E/logs/httpd.pid'
exit
~~~TEMPLATE: \apache\httpd.conf
~~~httpd.conf
This is the main server configuration file. See URL http://www.apache.org/
for instructions.
Do NOT simply read the instructions in here without understanding
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# what they do, if you are unsure consult the online docs. You have been
# warned.
# Originally by Rob McCool
# Dynamic Shared Object (DSO) Support

# To be able to use the functionality of a module which was built as a DSO you
# have to place corresponding 'LoadModule' lines at this location so the
# directives contained in it are actually available _before_ they are used.
# Please read the file README.DSO in the Apache 1.3 distribution for more
# details about the DSO mechanism and run 'httpd -1' for the list of already
# built-in (statically linked and thus always available) modules in your httpd
# binary.

# Example:
# LoadModule foo_module libexec/mod_foo.so
# ServerType is either inetd, or standalone.
ServerType standalone
# If you are running from inetd, go to "ServerAdmin".
# Port: The port the standalone listens to. For ports < 1023, you will
# need httpd to be run as root initially.
Port A_P_A_C_H_E_B_A_S_E01
# HostNameLookups: Log the names of clients or just their IP numbers
#    e.g. www.apache.org (on) or 204.62.129.132 (off)
# The default is off because it'd be overall better for the net if people
# had to knowingly turn this feature on.
HostNameLookups off
# If you wish httpd to run as a different user or group, you must run
# httpd as root initially and it will switch.
# User/Group: The name (or #number) of the user/group to run httpd as.
#   On SCO (ODT 3) use User nouser and Group nogroup
#   On HPUX you may not be able to use shared memory as nobody, and the
#   suggested workaround is to create a user www and use that user.
#   NOTE that some kernels refuse to setgid(Group) or semctl(IPC_SET)
#   when the value of (unsigned)Group is above 60000;
#   don't use Group #-1 on these systems !
User nohody
Group nobody
# ServerAdmin: Your address, where problems with the server should be
# e-mailed.
ServerAdmin root1@H_O_S_T_N_A_M_E.D_O_M_A_I_N
# ServerRoot: The directory the server's config, error, and log files
# are kept in.
# NOTE!  If you intend to place this on a NFS (or otherwise network)
# mounted filesystem then please read the LockFile documentation,
# you will save yourself a lot of trouble.
ServerRoot "O_R_A_C_L_E_A_P_B_A_S_E"
# BindAddress: you can support virtual hosts with this option. This option
# is used to tell the server which IP address to listen to. It can either
# contain "*", an IP address, or a fully qualified Internet domain name.
# See also the VirtualHost directive.
#BindAddress *
# ErrorLog: The location of the error log file. If this does not start
# with /, ServerRoot is prepended to it.
ErrorLog logs/error_log
# LogLevel: control the number of messages logged to the error_log.
# Possible values include: debug, info, notice, warn, error, crit,
# alert, emerg.
LogLevel warn
# The following directives define some format nicknames for use with
# a CustomLog directive (see below).
LogFormat "%h %1 %u %t \"%r\"%>s %b \"%{Referer}i\" \"%{User-Agent}i\" " combined
LogFormat "%h %1 %u %t \"%r\"%>s %b" common
LogFormat "%{Referer}i -> %U" referer
LogFormat "%{User-agent}i" agent
# The location of the access logfile (Common Logfile Format).
# If this does not start with /, ServerRoot is prepended to it.
CustomLog logs/access_log common
# If you would like to have an agent and referer logfile uncomment the
# following directives.
CustomLog logs/referer_log referer
CustomLog logs/agent_log agent
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# If you prefer a single logfile with access, agent and referer information
# (Combined Logfile Format) you can use the following directive.
CustomLog logs/access_log combined
# PidFile; The file the server should log its pid to
PidFile logs/httpd.pid
# ScoreBoardFile: File used to store internal server process information.
# Not all architectures require this. But if yours does (you'll know because
# this file is created when you run Apache) then you *must* ensure that
# no two invocations of Apache share the same scoreboard file.
ScoreBoardFile logs/apache_runtime_status
# The LockFile directive sets the path to the lockfile used when Apache
# is compiled with either USE_FCNTL_SERIALIZED_ACCEPT or
# USE_FLOCK_SERIALIZED_ACCEPT. This directive should normally be left at
# its default value. The main reason for changing it is if the logs
# directory is NFS mounted, since the lockfile MUST BE STORED ON A LOCAL
# DISK. The PID of the main server process is automatically appended to
# the filename.

#LockFile logs/accept.lock
# ExtendedStatus controls whether Apache will generate "full" status
# information (ExtendedStatus On) or just basic information (ExtendedStatus
# Off) when the server-status Handler is called. The default is Off.

ExtendedStatus On
# ServerName allows you to set a host name which is sent back to clients for
# your server if it's different than the one the program would get (i.e. use
# "www" instead of the host's real name).

# Note: You cannot just invent host names and hope they work. The name you
# define here must be a valid DNS name for your host. If you don't understand
# this, ask your network administrator.
# If your host doesn't have a registered DNS name, enter its IP address here.
# You will have to access it by its address (e.g., http://123.45.67.89)
# anyway, and this will make redirections work in a sensible way.
#ServerName new.host.name
# Optionally add a line containing the server version and virtual host
# name to server-generated pages (error documents, ftp directory listings,
# mod_status and mod_info output etc., but not SSI generated documents).
# Set to "EMail" to also include a mailto: link to the ServerAdmin.
# Set to one of: On | Off | EMail
ServerSignature on
# UseCanonicalName: (new for 1.3) With this setting turned on, whenever
# Apache needs to construct a self-referencing URL (a url that refers back
# to the server the response is coming from) it will use ServerName and
# Port to form a "canonical" name. With this setting off, Apache will
# use the hostname:port that the client supplied, when possible. This
# also affects SERVER_NAME and SERVER_PORT in CGIs.
UseCanonicalName on
# CacheNegotiatedDocs: By default, Apache sends Pragma: no-cache with each
# document that was negotiated on the basis of content. This asks proxy
# servers not to cache the document. Uncommenting the following line disables
# this behavior, and proxies will be allowed to cache the documents.
#CacheNegotiatedDocs
# Timeout: The number of seconds before receives and sends time out
Timeout 300
# KeepAlive: Whether or not to allow persistent connections (more than
# one request per connection). Set to "Off" to deactivate.
KeepAlive On
# MaxKeepAliveRequests: The maximum number of requests to allow
# during a persistent connection. Set to 0 to allow an unlimited amount.
# We reccommend you leave this number high, for maximum performance.
MaxKeepAliveRequests 100
# KeepAliveTimeout: Number of seconds to wait for the next request
KeepAliveTimeout 15
# Server-pool size regulation. Rather than making you guess how many
# server processes you need, Apache dynamically adapts to the load it
# sees - - - that is, it tries to maintain enough server processes to
# handle the current load, plus a few spare servers to handle transient
# load spikes (e.g., multiple simultaneous requests from a single
# Netscape browser).
# It does this by periodically checking how many servers are waiting
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
for a request. If there are fewer than MinSpareServers, it creates
a new spare. If there are more than MaxSpareServers, some of the
spares die off. These values are probably OK for most sites - - -
MinSpareServers 5
MaxSpareServers 10
Number of servers to start - - - should be a reasonable ballpark figure.
StartServers 5
Limit on total number of servers running, i.e., limit on the number
of clients who can simultaneously connect - - - if this limit is ever
reached, clients will be LOCKED OUT, so it should NOT BE SET TOO LOW.
It is intended mainly as a brake to keep a runaway server from taking
Unix with it as it spirals down . . .
MaxClients 150
MaxRequestsPerChild: the number of requests each child process is
allowed to process before the child dies.
The child will exit so as to avoid problems after prolonged use when
Apache (and maybe the libraries it uses) leak. On most systems, this
isn't really needed, but a few (such as Solaris) do have notable leaks
in the libraries.
MaxRequestsPerChild 30
Proxy Server directives. Uncomment the following line to
enable the proxy server:
ProxyRequests On
Enable/disable the handling of HTTP/1.1 "Via:" headers.
("Full" adds the server version; "Block" removes all outgoing Via: headers)
Set to one of: Off | On | Full | Block
ProxyVia on
To enable the cache as well, edit and uncomment the following lines:
(no cacheing without CacheRoot)
CacheRoot @@ServerRoot@@/proxy
CacheSize 5
CacheGcInterval 4
CacheMaxExpire 24
CacheLastModifiedFactor 0.1
CacheDefaultExpire 1
NoCache a_domain.com another_domain.edu joes.garage_sale.com
Listen: Allows you to bind Apache to specific IP addresses and/or
ports, in addition to the default. See also the VirtualHost command
Listen 3000
b#Listen 12.34.56.78:80
VirtualHost: Allows the daemon to respond to requests for more than one
server address, if your server machine is configured to accept IP packets
for multiple addresses. This can be accomplished with the ifconfig
alias flag, or through kernel patches like VIF.
Any httpd.conf or srm.conf directive may go into a VirtualHost command.
See also the BindAddress entry.
<VirtualHost host.some_domain.com>
ServerAdmin webmaster@host.some_domain.con
DocumentRoot /www/docs/host.some_domain.com
ServerName host.some_domain.com
ErrorLog logs/host.some_domain.com-error_log
TransferLog logs/host.some_domain.com-access_log
</VirtualHost>
********* VIGNETTE ADDITIONS **********

AddHandler server-parsed .html
THESE ARE NON-OPTIONAL SETTINGS. You must provide values for these settings.
The location of the StoryServer.cfg file for this content application server.
Vgn_SSConfigFile
O_R_A_C_L_E_V_G_N_B_A_S_E/StoryServer/R4.2/conf/H_O_S_T_N_A_M_E-A_P_A_C_H_E_B_A_S_E01-1/S
toryServer.cfg

The location of the shared library directory of your StoryServer installation

Vgn_ShLibDir O_R_A_C_L_E_V_G_N_B_A_S_E/StoryServer/R4.2/lib/solaris

********* VIGNETTE ADDITIONS **********
~~~TEMPLATE: \apache\srm.comf
~~~srm.comf
With this document, you define the name space that users see of your http
server. This file also defines server settings which affect how requests are
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# serviced, and how results should be formatted.
See the tutorials at http://www.apache.org/ for
more information.
Originally by Rob McCool; Adapted for Apache
DocumentRoot: The directory out of which you will serve your
documents. By default, all requests are taken from this directory, but
symbolic links and aliases may be used to point to other locations.
DocumentRoot "O_R_A_C_L_E_A_P_B_A_S_E/htdocs"
DocumentRoot "O_R_A_C_L_E_V_G_N_B_A_S_E/cas-docs"
UserDir: The name of the directory which is appended onto a user's home
directory if a ~user request is recieved.
UserDir public_html
DirectoryIndex: Name of the file or files to use as a pre-written HTML
directory index. Separate multiple entries with spaces.
DirectoryIndex index.html
# FancyIndexing is whether you want fancy directory indexing or standard
FancyIndexing on
AddIcon tells the server which icon to show for different files or filename
extensions
AddIconByEncoding (CMP,/icons/compressed.gif) x-compress x-gzip
AddIconByType (TXT,/icons/text.gif) text/*
AddIconByType (IMG,/icons/image2.gif) image/*
AddIconByType (SND,/icons/sound2.gif) audio/*
AddIconByType (VID,/icons/movie.gif) video/*
AddIcon /icons/binary.gif .bin .exe
AddIcon /icons/binhex.gif .hqx
AddIcon /icons/tar.gif .tar
AddIcon /icons/world2.gif .wrl .wrl.gz .vrml .vrm .iv
AddIcon /icons/compressed.gif .Z .z .tgz .gz .zip
AddIcon /icons/a.gif .ps .ai .eps
AddIcon /icons/layout.gif .html .shtml .htm .pdf
AddIcon /icons/text.gif .txt
AddIcon /icons/c.gif .c
AddIcon /icons/p.gif .pl .py
AddIcon /icons/f.gif .for
AddIcon /icons/d vi.gif .dvi
AddIcon /icons/uuencoded.gif .uu
AddIcon /icons/script.gif .conf .sh .shar .csh .ksh .tcl
AddIcon /icons/tex.gif .tex
AddIcon /icons/bomb.gif core
AddIcon /icons/back.gif
AddIcon /icons/hand.right.gif README
AddIcon /icone/folder.gif ^^DIRECTORY^^
AddIcon /icons/blank.gif ^^BLANKICON^^
DefaultIcon is which icon to show for files which do not have an icon
explicitly set.
DefaultIcon /icons/unknown.gif
AddDescription allows you to place a short description after a file in
server-generated indexes.
Format: AddDescription "description" filename
ReadmeName is the name of the README file the server will look for by
default. Format: ReadmeName name

The server will first look for name.html, include it if found, and it will
then look for name and include it as plaintext if found.

HeaderName is the name of a file which should be prepended to
directory indexes.
ReadmeName README
HeaderName HEADER
IndexIgnore is a set of filenames which directory indexing should ignore
# Format: IndexIgnore name1 name2 ...
IndexIgnore .??* *~ *# HEADER* README* RCS
# AccessFileName: The name of the file to look for in each directory
# for access control information.
AccessFileName .htaccess
# The following lines prevent .htaccess files from being viewed by
# Web clients. Since .htaccess files often contain authorization
# information, access is disallowed for security reasons. Comment
# these lines out if you want Web visitors to see the contents of
# .htaccess files. If you change the AccessFileName directive above,
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# be sure to make the corresponding changes here.
<Files .htaccess>
order allow,deny
deny from all
</Files>
# TypesConfig describes where the mime.types file (or equivalent) is
# to be found.
TypesConfig conf/mime.types
# DefaultType is the default MIME type for documents which the server
# cannot find the type of from filename extensions.
DefaultType text/plain
# AddEncoding allows you to have certain browsers (Mosaic/X 2.1+) uncompress
# information on the fly. Note: Not all browsers support this.
AddEncoding x-compress Z
AddEncoding x-gzip gz
# AddLanguage allows you to specify the language of a document. You can
# then use content negotiation to give a browser a file in a language
# it can understand. Note that the suffix does not have to be the same
# as the language keyword - - - those with documents in Polish (whose
# net-standard language code is pl) may wish to use "AddLanguage pl .po"
# to avoid the ambiguity with the common suffix for perl scripts.
AddLanguage en .en
AddLanguage fr .fr
AddLanguage de .de
AddLanguage da .da
AddLanguage el .el
AddLanguage it .it
# LanguagePriority allows you to give precedence to some languages
# in case of a tie during content negotiation.
# Just list the languages in decreasing order of preference.
LanguagePriority en fr de
# Redirect allows you to tell clients about documents which used to exist in
# your server's namespace, but do not anymore. This allows you to tell the
# clients where to look for the relocated document.
# Format: Redirect fakename url
# Aliases: Add here as many aliases as you need (with no limit). The format is
# Alias fakename realname
# Note that if you include a trailing / on fakename then the server will
# require it to be present in the URL. So "/icons" isn't aliased in this
# example.
Alias /icons/ "O_R_A_C_L_E_A_P_B_A_S_E/icons/"
# ScriptAlias: This controls which directories contain server scripts.
# Format: ScriptAlias fakename realname
#ScriptAlias /cgi-bin/ "O_R_A_C_L_E_A_P_B_A_S_E/cgi-bin/"
# If you want to use server side includes, or CGI outside
# ScriptAliased directories, uncomment the following lines.
# AddType allows you to tweak mime.types without actually editing it, or to
# make certain files to be certain types.
# Format: AddType type/subtype ext1
# For example, the PHP3 module (not part of the Apache distribution)
# will typically use:
#AddType application/x-httpd-php3 .phtml
#AddType application/x-httpd-php3-source .phps
# AddHandler allows you to map certain file extensions to "handlers",
# actions unrelated to filetype. These can be either built into the server
# or added with the Action command (see below)
# Format: AddHandler action-name ext1
# To use CGI scripts:
#AddHandler cgi-script .cgi
# To use server-parsed HTML files
#AddType text/html *shtml
#AddHandler server-parsed *shtml
# Uncomment the following line to enable Apache's send-asis HTTP file
# feature
#AddHandler send-as-is asis
# If you wish to use server-parsed imagemap files, use
#AddHandler imap-file map
To enable type maps, you might want to use
AddHandler type-map var
Action lets you define media types that will execute a script whenever
a matching file is called. This eliminates the need for repeated URL
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
pathnames for oft-used CGI file processors.
Format: Action media/type /cgi-script/location
Format: Action handler-name /cgi-script/location
MetaDir: specifies the name of the directory in which Apache can find
meta information files. These files contain additional HTTP headers
to include when sending the document
MetaDir .web
MetaSuffix: specifies the file name suffix for the file containing the
meta information.
MetaSuffix .meta
Customizable error response (Apache style)
these come in three flavors

1) plain text
ErrorDocument 500 "The server made a boo boo.
n.b. the (") marks it as text, it does not get output

2) local redirects
ErrorDocument 404 /missing.html
to redirect to local url /missing.html
ErrorDocument 404 /cgi-bin/missing_handler .pl
n.b. can redirect to a script or a document using server-side-includes.

3) external redirects
ErrorDocument 402 http: //some.other_server.com/subscription_info.html

mod_mime_magic allows the server to use various hints from the file itself
to determine its type.
MimeMagicFile conf/magic
The following directives disable keepalives and HTTP header flushes.
The first directive disables it for Netscape 2.x and browsers which
spoof it. There are known problems with these.
The second directive is for Microsoft Internet Explorer4.0b2
which has a broken HTTP/1.1 implementation and does not properly
support keepalive when it is used on 301 or 302 (redirect) responses.
BrowserMatch "Mozilla/2" nokeepalive
BrowserMatch "MSIE 4\.0b2;" nokeepalive downgrade-1.0 force-response-1.0
The following directive disables HTTP/1.1 responses to browsers which
are in violation of the HTTP\1.0 spec by not being able to grok a
basic 1.1 response.
BrowserMatch "RealPlayer 4\.0" force-response-1.0
BrowserMatch "Java/1\.0" force-response-1.0
BrowserMatch "JDK/1\.0" force-response-1.0
********* VIGNETTE ADDITIONS **********

Optional -  set the alias to the StoryServer documentation root if this
is the first development content application server
Alias /Storyserver O_R_A_C_L_E_V_G_N_B_A_S_E/StoryServer/R4.2/docroot

********* VIGNETTE ADDITIONS **********
~~~TEMPLATE: \apache\startApache
~~~startApache
!/bin/ksh
O_R_A_C_L_E_A_P_B_A_S_E/sbin/httpd \
    -f O_R_A_C_L_E_A_P_B_A_S_E/conf/httpd.conf
exit
~~~TEMPLATE: \apache\stopApache
~~~stopApache
!/bin/ksh
kill -TERM 'cat O_R_A_C_L_E_A_P_B_A_S_E/logs/httpd.pid'
exit
~DIRECTORY: templates\ics\
~~~TEMPLATE: \ics\cnls.en.msg
a=a
account=Account
acctaddress=Address
acctcategory=Account Category
acctcoupon=Coupons
acctloginname=Login Name
acctoneclicksetting=1-Click Settings
acctpassword=Password
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
acctpasswordverify=Verify password
acctpendingorder=Pending Orders
acctpreferences=Preferences
accttelephone=Telephone/Email
address1=Address line 1
address2=Address line 2
address3=Address line 3
addressmodified=Successfully Added
amount =Amount
amtforvlumdisc=Amt Toward Volume Discount
amountforvolumediscount=Amount Eligible For Volume Discount
assistant=Assistant
begindate=Valid Prom
bestprice=You Pay
billaddr=Billing Address
billto=Bill To
callback=Call-Me-Back
cartpromodiscount=Order Discount
changecurrency=Change Currency
checkout =Checkout
city=City
clear=Clear
clickhere=click here
county=County
country=Country
couponalreadyclipped=Coupon is already clipped.
couponexpired=Expired
coupons=Promotion Center
coupondisc=Promotion Discount
couponsect=Promotions in Section
couponstore=Promotions in Store
couponstoapplytoorder=Available Coupons
coupontoapply=Coupon Qty
cpnsandspecialoffers=Coupons and Special Offers
custname=Customer Name
date=Date
dayphone=Telephone (Day)
description=Description
dualprccat=Show prices in 2 currencies
echost==H_O_S_T_N_A_M_E.D_O_M_A_I_N:O_A_S_B_A_S_E21
email=E-mail
emailaddress=Address
emaildescription=Comments
emailservice=Email Service
emptyaddrfields=Please make sure address line 1, city and country values are specified.
emptynamefields=Please specify both first and last names.
emptypasswdfields=Please specify old and new passwords.
enddate=Valid To
eveningphone=Telephone (Eve)
faxphone=Fax Number
firstcurrencychoice=1st Currency Choice
firsmame=First Name
guest=Guest
HostName=http%3A%2F%2FH_O_S_T_N_A_M_E%2Eus%2Eoracle%2Ecom%3A6521%2F
iagree=I Agree
idonotagree=I Do Not Agree
ifyouarenot=If you are not
incorrectaddrinfo=Please make sure all mandatory fields are filled in, the address is
valid and that the Shipping as Billing option is selected if no Shipping address is
specified.
invalidloginname=Login name is invalid :
invalidloginnamesample=invalid characters.
invalidordernumber=Invalid order number.
invalidordernumberpassword=Invalid order number/password.
invalidpromotion=Invalid Promotion
invalidqtyfield=Quantity fields must be numeric and greater than 0.
invcouponquantity=Invalid coupon quantity applied.
invloginfields=Please fill in all fields and make sure that the password fields match.
invpasswd=Invalid Password
invalidselection=Nothing selected
lastname=Last Name
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
licenseLevel=License Level
linenumber=Item#
login=Login
logininformation=Login Information
logout=Logout
mandatoryfield=Mandatory field
maxorderamtexceeded=Purchase exceeds maximum allowable amount for store.
maxorderitmqtyexceeded=Exceeded maximun number of items that can be ordered per line
item.
modify=Modify
name=Name
newpasswd=New Password
newpasswdmismatch=New passwords are not the same
next=Next
nocouponsavailable=No coupons available to apply.
notaxsoftwarefound=Unable to verify address with the tax software.
numinstock=Number in Stock
oldpasswd=Old Password
oneclicksettingsupdated=1-Click Settings Successfully Updated
oneclicksettingsenable=Enable 1-Click Purchases
oneclicksettingsmandatoryitems=Items with * are mandatory.
oneclickpmtccnum=Credit Card Number
oneclickpmtccexpmm=Expiration Date: MM
oneclickpmtccexpyy=YY
ordemailflag=Send me email about your products
ordemailpmpt=Email Address
ordernumber=Order #
ordershippingfee=Order Shipping Fee
orderstatus=Order Status
ordersubtotal=Sub Total
origunitprice=List Price
orderauthmessage=Please select a password, this will be used when checking the status of
an order.
orderauthpaseword=Check Order Status Password
orderselectauthpassword=Please enter the password.
ots_country_code=Country Code
ots_comments=Notes
ots_customer_id=Customer Identifier
ots_failure_message=Callback request has failed. Please contact telephony server
administrator.
ots_invalidPhone_message=Invalid Phone Number or Country Code. Please check your Phone
number and country code and try again.
ots_notesToLong_message=Notes field must be less than 512 characters.
ots_noteswarning=Notes must be less than 512 characters.
ots_success_message=Callback request bas been successfully processed.
ots_telephone_number=Area Code & Phone No.
ots_telephone_extension=Extension
outofstock=Not enough items in stock
partnumber=Part #
passwdchanged=Password changed successfully
passwordinformation=Password Information
paymethod=Payment Method
perscommerceoff=Disable Personalized View
perscommerceon=Enable Personalized View
personalinfo=Personal Information
phone=Telephone
platform=Platform
postalcode=Zip/Postal Code
preferencesmodified=Successfully added
price=Price
pricecategories=Price Category
pricecategorychangeerror=Cannot change price category.
pricerange=Price Range
productage=Product Age
promo=Promotion
promocode=Promo Code
promoctr=Promotion Center
promoctrwelcome=Here are all the promotions we would like to offer you throughout the
store.
promotionadd=Promotion Successfully Added
proxyhost=P_R_O_X_Y_S_E_R_V_E_R
```

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
proxyport=P_R_O_X_Y_P_O_R_T
quantity=Quantity
Register_Attribute1=Password hint question
Register_Attribute2=Password hint answer
registration=Registration -,
regularprice=Regular
regularunitprice=Reg. Unit Price
removeitem=Remove
saleprice=Sale
sales=Sales
salesect=Sale in Section
salestore=Sale in Store
savedtotal=Total Saving Amt
score=Score
searchdatatofetch=Search data to fetch
searchon=Search On
secondcurrencychoice=2nd Currency Choice
sectionsearch=Section Search
select=Select
shcrtitemadded=item(s) successfully added to shopping cart
shipaddr=Shipping Address
shipdate=Ship Date
shipmethod=Shipment Method
shippingasbillingaddr=Shipping as Billing Address
shippingfee=Shipping & Handling
shippinginformation=Shipping Information
shippingoption=Shipping Option
shippingstatus=Shipping Status
shipto=Ship To
shoppingcartexpired=Shopping cart has expired.
singleprccat=Show prices in 1 currency
sku=SKU
state=State/Province
storedirectory=Directory
storesearch=Store Search
subtotal=Sub Total
supportlevel=Support Level
supportLevel=Support Level
tamtforvlumdisc=Total Amt Toward Volume Discount
tax=Tax
taxcangst=Tax GST
taxcanpst=Tax PST
telephonedescription=Comments
telephoneinformation=Telephone/Email Information
telephonemodified=Successfully added
telephonenumber=Number
telephonetype=Type
total=Total
totalafterdiscount=Total After Volume Discount
totalforvlumdisc=Total Amt Toward Volume Discount
tpihost=http://H_O_S_T_N_A_M_E.D_O_M_A_I_N:A_P_A_C_H_E_B_A_S_E40
tpihostmp=H_O_S_T_N_A_M_E.D_O_M_A_I_N:A_P_A_C_H_E_B_A_S_E40
trackingnotavailable=Not available
trackingnumber=Tracking Number
tvolumediscount=Total Volume Discount
uniqueloginname=Login names must be unique. please select another login name.
unitprice=Unit Price
usecancelorder=Use Cancel Order to remove the last order item.
viewcart=View Cart
vlumdisctotal=Total Volume Discount
wallet=Coupon Wallet
welcone=Welcome
yourunitprice=Your Unit Price
prccatdualprefix=dual_
~~~TEMPLATE: \ics\cstage.cfg
; -------------------------------------
; Start of configuration file cstage.cfg
; ========================================================
; Oracle internet Commerce (iStore)
;
; Customer Interface Configuration File (Staging System)
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; ==========================================================
; Number of Walkin Prdt's to display
max_walkin_products_displayed=2
; Number of BestSellers to display
max_bestsellers_per_category=5
; Database connectivity
; --------------------
username=TDOSfits
password=TDOSfits
connectstring=O_R_A_C_L_E_S_I_D
; NLS
nls_language=en
; Application directories
; ----------------------
oec_home=O_R_A_C_L_E_O_A_S_P_R_O_D_B_A_S_E/oec
oracle_home=O_R_A_C_L_E_O_A_S_P_R_O_D_B_A_S_E
store_doc_dir= .
store_instance_dir=O_R_A_C_L_E_O_A_S_P_R_O_D_B_A_S_E/stage/store
output_dir= /tmp
; ----------------------------------
; Begin web session related parameters
; ----------------------------------
; use_cookie= [true/false] (true if undefined)
; if "true", session info will be passed in a browser cookie
; if "false" it will be in URL or in a hidden field in forms
use_cookie= false
; cookie_encryption_key= [key] (no encryption if undefined)
; key using which the session info will be encrypted
cookie_encryption_key= a
; url_timeout_period= [time in minutes] (no timeout if undefined)
; period of inactivity after which a page times out and forces the
; shopper to restart. applicable only when use_cookie=false
; nb: if using frames, the menu frame is inactive most of the time
;url_timeout_period= 30
; timeout_url= [url] (by default, goes to ecexpiredpage.<nls>.htm)
; url where the shopper is taken if a page times out.
; this is obsolete. ecexpiredpage.<nls>.htm is always used
; cookie_expiration= [time in days] (if undefined, never expires)
; period after which browser cookie expires
; applicable only when use_cookie is true
cookie_expiration= 60
; domainname= [domain name]
; domain associated with browser cookie. required if using cookies
; Please ensure that there are atleast two dots in the domain name
; for eg us.oracle.com or .abc.com but not just abc.com
domainname= .us.com
; ----------------------------------
; End web session related parameters
; ----------------------------------
; ----------------------------------
; Customer interface specific parameters
; ----------------------------------
customer_root= cec
html_cache_on= true
log_requests= false
country_config_file= O_R_A_C_L_E_O_A_S_P_R_O_D_B_A_S_E/oec/config/country.cfg
check_rice_list= false
display_ics_invoice= true
;if you don't take PO number online, set always_using_faxed_po to true
;always_using_faxed_po= true
;Set the following parameter to true if you need to recalcututate
;the promotions after a valid promo code is entered
recalculate_promotions= false
;Set the following parameter to true if you need to reset the promotion
;code entered by the user; the reset will happen at the time of authorizing
;the payment.
reset_promocodes= false
; Third Party options
; -----------------
oecinvitm_config_file=O_R_A_C_L_E_O_A_S_P_R_O_D_B_A_S_E/oec/config/oecinvitm.cfg
taxware_config_file= O_R_A_C_L_E_O_A_S_P_R_O_D_B_A_S_E/oec/config/taxware_staging.cfg
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
orainvitm_config_file= O_R_A_C_L_E_O_A_S_P_R_O_D_B_A_S_E/oec/config/orainvitm.cfg
; Log server parameters
; --------------------
log_level= 11
enable_logging= false
debug_console= false
; Cache parameters
; ----------------
cache_on= true
store_cache_size= 1
sect_cache_size= 50
prd_cache_size= 100
prditm_cache_size= 200
cpn_cache_size= 100
;Affilate Tracking - tracking do methods
; ----------------
eceshctlink= true
eceprodlinksku= true
ecorderinvoice= true
ecehome= true
ecesearchlink= true
ecesectlink= true
eceprodlinkp= true
;Volume discount configuration
;if volume discount should be taxed, set vlumdisc_for_tax to true
;vlumdisc_for_tax = true
;if volume discount is required along with coupon, set vlumdisc_with_cpn to tru
e
;vlumdisc_with_cpn= true
; iPayment 3.1.0 Integration Parameters
; -------------------------------------
; ==========================================================
; | If you want to use HTTPS ( or SSL ) to communicate with
; | the iStore customer tor iPaymentPay page which lets the
; | customer input the Credit Card Number, you should set
; | using_ssl as true. But you should set up a SSL port
; | manually through OAS Node Manager by yourself
; ==========================================================
; using_ssl= false
; ==========================================================
; | If you set using_ssl as true and you already set up
; | SSL port manually through OAS Node Manager, you will
; | set ssl_host_name as that fully qualified OAS machine
; | name, Ex: a.b.com
; ==========================================================
; ssl_host_name= [full qualified machine name]
; ==========================================================
; | If you set using_ssl as true and you already set up a
; | SSL port manually through OAS Node Manager, you will
; | set ssl_port as the port number you set up for cstage
; | listener using SSL under OAS Node Manager
; ==========================================================
; ssl_port= [ssl port number you already set up in OAS]
; ==========================================================
; | If you set using_ssl as true and you already set up a
; | SSL port manually through OAS Node Manager, you should
; | also set this host_name as that fully qualified OAS
; | machine name which non-ssl port is running, Ex: a.b.com
; ==========================================================
; host_name= [full qualified machine name]
; ==========================================================
; | If you set using_ssl as true and you already set up a
; | SSL port manually through OAS Node Manager, you should
; | also set this host_port as the port number you set up
; | for cstage listener not using SSL under OAS Node Manager
; ==========================================================
; host_port= [non-ssl port number you set up in OAS]
; ==========================================================
; | If you want to use HTTPS ( or SSL ) to communicate
; | between the iStore Server and iPayment Server, you
; | should set this ipayment_using_ssl as true ( the default
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; | is false ).For making this work, you should follow the
; | OAS Administration Manual and iPayment Manual to config
; | both OAS running iStore and OAS running iPayment
; | correctly. And you should set up the followed two
; | parameters.
; ================================================================
ipayment_using_ssl =false
; ================================================================
; | If you set the ipayment_using_ssl as true, you need set
; | this ipayment_oas_wallet_loc as the directory you put
; | the oracle wallet for SSL certification, you should follow
; | the OAS Administration Manual and iPayment Manual to config
; | both OAS running iStore and OAS running iPayment correctly.
; ================================================================
; ipayment_oas_wallet_loc = [directory you put oracle wallet]
; ================================================================
; | If you set the ipayment_using_ssl as true, you need set
; | this ipayment_oas_wallet_pass as the password you use to
; | access your oracle wallet, you should follow the OAS
; | Administration Manual and iPayment Manual to config both
; | OAS running iStore and OAS running iPayment correctly.
; ================================================================
; ipayment_oas_wallet_pass = [ password used to access your oracle wallet]
; List of Sensitive methods
; List contains comma-separated list of methods which need a secure mode
; access (Authentication, in the form of credentials)
;--------------------------------------------------------------------------
;sensitive_methods =
ecacctroot, ecacctaddress, ecacctpasswd, ecacctpreferences, ecaccttelephome, ecacheckout, eccheckout, econeclicksetting, ecauthpmt
; Net Perceptions Integration Parameters
;-----------------------------------------------
; When set to false, iStore will not send any ratings to Net Perceptions.
; To completely disable the integration with Net perceptions, be sure to remove
; any Net Perceptions-enabled templates from the store.
netp_enabled = true
; The hostname of the machine where the Net Perceptions recommendation engine
; is located.
netp_hostname = dallsoluctrsv01
; This is name that the Orbix ORB uses to communicate with the Net Perceptions
; recommendation engine. It is specified during the installation of Net
; Perceptions.
netp_servername = prod
; When set to true, iStore will send ratings to Net perceptions whenever a
; Product Item detail page is viewed. <netp_enabled> must be set to true for
; this parameter to be active.
netp_enabled.sync_browse = true
; When set to true, iStore will send ratings to Net perceptions whenever a
; Product Item is purchased. <netp_enabled> must be set to true for
; this parameter to be active.
netp_enabled.sync_purchase = true
; ISPEED PARAMS
------------------------
; BROWSER CHAR SET
; ---
browser_char_set= WE8ISO8859P1
browser_char_set_isocode= ISO-8959-1
jdbcstring= jdbc:oracle:oci8
maxconnections= 10
timeout= 60
; End of configuration file cstage.cfg
; -----------------------------------
~~~TEMPLATE: \ics\gatekeeper.ior
!/bin/sh
echo "Content-type:text/html"
echo
cat O_R_A_C_L_E_O_A_S_P_R_O_D_B_A_S_E/ows/4.0/admin/iors/gatekeeper.ior
~~~TEMPLATE: \ics\mstage.cfg
; -----------------------------------
; Start of configuration file mstage.cfg
; ================================================================
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; Oracle Internet Commerce
;
; Merchant - Store Manager - Configuration File {Staging System}
; ==============================================================
; Database connectivity
; --------------------
username= SDOSfits
password= SDDSfits
connectstring= O_R_A_C_L_E_S_I_D
; NLS
; ---
nls_language= en
; Store Manager specific parameters
; ---------------------------------
merchant_root= oec
html_cache_on= true
country_config_file= O_R_A_C_L_E_O_A_S_P_R_O_D_B_A_S_E/oec/config/country.cfg
; Third Party options
; -------------------
oecinvitm_config_file= O_R_A_C_L_E_O_A_S_P_R_O_D_B_A_S_E/oec/config/oecinvitm.cfg
taxware_config_file= O_R_A_C_L_E_O_A_S_P_R_O_D_B_A_S_E/oec/config/taxware_staging.cfg
orainvitm_config_file= O_R_A_C_L_E_O_A_S_P_R_O_D_B_A_S_E/oec/config/orainvim.cfg
; Application directories
; -----------------------
oec_home=O_R_A_C_L_E_O_A_S_P_R_O_D_B_A_S_E/oec
oracle_home=O_R_A_C_L_E_O_A_S_P_R_O_D_B_A_S_E
store_doc_dir= .
store_instance_dir= O_R_A_C_L_E_O_A_S_P_R_O_D_B_A_S_E/oec/storemgr
output_dir=/tmp
; Log Server parameters
; ---------------------
log_level= 1
log_port= 9000
log_server_hostname=
enable_logging= false
debug_console= false
; Net Perceptions Integration Parameters
; --------------------------------------
; When set to false, iStore will not send any ratings to Net Perceptions.
; To completely disable the integration with Net Perceptions, be sure to remove
; any Net Perceptions-enabled templates from the store.
netp_enabled = true
; The hostname of the machine where the Net Perceptions recommendation engine
; is located.
netp_hostname =dallsoluctrsv01
; This is name that the Orbix ORB uses to communicate with the Net Perceptions
; recommendation engine. It is specified during the installation of Net
; Perceptions.
netp_servername = prod
; End of configuration file mstage.cfg
; ------------------------------------
~~~TEMPLATE: \ics\oecinvitm.cfg
; ---------------------------------------
; Start of configuration file oecinvitm_cfg
; =========================================================
; Oracle Internet Commerce
;
; Oracle Inventory Item Configuration File
; =========================================================
; Oracle Inventory Item environment variables
;
; Database connection
;
; NOTE: A separate config file should be created if you need different
;       testing and deployment database accounts.
;
oectpinv_username= OECTPDfits
oectpinv_password= OECTPDfits
oectpinv_connectstring= O_R_A_C_L_E_S_I_D
; End of configuration file oecinvitm.cfg
; ---------------------------------------
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
~~~TEMPLATE: \ics\owsenv_bsh.sh

This is a Bourne Shell script for setting up your enviromment variables.

if [ -z "$LD_LIBRARY_PATH" ]
then
        LD_LIBRARY_PATH=O_R_A_C_L_E_O_A_S_P_R_O_D_B_A_S_E/orb/4.0/lib:O_R_A_C_L_E_O_A_S_P_
R_O_D_B_A_S_E/ows/4.0/lib:O_R_A_C_L_E_O_A_S_P_R_O_D_B_A_S_E/ows/4.0/jdk/lib/sparc/native_
threads:O_R_A_C_L_E_O_A_S_P_R_O_D_B_A_S_E/ots/1.0/lib:O_R_A_C_L_E_O_A_S_P_R_O_D_B_A_S_E/1
ib ; export LD_LIBRARY_PATH
else
        LD_LIBRARY_PATH=O_R_A_C_L_E_O_A_S_P_R_O_D_B_A_S_E/orb/4.0/lib:O_R_A_C_L_E_O_A_S_P_
R_O_D_B_A_S_E/ows/4.0/lib:O_R_A_C_L_E_O_A_S_P_R_O_D_B_A_S_E/ows/4.0/jdk/lib/sparc/native_
threads:O_R_A_C_L_B_O_A_S_P_R_O_D_B_A_S_E/ots/1.0/lib:O_R_A_C_L_E_O_A_S_P_R_O_D_B_A_S_E/1
ib:${LD_LIBRARY_PATH} ; export LD_LIBRARY_PATH
fi
if [ -z "$PATH" }
then
        PATH=O_R_A_C_L_E_O_A_S_P_R_O_D_B_A_S_E/ows/4.0/bin:O_R_A_C_L_E_O_A_S_P_R_O_D_B_A_S
E/orb/4.0/admin/cgi:O_R_A_C_L_E_O_A_S_P_R_O_D_B_A_S_E/orb/4.0/bin:O_R_A_C_L_E_O_A_S_P_R_
O_D_B_A_S_E/ots/1.0/bin:O_R_A_C_L_E_O_A_S_P_R_O_D_B_A_S_E/ows/4.0/jdk/bin:O_R_A_C_L_E_O_A
_S_P_R_O_D_B_A_S_E/bin; export PATH
else
        PATH=O_R_A_C_L_E_O_A_S_P_R_O_D_B_A_S_E/ows/4.0/bin:O_R_A_C_L_E_O_A_S_P_R_O_D_B_A_S
_E/orb/4.0/admin/cgi:O_R_A_C_L_E_O_A_S_P_R_O_D_B_A_S_E/orb/4.0/bin:O_R_A_C_L_E_O_A_S_P_R_
O_D_B_A_S_E/ots/1.0/bin:O_R_A_C_L_E_O_A_S_P_R_O_D_B_A_S_E/ows/4.0/jdk/bin:O_R_A_C_L_E_O_A
_S_P_R_O_D_B_A_S_E/bin:$ {PATH}; export PATH
fi
if [ -z "$CLASSPATH" ]
then
        CLASSPATH=O_R_A_C_L_E_O_A_S_P_R_O_D_B_A_S_E/ows/4.0/classes/ecoapi.jar:O_R_A_C_L_E_O_A_S_P_R_O
else
        CLASSPATH=O_R_A_C_L_E_O_A_S_P_R_O_D_B_A_S_E/ows/4.0/classes/ecoapi.jar:O_R_A_C_L_E_O_A_S_P_R_O
fi
if [ -z "$MANPATH" ]
then
        MANPATH=O_R_A_C_L_E_O_A_S_P_R_O_D_B_A_S_E/ows/4.0/doc; export MANPATH
else
        MAHPATH=${MANPATH}:O_R_A_C_L_E_O_A_S_P_R_O_D_B_A_S_E/ows/4.0/doc; export MANPATH
fi
ORACLE_HOME=O_R_A_C_L_E_O_A_S_P_R_O_D_B_A_S_E ; export ORACLE_HOME
ORAWEB_HOME=O_R_A_C_L_E_O_A_S_P_R_O_D_B_A_S_E/ows/4.0 ; export ORAWEB_HOME
ORAWEB_SITE=O_A_S_S_I_T_E_N_A_M_E; export ORAWEB_SITE
ORAWEB_ADMIN=O_R_A_C_L_E_O_A_S_B_A_S_E/admin/ows; export ORAWEB_ADMIN
ORB_HOME=O_R_A_C_L_E_O_A_S_P_R_O_D_B_A_S_E/orb/4.0; export ORB_HOME
ORAWEB_NAMEROOT=/. :/applications/oracle/OAS; export ORAWEB_NAMEROOT
JRE_HOME=O_R_A_C_L_E_O_A_S_P_R_O_D_B_A_S_E/ows/4.0/jdk; export JRE_HOME
if [ "us" = "ja" ]
then
        NLS_LANG="JAPANESE_JAPAN.JA16EUC", export NLS_LANG
elif [ "us" = "zhs" ]
then
        NLS_LANG="SIMPLIFIED CHINESE_CHINA.ZHS16GBK"; export NLS_LANG
elif [ "us" = "ptb" ]
then
        NLS_LANG="BRAZILIAN PORTUGUESE_BRAZIL.WE8ISO8859P1"; export NLS_LANG
else
        NLS_LANG=; export NLS_LANG
fi
ORACLE_BASE=O_R_A_C_L_E_O_A_S_B_A_S_E ;export ORACLE_BASE
ORAORB_SITE=O_A_S_S_I_T_E_N_A_M_E ;export ORAORB_SITE
~~~TEMPLATE: \ics\perlidlc
!/bin/sh O_R_A_C_L_E_O_A_S_P_R_O_D_B_A_S_E/ows/4.0/. . ./cartx/common/perl/bin/perl
Perl source file used to compile IDL to perl client mappings
This script generates perl and java stubs for an IDL file. Java stubs
are generated because perl stubs uses them to communicate to the ORB
The programmer who uses perl stubs is not aware of the java mappings
and should use this script to generate both perl and java stubs for
a particular IDL and use the perl stubs (mappings) in his/her perl
programs/scripts
Usage : perlidlc <otherflags> −o <dir> <otherflags> IDLfile
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```perl
my $debug = 0;
if ($#ARGV < 0) {
    print "Usage: perlidlc [-o <dir>] <flags> IDLfile\n";
    exit;
}
$outarg = 0;
OUTER:
for($i = 0; $i < $#ARGV; $i++) {
    if ($ARGV[$i] eq "-o") {
        $outarg = $i + i;
        last OUTER;
    }
}
if ($^O =~ m/Win32/) {
    $P = "\\";
    $C = ";";
}
else {
    $P = "/";
    $C = ";";
}
# default output directory should be stuffed in args
if (!$outarg) {
    $default_path = 1;
    my $tail = $#ARGV;
    my $tailarg = $ARGV[$tail];
    $ARGV[$tail] = '-o';
    $ARGV[$tail + 1] = "O_R_A_C_L_E_O_A_S_P_R_O_D_B_A_S_E/ows/4.0" .
"$ {P} .. ${P}cartx${P}livehtml${P}stubs";
    die "Installation is not complete: " .$ARGV[$tail + 1] . " not found.\n"
        if(!opendir DIR, $ARGV[$tail + 1]);
    closedir DIR;
    $outarg = $tail + 1;
    $ARGV[$tail + 2] = $tailarg;
}
mkdir $ARGV[$outarg], 0755;
@perlARGV = @ARGV; $perlARGV[$outarg] .= "${P}perl"; mkdir $perlARGV[$outarg], 0755;
@javaARGV = @ARGV; $javaARGV[$outarg] .= "${P}java"; mkdir $javaARGV[$outarg], 0755;
use File::Find;
@javafiles = ( );
sub findjavafiles {
    my $javafile;
    if ($File::Find::name =~ /\.java/)
    {
        $javafile = $File::Find::name;
        $javafile =~ s/\//${P}/g;
            push @javafiles, $javafile;
    }
}
# Generate perl stubs
@args = ("O_R_A_C_L_E_O_A_S_P_R_O_D_B_A_S_E/ows/4.0${P}bin${P}perlidlcexe", eperlARGV);
print "Generating Perl stubs . . .\n";
print "    Executing %args\n" if $debug;
system(@arga) == 0
    or die "$args[0] : $!\n";
print "Please include $perlARGV[$outarg] in your PERLLIB environment variable".
    (!$default_path ? " and LiveHTML Perl Application Library Path" : "") .
    ".\n";
#Generate java stubs
@args =("O_R_A_C_L_E_O_A_S_P_R_O_D_B_A_S_E/ows/4.0${P}bin${P}wrbjidlc", @javaARGV);
$ | = 1;
print "Generating Java stubs for Perl stubs .";
print "    Executing @args\n" if $debug;
system(@args) = = 0
    or die "$args[0] : $!\n";
# Compile those java stubs with javac
my @javacargs = ("-classpath",
"O_R_A_C_L_E_O_A_S_P_R_O_D_B_A_S_E/ows/4.0${P}jdk${P}lib${P}classes.zip${C}O_R_A_C_L_E_O_A_S_P_R_O_D_B_A_S_E/ows/4.0${P}classes${P}wrbjidl.jar${C}O_R_A_C_L_E_O_A_S_P_R_O_D_B_A_S_E/ows/4.0${P}classes${P}services.jar${C}O_R_A_C_L_E_O_A_S_P_R_O_D_B_A_S_E/ows/4.0${P}classes${P}cosnam.jar${C}O_R_A_C_L_E_O_A_S_P_R_O_D_B_A_S_E/ows/4.0${P}classes${P}jcorba.jar${
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
C}.");
chdir $javaARGV[$outarg];
find(\&findjavafiles, ".")
while (@javafiles) {
        my %args = ("O_R_A_C_L_E_O_A_S_P_R_O_D_B_A_S_E/ows/4.0${P}jdk${P}bin${P}javac",
                @javacargs. splice(@javafiles, 0, 5));
        print "   Executing @args\n" if $debug;
        system(@args) = =0
                or die "$args[0]: $!\n";
        print ".";
}
print "\nPlease include $javaARGV[$outarg] in your CLASSPATH environment variable".
        (!$default_path ? " and LiveHTML environment section" : "") . ".\n";
~~~TEMPLATE: \ics\primary.dat
Host=H_O_S_T_N_A_M_E_D_O_M_A_I_N
Port=O_A_S_N_O_D_E_P_O_R_T
Site=O_A_S_S_I_T_E_N_A_M_E
~~~TEMPLATE: \ics\profile
ORACLE_BASE=O_R_A_C_L_E_O_A_S_B_A_S_E; export ORACLE_BASE
ORACLE_HOME=O_R_A_C_L_E_O_A_S_P_R_O_D_B_A_S_E; export ORACLE_HOME
ORAWEB_HOME=$ORACLE_HOME/ows/4.0; export ORAWEB_HOME
ORAWEB_ADMIN=$ORACLE_BASE/admin/ows; export ORAWEB_ADMIN
ORACLE_SID=O_R_A_C_L_E_S_I_D; export ORACLE_SID
THREADS_FLAG=native; export THREADS_FLAG
ORAORB_SITE=O_A_S_S_I_T_E_N_A_M_E; export ORAORB_SITE
ORAWEB_SITE=O_A_S_S_I_T_E_N_A_M_E; export ORAWEB_SITE
LD_LIBRARY_PATH=$ORACLE_HOME/lib:$ORAWEB_HOME/lib:/usr/dt/lib:/usr/openwin/lib:$ORACLE_HO
ME/jdbc/lib; export LD_LIBRARY_PATH
ORACLE_TERM=xsun5; export ORACLE_TERM
umask 022
PATH=$ORACLE_HOME/bin:/bin:/usr/bin:/usr/ccs/bin:/usr/local/bin:/opt/bin:$ORACLE_BASE/pro
duct/8.0.5/bin
TMPDIR=/tmp;export TMPDIR
CLASSPATH=$ORACLE_HOME/mocha/mocha.zip:$ORACLE_HOME/oec/java/oec:$ORACLE_HOME/oec/java;ex
port CLASSPATH
MANPATH=$ORACLE_BASE/product/ics/orb/4.0/man
PRINTER=/bin/echo; export PRINTER
TK2_PRINT_STATUS=/bin/echo;export TK2_PRINT_STATUS
TNS_ADMIN=$ORACLE_HOME/network/admin; export TNS_ADMIN
    O_R_A_C_L_E_O_A_S_P_R_O_D_B_A_S_E/ows/4.0/install/owsenv_bsh.sh
NLS_LANG=AMERICAN_AMERICA.WE8ISO8859P1; export NLS_LANG
stty erase
~~~TEMPLATE: \ics\profile.old
ORACLE_BASE=T_O_O_L_S_D_I_R/oracle; export ORACLE_BASE
ORACLE_HOME=$ORACLE_BASE/product/ics; export ORACLE_HOME
ORAWEB_HOME=$ORACLE_HOME/ows/4.0; export ORAWEB_HOME
ORAWEB_ADMIN=$ORACLE_BASE/admin/ows; export ORAWEB_ADMIN
ORACLE_SID=O_R_A_C_L_E_S_I_D; export ORACLE_SID
THREADS_FLAG=native; export THREADS_FLAG
ORAORB_SITE=website40;export ORAORB_SITE
ORAWEB_SITE=website40;export ORAWEB_SITE
LD_LIBRARY_PATH=$ORACLE_HOME/lib:$ORAWEB_HOME/lib:/usr/dt/lib:/usr/openwin/lib:$ORACLE_HO
ME/jdbc/lib; export LD_LIBRARY_PATH
ORACLE_TERM=xsun5; export ORACLE_TERM
umask 022
PATH=$ORACLE_HOME/bin:/bin:/usr/bin:/usr/ccs/bin:/usr/local/bin:/opt/bin:$ORACLE_BASE/pro
duct/8.0.5/bin:
TMPDIR=/tmp;export TMPDIR
CLASSPATH=$ORACLE_HOME/mocha/mocha.zip:$ORACLE_HOME/oec/java;export CLASSPATH
MANPATH=$ORACLE_BASE/product/ics/orb/4.0/man
PRINTER=/bin/echo;export PRINTER
TK2_PRINT_STATUS=/bin/echo;export TK2_PRINT_STATUS
TNS_ADMIN=$ORACLE_HOME/network/admin;export TNS_ADMIN
. $ORACLE_BASE/product/ics/ows/4.0/install/owsenv_bsh.sh
NLS_LANG=AMERICAN_AMERICA.US7ASCII;export NLS_LANG
~~~TEMPLATE: \ics\rmproxy.ior
!/bin/sh
. O_R_A_C_L_E_O_A_S_P_R_O_D_B_A_S_E/ows/4.0/install/owsenv_bsh.sh
echo "Content-type:text/html"
echo
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
$ORAWEB_HOME/bin/owsctl getIOR -w wrbrmpxy -force
~~~TEMPLATE: \ics\server.dfl
[NetInfo]
MaxConnectCount   = 338
DNSResolution     = NEVER
ServerPID         = /tmp/ServerPID
;
;
; Log Information
;
; Set values for . . .
;        LogDir                     . . . Place for all log files
;        LogInfoFile   . . . Information (Audit) Log file
;        LogErrorFile  . . . Error Log File
;
[LogParams]
TimeStyle  = GMT
AdminFile  = /tmp/LogError
;
;
; Server Parameters
;
; Set values for . . .
;        RequestTimeout   . . . Time out for incoming requests
;        ResponseTimeout  . . . Time out for outgoing responses
;        ScriptTimeout    . . . Time out for Script response time
;
[Server]
InitialFile         = wwwIndex.html
DefaultMIMEType     = application/octet-stream
; UserDir            = public_html
; UserDirInitialFile =myinitial.html
DefaultCharset      = iso-8859-1
PreferredLanguage   = en
ImageMap            = map
UseDirIndexing      = FALSE
CGITimeout          = 900
;
; Secure Information Parameters
;
; Set values for . . .
;        UserID       . . . Acquire privileges for User ID
;        GroupID      . . . Acquire privileges for Group ID
;
[SecureInfo]
UserID      = nobody
GroupID     = other
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
O_R_A_C_L_E_O_A_S_P_R_O_D_B_A_S_E/ows/4.0/doc/              NR    /
O_R_A_C_L_E_O_A_S_P_R_O_D_B_A_S_E/ows/4.0/bin/              CN    /ows-bin/
O_R_A_C_L_E_O_A_S_P_R_O_D_B_A_S_E/ows/4.0/doc/              NR    /ows-doc/
O_R_A_C_L_E_O_A_S_P_R_O_D_B_A_S_E/ows/4.0/admin/ing/   NR   /ows-img/
O_R_A_C_L_E_O_A_S_P_R_O_D_B_A_S_E/ows/4.0/admin/img/   NR   /ows-aimg/
O_R_A_C_L_E_O_A_S_P_R_O_D_B_A_S_E/ows/4.0/admin/doc/   NR   /ows-adoc/
O_R_A_C_L_R_O_A_S_P_R_O_D_B_A_S_E/ows/4.0/classes/          NR    /ows-vbclasses/
;
;
; File Cache
; List the full virtual filename path or wild-card
; expression denoting one or more files in the ServerEs
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; virtual file system.
;
; [FileCache]
; /products/*
; /products/xr25/Version*.c
; /employees/list/phomes
;
;
; Language Extensions
;
; List for each combination of language type
; and character set one or more unique
; extensions.
;
[LangExt]
en            iso-8859-1          eng
en            unicode-1-1         engU uc
fr-CA         iso-8859-1          frc
fr-FR         iso-8859-1          fr
jp-JP         iso-2022-jp         jp
jp-JP         unicode-1-1-utf-8   jpU
;
;
; MIME Types
;
; List for each combination of MIME Type
; and representation one or more unique
; extensions.
;
[MIMETypes]
text/hml           htm html
image/jpeg         jpg jpeg
image/gif          gif
appl/text          doc
text/plain         txt ksh lst
application/pdf    pdf
application/postscript   ps
model/vrml         wrl vrml
video/mpeg         mpeg mpg mpe
;
[Encodings]
compress           z
gzip               gz
;
;
; The ordering of the DynApps should not be changed
[DynApps]
O_R_A_C_L_E_O_A_S_P_R_O_D_B_A_S_E/ows/4.0/lib/ndwfss.so oracle_adp_init
~~~TEMPLATE: \ics\startWEB
!/bin/sh
Start the application server processes.
owsctl start
owsctl start –nodemgr
exit
~~~TEMPLATE: \ics\stopWEB
!/bin/sh
Stop the application server processes.
owsctl stop
owsctl stop –nodemgr
exit
~DIRECTORY: templates\netp\
~~~TEMPLATE: \netp\cshprofile
!/bin/csh

Copyright 1998 Net Perceptions, Inc. All Rights Reserved.

Environment configuration file for csh based shells. Please source
this file before running any Net Perceptions for E-commerce command.

Net Perceptions for E-commerce configuration variables not in
this script should be set using the modify_configuration_variable
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
command in netpadmin. See your manual for more details.
if ( ! $?ORACLE_HOME ) then
        setenv ORACLE_HOME O_R_A_C_L_E_H_O_M_E
endif
if ( ! $?NP_HOME ) then
        setenv NP_HOME O_R_A_C_L_E_N_P_B_A_S_E
endif
if ( ! $?NP_DBROOT ) then
        setenv NP_DBROOT O_R_A_C_L_E_N_P_B_A_S_E/config
endif
if ( ! $?NP_ROOT ) then
        setenv NP_ROOT NamingService:O_R_A_C_L_E_S_I_D
endif
if ( ! $?NP_MODE ) then
        setenv NP_MODE Key
endif
if ( ! $?ORBIX_NAMES ) then
        setenv ORBIX_NAMES O_R_A_C_L_E_N_P_B_A_S_E/iona/OrbixNames1.1c
endif
if ( ! $?ORBIX_MT ) then
        setenv ORBIX_MT O_R_A_C_L_E_N_P_B_A_S_E/iona/OrbiXMT_2.3c
endif
The following variable defines the service name offered by CORBA.
if ( ! $?NP_SERVNAME ) then
        setenv NP_SERVNAME O_R_A_C_L_E_S_I_D
endif
verify some values.
if ( ( ( "$ORACLE_HOME" = = " " ) || \
        ( "$NP_HOME" = = " " ) || ( "$NP_DBROOT" = = " " ) || \
        ( "$NP_MODE" = = " " ) || ( "$NP_ROOT" = = " " ) || \
        ( "$ORBIX_NAMES" = = " " ) || ( "$ORBIX_MT" = = " " ) || \
        ( "$NP_SERVNAME" = = " " ) ) then
    echo "ERROR:    Initial Net Perceptions environment variables are not set."
    echo "          Please edit config/cshprofile and set the initial variables and rerun
script."
    exit 1
endif
if ( ! -d "$ORACLE_HOME" ) then
    echo "ERROR: Directory specified by ORACLE_HOME environment variable is not
accessible."
    echo "          Please update config/cshprofile and rerun it."
    exit 1
    endif
Set the IONA variables
setenv IT_CONFIG_PATH $NP_HOME/iona
Update PATH
setenv PATH "$PATH": $NP_HOME/bin: $ORACLE_HOME/bin:$NP_HOME/jre/bin
Update LD_LIBRARY_PATH
if ( ! $?LD_LIBRARY_PATH ) setenv LD_LIBRARY_PATH " "
setenv LD_LIBRARY_PATH
"$LD_LIBRARY_PATH":$NP_HOME/lib:$ORACLE_HOME/lib:$NP_HOME/lib/rw:$ORBIX_NAMES/lib:$ORBIX_
MT/lib
Set NP_CLASSPATH
setenv NP_CLASSPATH
.:$NP_HOME/iona:$NP_HOME/java/NetPerceptionsN.jar:$NP_HOME/java/NetPerceptionsI.jar:$NP_H
OME/java/OrbixWeb_3.0.4.jar:$NP_HOME/examples

Set path to web browser,
used to display online help from applications like netpmanage

if ( ! $?NP_BROWSER ) then
        setenv NP_BROWSER /opt/netscape/netscape
endif
~~~TEMPLATE: \netp\env.cfg

This file is automatically generated and maintained by the Net Perceptions(TM)
Recommendation Engine. Do not modify, or this software may not work correctly

NP_BIN              O_R_A_C_L_E_N_P_B_A_S_E/bin
NP_DBDRIVER         ORACLES
NP_DBPASS           N_P_D_B_P_A_S_S
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
NP_DBSRC            O_R_A_C_L_E_S_I_D
NP_DBUSER           N_P_D_B_U_S_E_R
NP_LICENSE_FILE     O_R_A_C_L_E_N_P_B_A_S_E/config/netp.license
NP_SHMEM_ID         N_E_T_P_P_O_R_T
~~~TEMPLATE: \netp\Orbix.cfg
This file contains the default values for Orbix system configuration.
=====================================================================

Below are listed the main orbix environment configuration variables
and associated default values.

A orbix client, server or daemon will use these values
if, and only if, the relevant unix environment
variable is not defined.
IT_ORBIX_HOME               O_R_A_C_L_E_N_P_B_A_S_E/iona
IT_ERRORS                   $(IT_ORBIX_HOME)/ErrorMsgs
IT_IMP_REP_PATH             $(IT_ORBIX_HOME)/ImpRep
IT_INT_REP_PATH             $(IT_ORBIX_HOME)/IntRep
IT_LOCATOR_PATH             $(IT_ORBIX_HOME)/Locator
IT_LOCAL_DOMA
N                           D_O_M_A_I_N
IT_NAMES_PATH               $(IT_ORBIX_HOME)/NamesRep
IT_DAEMON_PORT              N_E_T_P_P_O_R_T
IT_DEFAULT_CODE
IT_DEFAULT_COMMS
IT_CONNECT_ATTEMPTS     15
IT_DAEMON_SERVER_RANGE  1024
IT_DAEMON_SERVER_BASE   7590
~~~TEMPLATE: \netp\Orbix.hosts
NS: H_O_S_T_N_A_M_E.D_O_M_A_I_N
IT_daemon: H_O_S_T_N_A_M_E.D_O_M_A_I_N :
~~~TEMPLATE: \netp\OrbixWeb.properties
OrbixWeb properties file. You really should use "owconfig" to edit this.
Note that backslash is an escape character in this format, so any paths on
NT or Windows 95 need to use double backslashes!

(RAW VERSION - - USED BY THE INSTALLATION SCRIPT)

OrbixWeb.IT_NS_PORT=N_E_T_P_P_O_R_T
OrbixWeb.IT_ORBIXD_IIOP_PORT=N_E_T_P_P_O_R_T
OrbixWeb.IMPL_IS_READY_TIMEOUT=30000
OrbixWeb.IT_ACCEPT_CONNECTIONS=true
OrbixWeb.IT_ALWAYS_CHECK_LOCAL_OBJS=false
OrbixWeb.IT_ANY_BUFFER_SIZE=512
OrbixWeb.IT_BIND_USING_IIOP=true
OrbixWeb.IT_BUFFER_SIZE=8192
OrbixWeb.IT_CLASSPATH_SWITCH=-classpath
OrbixWeb.IT_CONNECTION_TIMEOUT=300000
OrbixWeb.IT_CONNECT_TABLE_SIZE_DEFAULT=100
OrbixWeb.IT_DAEMON_SERVER_BASE=2000
OrbixWeb.IT_DAEMON_SERVER_RANGE=2000
OrbixWeb.IT_DETECT_APPLET_SANDBOX=true
OrbixWeb.IT_DETECT_DISPATCH=false
OrbixWeb.IT_DII_COPY_ARGS=false
OrbixWeb.IT_DSI_COPY_ARGS=false
OrbixWeb.IT_HTTP_TUNNEL_HOST=
OrbixWeb.IT_HTTP_TUNNEL_PORT=0
OrbixWeb.IT_HTTP_TUNNEL_PREFERRED=false
OrbixWeb.IT_HTTP_TUNNEL_PROTO=
OrbixWeb.IT_IIOP_LISTEN_PORT=0
OrbixWeb.IT_IIOP_PROXY_HOST=
OrbixWeb.IT_IIOP_PROXY_PORT=0
OrbixWeb.IT_IIOP_PROXY_PREFERRED=false
OrbixWeb.IT_IIOP_USE_LOCATOR=true
OrbixWeb.IT_IMPL_READY_IF_CONNECTED=true
OrbixWeb.IT_INITIAL_REFERENCES=
OrbixWeb.IT_IORS_USE_DNS=true
OrbixWeb.IT_KEEP_ALIVE_FORWARDER_CONN=true
OrbixWeb.IT_LISTENER_PRIORITY=5
OrbixWeb.IT_LOCAL_HOSTNAME=
OrbixWeb.IT_LOCATE_ATTEMPTS=2
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
OrbixWeb.IT_LOCATOR_HOPS=3
OrbixWeb.IT_MARSHAL_NULLS_OK=true
OrbixWeb.IT_MULTI_THREADED_SERVER=false
OrbixWeb.IT_NAMES_HASH_TABLE_LOAD_FACTOR=0.5
OrbixWeb.IT_NAMES_HASH_TABLE_SIZE=23
OrbixWeb.IT_NAMES_SERVER=NS
OrbixWeb.IT_NAMES_TIMEOUT=
OrbixWeb.IT_NON_COPYING_ANYS=false
OrbixWeb.IT_NS_HOSTNAME=H_O_S_T_N_A_M_E.D_O_M_A_I_N
OrbixWeb.IT_NS_IP_ADDR=
OrbixWeb.IT_OBJECT_CONNECT_TIMEOUT=-1
OrbixWeb.IT_OBJECT_TABLE_LOAD_FACTOR=0.75
OrbixWeb.IT_OBJECT_TABLE_SIZE=1789
OrbixWeb.IT_ORBIXD_PORT=7570
OrbixWeb.IT_READER_PRIORITY=3
OrbixWeb.IT_REQ_CACHE_SIZE=10
OrbixWeb.IT_SECURITY_AUTHENTICATE_CLIENTS=false
OrbixWeb.IT_SECURITY_DEFAULT_ENTITY=SEC_ENT_INSECURE_SERVER_INSECURE_CLIENT
OrbixWeb.IT_SSL_IIOP_LISTEN_PORT=0
OrbixWeb.IT_TRADING_SERVER=TDR
OrbixWeb.IT_USE_BIDIR_IIOP=false
OrbixWeb.IT_USE_EXTENDED_CAPABILITIES=true
OrbixWeb.Orbix=BOA
OrbixWeb.pingDuringBind=true
OrbixWeb.setDiagnostics=1

These are altered during installation.

Orbixweb.IT_LOCAL_DOMAIN=D_O_M_A_I_N
~~~TEMPLATE: \netp\profile.user
Filename: .profile file for Net P user
This is the default standard profile provided to a user.
They are expected to edit it to meet their own needs.

MAIL=/usr/mail/${LOGNAME: ? }
ORACLE_BASE="O_R_A_C_L_E_O_A_S_B_A_S_E"
ORACLE_HOME="O_R_A_C_L_E_O_A_S_B_A_S_E/product/OAS4081"
NP_HOME="O_R_A_C_L_E_N_P_B_A_S_E"
export ORACLE_BASE ORACLE_HOME NP_HOME
PATH="$ORACLE_HOME/bin:/usr/ccs/bin:/usr/sbin:/usr/ucb/bin:$PATH"
LD_LIBRARY_PATH="$ORACLE_HOME/lib:/usr/dt/lib:/usr/ucblib /usr/openwin/lib:/usr/ccs/lib:/usr/uch/lib"
export PATH LD_LIBRARY_PATH
TNS_ADMIN="$ORACLE_HOME/network/admin"
ORA_NLS="$ORACLE_HOME/ocommon/nls/admin/data"
export TNS_ADMIN ORA_NLS
ORACLE_SID="O_R_A_C_L_E_S_I_D"; export ORACLE_SID;
NLS_LANG="AMERICAN_AMERICA.WE8ISO8859P1"
export NLS_LANG
NLS_LANGUAGE="AMERICAN"
export NLS_LANGUAGE
NLS_DATE_FORMAT="DD-MON-RR"
export NLS_DATE_FORMAT
NLS_NUMERIC_CHARACTERS=". ,"
export NLS_NUMERIC_CHARACTERS
NLS_SORT="binary"
export NLS_SORT
. $NP_HOME/config/shprofile
~~~TEMPLATE: \netp\S98orb
!/bin/ksh

Copyright 1998 Net Perceptions, Inc. All Rights Reserved.

Set NP_HOME to the directory where Net Perceptions recommendation engine was installed
export NP_HOME="O_R_A_C_L_E_N_P_B_A_S_E/product/netp"
Set NP_USER to the user who should own the Net Perceptions recommendation engine
processes
NP_USER=oracle"
export NP_BIN="$NP_HOME/bin"
ECHO=/bin/echo
TEST=/bin/test
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
SU=/bin/su
case "$1" in
'start')
        if $TEST -x $NP_BIN/orbstartup ; then
                $ECHO "Starting Orbix ORB . . .\n"
                $SU $NP_USER -c "$ECHO '. $NP_HOME/config/shprofile; $NP_BIN/orbstartup'
| /bin/sh"
        else
                $ECHO "$NP_BIN/orbstartup does not exist, cannot start Orbix ORB"
        fi
        ; ;
'stop')
        if $TEST -x $NP_BIN/orbshutdown ; then
                $SU $NP_USER -c "$ECHO '. $NP_HOME/config/shprofile; $NP_BIN/orbshutdown'
| /bin/sh"
        fi
        ; ;
*)
        $ECHO "Usage: $0 { start | stop }"
        ; ;
esac
exit 0
~~~TEMPLATE: \netp\S99netp
!/bin/ksh

Copyright 1998 Net Perceptions, Inc. All Rights Reserved.

Set NP_HOME to the directory where Net Perceptions recommendation engine was installed
export NP_HOME="O_R_A_C_L_E_N_P_B_A_S_E"
Set NP_USER to the user who should own the Net Perceptions recommendation engine
processes
NP_USER="oracle"
export NP_BIN="$NP_HOME/bin"
ECHO=/bin/echo
TEST=/bin/test
SU=/bin/su
case "$1" in
'start')
        if $TEST -x $NP_BIN/netpstartup ; then
                $ECHO "Starting Net Perceptions recommendation engine . . .\n"
                $SU $NP_USER -c "$ECHO '. $NP_HOME/config/shprofile; $NP_BIN/netpstartup'
| /bin/sh"
        else
                $ECHO "$NP_BIN/netpstartup does not exist, cannot start Net Perceptions
recommendation engine"
        fi
        ; ;
'stop')
        if $TEST -x $NP_BIN/netpshutdown ; then
                $SU $NP_USER -c "$ECHO '. $NP_HOME/config/shprofile;
$NP_BIN/netpshutdown'| /bin/sh"
        fi
        ; ;
*)
        $ECHO "Usage: $0 { start | stop }"
        ; ;
esac
exit 0
~~~TEMPLATE: \netp\shprofile
!/bin/sh

Copyright 1998 Net Perceptions, Inc. All Rights Reserved.

Environment configuration file for sh based shells. Please source
this file before running any Net Perceptions for E-commerce command.

Net Perceptions for E-commerce configuration variables not in
this script should be set using the modify_configuration_variable
command in netpadmin. See your manual for more details.
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [ -z "$ORACLE_HOME"] ; then
    ORACLE_HOME=O_R_A_C_L_E_H_O_M_E
    export ORACLE_HOME
fi
if [ -z "$NP_HOME" ] ; then
    NP_HOME=O_R_A_C_L_E_N_P_B_A_S_E
    export NP_HOME
fi
if [ -z "$NP_DBROOT" ] ; then
    NP_DBROOT-$NP_HOME/config
    export NP_DBROOT
fi
if [ -z "$NP_ROOT" ] ; then
    NP_ROOT=NamingService:prod
    export NP_ROOT
fi
if [ -z "$NP_MODE" ] ; then
    NP_MODE=Key
    export NP_MODE
fi
if [ -z "$ORBIX_NAMES" ] ; then
    ORBIX_NAMES=$NP_HOME/iona/OrbixNames1.1c
    export ORBIX_NAMES
fi
if [ -z "$ORBIX_MT" ] ; then
    ORBIX_MT=$NP_HOME/iona/OrbixMT_2.3c
    export ORBIX_MT
fi
# The following variable defines the service name offered by CORBA.
if [ -z "$NP_SERVNAME" ] ; then
    NP_SERVNAME=O_R_A_C_L_E_S_I_D
    export NP_SERVNAME
fi
# verify some values.
if [ -z "$ORACLE_HOME" -o \
        -z "$NP_HOME" -o -z "$NP_DBROOT" -o \
        -z "$ORBIX_NAMES" -o -z "$ORBIX_MT" -o \
        -z "$NP_SERVNAME" ] ; then
    echo "ERROR: Initial Net Perceptions environment variables are not set." >2
    echo "       Please edit config/shprofile and set the initial variables and
rerun script."   >2
    return 1
fi
if [ ! -d "$ORACLE_HOME" ] ; then
    echo "ERROR: Directory specified by ORACLE_HOME environment variable is not
accessible."  >2
    echo "       Please update config/shprofile and rerun it."  >2
    return 1
fi
# Set the IONA variable
IT_CONFIG_PATH=$NP_HOME/iona
export IT_CONFIG_PATH
# update PATH
PATH=$PATH: $NP_HOME/bin: $ORACLE_HOME/bin: $NP_HOME/jre/bin
export PATH
# update LD_LIBRARY_PATH
LD_LIBRARY_PATH=$LD_LIBRARY_PATH:$NP_HOME/lib:$ORACLE_HOME/lib:$NP_HOME/lib/rw:$ORBIX_NAM
ES/lib:$ORBIX_MT/lib
export LD_LIBRARY_PATH
# Set the NP_CLASSPATH variable
NP_CLASSPATH=.:$NP_HOME/iona:$NP_HOME/java/NetPerceptionsN.jar:$NP_HOME/java/Netperceptio
nsI.jar:$NP_HOME/java/OrbixWeb_3.0.4.jar:$NP_HOME/examples
export NP_CLASSPATH

# Set path to web browser,
used to display online help from applications like netpmanage

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```sh
if [ -z "$NP_BROWSER" ] ; then
    NP_BROWSER=
    export NP_BROWSER
fi
---TEMPLATE: \netp\shprofile_pl.sh
#!/bin/sh

Copyright 1998 Net Perceptions, Inc. All Rights Reserved.

Environment configuration file for sh based shells. Please source
this file before running any Net Perceptions for E-commerce command.

Net Perceptions for E-commerce configuration variables not in
this script should be set using the modify_configuration_variable
command in netpadmin. See your manual for more details.
if [ -z "$ORACLE_HOME" ] ; then
    ORACLE_HOME=O_R_A_C_L_E_H_O_M_E
    export ORACLE_HOME
fi
if [ -z "$NP_HOME" ] ; then
    NP_HOME=O_R_A_C_L_E_N_P_B_A_S_E
    export NP_HOME
fi
if [ -z "$NP_DBROOT" ] ; then
    NP_DBROOT=O_R_A_C_L_E_N_P_B_A_S_E/config
    export NP_DBROOT
fi
if [ -z "$NP_ROOT" ] ; then
    NP_ROOT=NamingService:O_R_A_C_L_E_S_I_D
    export NP_ROOT
fi
if [ -z "$NP_MODE" ] ; then
    NP_MODE=Key
    export NP_MODE
fi
if [ -z "$ORBIX_NAMES" ] ; then
    ORBIX_NAMES=O_R_A_C_L_E_N_P_B_A_S_E/iona/OrbixNames1.1c
    export ORBIX_NAMES
fi
if [ -z "$ORBIX_MT" ] ; then
    ORBIX_MT=O_R_A_C_L_E_N_P_B_A_S_E/iona/OrbixMT_2.3c
    export ORBIX_MT
fi
# The following variable defines the service name offered by CORBA.
if [ -z "$NP_SERVNAME" ] ; then
    NP_SERVNAME=O_R_A_C_L_E_S_I_D
    export NP_SERVNAME
fi
# verify some values.
if [ -z "$ORACLE_HOME" -o \
     -z "$NP_HOME" -o -z "$NP_DBROOT" -o \
     -z "$ORBIX_NAMES" -o -z "$ORBIX_MT" -o \
     -z "$NP_SERVNAME" ] ; then
    echo "ERROR:  Initial Net Perceptions environment variables are not set." >2
    echo "          Please edit config/shprofile and set the initial variables and rerun
script." >2
    return 1
fi
if [ ! -d "$ORACLE_HOME" ]; then
    echo "ERROR: Directory specified by ORACLE_HOME environment variable is not
accessible." >2
        echo "          Please update config/shprofile and rerun it." >2
        return 1
fi
# Set the IONA variable
IT_CONFIG_PATH=$NP_HOME/iona
export IT_CONFIG_PATH
# Update PATH
PATH=$PATH:$NP_HOME/bin:$ORACLE_HOME/bin:$NP_HOME/jre/bin
export PATH
# Update LD_LIBRARY_PATH
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
LD_LIBRARY_PATH=$LD_LIBRARY_PATH:$NP_HOME/lib:$ORACLE_HOME/lib:$NP_HOME/lib/rw:$ORBIX_NAM
ES/lib:$ORBIX_MT/lib
export LD_LIBRARY_PATH
# Set the NP_CLASSPATH variable
NP_CLASSPATH=.:$NP_HOME/iona:$NP_HOME/java/NetPerceptionsN.jar:$NP_HOME/java/Netperceptio
nsI.jar:$NP_HOME/java/OrbixWeb_3.0.4.jar:$NP_HOME/examples
export NP_CLASSPATH

# Set path to web browser,
used to display online help from applications like netpmanage

if [ -z "$NP_BROWSER" ] ; then
    NP_BROWSER=/opt/netscape/netscape
    export NP_BROWSER
fi
---TEMPLATE: \netp\startNETP
#!/bin/ksh
# Starts all the processes for the NetPerceptions including ORB.
# Set the netperceptions environment.
. O_R_A_C_L_E_N_P_B_A_S_E/config/shprofile
export NP_BIN=$NP_HOME/bin
echo "Starting ORB . . . "
$NP_BIN/orbstartup
echo "Starting ORB . . . Done."
echo "Starting Net Perceptions Recommendation Engine . . . "
$NP_BIN/netpstartup
echo "Starting Net Perceptions Recommendation Engine . . . Done."
$NP_BIN/chmodit O_R_A_C_L_E_S_I_D i+I_C_S
$NP_BIN/chmodit O_R_A_C_L_E_S_I_D 1+I_C_S
$NP_BIN/chmodit O_R_A_C_L_E_S_I_D i+O_R_A_C_L_E_U_S_E_R
$NP_BIN/chmodit O_R_A_C_L_E_S_I_D 1+O_R_A_C_L_E_U_S_E_R
$NP_BIN/chmodit O_R_A_C_L_E_S_I_D i+NS
$NP_BIN/chmodit O_R_A_C_L_E_S_I_D 1+NS
$NP_BIN/chmodit O_R_A_C_L_E_S_I_D i+ALL
$NP_BIN/chmodit O_R_A_C_L_E_S_I_D 1+ALL
exit 0
---TEMPLATE: \netp\stopNETP
#!/bin/ksh
# Starts all the processes for the NetPerceptions including ORB.
# Set the netperceptions environment.
. O_R_A_C_L_E_N_P_B_A_S_E/config/shprofile
export NP_BIN=$NP_HOME/bin
echo "Stopping Net Perceptions Recommendation Engine . . . "
$NP_BIN/netpshutdown
echo "Stopping Net Perceptions Recommendation Engine . . . Done."
echo "Stopping ORB . . . "
$NP_BIN/orbshutdown
echo "Stopping ORB . . . Done."
exit 0
---TEMPLATE: \netp\update_netp.sql
- - Filename:      update_netp.sql
- - Description: This file performs the necessary updates to the netp schema
- -              to allow netp to work properly in a cloned database.
- - Usage:       This file is called in the cloning process after the
- -              proper values are substituted.
- -
- -
insert into D_B_U_S_E_R_N_E_T_P.T_GLRDOOT
    values ('O_R_A_C_L_E_N_P_B_A_S_E/config',1,'Id','4.0.50.3');
update D_B_U_S_E_R_N_E_T_P.t_gldatabase
    set rootname = 'O_R_A_C_L_E_N_P_B_A_S_E/config';
delete from D_B_U_S_E_R_N_E_T_P.T_GLROOT
    where name ='O_L_D_O_R_A_C_L_E_N_P_B_A_S_E/config'
update D_B_U_S_E_R_N_E_T_P.T_GLDBSIG
    set src = 'O_R_A_C_L_E_S_I_D';
exit;
-DIRECTORY: templates\oracle\
---TEMPLATE: \oracle\configDR.ora

# $Header: cnfg.orc 1.1 95/02/27 12:14:25 wyim Osd<unix> $ Copyr (c) 1992 Oracle

```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# cnfg.ora - instance configuration parameters
control_files          = (_B_D_A_T_A_D_I_R/ctl1O_R_A_C_L_E_S_I_D.ctl,
                          D_B_D_A_T_A_D_I_R/ctl2O_R_A_C_L_E_S_I_D.ctl)
# Below for possible future use . . .
# init_sql_files        = (?/dbs/sql.bsq,
#                          ?/rdbms/admin/catalog.sql,
#                          ?/rdbms/admin/expvew.sql)
background_dump_dest   = O_R_A_C_L_E_B_A_S_E/admin/O_R_A_C_L_E_S_I_D/bdump
core_dump_dest               = O_R_A_C_L_E_B_A_S_E/admin/O_R_A_C_L_E_S_I_D/cdump
user_dump_dest               = O_R_A_C_L_E_B_A_S_E/admin/O_R_A_C_L_E_S_I_D/udump
#log_archive_dest      =  O_R_A_C_L_E_B_A_S_E/admin/O_R_A C_L_E_S_I_D/arch/arch.log
db_block_size          =  8192
db_name                = O_R_A_C_L_E_S_I_D
---TEMPLATE: \oracle\crctrl.sql
CONNECT INTERNAL
SET ECHO ON
STARTUP NOMOUNT
pfile=O_R_A_C_L_E_B_A_S_E/admin/O_R_A_C_L_E_S_I_D/pfile/initO_R_A_C_L_E_S_I_D.ora
CREATE CONTROLFILE DATABASE "O_R_A_C_L_E_S_I_D" RESETLOGS NOARCHIVELOG
      SET DATABASE O_R_A_C_L_E_S_I_D
      MAXLOGFILES 32
      MAXLOGMEMRERS 2
      MAXDATAFILES 30
      MAXINSTANCES 8
      MAXLOGHISTORY 843
LOGFILE
   GROUP 1 ('D_B_D_A_T_A_D_I_R/rdo11O_R_A_C_L_E_S_I_D.dbf'
            'D_B_D_A_T_A_D_I_R/rdo12O_R_A_C_L_E_S_I_D.dbf') SIZE 20M,
   GROUP 2 ('D_B_D_A_T_A_D_I_R/rdo13O_R_A_C_L_E_S_I_D.dbf'
            'D_B_D_A_T_A_D_I_R/rdo21O_R_A_C_L_E_S_I_D.dbf') SIZE 20M,
   GROUP 3 ('D_B_D_A_T_A_D_I_R/rdo22O_R_A_C_L_E_S_I_D.dbf'
            'D_B_D_A_T_A_D_I_R/rdo23O_R_A_C_L_E_S_I_D.dbf') SIZE 20M
DATAFILE
   'D_B_D_A_T_A_D_I_R/ctxdO_R_A_C_L_E_S_I_D.dbf',
   'D_B_D_A_T_A_D_I_R/ispeedO_R_A_C_L_E_S_I_D.dbf',
   'D_B_D_A_T_A_D_I_R/np01O_R_A_C_L_E_S_I_D.dbf',
   'D_B_D_A_T_A_D_I_R/npidx01O_R_A_C_L_E_S_I_D.dbf',
   'D_B_D_A_T_A_D_I_R/nptmp01O_R_A_C_L_E_S_I_D.dbf',
   'D_B_D_A_T_A_D_I_R/rbsO_R_A_C_L_E_S_I_D.dbf',
   'D_R_D_A_T_A_D_I_R/strd01O_R_A_C_L_E_S_I_D.dbf',
   'D_R_D_A_T_A_D_I_R/sysO_R_A_C_L_E_S_I_D.dbf',
   'D_R_D_A_T_A_D_I_R/tmpO_R_A_C_L_E_S_I_D.dbf',
   'D_B_D_A_T_A_D_I_R/toolsO_R_A_C_L_E_S_I_D.dbf',
   'D_R_D_A_T_A_D_I_R/vg01O_R_A_C_L_E_S_I_D.dbf'
;
# Database can now be opened normally.
ALTER DATABASE OPEN RESETLOGS;
alter user vignette identified by vignette;
SHUTDOWN NORMAL;
EXIT;
---TEMPLATE: \oracle\initDB.ora

# $Header: initx.orc 12-jun-97.09:14:56 hpiao Exp $ Copyr (c) 1992 Oracle

# include database configuration parameters
ifile            =
O_R_A_C_L_E_B_A_S_E/admin/O_R_A_C_L_E_S_I_D/pfile/configO_R_A_C_L_E_S_I_D.ora
rollback_segments     = (rb01,rb02,rb03,rb04)
###################################################################
# Example INIT.ORA file

# This file is provided by Oracle Corporation to help you customize
# your RDBMS installation for your site. Important system parameters
# are discussed, and example settings given.

# Some parameter settings are generic to any size installation.
# For parameters that require different values in different size
# installations, three scenarios have been provided: SMALL, MEDIUM
# and LARGE. Any parameter that needs to be tuned according to
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# installation size will have three settings, each one commented
# according to installation size.

# Use the following table to approximate the SGA size needed for the
# three scenarios provided in this file:

#              - - - - - - -Installation/Database Size- - - - -
#              SMALL     MEDIUM     LARGE
#   Block  2K  4500K     6900X      17000K
#   Size   4K  5500K     8900K      21000K

# To set up a database that multiple instances will be using, place
# all instance-specific parameters in one file, and then have all
# of these files point to a master file using the IFILE command.
# This way, when you change a public
# parameter, it will automatically change on all instances. This is
# necessary, since all instances must run with the same value for many
# parameters. For example, if you choose to use private rollback segments,
# these must be specified in different files, but since all gc_*
# parameters must be the same on all instances, they should be in one file.

# INSTRUCTIONS: Edit this file and the other INIT files it calls for
# your site, either by using the values provided here or by providing
# your own. Then place an IFILE= line into each instance-specific
# INIT file that points at this file.
##################################################################
# tuning parameters
db_files = 80
# db_file_multiblock_read_count = 8           # SMALL
# db_file_multiblock_read_count = 16          # MEDIUM
db_file_multiblock_read_count = 32            # LARGE
# db_block_buffers = 200                      # SMALL
# db_block buffers = 550                      # MEDIUM
# db_block_buffers = 3200                     # LARGE
db_block_buffers = 5000                       # istore
# shared_pool_size = 3500000                  # SMALL
# shared_pool_size = 6000000                  # MEDIUM
# shared_pool_size = 9000000                  # LARGE
shared_pool_size = 12000000                   # ICS
log_checkpoint_interval = 10000
# processes = 50                              # SMALL
# processes = 100                             # MEDIUM
processes = 200                               # LARGE
# dml_locks = 100                             # SMALL
# dml_locks = 200                             # MEDIUM
dml_locks = 500                               # LARGE
# log_buffer = 8192                           # SMALL
# log_buffer = 32768                          # MEDIUM
log_buffer = 163840                           # LARGE
sequence_cache_entries = 10                   # SMALL
# sequence_cache_entries = 30                 # MEDIUM
# sequence_cache_entries = 100                # LARGE
sequence_cache_hash_buckets = 10              # SMALL
# sequence_cache_hash_buckets = 23            # MEDIUM
# sequence_cache_hash_buckets = 89            # LARGE
# audit_trail = true         # if you want auditing
# timed_statistics = true    # if you want timed statistics
max_dump_file_size = 10240   # limit trace file size to 5 Meg each
# log_archive_start = true   # if you want automatic archiving
# global_names = TRUE
global_names = FALSE
# mts_dispatchers="ipc,1"
# mts_max_dispatchers=10
# mts_servers=1
# mts_max_servers=10
# mts_service=O_R_A_C_L_E_S_I_D
# mts_listener_address="(ADDRESS= (PROTOCOL=ipc) (KEY=PNPKEY))"

# needed if running OPS

# PARALLEL_SERVER=TRUE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# For context cartridge.
TEXT_ENABLE=TRUE
# istore related.
open_cursors= 500
---TEMPLATE: \oracle\listener.ora
O_R_A_C_L_E_S_I_D =
    (ADDRESS_LIST =
            (ADDRESS= (PROTOCOL= IPC) (KEY= O_R_A_C_L_E_S_I_D))
            (ADDRESS= (PROTOCOL= TCP) (Host= h_o_s_t_n_a_m_e) (Port= T_N_S_P_O_R_T))
    )
SID_LIST_O_R_A_C_L_E_S_I_D =
    (SID_LIST =
        (SID_DESC =
            (ORACLE_HOME= O_R_A_C_L_E_H_O_M_E)
            (SID_NAME = O_R_A_C_L_E_S_I_D)
        )
        (SID_DESC =
            (SID_NAME = extproc)
            (ORACLE_HOME = O_R_A_C_L_E_H_O_M_E)
            (PROGRAM = extproc)
        )
    )
---TEMPLATE: \oracle\profile
ORACLE_BASE=O_R_A_C_L_E_B_A_S_E; export ORACLE_BASE
ORACLE_HOME=O_R_A_C_L_E_H_O_M_E; export ORACLE_HOME
ORACLE_SID=O_R_A_C_L_E_S_I_D; export ORACLE_SID
THREADS_FLAG=native; export THREADS_FLAG
ORAORB_SITE=website40;export ORAORB_SITE
LD_LIBRARY_PATH=$ORACLE_HOME/lib:/usr/dt/lib:/usr/openwin/lib:$ORACLE_HOME/jdbc/lib;
export LD_LIBRARY_PATH
ORACLE_TERM=xsun5; export ORACLE_TERM
NLS_LANG=AMERICAN_AMERICA.US7ASCII;export NLS_LANG
PATH=$ORACLE_HOME/bin:/bin:/usr/bin:/usr/ccs/bin:/usr/local/bin:/opc/bin:$PATH
TMPDIR=/tmp;export TMPDIR
CLASSPATH=$ORACLE_HOME/jdbc/lib/classes111.zip;export CLASSPATH
# Get the Netperceptions environment
# $ORACLE_BASE/product/netp/config/shprofile
PATH=$PATH:$ORACLE_BASE/product/netp/bin
umask 022
---TEMPLATE: \oracle\startCTX
#!/bin/sh
# Start the context server services.
LOGFILE=/tmp/ctx$(ORACLE_SID)Q$$.log
ctxsrv -user ctxsys/ctxsys -logfile "${LOGFILE}" -personality Q &
ctxsrv -user ctxsys/ctxsys -logfile "${LOGFILE}" -personality M &
ctxsrv -user ctxsys/ctxsys -logfile "${LOGFILE}" -personality D &
exit
---TEMPLATE: \oracle\startDB
#!/bin/sh
# Starts the ispeed database instance.
ORACLE_SID="O_R_A_C_L_E_S_I_D"
ORAENV_ASK="NO"
echo "Starting the \"${ORACLE_SID}\" instance . . . "
. oraenv
svrmgrl << EOP
connect internal
startup pfile=O_R_A_C_L_E_H_O_M_E/dbs/initO_R_A_C_L_E_S_I_D.ora
exit
EOF
if test $? -eq 0 ; then
    echo ""
    echo "Database \"${ORACLE_SID}\" warm started."
else
    echo ""
    echo "Database \"${ORACLE_SID}\" NOT started."
fi
exit
---TEMPLATE. \oracle\startNET
#!/bin/sh
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# Start the network services for ORACLE
lsnrctl start O_R_A_C_L_E_S_I_D
exit
---TEMPLATE: \oracle\stopCTX
#!/bin/sh
# Stop the context servers.
ctxctl <<EOF
stop all
exit
EOF
---TEMPLATE: \oracle\stopDB
#!/bin/sh
# Stops the ispeed database instance (using immediate option).
ORACLE_SID="O_R_A_C_L_E_S_I_D"
ORAENV_ASK="NO"
echo "Shutting the \"${ORACLE_SID}\" instance . . . "
. oraenv
svmgrl << EOF
connect internal
shutdown immediate
exit
EOF
if test $? −eq 0 ; then
    echo ""
    echo "Database \"$(ORACLE_SID)\" shutdown comple."
else
    echo ""
    echo "Database \"$(ORACLE_SID)\" shutdown FAILED."
fi
exit
---TEMPLATE: \oracle\stopNET
#!/bin/sh
# Stop the network services for ORACLE
lsnrctl stop O_R_A_C_L_E_S_I_D
exit
---TEMPLATE: \oracle\tnsnames.ora

# Installation Generated Net8 Configuration
# Version Date: Oct-27-97
# Filename: Tnsnames.ora

extproc_connection_data =
    (DESCRIPTION =
        (ADDRESS = (PROTOCOL = IPC) (KEY = O_R_A C_L_E_S_I_D))
        (CONNECT_DATA = (SID = extproc))
    )
O_R_A_C_L_E_S_I_D =
    (DESCRIPTION =
        (ADDRESS = (PROTOCOL= TCP) (Host= h_o_s_t_n_a_m_e.d_o_m_a_i_n) (Port= T_N_S_P_O_R_T))
        (CONNECT_DATA = (SID = O_R_A_C_L_E_S_I_D))
    )
O_R_A_C_L_E_S_I_D_SEQ =
    (DESCRIPTION =
        (ADDRESS =   (PROTOCOL = BEQ) (PROGRAM = O_R_A_C_L_E_H_O_M_E)
                     (argv0 = oracleO_R_A_C_L_E_S_I_D)
                     (args = '(DESCRIPTION = (LOCAL=YES) (ADDRESS= (PROTOCOL=SEQ)))')
                     (envs = 'ORACLE_HOME=${O_R_A_C_L_E_H_O_M_E},ORACLE_SID=O_R_A_C_L_E_S_I_D')
    )
)
-DIRECTORY: templates\vignette\
---TEMPLATE: \vignette\admin
#!/bin/sh
export ORACLE_HOME RCNAME PKGINST
ORACLE_HOME=O_R_A_C_L_E_H_O_M_E
PKGINST="-R / VGNStSrv"
RCNAME=StoryServer4
ADMIN_FILE=O_R_A_C_L_E_V_G_N_B_A_S_E/StoryServer/R4.2/bin/solaris/ssde
CONFIG_PATH=O_R_A_C_L_E_V_G_N_B_A_S_E/StoryServer/R4.2/conf/H_O_S_T_N_A_M_E-A_P_A_C_H_E_B
_A_S_E01-1
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
echo "Copyright (c) 1996–1998 by Vignette Corporation. All Rights Reserved."
if [ $# -lt 1 ] ; then
    echo "
    Usage: $0
           (reset | start | status | stop | verify | updatepe | update_pmcfg)
"
    exit 1
fi
# Assume it fails
RESULTS=1
if [ -f $ADMIN_FILE -a -x $ADMIN_FILE ] ; then
    # Invoke the script with the config info (-c) and the action (-a)
    $ADMIN_FILE -c $CONFIG_PATH -a $1 -L
O_R_A_C_L_E_V_G_N_B_A_S_E/StoryServer/R4.2/lib/solaris
    RESULTS=$?
fi
exit $RESULTS
--TEMPLATE: \vignette\delivery.tcl
set _CacheManagers(all) { }
set _CacheManagers(live) { }
set _CacheManagers(development) { }
set _CacheManagers(all) [concat $_CacheManagers(all)
"H_O_S_T_N_A_M_E.D_O_M_A_I_N:A_P_A_C_H_E_B_A_S_E06"] ;#
H_O_S_T_N_A_M_E-A_P_A_C_H_E_B_A_S_E01-1
set _CacheManagers(development) [concat $_CacheManagers(development)
"H_O_S_T_N_A_M_E.D_O_M_A_I_N:A_P_A_C_H_E_B_A_S_E06"] ;#
H_O_S_T_N_A_M_E-A_P_A_C_H_E_B_A_S_E01-1
---TEMPLATE: \vignette\pm.cfg
INSTALLATION IDENTIFICATION
set SITE_INSTALL_HOST      H_O_S_T_N_A_M_E
set SITE_INSTALL_PATE      O_R_A_C_L_E_V_G_N_B_A_S_E/StoryServer/R4.2
set SITE_INSTALL_NAME      H_O_S_T_N_A_M_E:O_R_A_C_L_E_V_G_N_B_A_S_E/StoryServer/R4.2
set BIN_DIRECTORY          O_R_A_C_L_E_V_G_N_B_A_S_E/StoryServer/R4.2/bin/solaris
set SS_VERSION             4.2
CONTENT MANAGEMENT SERVER SETTINGS
set PM_HOST                H_O_S_T_N_A_M_E.D_O_M_A_I_N
set PM_PORT                A_P_A_C_H_E_B_A_S_E10
# Controls the behavior of Content Management Server's error logging
# Level 1 & 2 errors (major) go to syslog (/var/adm/StoryServer.*) and to the log file.
# Level 3 & 4 errors (warnings & info) go only to the log file.
set PM_LOG_FILE
O_R_A_C_L_E_V_G_N_B_A_S_E/StoryServer/R4.2/conf/Production/pm.log
set PM_LOG_LEVEL     2
set MAX_LOG_SIZE     500000
# This controls how big histories for projects and content
# can be. Remember, if you change this, you have to restart
# the production engine.
set MAX_HISTORY_SIZE     50
# Controls behavior of TED's error logging
# Level 1 & 2 errors go to syslog, level 3 & 4 errors go to the log file
set TED_LOG_FILE
O_R_A_C_L_E_V_G_N_B_A_S_E/StoryServer/R4.2/conf/Production/ted.log
set TED_LOG_LEVEL     2
# When TED spawns subprocesses to run program tasks, it waits this many secs
# between subprocess status checks
set TED_SUBPROCESS_POLL_INTERVAL 5
# TED runs program task subprocesses as this user
set TED_SUBPROCESS_USERNAME    nobody
# This is where TED expects the program task executables to be; it actually
# prepends this path to argv[0] of the program task's invocation pattern
set TED_TASK_BIN_DIR
O_R_A_C_L_E_V_G_N_B_A_S_E/StoryServer/R4.2/taskbin/solaris
# Controls behavior of VHS's error logging
# Level 1 & 2 errors go to syslog, level 3 & 4 errors go to the log file
set VHS_LOG_FILE
O_R_A_C_L_E_V_G_N_B_A_S_E/StoryServer/R4.2/conf/Production/vhs.log
set VHS_LOG_LEVEL    2
# Size of VHS's process pool. Must be at least two.
set VHS_POOL_SIZE    9
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# VHS's prototype doctree root, where it builds, incrementally, a prototype
# static content doc tree that mirrors the target webserver(s) static content
# doc tree(s)
set VHS_PROTO_DOCROOT
O_R_A_C_L_E_V_G_N_B_A_S_E/StoryServer/R4.2/conf/Production/VhsProtoDocRoot
# VHS's template zip file root where the zip files and their revisions
# for Visual Templates are stored
set VHS_TEMPLATE_ZIP_DIR
O_R_A_C_L_E_V_G_N_B_A_S_E/StoryServer/R4.2/conf/Production/VgnTemplateZipFiles
DATABASE SERVER SETTINGS
set TEXTSIZE              131072
set ORACLE_HOME                   O_R_A_C_L_E_H_O_M_E
set ORACLE_VERSION   Oracle8
set DB_CLIENT             dbconnect
set vdbmsg(rwdblib) librwora_mt.so
set SYSTEM_DB_TYPE           Oracle
set SYSTEM_DB_SERVER     O_R_A_C_L_E_S_I_D
set SYSTEM_DB_DATABASE    ""
set SYSTEM_DB_SID  O_R_A_C_L_E_S_I_D
set SYSTEM_DB_USERNAME    vignette
set SYSTEM_DB_PASSWORD    2z:u8I0jM6WRHAYP
set SYSTEM_DB_PASSWORD_ENCRYPTED yes
set SYSTEM_DB_RWDBLIB         librwora_mt.so
set SYS_DBENV                  O_R_A_C_L_E_H_O_M_E
set SYS_DBPATH                 O_R_A_C_L_E_H_O_M_E
set SYS_DBSCHEXT    ora
set VHS_PORT                   V_H_S_P_O_R_T
---TEMPLATE: \vignette\Prod_admin
#!/bin/sh
export LD_LIBRARY_PATH ORACLE_HOME   PKGINST
LD_LIBRARY_PATH=O_R_A_C_L_E_V_G_N_B_A_S_E/StoryServer/R4.2/lib/solaris
ORACLE_HOME=O_R_A_C_L_E_H_O_M_E
PKGINST="-R / VGNStSrv"
RCNAME=StoryServer3
ADMIN_FILE=O_R_A_C_L_E_V_G_N_B_A_S_E/StoryServer/R4.2/bin/solaris/sspm
if [ $# -lt 1 ] ; then
    echo "
    Usage: $0 (start | status | stop)
    "
    exit 0
fi
# Assume it fails
RESULTS= 1
if [ -f $ADMIN_FILE -a -x $ADMIN_FILE ] ; then
    # Invoke the script with the config info (-c) and the action (-a)
    $ADMIN_FILE $1
    RESULTS=$?
fi
exit $RESULTS
---TEMPLATE: \vignette\S97StoryServer4
#!/bin/sh
export ORACLE_HOME   RCNAME PKGINST
ORACLE_HOME=O_R_A_C_L_E_H_O_M_E
PKGINST="-R / VGNStSrv"
RCNAME=StoryServer4
ADMIN_FILE=O_R_A_C_L_E_V_G_N_B_A_S_E/StoryServer/R4.2/bin/solaris/ssde
CONFIG_PATH=O_R_A_C_L_E_V_G_N_B_A_S_E/StoryServer/R4.2/conf/H_O_S_T_N_A_M_E-A_P_A_C_H_E_B_A_S_E01-1
echo "Copyright (c) 1996–1998 by Vignette Corporation. All Rights Reserved."
if [ $# -lt 1 ] ; then
    echo "
    Usage: $0
            (reset | start | status | stop | verify | updatepe | update_pmcfg)
    "
    exit 1
fi
# Assume it fails
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```sh
RESULTS=1
if [ -f $ADMIN_FILE -a -x $ADMIN_FILE ] ; then
    # Invoke the script with the config info (-c) and the action (-a)
    $ADMIN_FILE -c $CONFIG_PATH -a $1 -L
O_R_A_C_L_E_V_G_N_B_A_S_E/StoryServer/R4.2/lib/solaris
    RESULTS=$?
fi
exit $RESULTS
---TEMPLATE: \vignette\S97StoryServer5
#!/bin/sh
export ORACLE_HOME  RCNAME PKGINST
ORACLE_HOME=O_R_A_C_L_E_H_O_M_E
PKGINST="-R / VGNStSrv"
RCNAME=StoryServer5
ADMIN_FILE=O_R_A_C_L_E_V_G_N_B_A_S_E/StoryServer/R4.2/bin/solaris/ssde
CONFIG_PATH=O_R_A_C_L_E_V_G_N_B_A_S_E/StoryServer/R4.2/conf/H_O_S_T_N_A_M_E-A_P_A_C_H_E_B
_A_S_E01-1
echo "Copyright (c) 1996–1998 by Vignette Corporation. All Rights Reserved."
if [ $ -lt 1 ] ; then
    echo "
    Usage: $0
            (reset | start | status | stop | verify | update_pmcfg)
"
    exit 1
fi
# Assume it fails
RESULTS= 1
if [ -f $ADMIN_FILE -a -x $ADMIN_FILE ] ; then
    # Invoke the script with the config info (-c) and the action (-a)
    $ADMIN_FILE -c $CONFIG_PATH -a $1 -L
O_R_A_C_L_E_V_G_N_B_A_S_E/StoryServer/R4.2/lib/solaris
    RESULTS=$?
fi
exit $RESULTS
---TEMPLATE: \vignette\startCASVIGN
#!/bin/sh
#Filename: startCASVIGN

export ORACLE_HOME  RCNAME PKGINST
ORACLE_HOME=O_R_A_C_L_E_H_O_M_E
PKGINST="-R / VGNStSrv"
RCNAME=StoryServer4
ADMIN_FILE=O_R_A_C_L_E_V_G_N_B_A_S_E/StoryServer/R4.2/bin/solaris/ssde
CONFIG_PATH=O_R_A_C_L_E_V_G_N_B_A_S_E/StoryServer/R4.2/conf/H_O_S_T_N_A_M_E-A_P_A_C_H_E_B
_A_S_E01-1
# Assume it fails
RESULTS=1
echo "Starting vignette CAS . . . "
if [ -f $ADMIN_FILE -a -x $ADMIN_FILE ] ; then
    # Invoke the script with the config info (-c) and the action (-a)
    $ADMIN_FILE -c $CONFIG_PATH -a start -L
O_R_A_C_L_E_V_G_N_B_A_S_E/StoryServer/R4.2/lib/solaris
    RESULTS=$?
fi
echo "Starting vignette CAS . . . Done."
exit $RESULTS
---TEMPLATE: \vignette\startCMSVIGN
#!/bin/sh
#filename: startCMSVIGN
export LD_LIBRARY_PATH ORACLE_HOME  PKGINST
LD_LIBRARY_PATH=O_R_A_C_L_E_V_G_N_B_A_S_E/StoryServer/R4.2/lib/solaris
ORACLE_HOME=O_R_A_C_L_E_H_O_M_E
PKGINST="-R / VGNStSrv"
RCNAME=StoryServer1
ADMIN_FILE=O_R_A_C_L_E_V_G_N_B_A_S_E/StoryServer/R4.2/bin/solaris/sspm
# Assume it fails
RESULTS=1
echo "Starting vignette CMS . . ."
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
if [ -f $ADMIN_FILE -a -x $ADMIN_FILE ] ; then
    # Invoke the script with the config info (-c) and the action (-a)
    $ADMIN_FILE start
    RESULTS=$?
fi
echo "Starting vignette CMS . . . Done."
exit $RESULTS
---TEMPLATE: \vignette\startVignette
#!/bin/ksh
# Filename: startVignette
O_R_A_C_L_E_V_G_N_B_A_S_E/StoryServer/R4.2/bin/solaris/startCMSVIGN
O_R_A_C_L_E_V_G_N_B_A_S_E/StoryServer/R4.2/bin/solaris/startCASVIGN
exit
---TEMPLATE: \vignette\stopCASVIGN
#!/bin/sh
# Filename: stopCASVIGN
export ORACLE_HOME  RCNAME PKGINST
ORACLE_HOME=O_R_A_C_L_E_H_O_M_E
PKGINST="-R / VGNStSrv"
RCNAME=StoryServer4
ADMIN_FILE=O_R_A_C_L_E_V_G_N_B_A_S_E/StoryServer/R4.2/bin/solaris/ssde
CONFIG_PATH=O_R_A_C_L_E_V_G_N_B_A_S_E/StoryServer/R4.2/conf/H_O_S_T_N_A_M_E-A_P_A_C_H_E_B
_A_S_E01-1
# Assume it fails
RESULTS=1
echo "Stopping vignette CAS . . . "
if [ -f $ADMIN_FILE -a -x $ADMIN_FILE ] ; then
    # Invoke the script with the config info (-c) and the action (-a)
    $ADMIN_FILE -c $CONFIG_PATH -a stop -L
O_R_A_C_L_E_V_G_N_B_A_S_E/StoryServer/R4.2/lib/solaris
    RESULTS=$?
fi
echo "Stopping vignette CAS . . . Done."
exit $RESULTS
---TEMPLATE: \vignette\stopCMSVIGN
#!/bin/sh
# Filename:   stopCMSVIGN
export LD_LIBRARY_PATH ORACLE_HOME PKGINST
LD_LIBRARY_PATH=O_R_A_C_L_E_V_G_N_B_A_S_E/StoryServer/R4.2/lib/solaris
ORACLE_HOME=O_R_A_C_L_E_H_O_M_E
PKGINST="-R / VGNStSrv"
RCNAME=StoryServer1
ADMIN_FILE=O_R_A_C_L_E_V_G_N_B_A_S_E/StoryServer/R4.2/bin/solaris/sspm
# Assume it fails
RESULTS=1
echo "Stopping the vignette CMS . . . "
if [ -f $ADMIN_FILE -a -x $ADMIN_FILE ] ; then
    # Invoke the script with the config info (-c) and the action (-a)
    $ADMIN_FILE stop
    RESULTS=$?
fi
echo "Stopping the vignette CMS . . . Done."
exit $RESULTS
---TEMPLATE: \vignette\stopVignette
#!/bin/ksh
# Filename:   stopVignette
O_R_A_C_L_E_V_G_N_B_A_S_E/StoryServer/R4.2/bin/solaris/stopCASVIGN
O_R_A_C_L_E_V_G_N_B_A_S_E/StoryServer/R4.2/bin/solaris/stopCMSVIGN
exit
---TEMPLATE: \vignette\StoryServer.cfg
# Configuration created on Fri Jul 16 12:51:52 EDT 1999
# Filename: StoryServer.cfg
CONFIGURATION IDENTIFICATION
set INSTALL_NAME    H_O_S_T_N_A_M_E:O_R_A_C_L_E_V_G_N_B_A_S_E/StoryServer/R4.2
set CONFIG_NAME     H_O_S_T_N_A_M_E-A_P_A_C_H_E_B_A_S_E01-1
set CONFIG_TYPE     Development
CACHE MANAGER SETTINGS
# How to flush the document cache (valid values: RENAME or DELETE)
set CMD_ACTION      RENAME
# Cache Manager hostname
set CMD_HOST        H_O_S_T_N_A_M_E.D_O_M_A_I_N
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# Cache Manager port
set CMD_PORT          A_P_A_C_H_E_B_A_S_E06
# Size of Cache Manager Thread pool. Must be at least two.
set CMD_POOL_SIZE         5
# Seconds allowed for other daemons to tell the Cache Manager what to do
set CMD_TIMEOUT           5
# The user the Cache Manager runs as (normally, matches owner of the
# docroot; must have read, write and execute permissions on the docroot to
# create directories and to rename or delete cached files)
set CMD_WHOAMI            nobody
# Controls whether the cache manager treats template paths that end in
# a legal mime type extension, as files or directories. The default is to
# treat all template paths as directories unless they end in '.html'
set CMD_MIMETYPE_EXT   0
# Controls behavior of cmd error logging
# Level 1 & 2 errors go to syslog, level 3 & 4 errors go to the log file
set CMD_LOG_FILE
O_R_A_C_L_E_V_G_N_B_A_S_E/StoryServer/R4.2/conf/H_O_S_T_N_A_M_E-A_P_A_C_H_E_B_A_S_E01-1/c
md.log
set CMD_LOG_LEVEL         2
PAGE GENERATOR SETTINGS
# Whether to allow [ ] in data posted to a template; should be disabled
# to avoid a security risk.
# no removes [ ] yes allows then
set CTLD_ALLOW_BRACES  no
# Seconds allowed for template evaluation
set CTLD_EVAL_TIMEOUT   20
# Page Generator hostname
set CTLD_HOST             H_O_S_T_N_A_M_E.D_O_M_A_I_N
# Size of page generator process pool.  Must be at least two.
set CTLD_POOL_SIZE        8
# Controls behavior of ctld error logging
# Level 1 & 2 errors go to syslog, level 3 & 4 errors go to the log file
set CTLD_INFO_FILE
O_R_A_C_L_E_V_G_N_B_A_S_E/StoryServer/R4.2/conf/H_O_S_T_N_A_M_E-A_P_A_C_H_E_B_A_S_E01-1/c
tldinfo.log
set CTLD_LOG_LEVEL        2
# File used by the StoryServer Tcl LOG command.
# Because there will be multiple page generators in the slave pool,
# a process pool sequence number is automatically appended to file name.
# This sequence number has a minimum value of 1 and the maximum value is
# equal to the value of the CTLD_POOL_SIZE variable (defaults to 8) in this file.
set CTLD_LOG_FILE
O_R_A_C_L_E_V_G_N_B_A_S_E/StoryServer/R4.2/conf/H_O_S_T_N_A_M_E-A_P_A_C_H_E_B_A_S_E01-1/c
tld.log
# Page Generator port
set CTLD_PORT             A_P_A_C_H_E_B_A_S_E07
# The user the Page Generator runs as; only writes in the
# H_O_S_T_N_A_M_E-A_P_A_C_H_E_B_A_S_E01 directory
set CTLD_WHOAMI           nobody
# Locale specification. If set to 1, the page generator will heed the browser's
# locale setting. If set to 0 (the default), the page generator ignores the
# browser's locale and uses the locale set by CTLD_DEFAULT_LOCALE.
set CTLD_USE_LOCALE       0
# Default locale specification. Use this locale as the StoryServer's default locale
# if CTLD_USE_LOCALE is 0. If CTLD_USE_LOCALE is 1, then the web browser's specified
# language is used if it exists on the StoryServer system. If the locale does not
# exist, then use this as the default.
set CTLD_DEFAULT_LOCALE   "en"
# The prefix used by the COMPONENT tcl command. This setting must match
# the ccPrefix variable in the obj.conf file (nsapi only).
set COMPONENT_PREFIX      /component
# The ServerSideFunction prefix
set SSF_PREFIX            /ServerSideFunction
TEMPLATE MANAGER SETTINGS
# Template Manager hostname
set TMD_HOST              H_O_S_T_N_A_M_E.D_O_M_A_I_N
# Template Manager port
set TMD_PORT              A_P_A_C_H_E_B_A_S_E05
# If greater than zero, seconds between automatic refreshes of template cache.
set TMD_SLEEP             -1
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# The user the Template Manager runs as; only writes in the
# H_O_S_T_N_A_M_E-A_P_A_C_H_E_B_A_S_E01 directory
set TMD_WHOAMI              nobody
# Whether to make private templates available in this configuration.
# 0 keeps private templates hidden; 1 makes them available
set TMD_XRAY                1
# Controls behavior of tmd error/debug logging
# Level 1 & 2 errors go to syslog, level 3 & 4 errors go to the log file
set TMD_LOG_FILE
O_R_A_C_L_E_V_G_N_B_A_S_E/StoryServer/R4.2/conf/H_O_S_T_N_A_M_E-A_P_A_C_H_E_B_A_S_E01-1/t
md.log
set TMD_LOG_LEVEL           2
PLACEMENT MANAGER SETTINGS
# Placement Manager hostname
set PAD_HOST                H_O_S_T_N_A_M_E.D_O_M_A_I_N
# Placement Manager port
set PAD_PORT                A_P_A_C_H_E_B_A_S_E09
# The user the Placement Manager runs as (normally, matches owner of the
# docroot; must have read, write and execute permissions on the docroot to
# create directories and to rename or delete cached files)
set PAD_WMOANI              nobody
# Controls the behavior of pad error logging
# Level 1 & 2 errors go to syslog, level 3 & 4 errors go to the log file
set PAD_LOG_FILE
O_R_A_C_L_E_V_G_N_B_A_S_E/StoryServer/R4.2/conf/H_O_S_T_N_A_M_E-A_P_A_C_H_E_B_A_S_E01-1/p
ad.log
set PAD_LOG_LEVEL           2
# PAD uses this subdir to store it's work files
set PAD_WORK_DIR
O_R_A_C_L_E_V_G_N_B_A_S_E/StoryServer/R4.2/conf/H_O_S_T_N_A_M_E-A_P_A_C_H_E_B_A_S_E01-1/P
adWorkDir
# PAD uses this subdir as the archival repository
set PAD_ARCHIVE_DIR
O_R_A_C_L_E_V_G_N_B_A_S_E/StoryServer/R4.2/conf/H_O_S_T_N_A_M_E-A_P_A_C_H_E_B_A_S_E01-1/P
adArchiveDir
# Size of Placement Manager's process pool. Must be at least two.
set PAD_POOL_SIZE           8
OBSERVATION MANAGER SETTINGS
# Determines whether or not an Observation Manager (OM)
# daemon is run with this Application Server.
# 0 This Application Server does not perform StoryServer Personalization
# 1 This Application Server has an Observation Manager (OM)
# 2 This Application Server uses an Observation Manager (OM) on another Content
Application Server
set PZND_RUN_DAEMON   0
# Observation Manager (OM) hostname
set PZND_HOST               ""
# Personalization Placement Manager port
set PZND_PORT               ""
# The user the Personalization Observation Manager runs as
set PZND_WHOAMI             nobody
# Controls the behavior of PZND error logging
# Level 1 & 2 errors go to syslog, level 3 & 4 errors go to the log file
set PZND_LOG_FILE
O_R_A_C_L_E_V_G_N_B_A_S_E/StoryServer/R4.2/conf/H_O_S_T_N_A_M_E-A_P_A_C_H_E_B_A_S_E01-1/p
znd.log
set PZND_LOG_LEVEL          2
# The frequency at which pznd flushes the PROFILE_MARK queue to the db (seconds)
set PZND_UPDATE_FREQ        2
# The maximum allowed size of the PROFILE_MARK queue in the plugin and pznd.
set PZN_PMARK_QUEUE_MAX     5000
# The maximum size of the pznd visitor cache
set PZND_CACHE_SIZE         5000
# The cache expiration period of visitor records in pznd (seconds). The actual time
# visitor records remain cached is between N and N times 2.
set PZND_CACHE_DURATION     300
# The column names in vgn_ur the pznd will read and serve to the httpd plugin
# for personalization purposes.
set PZND_VR_COLUMNS "userid,lname,fname,email,city,state,zip,country"
# The size of the thread pool for the Observation Manager
set PZND_THREAD_POOL_SIZE   10
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
##GroupLens Integration
set GL_HOST           ""
set GL_PORT           ""
SYSTEM DATABASE SETTINGS
set STORYSERVER_PMCFG
O_R_A_C_L_E_V_G_N_B_A_S_E/StoryServer/R4.2/conf/Production/pm.cfg
source $STORYSERVER_PMCFG
CONTENT DATABASE SETTINGS
set ORACLE_HOME               O_R_A_C_L_E_H_O_M_E
set DB_CLIENT                 dbconnect
set vdbmsg(rwdblib) librwora_mt.so
set CONTENT_DB_TYPE           Oracle
set CONTENT_DB_SERVER         O_R_A_C_L_E_S_I_D
set CONTENT_DB_DATABASE       ""
set CONTENT_DB_SID            O_R_A_C_L_E_S_I_D
set CONTENT_DB_USERNAME       vignette
set CONTENT_DB_PASSWORD       2oOux0GnkUlSWbbK
set vdomsg(password_encrypted)    yes
set CONTENT_DB_RWDBLIB        librwora_mt.so
WEB SERVER SETTINGS
set DOCROOT                   O_R_A_C_L_E_V_G_N_B_A_S_E/cas-docs
set METAFILE_CACHE
O_R_A_C_L_E_V_G_N_B_A_S_E/StoryServer/R4.2/conf/H_O_S_T_N_A_M_E-P_O_R_T_A_P_A_C_H_E-1/met
afiles
set HTTPD_CFG_FILE            httpd.conf
set HTTPD_CFG_PATH            O_R_A_C_L_E_A_P_B_A_S_E/apache_1.3.3/conf
set HTTPD_CFG_TYPE            Apache
set HTTPD_HOST                H_O_S_T_N_A_M_E.D_O_M_A_I_N
set HTTPD_PORT                P_O_R_T_A_P_A_C_H_E
set HTTPD_TYPE                Apache
set HTTPD_COMPONENTSCAN       1
# Front Door Curl Setting
#set HTTPD_FDCURL         "your frontdoor"
# Plugin log file
set HTTPD_PLUGIN_LOG_FILE
O_R_A_C_L_E_V_G_N_B_A_S_E/StoryServer/R4.2/conf/H_O_S_T_N_A_M_E-A_P_A_C_H_E_B_A_S_E01-1p
lugin.log
# Plugin log level.
set HTTPD_PLUGIN_LOG_LEVEL            2
# Controls whether plugin generated log files have the pid appended to the file name.
# Set to 1 for Netscape, 2 and Apache 1.2, and set to 0 for others.
set HTTPD_LOG_BY_PID         1
# PERSONALIZATION AND WEB SERVER PLUGIN SETTINGS
Server-side function library and the list of server functions that are
to be made available to the plugin. VGN_CSFLIB can be an additional
library.
set VGN_SFLIB
"apache_pzn133.so,update_ucs,component_pzn,curl_pzn,personalize,pznStats,cache_delete"
set VGN_CSFLIB                    ""
The personalization function library and the list of personalization
functions that are to be made available to the plugin. VGN_CPZNLIB
can be an additional library.
set VGN_PZNLIB
"libPfuncs.so,maxmarks,minmarks,connectioninfo.visitorinfo,topNvisits,cookieinfo"
set VGN_CPZNLIB                   ""
Should HTTP Connection information be sent to personalization functions?
set PZN_HTTPD_SEND_CONNECTIONINFO    0
# The cache expiration period of visitor records in the httpd. The actual time
# visitor records remain cached is between N and N times 2.
set PZN_HTTPD_CACHE_DURATION         300
# Maximum size of plugin visitor record cache (# visitor records)
set PZN_HTTPD_CACHE_SIZE             5000
# Maximum number of plugin/pznd connections
set PZN_HTTPD_CONNECTION_POOL_MAX    10
# Minimum number of plugin/pznd connections
set PZN_HTTPD_CONNECTION_POOL_MIN    5
# Max seconds httpd plugin will wait for response from pznd
set PZN_HTTPD_PZND_REQUEST_TIMEOUT   10
# For apache both PZN_HTTPD_CONNECTION_POOL_MAX and PZN_HTTPD_CONNECTION_POOL_MIN
# should be set to 1.
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# How often plugin will send PROFILE_MARK queue to pznd. (Seconds).
set PZN_HTTPD_UPDATE_FREQ              2
# Name of Personalization cookie, used for tracking visitors either in a cookie
# or in url stuffing.
set PZN_COOKIE_NAME                    ssuid
# Perform visitor tracking via cookie? (1/0) (1 = yes, 0 = no)
set PZN_COOKIE_TRACKING                1
# Perform automatic visitor tracking with a cookie? (1/0) Note that enabling this
# will force a visitor registry entry for every web site visitor.
set PZN_AUTO_COOKIE_TRACKING           1
# Perform visitor tracking via url stuffing? (1/0)
# Note that if you change this setting, you must flush all the cached pages in
# your docroot that contain CURL or COMPONENT in order for the change to take effect.
set PZN_URL_TRACKING                   0
# Perform automatic visitor tracking with url stuffing? (1/0) Note that enabling this
# will force a visitor registry entry for every web site visitor.
set PZN_AUTO_URL_TRACKING              0
# Personalization Cookie Path. This path is used in the Set-Cookie header
# when visitor id cookies (PZN_COOKIE_NAME) are set (if
# PZN_AUTO_COOKIE_TRACKING is enabled). This path is also used to
# determine when to set the the cookie, i.e. if the url being requested
# matches PZN_COOKIE_PATH.
set PZN_COOKIE_PATH                    "/"
# Personalization Variable Information. Change this variable to change the default
settings
# for the cookies used in Personalization.
set PZN_COOKIE_VARS                    " expires=Saturday, 06-Sep-2014 23:50:08 GMT"
# URL Tracking Exclusion. This is a "|" delimited list to exclude particular paths
# from using URL Tracking for Personalization.
set PZN_URL_TRACKING_EXCLUDE    "/vgn/"
# The Profile Marker Log file. Profile marker information can be
# recorded in pmark.log. The Date, Time, VisitorId, URI, Category, and
# Keyword of every page view containing Profile Markers can be
# recorded.

# The following *PMARK* variables govern the ways in which information
# can be recorded. A facility is provided so that logs can be
# automatically accumulated by month. Each month a new pmark.log file
# will be created named pmark.log.nn where nn represents the month.
# Alternatively the traditional StoryServer MAX_LOG_SIZE rollover to
# .bak mechanism is also provided. Due to the potential size of this
# file(s), this logging is turned off by default,
# i.e., PZN_PMARK_LOG_MAX is set to 0. To enable Profile Marker
# logging, set PZN_PMARK_LOG_MAX to either –1 for unlimited size (in
# which case you should use the SUFFIX mechanism) or some reasonable
# maximum size.
# The file to record Profile Marker information.
# This file name is also affected by HTTPD_LOG_BY_PID. If HTTPD_LOG_BY_PID is set
# to 1, the process id is appended to this filename.
set PZN_PMARK_LOG_FILE
O_R_A_C_L_E_V_G_N_B_A_S_E/StoryServer/R4.2/conf/H_O_S_T_N_A_M_E-A_P_A_C_H_E_B_A_S_E01-1/p
mark.log
# strftime(3C) format to append to PZN_PMARK_LOG_FILE file name. Suffix of ".%m"
# will append the current month to the name of the log file, aggregating stats by
# month. When the evaluation of the SUFFIX changes, a new file is created.
# Over a period of months you end up with pmark.log.01, pmark.log.02 etc.
# %m month, %Y year, %d day in month
set PZN_PMARK_LOG_FILE_SUFFIX          ".%m"
# Max size of log file. 0 disables writing to thig log. –1 for unlimited size.
set PZN_PMARK_LOG_MAX                  0
# Field separator. Fields in pmark.log are separated by this string.
set PZN_PMARK_LOG_FSEP                 " "
# The time will be recorded in pmark.log using this strftime(3C) time format.
# %H hour, %M minute
set PZN_PMARK_LOG_TFMT                 "%H%M"
# The date will be recorded in pmark.log using this strftime(3C) date format.
# %m month, %Y year, %d day in month
set PZN_PMARK_LOG_DFMT                 "%Y%m%d"
# The fields to be written to the log. Use the 1st letter of each of the
# following field names to record those fields in pmark.log. A setting
# of "DTVUCK" will record the Date, Time, VisitorId, URI, Category, and
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
# Keyword in pmark.log.
set PZN_PMARK_LOG_FIELDS            "DTVUCK"
# These variables control whether template performance measurement is
# enabled. By default, template performance measurement is enabled.
# To disable, set VGN_TIMETABLE to 'false'. To limit the size of the
# template performance measurement cache use the variable VGN_TMTSIZE.
# The maximum number of templates that will remain in the cache is 1000
# and the default value for VGN_TMTSIZE is 100. The variable VGN_TMTPATH
# must be set and match the path prefix for your performance reports.
# When a template with a path prefix matching VGN_TMTPATH is executed, a
# variable name _PerfData is created that holds execution statistics for
# all of the templates that have executed since the last reset. See the
# templates that are delivered in /vgn/performance/TMT/ for a description
# of the data that is maintained.
#set VGN_TMTENABLE false
set VGN_TMTSIZE 100
set VGN_TMTPATH /vgn/performance/TMT
set  UPG_UPGRADE_STATE   R42
COMMUNICATION SETTINGS FOR StoryServer - Do not modify
set CMDS               { { H_O_S_T_N_A_M_E.D_O_M_A_I_N_A_P_A_C_H_E_B_A_S_E06 } }
set DB_DOWN_FILE       O_R_A_C_L_E_V_G_N_B_A_S_E/StoryServer/R4.2/conf/dbdown
set RWDBLIB            librwora_mt.so
set TEMPLATE_CACHE
O_R_A_C_L_E_V_G_N_B_A_S_E/StoryServer/R4.2/conf/H_O_S_T_N_A_M_E-A_P_A_C_H_E_B_A_S_E01-1/t
emplates
Include external Tcl files or DLOAD other API modules here
if { [info exists _Process] && $_Process == "ctld" } {
    source O_R_A_C_L_E_V_G_N_B_A_S_E/StoryServer/R4.2/conf/delivery.tcl
    DLOAD libBOBTclClient.so InitBobClient
}
set ONLINE_DOCS
"http://H_O_S_T_N_A_M_E.D_O_M_A_I_N:A_P_A_C_H_E_B_A_S_E01/StoryServer/docs/index.html"
-DIRECTORY: templates\web\
---TEMPLATE: \web\adapter.app
[ADAPTER.Services]
Redirect=O_R_A_C_L_E_O_A_S_P_R_O_D_B_A_S_E/ows/4.0/lib/ndwrd.so,ndwrdgi_global_init
Ior=O_R_A_C_L_E_O_A_S_P_R_O_D_B_A_S_E/ows/4.0/lib/wrior.so,wriorGlobalInit
Dispatcher=O_R_A_C_L_E_O_A_S_P_R_O_D_B_A_S_E/ows/4.0/lib/libwrl.so,wrdDynamicInit
Logger=O_R_A_C_L_E_O_A_S_P_R_O_D_B_A_S_E/ows/4.0/lib/libndwzo.so,ndwzs_DynamicInit
;
[ADAPTER.Spyglass]
Services=Ior,Redirect,Dispatcher,Logger
;
[ADAPTER.Netscape]
Services=Ior,Dispatcher,Logger
;
[ADAPTER.Apache]
Services=Dispatcher,Logger
---TEMPLATE: \web\owl.cfg

(
ListenerName=admin
(
PortNumber=O_A_S_B_A_S_E18
(
HostName=H_O_S_T_N_A_M_E
)
(
HostAddress=ANY
)
(
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_
E/admin/
)
)

(
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
ListenerName=www
(
PortNumber=O_A_S_B_A_S_E11
(
HostName=H_O_S_T_N_A_M_E
)
(
HostAddress=ANY
)
(
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_E/www/
)
)

(
ListenerName=mstage
(
PortNumber=O_A_S_B_A_S_E20
(
HostName=H_O_S_T_N_A_M_E.us.oracle.com
)
(
HostAddress=ANY
)
(
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_E/mstage/
)
)

(
ListenerName=cstage
(
PortNumber=O_A_S_B_A_S_E21
(
HostName=H_O_S_T_N_A_M_E.D_O_M_A_I_N
)
(
HostAddress=ANY
)
(
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_E/cstage/
)
)

(
ListenerName=ots
(
PortNumber=O_A_S_B_A_S_E23
(
HostName=H_O_S_T_N_A_M_E.D_O_M_A_I_N
)
(
HostAddress=ANY
)
(
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_E/ots/
)
)

(
ListenerName=cdeply
(
PortNumber=O_A_S_B_A_S_E22
(
HostName=H_O_S_T_N_A_M_E.D_O_M_A_I_N
)
(
HostAddress=ANY
)
(
PROXY=OFF
)
)
(
ServerRoot=O_R_A_C_L_E_O_A_S_B_A_S_E/admin/ows/O_A_S_S_I_T_E_N_A_M_E/httpd_H_O_S_T_N_A_M_E/cdeply/
)
)
---TEMPLATE: \web\resources.ora
ys.msgFilePath=O_R_A_C_L_E_O_A_S_P_R_O_D_B_A_S_E/orb/4.0/mesg/
ys.dlpath=O_R_A_C_L_E_O_A_S_P_R_O_D_B_A_S_E/orb/4.0/lib/
orb.bootport=O_A_S_O_R_B_B_A_B_E49
orb.boothost=H_O_S_T_N_A_M_E
orb.sec.w-location=file:O_R_A_C_L_E_O_A_S_P_R_O_D_B_A_S_E/orb/4.0/wmt
orb.sec.w-passwd=B+X1K2Z2LqVoFFglv6OqAtWs5ATxEuQA0KkstwoDzIIBwJUK1AtWMBIE
zyg.g0ip=225.231.55.74
zyg.g0port=62749
orb.spy.export-metrics=true
owsctl.spy.export-metrics=false
oasadmin.spy.export-metrics=false
ys.msgFilePath=O_R_A_C_L_E_O_A_S_P_R_O_D_B_A_S_E/ows/mesg/
oasoctl.forceinit=true
---TEMPLATE: \web\site.app
;
[root]
Components      = wrb,dispatchers,cartx,orb,ots
DisplayName     = "O_A_S_S_I_T_E_N_A_M_E Site"
InternalName    = O_A_S_S_I_T_E_N_A_M_E
ConfigURL       = /ows-abin/oasadmin?FORM_CODE=MAIN&COMPONENT=SITE
OpenGIF         = site.gif
CloseGIF        = site.gif
NodesList       = H_O_S_T_N_A_M_E
StartOrder      = orb,wrb,dispatchers,cartx ;
[O_A_S_S_I_T_E_N_A_M_E.H_O_S_T_N_A_M_E]
NodeManagerPort = O_A_S_N_O_D_E
NodeType        = Primary
InstallationType = List,Wrb,Cartx
UserName        = admin
Password        = JPPMDBLOKGHDOJMC
DomainName      = D_O_M_A_I_N ;
[O_A_S_S_I_T_E_N_A_M_E.ots]
TreeLocation    = O_A_S_S_I_T_E_N_A_M_E.wrb
JavaClass       = oracle.ots.mgmt.OtsTree ;
[O_A_S_S_I_T_E_N_A_M_E.orb]
Processes       = orbproc ;
[O_A_S_S_I_T_E_N_A_M_E.orb.orbproc]
StartCmd        = O_R_A_C_L_E_O_A_S_P_R_O_D_B_A_S_E/orb/4.0/admin/cgi/oasoctl.cgi
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
start ALL
StopCmd            = O_R_A_C_L_E_O_A_S_P_R_O_D_B_A_S_E/orb/4.0/admin/cgi/oasoctl.cgi stop
ALL
MonitorCmd         = O_R_A_C_L_E_O_A_S_P_R_O_D_B_A_S_E/orb/4.0/admin/cgi/oasoctl.cgi
monitor ALL
ReloadCmd          = O_R_A_C_L_E_O_A_S_P_R_O_D_B_A_S_E/orb/4.0/admin/cgi/oasoctl.cgi
reload ALL
;
[O_A_S_S_I_T_E_N_A_M_E.wrb]
Components         = logging,security,dad,frecovery,orb
DisplayName        = "Oracle Application Server"
InternalName       = wrb
Processes          =
wrbcfg,wrblog,wrbroker,wrbahsrv,wrbasrv,wrbrmpxy,wrksf,wrbmon,otsfacsrv
CollapseProcesses  = oassrv,wrksf,otsfacsrv
ConfigURL          = /ows-abin/oasadmin?FORM_CODE=MAIN&COMPONENT=WRB&NAME=wrb
OpenGIF            = oas.gif
CloseGIF           = oas.gif
ReloadOrder        =
wrb/wrblog,wrb/wrbahsrv,wrb/wrbasrv,wrb/wrksf,wrb/cartxSrv,wrb/wrbroker,wrb/wrbrmpxy,wrb/
wrbmon,wrb/otsfacsrv,dispatchers
;
[O_A_S_S_I_T_E_N_A_M_E.wrb.logging]
Components         = system,attribute,xlf
DisplayName        = "Logging"
ConfigURL          = /ows-abin/lgadmin?FORM_CODE=LOGGER_MAIN
OpenGIF            = folder_open.gif
CloseGIF           = folder_closed.gif
;
[O_A_S_S_I_T_E_N_A_M_E.wrb.logging.system]
DisplayName        = "System"
ConfigURL          = /ows-abin/lgadmin?FORM_CODE=LOGGER_SYS
OpenGIF            = propsheet.gif
CloseGIF           = propsheet.gif
;
[O_A_S_S_I_T_E_N_A_M_E.wrb.logging.attribute]
DisplayName        = "Attribute"
ConfigURL          = /ows-abin/lgadmin?FORM_CODE=LOGGER_ATTR
OpenGIF            = propsheet.gif
CloseGIF           = propsheet.gif
;
[O_A_S_S_I_T_E_N_A_M_E.wrb.logging.xlf]
DisplayName        = "XLF"
ConfigURL          = /ows-abin/lgadmin?FORM_CODE=LOGGER_XLF
OpenGIF            = propsheet.gif
CloseGIF           = propsheet.gif
;
[O_A_S_S_I_T_E_N_A_M_E.wrb.security]
Components         = basic,digest,ip,domain,database,crypt,certificate
DisplayName        = "Security"
ConfigURL          = /ows-abin/atadmin?FORM_CODE=AUTH_CONFIG_FORM
OpenGIF            = folder_open.gif
CloseGIF           = folder_closed.gif
;
[O_A_S_S_I_T_E_N_A_M_E.wrb.security.basic]
DisplayName        = "Basic"
ConfigURL          = /ows-abin/atadmin?FORM_CODE=AUTH_BASIC_FORM
OpenGIF            = propsheet.gif
CloseGIF           = propsheet.gif
;
[O_A_S_S_I_T_E_N_A_M_E.wrb.security.digest]
DisplayName        = "Digest"
ConfigURL          = /ows-abin/atadmin?FORM_CODE=AUTH_DIGEST_FORM
OpenGIF            = propsheet.gif
CloseGIF           = propsheet.gif
;
[O_A_S_S_I_T_E_N_A_M_E.wrb.security.ip]
DisplayName        = "IP"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
ConfigURL       = /ows-abin/atadmin?FORM_CODE=AUTH_IP_FORM
OpenGIF         = propsheet.gif
CloseGIF        = propsheet.gif
;
[O_A_S_S_I_T_E_N_A_M_E.wrb.security.domain]
DisplayName     = "Domain"
ConfigURL       = /ows-abin/atadmin?FORM_CODE=AUTH_DOMAIN_FORM
OpenGIF         = propsheet.gif
CloseGIF        = propsheet.gif
;
[O_A_S_S_I_T_E_N_A_M_E.wrb.security.database]
DisplayName     = "Basic_Oracle"
ConfigURL       = /ows-abin/atadmin?FORM_CODE=AUTH_BASIC_ORACLE_FORM
OpenGIF         = propsheet.gif
CloseGIF        = propsheet.gif
;
[O_A_S_S_I_T_E_N_A_M_E.wrb.security.crypt]
DisplayName     = "Crypt"
ConfigURL       = /ows-abin/atadmin?FORM_CODE=AUTH_CRYPT_FORM
OpenGIF         = propsheet.gif
CloseGIF        = propsheet.gif
;
[O_A_S_S_I_T_E_N_A_M_E.wrb.security.certificate]
Components      = realms, servers, acls
DisplayName     = "Certificate"
ConfigURL       = /ows-adoc/blank.html
OpenGIF         = folder_open.gif
CloseGIF        = folder_closed.gif
;
[O_A_S_S_I_T_E_N_A_M_E.wrb.security.certificate.realms]
DisplayName     = "Realms"
ConfigURL       = /ows-abin/csadmin?FORM_CODE=CERT_REALM_MAIN
OpenGIF         = folder_open.gif
CloseGIF        = folder_closed.gif
;
[O_A_S_S_I_T_E_N_A_M_E.wrb.security.certificate.servers]
DisplayName     = "Servers"
ConfigURL       = /ows-abin/csadmin?FORM_CODE=CERT_SERVER_MAIN
OpenGIF         = folder_open.gif
CloseGIF        = folder_closed.gif
;
[O_A_S_S_I_T_E_N_A_M_E.wrb.security.certificate.acls]
DisplayName     = "ACLs"
ConfigURL       = /ows-abin/csadmin?FORM_CODE=CERT_ACL_MAIN
OpenGIF         = folder_open.gif
CloseGIF        = folder_closed.gif
;
[O_A_S_S_I_T_E_N_A_M_E.wrb.orb]
DisplayName     = "ORB Configuration"
ConfigURL       = /ows-abin/orbmgr?file=gencfg
OpenGIF         = propsheet.gif
CloseGIF        = propsheet.gif
;
[O_A_S_S_I_T_E_N_A_M_E.wrb.oassrv]
DisplayName     = "Oracle Application Server"
ComponentType   = Wrb
InternalName    = oassrv
Nodes           = H_O_S_T_N_A_M_E
;
[O_A_S_S_I_T_E_N_A_M_E.wrb.oassrv.H_O_S_T_N_A_M_E]
Instances       = 1
;
[O_A_S_S_I_T_E_N_A_M_E.wrb.otsfacsrv]
DisplayName     = "Transaction Server Factory"
ComponentType   = Wrb
InternalName    = otsfacsrv
Nodes           = H_O_S_T_N_A_M_E
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.wrb.otsfacsrv.H_O_S_T_N_A_M_E]
Instances       = 1
;
[O_A_S_S_I_T_E_N_A_M_E.wrb.wrbmon]
DisplayName     = "Monitoring Daemon"
ComponentType   = Wrb
InternalName    = wrbmon
Nodes           = H_O_S_T_N_A_M_E
;
[O_A_S_S_I_T_E_N_A_M_E.wrb.wrbron.H_O_S_T_N_A_M_E]
Instances       = 1
;
[O_A_S_S_I_T_E_N_A_M_E.wrb.wrblog]
DisplayName     = "Log Server"
ComponentType   = Wrb
InternalName    = wrblog
Nodes           = H_O_S_T_N_A_M_E
;
[O_A_S_S_I_T_E_N_A_M_E.wrb.wrblog.H_O_S_T_N_A_M_E]
Instances       = 1
;
[O_A_S_S_I_T_E_N_A_M_E.wrb.wrksf]
DisplayName     = "Cartridge Server Factory"
ComponentType   = Wrb
InternalName    = wrksf
Nodes           = H_O_S_T_N_A_M_E
;
[O_A_S_S_I_T_E_N_A_M_E.wrb.wrksf.H_O_S_T_N_A_M_E]
Instances       = 1
;
[O_A_S_S_I_T_E_N_A_M_E.wrb.wrbroker]
DisplayName     = "Resource Manager"
ComponentType   = Wrb
InternalName    = wrbroker
Nodes           H_O_S_T_N_A_M_E
;
[O_A_S_S_I_T_E_N_A_M_E.wrb.wrbroker.H_O_S_T_N_A_M_E]
Instances       = 1
;
[O_A_S_S_I_T_E_N_A_M_E.wrb.wrbrmpxy]
DisplayName     = "Resource Manager Proxy"
ComponentType   = Wrb
InternalName    = wrbrmpxy
Nodes           = H_O_S_T_N_A_M_E
;
[O_A_S_S_I_T_E_N_A_M_E.wrb.wrbrmpxy.H_O_S_T_N_A_M_E]
Instances       = 1
;
[O_A_S_S_I_T_E_N_A_M_E.wrb.wrbcfg]
DisplayName     = "Configuration Provider"
ComponentType   = Wrb
InternalName    = wrbcfg
Nodes           = H_O_S_T_N_A_M_E
;
[O_A_S_S_I_T_E_N_A_M_E.wrb.wrbcfg.H_O_S_T_N_A_M_E]
Instances       = 1
;
[O_A_S_S_I_T_E_N_A_M_E.wrb.wrbasrv]
DisplayName     = "Authentication Server"
ComponentType   = Wrb
InternalName    = wrbasrv
Nodes           = H_O_S_T_N_A_M_E
;
[O_A_S_S_I_T_E_N_A_M_E.wrb.wrbasrv.H_O_S_T_N_A_M_E]
Instances       = 1
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.wrb.wrbahsrv]
DisplayName     = "Authentication Host Server"
ComponentType   = Wrb
InternalName    = wrbahsrv
Nodes           = H_O_S_T_N_A_M_E
;
[O_A_S_S_I_T_E_N_A_M_E.wrb.wrbahsrv.H_O_S_T_N_A_M_E]
Instances       = 1
;
[O_A_S_S_I_T_E_N_A_M_E.dispatchers]
Components      = dispproc
DisplayName     = "HTTP Listeners"
InternalName    = dispatchers
ConfigURL       = /ows-abin/oasadmin?FORM_CODE=MAIN&COMPONENT=LIST&NAME=dispatchers
OpenGIF         = listener_node_open.gif
CloseGIF        = listener_node_closed.gif
;
[O_A_S_S_I_T_E_N_A_M_E.dispatchers.dispproc]
Components      = Net,Srv,UsrGrp,Dir,Lang,Mime,Enc,CaRoot,Sec
ComponentType   = Disp
ConfigURL       = /ows-abin/oasadmin?FORM_CODE=MAIN&COMPONENT=LIST&NAME=dispatchers/
OpenGIF         = listener.gif
CloseGIF        = listener.gif
;
[O_A_S_S_I_T_E_N_A_M_E.dispatchers.dispproc.Net]
DisplayName     = "Network"
ConfigURL       = /ows-abin/wladmin?CONFIG_CODE=NETWORK&orig_name=
OpenGIF         = propsheet.gif
CloseGIF        = propsheet.gif
;
[O_A_S_S_I_T_E_N_A_M_E.dispatchers.dispproc.Srv]
DisplayName     = "Server"
ConfigURL       = /ows-abin/wladmin?CONFIG_CODE=SERVER&orig_name=
OpenGIF         = propsheet.gif
CloseGIF        = propsheet.gif
;
[O_A_S_S_I_T_E_N_A_M_E.dispatchers.dispproc.UsrGrp]
DisplayName     = "User/Group"
ConfigURL       = /ows-abin/wladmin?CONFIG_CODE=UG&orig_name=
OpenGIF         = propsheet.gif
CloseGIF        = propsheet.gif
;
[O_A_S_S_I_T_E_N_A_M_E.dispatchers.dispproc.Dir]
DisplayName     = "Directory"
ConfigURL       = /ows-abin/wladmin?CONFIG_CODE=DIR&orig_name=
OpenGIF         = propsheet.gif
CloseGIF        = propsheet.gif
;
[O_A_S_S_I_T_E_N_A_M_E.dispatchers.dispproc.Lang]
DisplayName     = "Language"
ConfigURL       = /ows-abin/wladmin?CONFIG_CODE=LANG&orig_name=
OpenGIF         = propsheet.gif
CloseGIF        = propsheet.gif
;
[O_A_S_S_I_T_E_N_A_M_E.dispatchers.dispproc.Mime]
DisplayName     = "MIME"
ConfigURL       = /ows-abin/wladmin?CONFIG_CODE=MIME&orig_name=
OpenGIF         = propsheet.gif
CloseGIF        = propsheet.gif
;
[O_A_S_S_I_T_E_N_A_M_E.dispatchers.dispproc.Enc]
DisplayName     = "Encoding"
ConfigURL       = /ows-abin/wladmin?CONFIG_CODE=ENCODING&orig_name=
OpenGIF         = propsheet.gif
CloseGIF        = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.dispatchers.dispproc.CaRoot]
DisplayName     = "SSL CA Roots"
ConfigURL       = /ows-abin/wladmin?CONFIG_CODE=SSLCA&orig_name=
OpenGIF         = propsheet.gif
CloseGIF        = propsheet.gif
;
[O_A_S_S_I_T_E_N_A_M_E.dispatchers.dispproc.Sec]
Components      = Basic,Digest,IP,Domain,SSL
DisplayName     = "Security"
ConfigURL       = /ows-abin/wladmin?CONFIG_CODE=SECURITY&orig_name=
OpenGIF         = folder_open.gif
CloseGIF        = folder_closed.gif
;
[O_A_S_S_I_T_E_N_A_M_E.dispatchers.dispproc.Sec.Basic]
DisplayName     = "Basic"
ConfigURL       = /ows-abin/wladmin?CONFIG_CODE=BASIC&orig_name=
OpenGIF         = propsheet.gif
CloseGIF        = propsheet.gif
;
[O_A_S_S_I_T_E_N_A_M_E.dispatchers.dispproc.Sec.Digest]
DisplayName     = "Digest"
ConfigURL       = /ows-abin/wladmin?CONFIG_CODE=DIGEST&orig_name=
OpenGIF         = propsheet.gif
CloseGIF        = propsheet.gif
;
[O_A_S_S_I_T_E_N_A_M_E.dispatchers.dispproc.Sec.IP]
DisplayName     = "IP"
ConfigURL       = /ows-abin/wladmin?CONFIG_CODE= IP&orig_name=
OpenGIF         = propsheet.gif
CloseGIF        = propsheet.gif
;
[O_A_S_S_I_T_E_N_A_M_E.dispatchers.dispproc.Sec.Domain]
DisplayName     = "Domain"
ConfigURL       = /ows-abin/wladmin?CONFIG_CODE=DOMAIN&orig_name=
OpenGIF         = propsheet.gif
CloseGIF        = propsheet.gif
;
[O_A_S_S_I_T_E_N_A_M_E.dispatchers.dispproc.Sec.SSL]
DisplayName     = "SSL"
ConfigURL       = /ows-abin/wladmin?CONFIG_CODE=SSL&orig_name=
OpenGIF         = propsheet.gif
CloseGIF        = propsheet.gif
;
[O_A_S_S_I_T_E_N_A_M_E.wrb.dad]
DisplayName     = "DB Access Descriptor"
ConfigURL       = /ows-abin/dadadmin
OpenGIF         = dad_node_closed.gif
CloseGIF        = dad_node_closed.gif
;
[O_A_S_S_I_T_E_N_A_M_E.wrb.frecovery]
DisplayName     = "Failure Recovery"
ConfigURL       = /ows-abin/csadmin?FORM_CODE=FAILURE_RECOVERY
OpenGIF         = propsheet.gif
CloseGIF        = propsheet.gif
;
[O_A_S_S_I_T_E_N_A_M_E.cartx]
DisplayName     = "Applications"
InternalName    = wrb/cartxSrv
ConfigURL       = /ows-abin/oasadmin?FORM_CODE=MAIN&COMPONENT=APP
OpenGIF         = app_node_open.gif
CloseGIF        = app_node_closed.gif
Components      = owsapps,DB_Utilities, mstage, cstage, mdeploy, ots, cdeploy
;
[O_A_S_S_I_T_E_N_A_M_E.cartx.owsapps]
ConfigURL       = /ows-abin/oasadmin?FORM_CODE=MAIN&COMPONENT=APP&NAME=owsapps
OpenGIF         = app.gif
CloseGIF        = app.gif
Components      = AppConf, AppCartx
InternalName    = owsapps
ComponentType   = App
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.cartx.owsapps.AppConf]
DisplayName     = "Configuration"
ConfigURL       = /ows-abin/csadmin?FORM_CODE=DISPLAY_CONFIG&ServerName=owsapps
OpenGIF         = folder_open.gif
CloseGIF        = folder_closed.gif
Components      = AppConfSrv, AppConfLog, AppConfWeb, AppConfTxProperty,
AppConfWebTransactions
;
[O_A_S_S_I_T_E_N_A_M_E.cartx.owsapps.AppConf.AppConfSrv]
DisplayName     = "Server"
ConfigURL       = /ows-abin/csadmin?FORM_CODE=SERVER_CONFIG&ServerName=owsapps
OpenGIF         = propsheet.gif
CloseGIF        = propsheet.gif
;
[O_A_S_S_I_T_E_N_A_M_E.cartx.owsapps.AppConf.AppConfLog]
DisplayName     = "Logging"
ConfigURL       = /ows-abin/csadmin?FORM_CODE=LOG_CONFIG&ServerName=owsapps
OpenGIF         = propsheet.gif
CloseGIF        = propsheet.gif
;
[O_A_S_S_I_T_E_N_A_M_E.cartx.owsapps.AppConf.AppConfWeb]
DisplayName     = "Web Parameters"
ConfigURL       = /ows-abin/csadmin?FORM_CODE=WEB_CONFIG&ServerName=owsapps
OpenGIF         = propsheet.gif
CloseGIF        = propsheet.gif
;
[O_A_S_S_I_T_E_N_A_M_E.cartx.owsapps.AppConf.AppConfTxProperty]
DisplayName     = "Tx Property"
ConfigURL       = /ows-abin/csadmin?FORM_CODE=TXN_PROP&ServerName=owsapps
OpenGIF         = propsheet.gif
CloseGIF        = propsheet.gif
;
[O_A_S_S_I_T_E_N_A_M_E.cartx.owsapps.AppConf.AppConfWebTransactions]
DisplayName     = "Transactions"
ConfigURL       = /ows-abin/csadmin?FORM_CODE=TXN_MAIN&ServerName=owsapps
OpenGIF         = txn_folder_open.gif
CloseGIF        = txn_folder_closed.gif
;
[O_A_S_S_I_T_E_N_A_M_E.cartx.owsapps.AppCartx]
DisplayName     = "Cartridges"
ConfigURL       =
/ows-abin/oasadmin?FORM_CODE=MAIN&COMPONENT=CARTX&APPNAME=owsapps&NAME=owsapps
OpenGIF         = cart_node_open.gif
CloseGIF        = cart_node_closed.gif
Components      = owsstat
InternalName    = cartx/owsapps
;
[O_A_S_S_I_T_E_N_A_M_E.cartx.owsapps.AppCartx.owsstat]
ConfigURL       =
/ows-abin/oasadmin?FORM_CODE=MAIN&COMPONENT=CARTX&APPNAME=owsapps&NAME=owsapps/owsstat
OpenGIF         = cart.gif
CloseGIF        = cart.gif
Components      = AppCartxConf
InternalName    = cwsapps/owsstat
ComponentType   = Cartx
;
[O_A_S_S_I_T_E_N_A_M_E.cartx.owsapps.AppCartx.owsstat.AppCartxConf]
DisplayName     = "Configuration"
ConfigURL       =
/ows-abin/csadmin?FORM_CODE=CART_CONFIG&CartridgeName=owsapps/owsstat
OpenGIF         = folder_open.gif
CloseGIF        = folder_closed.gif
Components      = AppCartxConfTuning, AppCartxConfVP, AppCartxConfCartlib,
AppCartxConfParam
;
[O_A_S_S_I_T_E_N_A_M_E.cartx.owsapps.AppCartx.owsstat.AppCartxConf.AppCartxConfTuning]
DisplayName     = "Tuning"
ConfigURL       =
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
/ows-abin/csadmin?FORM_CODE=LOAD_CONFIG&CartridgeName=owsapps/owsstat
OpenGIF          = propsheet.gif
CloseGIF         = propsheet.gif
;
[O_A_S_S_I_T_E_N_A_M_E.cartx.owsapps.AppCartx.owsstat.AppCartxConf.AppCartxConfVP]
DisplayName      = "Virtual Path"
ConfigURL        = /ows-abin/csadmin?FORM_CODE=VPATH&CartridgeName=owsapps/owsstat
OpenGIF          = propsheet.gif
CloseGIF         = propsheet.gif
;
[O_A_S_S_I_T_E_N_A_M_E.cartx.owsapps.AppCartx.owsstat.AppCartxConf.AppCartxConfCartlib]
DisplayName      = "CWEB Parameters"
ConfigURL        =
/ows-abin/csadmin?FORM_CODE=CWEB_SO_CONFIG&CartridgeName=owsapps/owsstat
OpenGIF          = propsheet.gif
CloseGIF         = propsheet.gif
;
[O_A_S_S_I_T_E_N_A_M_E.cartx.owsapps.AppCartx.owsstat.AppCartxConf.AppCartxConfParam]
DisplayName      = "Cartridge Parameters"
ConfigURL        = /ows-abin/csadmin?FORM_CODE=ENV_CONFIG&CartridgeName=owsapps/owsstat
OpenGIF          = propsheet.gif
CloseGIF         = propsheet.gif
;
[O_A_S_S_I_T_E_N_A_M_E.cartx.DB_Utilities]
ConfigURL        = /ows-abin/oasadmin?FORM_CODE=MAIN&COMPONENT=APP&NAME=DB_Utilities
OpenGIF          = app.gif
CloseGIF         = app.gif
Components       = AppConf, AppCartx
InternalName     = DB_Utilities
ComponentType    = App
;
[O_A_S_S_I_T_E_N_A_M_E.cartx.DB_Utilities.AppConf]
DisplayName      = "Configuration"
ConfigURL        = /ows-abin/csadmin?FORM_CODE=DISPLAY_CONFIG&ServerName=DB_Utilities
OpenGIF          = folder_open.gif
CloseGIF         = folder_closed.gif
Components       = AppConfSrv, AppConfLog, AppConfWeb, AppConfTxProperty,
AppConfWebTransactions
;
[O_A_S_S_I_T_E_N_A_M_E.cartx.DB_Utilities.AppConf.AppConfSrv]
DisplayName      = "Server"
ConfigURL        = /ows-abin/csadmin?FORM_CODE=SERVER_CONFIG&ServerName=DB_Utilities
OpenGIF          = propsheet.gif
CloseGIF         = propsheet.gif
;
[O_A_S_S_I_T_E_N_A_M_E.cartx.DB_Utilities.AppConf.AppConfLog]
DisplayName      = "Logging"
ConfigURL        = /ows-abin/csadmin?FORM_CODE=LOG_CONFIG&ServerName=DB_Utilities
OpenGIF          = propsheet.gif
CloseGIF         = propsheet.gif
;
[O_A_S_S_I_T_E_N_A_M_E.cartx.DB_Utilities.AppConf.AppConfWeb]
DisplayName      = "Web Parameters"
ConfigURL        = /ows-abin/csadmin?FORM_CODE=WEB_CONFIG&ServerName=DB_Utilities
OpenGIF          = propsheet.gif
CloseGIF         = propsheet.gif
;
[O_A_S_S_I_T_E_N_A_M_E.cartx.DB_Utilities.AppConf.AppConfTxProperty]
DisplayName      = "Tx property"
ConfigURL        = /ows-abin/csadmin?FORM_CODE=TXN_PROP&ServerName=DB_Utilities
OpenGIF          = propsheet.gif
CloseGIF         = propsheet.gif
;
[O_A_S_S_I_T_E_N_A_M_E.cartx.DB_Utilities.AppConf.AppConfWebTransactions]
DisplayName      = "Transactions"
ConfigURL        = /ows-abin/csadmin?FORM_CODE=TXN_MAIN&ServerName=DB_Utilities
OpenGIF          = txn_folder_open.gif
CloseGIF         = txn_folder_closed.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.cartx.DB_Utilities.AppCartx]
DisplayName     = "Cartridges"
ConfigURL       =
/ows-abin/oasadmin?FORM_CODE=MAIN&COMPONENT=CARTX&APPNAME=DB_Utilities&NAME=DB_Utilities
OpenGIF         = cart_node_open.gif
CloseGIF        = cart_node_closed.gif
Components      = DB_Browser, Log_Analyzer
InternalName    = cartx/DB_Utilities
;
[O_A_S_S_I_T_E_N_A_M_E.cartx.DB_Utilities.AppCartx.DB_Browser]
ConfigURL       =
/ows-abin/oasadmin?FORM_CODE=MAIN&COMPONENT=CARTX&APPNAME=DB_Utilities&NAME=DB_Utilities/
DB_Browser
OpenGIF         = cart.gif
CloseGIF        = cart.gif
Components      = AppCartxConf
InternalName    = DB_Utilities/DB_Browser
ComponentType   = Cartx
;
[O_A_S_S_I_T_E_N_A_M_E.cartx.DB_Utilities.AppCartx.DB_Browser.AppCartxConf]
DisplayName     = "Configuration"
ConfigURL       =
/ows-abin/csadmin?FORM_CODE=CART_CONFIG&CartridgeName=DB_Utilities/DB_Browser
OpenGIF         = folder_open.gif
CloseGIF        = folder_closed.gif
Components      = AppCartxConfTuning, AppCartxConfPlsql, AppCartxConfVP
;
[O_A_S_S_I_T_E_N_A_M_E.cartx.DB_Utilities.AppCartx.DB_Browser.AppCartxConf.AppCartxConfTu
ning]
DisplayName     = "Tuning"
ConfigURL       =
/ows-abin/csadmin?FORM_CODE=LOAD_CONFIG&CartridgeName=DB_Utilities/DB_Browser
OpenGIF         = propsheet.gif
CloseGIF        = propsheet.gif
;
[O_A_S_S_I_T_E_N_A_M_E.cartx.DB_Utilities.AppCartx.DB_Browser.AppCartxConf.AppCartxConfPl
sql]
DisplayName     = "PLSQL Parameters"
ConfigURL       =
/ows-abin/csadmin?FORM_CODE=AGENT_CONFIG&AgentName=DB_Utilities/DB_Browser
OpenGIF         = propsheet.gif
CloseGIF        = propsheet.gif
;
[O_A_S_S_I_T_E_N_A_M_E.cartx.DB_Utilities.AppCartx.DB_Browser.AppCartxConf.AppCartxConfVP
]
DisplayName     = "Virtual Path"
ConfigURL       =
/ows-abin/csadmin?FORM_CODE=VPATH&CartridgeName=DB_Utilities/DB_Browser
OpenGIF         = propsheet.gif
CloseGIF        = propsheet.gif
;
[O_A_S_S_I_T_E_N_A_M_E.cartx.DB_Utilities.AppCartx.Log_Analyzer]
ConfigURL       =
/ows-abin/oasadmin?FORM_CODE=MAIN&COMPONENT=CARTX&APPNAME=DB_Utilities&NAME=DB_Utilities/
Log_Analyzer
OpenGIF         = cart.gif
CloseGIF        = cart.gif
Components      = AppCartxConf
InternalName    = DB_Utilities/Log_Analyzer
ComponentType   = Cartx
;
[O_A_S_S_I_T_E_N_A_M_E.cartx.DB_Utilities.AppCartx.Log_Analyzer.AppCartxConf]
DisplayName     = "Configuration"
ConfigURL       =
/ows-abin/csadmin?FORM_CODE=CART_CONFIG&CartridgeName=DB_Utilities/Log_Analyzer
OpenGIF         = folder_open.gif
CloseGIF        = folder_closed.gif
Components      = AppCartxConfTuning, AppCartxConfPlsql, AppCartxConfVP
;
[O_A_S_S_I_T_E_N_A_M_E.cartx.DB_Utilities.AppCartx.Log_Analyzer.AppCartxConf.AppCartxConf
Tuning]
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
DisplayName       = "Tuning"
ConfigURL         =
/ows-abin/csadmin?FORM_CODE=LOAD_CONFIG&CartridgeName=DB_Utilities/Log_Analyzer
OpenGIF           = propsheet.gif
CloseGIF          = propsheet.gif
;
[O_A_S_S_I_T_E_N_A_M_E.cartx.DB_Utilities.AppCartx.Log_Analyzer.AppCartxConf.AppCartxConf
Plsql]
DisplayName       = "PLSQL Parameters"
ConfigURL         =
/ows-abin/csadmin?FORM_CODE=AGENT_CONFIG&AgentName=DB_Utilities/Log_Analyzer
OpenGIF           = propsheet.gif
CloseGIF          = propsheet.gif
;
[O_A_S_S_I_T_E_N_A_M_E.cartx.DB_Utilities.AppCartx.Log_Analyzer.AppCartxConf.AppCartxConf
VP]
DisplayName       = "Virtual Path"
ConfigURL         =
/ows-abin/csadmin?FORM_CODE=VPATH&CartridgeName=DB_Utilities/Log_Analyzer
OpenGIF           = propsheet.gif
CloseGIF          = propsheet.gif
;
[O_A_S_S_I_T_E_N_A_M_E.cartx.cdeploy]
ConfigURL         = /ows-abin/oasadmin?FORM_CODE=MAIN&COMPONENT=APP&NAME=cdeploy
OpenGIF           = app.gif
CloseGIF          = app.gif
Components        = AppConf, AppCartx
InternalName      = cdeploy
ComponentType     = App
;
[O_A_S_S_I_T_E_N_A_M_E.cartx.cdeploy.AppConf]
DisplayName       = "Configuration"
ConfigURL         = /ows-abin/csadmin?FORM_CODE=DISPLAY_CONFIG&ServerName=cdeploy
OpenGIF           = folder_open.gif
CloseGIF          = folder_closed.gif
Components        = AppConfSrv, AppConfEnv, AppConfLog, AppConfJava, AppConfWeb,
AppConfTxProperty
;
[O_A_S_S_I_T_E_N_A_M_E.cartx.cdeploy.AppConf.AppConfSrv]
DisplayName       = "Server"
ConfigURL         = /ows-abin/csadmin?FORM_CODE=SERVER_CONFIG&ServerName=cdeploy
OpenGIF           = propsheet.gif
CloseGIF          = propsheet.gif
;
[O_A_S_S_I_T_E_N_A_M_E.cartx.cdeploy.APPConf.AppConfEnv]
DisplayName       = "Environment Variables"
ConfigURL         = /ows-abin/csadmin?FORM_CODE=ENV_CONFIG&ServerName=cdeploy
OpenGIF           = propsheet.gif
CloseGIF          = propsheet.gif
;
[O_A_S_S_I_T_E_N_A_M_E.cartx.cdeploy.AppConf.AppConfLog]
DisplayName       = "Logging"
ConfigURL         = /ows-abin/csadmin?FORM_CODE=LOG_CONFIG&ServerName=cdeploy
OpenGIF           = propsheet.gif
CloseGIF          = propsheet.gif
;
[O_A_S_S_I_T_E_N_A_M_E.cartx.cdeploy.AppConf.AppConfJava]
DisplayName       = "Java Environment"
ConfigURL         = /ows-abin/csadmin?FORM_CODE=JAVA_PARAM_CONFIG&ServerName=cdeploy
OpenGIF           = propsheet.gif
CloseGIF          = propsheet.gif
;
[O_A_S_S_I_T_E_N_A_M_E.cartx.cdeploy.AppConf.AppConfWeb]
DisplayName       = "Web Parameters"
ConfigURL         = /ows-abin/csadmin?FORM_CODE=WEB_CONFIG&ServerName=cdeploy
OpenGIF           = propsheet.gif
CloseGIF          = propsheet.gif
;
[O_A_S_S_I_T_E_N_A_M_E.cartx.cdeploy.AppConf.AppConfTxProperty]
DisplayName       = "Tx Property"
ConfigURL         = /ows-abin/csadmin?FORM_CODE=TXN_PROP&ServerName=cdeploy
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
OpenGIF          = propsheet.gif
CloseGIF         = propsheet.gif
;
[O_A_S_S_I_T_E_N_A_M_E.cartx.cdeploy.AppCartx]
DisplayName      = "Cartridges"
ConfigURL        =
/ows-abin/oasadmin?FORM_CODE=MAIN&COMPONENT=CARTX&APPNAME=cdeploy&NAME=cdeploy
OpenGIF          = cart_node_open.gif
CloseGIF         = cart_node_closed.gif
InternalName     = cartx/cdeploy
Components       = cdeploy
;
[O_A_S_S_I_T_E_N_A_M_E.cartx.mstage]
ConfigURL        = /ows-abin/oasadmin?FORM_CODE=MAIN&COMPONENT=APP&NAME=mstage
OpenGIF          = app.gif
CloseGIF         = app.gif
Components       = AppConf, AppCartx
InternalName     = mstage
ComponentType    = App
;
[O_A_S_S_I_T_E_N_A_M_E.cartx.mstage.AppConf]
DisplayName      = "Configuration"
ConfigURL        = /ows-abin/csadmin?FORM_CODE=DISPLAY_CONFIG&ServerName=mstage
OpenGIF          = folder_open.gif
CloseGIF         = folder_closed.gif
Components       = AppConfSrv, AppConfEnv, AppConfLog. AppConfJava, AppConfWeb,
AppConfTxProperty
;
[O_A_S_S_I_T_E_N_A_M_E.cartx.mstage.AppConf.AppConfSrv]
DisplayName      = "Server"
ConfigURL        = /ows-abin/csadmin?FORM_CODE=SERVER_CONFIG&ServerName=mstage
OpenGIF          = propsheet.gif
CloseGIF         = propsheet.gif
;
[O_A_S_S_I_T_E_N_A_M_E.cartx.mstage.AppConf.AppConfEnv]
DisplayName      = "Environment Variables"
ConfigURL        = /ows-abin/csadmin?FORM_CODE=ENV_CONFIG&ServerName=mstage
OpenGIF          = propsheet.gif
CloseGIF         = propsheet.gif
;
[O_A_S_S_I_T_E_N_A_M_E.cartx.mstage.AppConf.AppConfLog]
DisplayName      = "Logging"
ConfigURL        = /ows-abin/csadmin?FORM_CODE=LOG_CONFIG&ServerName=mstage
OpenGIF          = propsheet.gif
CloseGIF         = propsheet.gif
;
[O_A_S_S_I_T_E_N_A_M_E.cartx.mstage.AppConf.AppConfJava]
DisplayName      = "Java Environment"
ConfigURL        = /ows-abin/csadmin?FORM_CODE=JAVA_PARAM_CONFIG&ServerName=mstage
OpenGIF          = propsheet.gif
CloseGIF         = propsheet.gif
;
[O_A_S_S_I_T_E_N_A_M_E.cartx.mstage.AppConf.AppConfWeb]
DisplayName      = "Web Parameters"
ConfigURL        = /ows-abin/csadmin?FORM_CODE=WEB_CONFIG&ServerName=mstage
OpenGIF          = propsheet.gif
CloseGIF         = propsheet.gif
;
[O_A_S_S_I_T_E_N_A_M_E.cartx.mstage.AppConf.AppConfTxProperty]
DisplayName      = "Tx Property"
ConfigURL        = /ows-abin/csadmin?FORM_CODE=TXN_PROP&ServerName=mstage
OpenGIF          = propsheet.gif
CloseGIF         = propsheet.gif
;
[O_A_S_S_I_T_E_N_A_M_E.cartx.mstage.AppCartx]
DisplayName      = "Cartridges"
ConfigURL        =
/ows-abin/oasadmin?FORM_CODE=MAIN&COMPONENT=CARTX&APPNAME=mstage&NAME=mstage
OpenGIF          = cart_node_open.gif
CloseGIF         = cart_node_closed.gif
InternalName     = cartx/mstage
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
Components        = mstage
;
[O_A_S_S_I_T_E_N_A_M_E.cartx.mstage.AppCartx.mstage]
ConfigURL         = /ows-abin/oasadmin?FORM_CODE=MAIN&COMPONENT=APP&NAME=mstage
OpenGIF           = app.gif
CloseGIF          = app.gif
Components        = AppCartxConf
InternalName      = mstage/mstage
ComponentType     = Cartx
;
[O_A_S_S_I_T_E_N_A_M_E.cartx.mstage.AppCartx.mstage.AppCartxConf]
DisplayName       = "Configuration"
ConfigURL         = /ows-abin/csadmin?FORM_CODE=CART_CONFIG&CartridgeName=mstage/mstage
OpenGIF           = folder_open.gif
CloseGIF          = folder_closed.gif
Components        = AppCartxConfTuning, AppCartxConfVP, AppCartxConfJWeb
;
[O_A_S_S_I_T_E_N_A_M_E.cartx.mstage.AppCartx.mstage.AppCartxConf.AppCartxConfTuning]
DisplayName       = "Tuning"
ConfigURL         = /ows-abin/csadmin?FORM_CODE=LOAD_CONFIG&CartridgeName=mstage/mstage
OpenGIF           = propsheet.gif
CloseGIF          = propsheet.gif
;
[O_A_S_S_I_T_E_N_A_M_E.cartx.mstage.AppCartx.mstage.AppCartxConf.AppCartxConfVP]
DisplayName       = "Virtual Path"
ConfigURL         = /ows-abin/csadmin?FORM_CODE=VPATH&CartridgeName=mstage/mstage
OpenGIF           = propsheet.gif
CloseGIF          = propsheet.gif
;
[O_A_S_S_I_T_E_N_A_M_E/cartx.mstage.AppCartx.mstage.AppCartxConf.AppCartxConfJWeb]
DisplayName       = "JWeb Parameters"
ConfigURL         =
/ows-abin/csadmin?FORM_CODE=JWEB_PAR_CONF&CartridgeName=mstage/mstage
OpenGIF           = propsheet.gif
CloseGIF          = propsheet.gif
;
[O_A_S_S_I_T_E_N_A_M_E.cartx.cstage]
ConfigURL         = /ows-abin/oasadmin?FORM_CODE=MAIN&COMPONENT=APP&NAME=cstage
OpenGIF           = app.gif
CloseGIF          = app.gif
Components        = AppConf, AppCartx
InternalName      = cstage
ComponentType     = App
;
[O_A_S_S_I_T_E_N_A_M_E.cartx.cstage.AppConf]
DisplayName       = "Configuration"
ConfigURL         = /ows-abin/csadmin?FORM_CODE=DISPLAY_CONFIG&ServerName=cstage
OpenGIF           = folder_open.gif
CloseGIF          = folder_closed.gif
Components        = AppConfSrv, AppConfEnv, AppConfLog, AppConfJava. AppConfWeb,
AppConfTxProperty
;
[O_A_S_S_I_T_E_N_A_M_E.cartx.cstage.AppConf.AppConfSrv]
DisplayName       = "Server"
ConfigURL         = /ows-abin/csadmin?FORM_CODE=SERVER_CONFIG&ServerName=cstage
OpenGIF           = propsheet.gif
CloseGIF          = propsheet.gif
;
[O_A_S_S_I_T_E_N_A_M_E.cartx.cstage.AppConf.AppConfEnv]
DisplayName       = "Environment Variables"
ConfigURL         = /ows-abin/csadmin?FORM_CODE=ENV_CONFIG&ServerName=cstage
OpenGIF           = propsheet.gif
CloseGIF          = propsheet.gif
;
[O_A_S_S_I_T_E_N_A_M_E.cartx.cstage.AppConf.AppConfLog]
DisplayName       = "Logging"
ConfigURL         = /ows-abin/csadmin?FORM_CODE=LOG_CONFIG&ServerName=cstage
OpenGIF           = propsheet.gif
CloseGIF          = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.cartx.cstage.AppConf.AppConfJava]
DisplayName     = "Java Environment"
ConfigURL       = /ows-abin/csadmin?FORM_CODE=JAVA_PARAM_CONFIG&ServerName=cstage
OpenGIF         = propsheet.gif
CloseGIF        = propsheet.gif
;
[O_A_S_S_I_T_E_N_A_M_E.cartx.cstage.AppConf.AppConfWeb]
DisplayName = "Web Parameters"
ConfigURL = /ows-abin/csadmin?FORM_CODE=WEB_CONFIG&ServerName=cstage
OpenGIF = propsheet.gif
CloseGIF = propsheet.gif
;
[O_A_S_S_I_T_E_N_A_M_E.cartx.cstage.AppConf.AppConfTxProperty]
DisplayName     = "Tx Property"
ConfigURL       = /ows-abin/csadmin?FORM_CODE=TXN_PROP&ServerName=cstage
OpenGIF         = propsheet.gif
CloseGIF        = propsheet.gif
;
[O_A_S_S_I_T_E_N_A_M_E.cartx.cstage.AppCartx]
DisplayName     = "Cartridges"
ConfigURL       =
/ows-abin/oasadmin?FORM_CODE=MAIN&COMPONENT=CARTX&APPNAME=cstage&NAME=cstage
OpenGIF         = cart_node_open.gif
CloseGIF        = cart_node_closed.gif
InternalName    = cartx/cstage
Components      = cstage
;
[O_A_S_S_I_T_E_N_A_M_E.cartx.cstage.AppCartx.cstage]
ConfigURL       = /ows-abin/oasadmin?FORM_CODE=MAIN&COMPONENT=APP&NAME=cstage
OpenGIF         = app.gif
CloseGIF        = app.gif
Components      = AppCartxConf
InternalName    = cstage/cstage
ComponentType   = Cartx
;
[O_A_S_S_I_T_E_N_A_M_E.cartx.cstage.AppCartx.cstage.AppCartxConf]
DisplayName     = "Configuration"
ConfigURL       = /ows-abin/csadmin?FORM_CODE=CART_CONFIG&CartridgeName=cstage/cstage
OpenGIF         = folder_open.gif
CloseGIF        = folder_closed.gif
Components      = AppCartxConfTuning, AppCartxConfVP, AppCartxConfJWeb
;
[O_A_S_S_I_T_E_N_A_M_E.cartx.cstage.AppCartx.cstage.AppCartxConf.AppCartxConfTuning]
DisplayName     = "Tuning"
ConfigURL       = /ows-abin/csadmin?FORM_CODE=LOAD_CONFIG&CartridgeName=cstage/cstage
OpenGIF         = propsheet.gif
CloseGIF        = propsheet.gif
;
[O_A_S_S_I_T_E_N_A_M_E.cartx.cstage.AppCartx.cstage.AppCartxConf.AppCartxConfVP]
DisplayName     = "Virtual Path"
ConfigURL       = /ows-abin/csadmin?FORM_CODE=VPATH&CartridgeName=cstage/cstage
OpenGIF         = propsheet.gif
CloseGIF        = propsheet.gif
;
[O_A_S_S_I_T_E_N_A_M_E.cartx.cstage.AppCartx.cstage.AppCartxConf.AppCartxConfJweb]
DisplayName     = "JWeb Parameters"
ConfigURL       =
/ows-abin/csadmin?FORM_CODE=JWEB_PAR_CONF&CartridgeName=cstage/cstage
OpenGIF         = propsheet.gif
CloseGIF        = propsheet.gif
;
[O_A_S_S_I_T_E_N_A_M_E.cartx.mdeploy]
ConfigURL       = /ows-abin/oasadmin?FORM_CODE=MAIN&COMPONENT=APP&NAME=mdeploy
OpenGIF         = app.gif
CloseGIF        = app.gif
Components      = AppConf, AppCartx
InternalName    = mdeploy
ComponentType   = App
;
[O_A_S_S_I_T_E_N_A_M_E.cartx.mdeploy.AppConf]
DisplayName     = "Configuration"
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
ConfigURL          = /ows-abin/csadmin?FORM_CODE=DISPLAY_CONFIG&ServerName=mdeploy
OpenGIF            = folder_open.gif
CloseGIF           = folder_closed.gif
Components         = AppConfSrv, AppConfEnv, AppConfLog, AppConfJava, AppConfWeb,
AppConfTxProperty
;
[O_A_S_S_I_T_E_N_A_M_E.cartx.mdeploy.AppConf.AppConfSrv]
DisplayName        = "Server"
ConfigURL          = /ows-abin/csadmin?FORM_CODE=SERVER_CONFIG&ServerName=mdeploy
OpenGIF            = propsheet.gif
CloseGIF           = propsheet.gif
;
[O_A_S_S_I_T_E_N_A_M_E.cartx.mdeploy.AppConf.AppConfEnv]
DisplayName        = "Environment Variables"
ConfigURL          = /ows-abin/csadmin?FORM_CODE=ENV_CONFIG&ServerName=mdeploy
OpenGIF            = propsheet.gif
CloseGIF           = propsheet.gif
;
[O_A_S_S_I_T_E_N_A_M_E.cartx.mdeploy.AppConf.AppConfLog]
DisplayName        = "Logging"
ConfigURL          = /ows-abin/csadmin?FORM_CODE=LOG_CONFIG&ServerName=mdeploy
OpenGIF            = propsheet.gif
CloseGIF           = propsheet.gif
;
[O_A_S_S_I_T_E_N_A_M_E.cartx.mdeploy.AppConf.AppConfJava]
DisplayName        = "Java Environment"
ConfigURL          = /ows-abin/csadmin?FORM_CODE=JAVA_PARAM_CONFIG&ServerName=mdeploy
OpenGIF            = propsheet.gif
CloseGIF           = propsheet.gif
;
[O_A_S_S_I_T_E_N_A_M_E.cartx.mdeploy.AppConf.AppConfWeb]
DisplayName        = "Web Parameters"
ConfigURL          = /ows-abin/csadmin?FORM_CODE=WEB_CONFIG&ServerName=mdeploy
OpenGIF            = propsheet.gif
CloseGIF           = propsheet.gif
;
[O_A_S_S_I_T_E_N_A_M_E.cartx.mdeploy.AppConf.AppConfTxProperty]
DisplayName        = "TX Property"
ConfigURL          = /ows-abin/csadmin?FORM_CODE=TXN_PROP&ServerName=mdeploy
OpenGIF            = propsheet.gif
CloseGIF           = propsheet.gif
;
[O_A_S_S_I_T_E_N_A_M_E.cartx.mdeploy.AppCartx]
DisplayName        = "Cartridges"
ConfigURL          =
/ows-abin/oasadmin?FORM_CODE=MAIN&COMPONENT=CARTX&APPNAME=mdeploy&NAME=mdeploy
OpenGIF            = cart_node_open.gif
CloseGIF           = cart_node_closed.gif
InternalName       = cartx/mdeploy
Components         = mdeploy
;
[O_A_S_S_I_T_E_N_A_M_E.cartx.mdeploy.AppCartx.mdeploy]
ConfigURL          = /ows-abin/oasadmin?FORM_CODE=MAIN&COMPONENT=APP&NAME=mdeploy
OpenGIF            = app.gif
CloseGIF           = app.gif
Components         = AppCartxConf
InternalName       = mdeploy/mdeploy
ComponentType      = Cartx
;
[O_A_S_S_I_T_E_N_A_M_E.cartx.mdeploy.AppCartx.mdeploy.AppCartxConf]
DisplayName        = "Configuration"
ConfigURL          =
/ows-abin/csadmin?FORM_CODE=CART_CONFIG&CartridgeName=mdeploy/mdeploy
OpenGIF            = folder_open.gif
CloseGIF           = folder_closed.gif
Components         = AppCartxConfTuning, AppCartxConfVP, AppCartxConfJWeb
;
[O_A_S_S_I_T_E_N_A_M_E.cartx.mdeploy.AppCartx.mdeploy.AppCartxConf.AppCartxConfTuning]
DisplayName        = "Tuning"
ConfigURL          =
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
/ows-abin/csadmin?FORM_CODE=LOAD_CONFIG&CartridgeName=mdeploy/mdeploy
OpenGIF          = propsheet.gif
CloseGIF         = propsheet.gif
;
[O_A_S_S_I_T_E_N_A_M_E.cartx.mdeploy.AppCartx.mdeploy.AppCartxConf.AppCartxConfVP]
DisplayName      = "Virtual Path"
ConfigURL        = /ows-abin/csadmin?FORM_CODE=VPATH&CartridgeName=mdeploy/mdeploy
OpenGIF          = propsheet.gif
CloseGIF         = propsheet.gif
;
[O_A_S_S_I_T_E_N_A_M_E.cartx.mdeploy.AppCartx.mdeploy.AppCartxConf.AppCartxConfJWeb]
DisplayName      = "JWeb Parameters"
ConfigURL        =
/ows-abin/csadmin?FORM_CODE=JWEB_PAR_CONF&CartridgeName=mdeploy/mdeploy
OpenGIF          = propsheet.gif
CloseGIF         = propsheet.gif
;
[O_A_S_S_I_T_E_N_A_M_E.cartx.ots]
ConfigURL        = /ows-abin/oasadmin?FORM_CODE=MAIN&COMPONENT=APP&NAME=ots
OpenGIF          = app.gif
CloseGIF         = app.gif
Components       = AppConf, AppCartx
InternalName     = ots
ComponentType    = App
;
[O_A_S_S_I_T_E_N_A_M_E.cartx.ots.AppConf]
DisplayName      = "Configuration"
ConfigURL        = /ows-abin/csadmin?FORM_CODE=DISPLAY_CONFIG&ServerName=ots
OpenGIF          = folder_open.gif
CloseGIF         = folder_closed.gif
Components       = AppConfSrv, AppConfEnv, AppConfLog, AppConfJava, AppConfWeb,
AppConfTxProperty
;
[O_A_S_S_I_T_E_N_A_M_E.cartx.ots.AppConf.AppConfSrv]
DisplayName      = "Server"
ConfigURL        = /ows-abin/csadmin?FORM_CODE=SERVER_CONFIG&ServerName=ots
OpenGIF          = propsheet.gif
CloseGIF         = propsheet.gif
;
[O_A_S_S_I_T_E_N_A_M_E.cartx.ots.AppConf.AppConfEnv]
DisplayName      = "Environment Variables"
ConfigURL        = /ows-abin/csadmin?FORM_CODE=ENV_CONFIG&ServerName=ots
OpenGIF          = propsheet.gif
CloseGIF         = propsheet.gif
;
[O_A_S_S_I_T_E_N_A_M_E.cartx.ots.AppConf.AppConfLog]
DisplayName      = "Logging"
ConfigURL        = /ows-abin/csadmin?FORM_CODE=LOG_CONFIG&ServerName=ots
OpenGIF          = propsheet.gif
CloseGIF         = propsheet.gif
;
[O_A_S_S_I_T_E_N_A_M_E.cartx.ots.AppConf.AppConfJava]
DisplayName      = "Java Environment"
ConfigURL        = /ows-abin/csadmin?FORM_CODE=JAVA_PARAM_CONFIG&ServerName=ots
OpenGIF          = propsheet.gif
CloseGIF         = propsheet.gif
;
[O_A_S_S_I_T_E_N_A_M_E.cartx.ots.AppConf.AppConfWeb]
DisplayName      = "Web Parameters"
ConfigURL        = /ows-abin/csadmin?FORM_CODE=WEB_CONFIG&ServerName=ots
OpenGIF          = propsheet.gif
CloseGIF         = propsheet.gif
;
[O_A_S_S_I_T_E_N_A_M_E.cartx.ots.AppConf.AppConfTxProperty]
DisplayName      = "Tx Property"
ConfigURL        = /ows-abin/csadmin?FORM_CODE=TXN_PROP&ServerName=ots
OpenGIF          = propsheet.gif
CloseGIF         = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.cartx.ots.AppCartx]
DisplayName     = "Cartridges"
ConfigURL       =
/ows-abin/oasadmin?FORM_CODE=MAIN&COMPONENT=CARTX&APPNAME=ots&NAME=ots
OpenGIF         = cart_node_open.gif
CloseGIF        = cart_node_closed.gif
InternalName    = cartx/ots
Components      = ots
;
[O_A_S_S_I_T_E_N_A_M_E.cartx.ots.AppCartx.ots]
ConfigURL       = /ows-abin/oasadmin?FORM_CODE=MAIN&COMPONENT=APP&NAME=ots
OpenGIF         = app.gif
CloseGIF        = app.gif
Components      = AppCartxConf
InternalName    = ots/ots
ComponentType   = Cartx
;
[O_A_S_S_I_T_E_N_A_M_E.cartx.ots.AppCartx.ots.AppCartxConf]
DisplayName     = "Configuration"
ConfigURL       = /ows-abin/csadmin?FORM_CODE=CART_CONFIG&CartridgeName=ots/ots
OpenGIF         = folder_open.gif
CloseGIF        = folder_closed.gif
Components      = AppCartxConfTuning, AppCartxConfVP. AppCartxConfJWeb
;
[O_A_S_S_I_T_E_N_A_M_E.cartx.ots.AppCartx.ots.AppCartxConf.AppCartxConfTuning]
DisplayName     = "Tuning"
ConfigURL       = /ows-abin/csadmin?FORM_CODE=LOAD_CONFIG&CartridgeName=ots/ots
OpenGIF         = propsheet.gif
Close&IF        = propsheet.gif
;
[O_A_S_S_I_T_E_N_A_M_E.cartx.ots.AppCartx.ots.AppCartxConf.AppCartxConfVP]
DisplayName     = "Virtual Path"
ConfigURL       = /ows-abin/csadmin?FORM_CODE=VPATH&CartridgeName=ots/ots
OpenGIF         = propsheet.gif
CloseGIF        = propsheet.gif
;
[O_A_S_S_I_T_E_N_A_M_E.cartx.ots.AppCartx.ots.AppCartxConf.AppCartxConfJWeb]
DisplayName     = "JWeb Parameters"
ConfigURL       = /ows-abin/csadmin?FORM_CODE=JWEB_PAR_CONF&CartridgeName=ots/ots
OpenGIF         = propsheet.gif
CloseGIF        = propsheet.gif
;
[O_A_S_S_I_T_E_N_A_M_E.cartx.cdeploy.AppCartx.cdeploy]
ConfigURL       = /ows-abin/oasadmin?FORM_CODE=MAIN&COMPONENT=APP&NAME=cdeploy
OpenGIF         = app.gif
CloseGIF        = app.gif
Components      = AppCartxConf
InternalName    = cdeploy/cdeploy
ComponentType   = Cartx
;
[O_A_S_S_I_T_E_N_A_M_E.cartx.cdeploy.AppCartx.cdeploy.AppCartxConf]
DisplayName     = "Configuration"
ConfigURL       =
/ows-abin/csadmin?FORM_CODE=CART_CONFIG&CartridgeName=cdeploy/cdeploy
OpenGIF         = folder_open.gif
CloseGIF        = folder_closed.gif
Components      = AppCartxConfTuning, AppCartxConfVP, AppCartxConfJWeb
;
[O_A_S_S_I_T_E_N_A_M_E.cartx.cdeploy.AppCartx.cdeploy.AppCartxConf.AppCartxConfTuning]
DisplayName     = "Tuning"
ConfigURL       =
/ows-abin/csadmin?FORM_CODE=LOAD_CONFIG&CartridgeName=cdeploy/cdeploy
OpenGIF         = propsheet.gif
CloseGIF        = propsheet.gif
;
[O_A_S_S_I_T_E_N_A_M_E.cartx.cdeploy.AppCartx.cdeploy.AppCartxConf.AppCartxConfVP]
DisplayName     = "Virtual Path"
ConfigURL       = /ows-abin/csadmin?FORM_CODE=VPATH&CartridgeName=cdeploy/cdeploy
OpenGIF         = propsheet.gif
CloseGIF        = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.cartx.cdeploy.AppCartx.cdeploy.AppCartxConf.AppCartxConfJWeb]
DisplayName      = "JWeb Parameters"
ConfigURL        =
/ows-abin/csadmin?FORM_CODE=JWEB_PAR_CONF&CartridgeName=cdeploy/cdeploy
OpenGIF          = propsheet.gif
CloseGIF         = propsheet.gif
---TEMPLATE: \web\site_e.app
;
[root]
Components       = wrb,dispatchers,cartx,orb,ots
DisplayName      = "O_A_S_S_I_T_E_N_A_M_E Site"
InternalName     = O_A_S_S_I_T_E_N_A_M_E
ConfigURL        = /ows-abin/oasadmin?FORM_CODE=MAIN&COMPONENT=SITE
OpenGIF          = site.gif
CloseGIF         = site.gif
NodesList        = H_O_S_T_N_A_M_E
StartOrder       = orb,wrb,dispatchers,cartx
;
[O_A_S_S_I_T_E_N_A_M_E.H_O_S_T_N_A_M_E]
NodeManagerPort  = O_A_S_N_O_D_E
NodeType         = Primary
InstallationType = List,Wrb,Cartx
UserName         = admin
Password         = JPPMDBLOKGHDOJMC
DomainName       = D_O_M_A_I_N
;
[O_A_S_S_I_T_E_N_A_M_E.ots]
TreeLocation     = O_A_S_S_I_T_E_N_A_M_E.wrb
JavaClass        = oracle.ots.mgmt.otsTree
;
[O_A_S_S_I_T_E_N_A_M_E.orb]
;TreeLocation    = O_A_S_S_I_T_E_N_A_M_E.wrb
;JavaClass       = oracle.orb.mgmt.OrbTree
Processes        = orbproc
;
[O_A_S_S_I_T_E_N_A_M_E.orb.orbproc]
StartCmd         = O_R_A_C_L_E_O_A_S_P_R_O_D_B_A_S_E/orb/4.0/admin/cgi/oasoctl.cgi
start ALL
StopCmd          = O_R_A_C_L_E_O_A_S_P_R_O_D_B_A_S_E/orb/4.0/admin/cgi/oasoctl.cgi stop
ALL
MonitorCmd       = O_R_A_C_L_E_O_A_S_P_R_O_D_B_A_S_E/orb/4.0/admin/cgi/oasoctl.cgi
monitor ALL
ReloadCmd        = O_R_A_C_L_E_O_A_S_P_R_O_D_B_A_S_E/orb/4.0/admin/cgi/oasoctl.cgi
reload ALL
;
[O_A_S_S_I_T_E_N_A_M_E.wrb]
Components       = logging,security,dad,frecovery,orb
DisplayName      = "Oracle Application Server"
InternalName     = wrb
Processes        =
wrbcfg,wrblog,wrbroker,wrbahsrv,wrbasrv.wrbrmpxy,wrksf,wrbmon,otsfacsrv
CollapseProcesses = oassrv,wrksf,otsfacsrv
ConfigURL        = /ows-abin/oasadmin?FORM_CODE=MAIN&COMPONENT=WRB&NAME=wrb
OpenGIF          = oas.gif
CloseGIF         = oas.gif
Reloadorder      =
wrb/wrblog,wrb/wrbahsrv,wrb/wrbasrv,wrb/wrksf,wrb/cartxSrv,wrb/wrbroker,wrb/wrbrmpxy,wrb/
wrbmon,wrb/otsfacsrv,dispatchers
;
[O_A_S_S_I_T_E_N_A_M_E.wrb.logging]
Components       = system,attribute,xlf
DisplayName      = "Logging"
ConfigURL        = /ows-abin/lgadmin?FORM_CODE=LOGGER_MAIN
OpenGIF          = folder_open.gif
CloseGIF         = folder_closed.gif
;
[O_A_S_S_I_T_E_N_A_M_E.wrb.logging.system]
DisplayName      = "System"
ConfigURL        = /ows-abin/lgadmin?FORM_CODE=LOGGER_SYS
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
OpenGIF          = propsheet.gif
CloseGIF         = propsheet.gif
;
[O_A_S_S_I_T_E_N_A_M_E.wrb.logging.attribute]
DisplayName      = "Attribute"
ConfigURL        = /ows-abin/lgadmin?FORM_CODE=LOGGER_ATTR
OpenGIF          = propsheet.gif
CloseGIF         = propsheet.gif
;
[O_A_S_S_I_T_E_N_A_M_E.wrb.logging.xlf]
DisplayName      = "XLF"
ConfigURL        = /ows-abin/lgadmin?FORM_CODE=LOGGER_XLF
OpenGIF          = propsheet.gif
CloseGIF         = propsheet.gif
;
[O_A_S_S_I_T_E_N_A_M_E.wrb.security]
Components       = basic,digest,ip,domain,database,crypt,certificate
DisplayName      = "Security"
ConfigURL        = /ows-abin/atadmin?FORM_CODE=AUTH_CONFIG_FORM
OpenGIF          = folder_open.gif
CloseGIF         = folder_closed.gif
;
[O_A_S_S_I_T_E_N_A_M_E.wrb.security.basic]
DisplayName      = "Basic"
ConfigURL        = /ows-abin/atadmin?FORM_CODE=AUTH_BASIC_FORM
OpenGIF          = propsheet.gif
CloseGIF         = propsheet.gif
;
[O_A_S_S_I_T_E_N_A_M_E.wrb.security.digest]
DisplayName      = "Digest"
ConfigURL        = /ows-abin/atadmin?FORM_CODE=AUTH_DIGEST_FORM
OpenGIF          = propsheet.gif
CloseGIF         = propsheet.gif
;
[O_A_S_S_I_T_E_N_A_M_E.wrb.security.ip]
DisplayName      = "IP"
ConfigURL        = /ows-abin/atadmin?FORM_CODE=AUTH_IP_FORM
OpenGIF          = propsheet.gif
CloseGIF         = propsheet.gif
;
[O_A_S_S_I_T_E_N_A_M_E.wrb.security.domain]
DisplayName      = "Domain"
ConfigURL        = /ows-abin/atadmin?FORM_CODE=AUTH_DOMAIN_FORM
OpenGIF          = propsheet.gif
CloseGIF         = propsheet.gif
;
[O_A_S_S_I_T_E_N_A_M_E.wrb.security.database]
DisplayName      = "Basic_Oracle"
ConfigURL        = /ows-abin/atadmin?FORM_CODE=AUTH_BASIC_ORACLE_FORM
OpenGIF          = propsheet.gif
CloseGIF         = propsheet.gif
;
[O_A_S_S_I_T_E_N_A_M_E.wrb.security.crypt]
DisplayName      = "Crypt"
ConfigURL        = /ows-abin/atadmin?FORM_CODE=AUTH_CRYPT_FORM
OpenGIF          = propsheet.gif
CloseGIF         = propsheet.gif
;
[O_A_S_S_I_T_E_N_A_M_E.wrb.security.certificate]
Components       = realms, servers, acls
DisplayName      = "Certificate"
ConfigURL        = /ows-adoc/blank.html
OpenGIF          = folder_open.gif
CloseGIF         = folder_closed.gif
;
[O_A_S_S_I_T_E_N_A_M_E.wrb.security.certificate.realms]
DisplayName      = "Realms"
ConfigURL        = /ows-abin/csadmin?FORM_CODE=CERT_REALM_MAIN
OpenGIF          = folder_open.gif
CloseGIF         = folder_closed.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.wrb.security.certificate.servers]
DisplayName     = "Servers"
ConfigURL       = /ows-abin/csadmin?FORM_CODE=CERT_SERVER_MAIN
OpenGIF         = folder_open.gif
CloseGIF        = folder_closed.gif
;
[O_A_S_S_I_T_E_N_A_M_E.wrb.security.certificate.acls]
DisplayName     = "ACLs"
ConfigURL       = /ows-abin/csadmin?FORM_CODE=CERT_ACL_MAIN
OpenGIF         = folder_open.gif
CloseGIF        = folder_closed.gif
;
[O_A_S_S_I_T_E_N_A_M_E.wrb.orb]
DisplayName     = "ORB Configuration"
ConfigURL       = /ows-abin/orbmgr?file=gencfg
OpenGIF         = propsheet.gif
CloseGIF        = propsheet.gif
;
[O_A_S_S_I_T_E_N_A_M_E.wrb.oassrv]
DisplayName     = "Oracle Application Server"
ComponentType   = wrb
InternalName    = oassrv
Nodes           = H_O_S_T_N_A_M_E
;
[O_A_S_S_I_T_E_N_A_M_E.wrb.oassrv.H_O_S_T_N_A_M_E]
Instances       = 1
;
[O_A_S_S_I_T_E_N_A_M_E.wrb.otsfacsrv]
DisplayName     = "Transaction Server Factory"
ComponentType   = Wrb
InternalName    = otsfacsrv
Nodes           = H_O_S_T_N_A_M_E
;
[O_A_S_S_I_T_E_N_A_M_E.wrb.otsfacsrv.H_O_S_T_N_A_M_E]
Instances       = 1
;
[O_A_S_S_I_T_E_N_A_M_E.wrb.wrbmon]
DisplayName     "Monitoring Daemon"
ComponentType   = Wrb
InternalName    = wrbmon
Nodes           = H_O_S_T_N_A_M_E
;
[O_A_S_S_I_T_E_N_A_M_E.wrb.wrbmon.H_O_S_T_N_A_M_E]
Instances       = 1
;
[O_A_S_S_I_T_E_N_A_M_E.wrb.wrblog]
DisplayName     = "Log Server"
ComponentType   = Wrb
InternalName    = wrblog
Nodes           = H_O_S_T_N_A_M_E
;
[O_A_S_S_I_T_E_N_A_M_E.wrb.wrblog.H_O_S_T_N_A_M_E]
Instances       = 1
;
[O_A_S_S_I_T_E_N_A_M_E.wrb.wrksf]
DisplayName     = "Cartridge Server Factory"
ComponentType   = Wrb
InternalName    = wrksf
Nodes           = H_O_S_T_N_A_M_E
;
[O_A_S_S_I_T_E_N_A_M_E.wrb.wrksf.H_O_S_T_N_A_M_E]
Instances       = 1
;
[O_A_S_S_I_T_E_N_A_M_E.wrb.wrbroker]
DisplayName     = "Resource Manager"
ComponentType   = Wrb
InternalName    = wrbroker
Nodes           = H_O_S_T_N_A_M_E
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.wrb.wrbroker.H_O_S_T_N_A_M_E]
Instances        = 1
;
[O_A_S_S_I_T_E_N_A_M_E.wrb.wrbrmpxy]
DisplayName      = "Resource Manager Proxy"
ComponentType    = Wrb
InternalName     = wrbrmpxy
Nodes            = H_O_S_T_N_A_M_E
;
[O_A_S_S_I_T_E_N_A_M_E.wrb.wrbrmpxy.H_O_S_T_N_A_M_E]
Instances        = 1
;
[O_A_S_S_I_T_E_N_A_M_E.wrb.wrbcfg]
DisplayName      = "Configuration Provider"
ComponentType    = Wrb
InternalName     = wrbcfg
Nodes            = H_O_S_T_N_A_M_E
;
[O_A_S_S_I_T_E_N_A_M_E.wrb.wrbcfg.H_O_S_T_N_A_M_E]
Instances        = 1
;
[O_A_S_S_I_T_E_N_A_M_E.wrb.wrbasrv]
DisplayName      = "Authentication Server"
ComponentType    = Wrb
InternalName     = wrbasrv
Nodes            = H_O_S_T_N_A_M_E
;
[O_A_S_S_I_T_E_N_A_M_E.wrb.wrbasrv.H_O_S_T_N_A_M_E]
Instances        = 1
;
[O_A_S_S_I_T_E_N_A_M_E.wrb.wrbahsrv]
DisplayName      = "Authentication Host Server"
ComponentType    = Wrb
InternalName     = wrbahsrv
Nodes            = H_O_S_T_N_A_M_E
;
[O_A_S_S_I_T_E_N_A_M_E.wrb.wrbahsrv.H_O_S_T_N_A_M_E]
Instances        = 1
;
;[O_A_S_S_I_T_E_N_A_M_E.wrb.wrbvpm]
;DisplayName = "Virtual Path Manager"
;ComponentType = Wrb
;InternalName = wrbvpm
;Nodes = H_O_S_T_N_A_M_E
;
;[O_A_S_S_I_T_E_N_A_M_E.wrb.wrbvpm.H_O_S_T_N_A_M_E]
;Instances        = 1
;
[O_A_S_S_I_T_E_N_A_M_E.dispatchers]
Components       = dispproc
DisplayName      = "HTTP Listeners"
InternalName     = dispatchers
ConfigURL        = /ows-abin/oasadmin?FORM_CODE=MAIN&COMPONENT=LIST&NAME=dispatchers
OpenGIF          = listener_node_open.gif
CloseGIF         = listener_node_closed.gif
;
[O_A_S_S_I_T_E_N_A_M_E.dispatchers.dispproc]
Components       = Net,Srv.UsrGrp,Dir,Lang,Mime,Enc,CaRoot,Sec
ComponentType    = Disp
ConfigURL        = /ows-abin/oasadmin?FORM_CODE=MAIN&COMPONENT=LIST&NAME=dispatchers/
OpenGIF          = listener.gif
CloseGIF         = listener.gif
;
[O_A_S_S_I_T_E_N_A_M_E.dispatchers.dispproc.Net]
DisplayName      = "Network"
ConfigURL        = /ows-abin/wladmin?CONFIG_CODE=NETWORK&orig_name=
OpenGIF          = propsheet.gif
CloseGIF         = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.dispatchers.dispproc.Srv]
DisplayName     = "Server"
ConfigURL       = /ows-abin/wladmin?CONFIG_CODE=SERVER&orig_name=
OpenGIF         = propsheet.gif
CloseGIF        = propsheet.gif
;
[O_A_S_S_I_T_E_N_A_M_E.dispatchers.dispproc.UsrGrp]
DisplayName     = "User/Group"
ConfigURL       = /ows-abin/wladmin?CONFIG_CODE=UG&orig_name=
OpenGIF         = propsheet.gif
CloseGIF        = propsheet.gif
;
[O_A_S_S_I_T_E_N_A_M_E.dispatchers.dispproc.Dir]
DisplayName     = "Directory"
ConfigURL       = /ows-abin/wladmin?CONFIG_CODE=DIR&orig_name=
OpenGIF         = propsheet.gif
CloseGIF        = propsheet.gif
;
[O_A_S_S_I_T_E_N_A_M_E.dispatchers.dispproc.Lang]
DisplayName     = "Language"
ConfigURL       = /ows-abin/wladmin?CONFIG_CODE=LANG&orig_name=
OpenGIF         = propsheet.gif
CloseGIF        = propsheet.gif
;
[O_A_S_S_I_T_E_N_A_M_E.dispatchers.dispproc.Mime]
DisplayName     = "MIME"
ConfigURL       = /ows-abin/wladmin?CONFIG_CODE=MIME&orig_name=
OpenGIF         = propsheet.gif
CloseGIF        = propsheet.gif
;
[O_A_S_S_I_T_E_N_A_M_E.dispatchers.dispproc.Enc]
DisplayName     = "Encoding"
ConfigURL       = /ows-abin/wladmin?CONFIG_CODE=ENCODING&orig_name=
OpenGIF         = propsheet.gif
CloseGIF        = propsheet.gif
;
[O_A_S_S_I_T_E_N_A_M_E.dispatchers.dispproc.CaRoot]
DisplayName     = "SSL CA Roots"
ConfigURL       = /ows-abin/wladmin?CONFIG_CODE=SSLCA&orig_name=
OpenGIF         = propsheet.gif
CloseGIF        = propsheet.gif
;
[O_A_S_S_I_T_E_N_A_M_E.dispatchers.dispproc.Sec]
Components      = Basic,Digest,IP,Domain,SSL
DisplayName     = "Security"
ConfigURL       = /ows-abin/wladmin?CONFIG_CODE=SECURITY&orig_name=
OpenGIF         = folder_open.gif
CloseGIF        = folder_closed.gif
;
[O_A_S_S_I_T_E_N_A_M_E.dispatchers.dispproc.Sec.Basic]
DisplayName     = "Basic"
ConfigURL       = /ows-abin/wladmin?CONFIG_CODE=BASIC&orig_name=
OpenGIF         = propsheet.gif
CloseGIF        = propsheet.gif
;
[O_A_S_S_I_T_E_N_A_M_E.dispatchers.dispproc.Sec.Digest]
DisplayName     = "Digest"
ConfigURL       = /ows-abin/wladmin?CONFIG_CODE=DIGEST&orig_name=
OpenGIF         = propsheet.gif
CloseGIF        = propsheet.gif
;
[O_A_S_S_I_T_E_N_A_M_E.dispatchers.dispproc.Sec.IP]
DisplayName     = "IP"
ConfigURL       = /ows-abin/wladmin?CONFIG_CODE=IP&orig_name=
OpenGIF         = propsheet.gif
CloseGIF        = propsheet.gif
;
[O_A_S_S_I_T_E_N_A_M_E.dispatchers.dispproc.Sec.Domain]
DisplayName     = "Domain"
ConfigURL       = /ows-abin/wladmin?CONFIG_CODE=DOMAIN&orig_name=
OpenGIF         = propsheet.gif
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
CloseGIF          = propsheet.gif
;
[O_A_S_S_I_T_E_N_A_M_E.dispatchers.dispproc.Sec.SSL]
DisplayName       = "SSL"
ConfigURL         = /ows-abin/wladmin?CONFIG_CODE=SSL&orig_name=
OpenGIF           = propsheet.gif
CloseGIF          = propsheet.gif
;
[O_A_S_S_I_T_E_N_A_M_E.wrb.dad]
DisplayName       = "DB Access Descriptor"
ConfigURL         = /ows-abin/dadadmin
OpenGIF           = dad_node_closed.gif
CloseGIF          = dad_node_closed.gif
;
[O_A_S_S_I_T_E_N_A_M_E.wrb.frecovery]
DisplayName       = "Failure Recovery"
ConfigURL         = /ows-abin/csadmin?FORM_CODE=FAILURE_RECOVERY
OpenGIF           = propsheet.gif
CloseGIF          = propsheet.gif
;
[O_A_S_S_I_T_E_N_A_M_E.cartx]
DisplayName = "Applications"
InternalName = wrb/cartxSrv
ConfigURL = /ows-abin/oasadmin?FORM_CODE=MAIN&COMPONENT=APP
OpenGIF = app_node_open.gif
CloseGIF = app_node_closed.gif
;
---TEMPLATE: \web\site_s.app
;
[root]
Components        = wrb,dispatchers,cartx,orb,ots
DisplayName       = "O_A_S_S_I_T_E_N_A_M_E Site"
InternalName      = O_A_S_S_I_T_E_N_A_M_E
ConfigURL         = /ows-abin/oasadmin?FORM_CODE=MAIN&COMPONENT=SITE
OpenGIF           = site.gif
CloseGIF          = site.gif
NodesList         = H_O_S_T_N_A_M_E
StartOrder        = orb,wrb,dispatchers,cartx
;
[O_A_S_S_I_T_E_N_A_M_E.H_O_S_T_N_A_M_E]
NodeManagerPort   = O_A_S_N_O_D_E
NodeType          = Primary
InstallationType  = List,Wrb,Cartx
UserName          = admin
Password          = JPPMDBLOKGHDOJMC
DomainName        = D_O_M_A_I_N
;
[O_A_S_S_I_T_E_N_A_M_E.ots]
TreeLocation      = O_A_S_S_I_T_E_N_A_M_E.wrb
JavaClass         = oracle.ots.mgmt.OtsTree
;
[O_A_S_S_I_T_E_N_A_M_E.orb]
;TreeLocation     = O_A_S_S_I_T_E_N_A_M_E.wrb
;JavaClass        = oracle.orb.mgmt.OrbTree
Processes         = orbproc
;
[O_A_S_S_I_T_E_N_A_M_E.orb.orbproc]
StartCmd          = O_R_A_C_L_E_O_A_S_P_R_O_D_B_A_S_E/orb/4.0/admin/cgi/oasoctl.cgi
start ALL
StopCmd           = O_R_A_C_L_E_O_A_S_P_R_O_D_B_A_S_E/orb/4.0/admin/cgi/oasoctl.cgi stop
ALL
MonitorCmd        = O_R_A_C_L_E_O_A_S_P_R_O_D_B_A_S_E/orb/4.0/admin/cgi/oasoctl.cgi
CloseGIF          = propsheet.gif
;
[O_A_S_S_I_T_E_N_A_M_E.wrb.security.ip]
DisplayName       = "IP"
ConfigURL         = /ows-abin/atadmin?FORM_CODE=AUTH_IP_FORM
OpenGIF           = propsheet.gif
CloseGIF          = propsheet.gif
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[O_A_S_S_I_T_E_N_A_M_E.wrb.security.domain]
DisplayName    = "Domain"
ConfigURL      = /ows-abin/atadmin?FORM_CODE=AUTH_DOMAIN_FORM
OpenGIF        = propsheet.gif
CloseGIF       = propsheet.gif
;
[O_A_S_S_I_T_E_N_A_M_E.wrb.security.database]
DisplayName    = "Basic_Oracle"
ConfigURL      = /ows-abin/atadmin?FORM_CODE=AUTH_BASIC_ORACLE_FORM
OpenGIF        = propsheet.gif
CloseGIF       = propsheet.gif
;
[O_A_S_S_I_T_E_N_A_M_E.wrb.security.crypt]
DisplayName    = "Crypt"
ConfigURL      = /ows-abin/atadmin?FORM_CODE=AUTH_CRYPT_FORM
OpenGIF        = propsheet.gif
CloseGIF       = propsheet.gif
;
[O_A_S_S_I_T_E_N_A_M_E.wrb.security.certificate]
Components     = realms, servers, acls
DisplayName    = "Certificate"
ConfigURL      = /ows-adoc/blank.html
OpenGIF        = folder_open.gif
CloseGIF       = folder_closed.gif
;
[O_A_S_S_I_T_E_N_A_M_E.wrb.security.certificate.realms]
DisplayName    = "Realms"
ConfigURL      = /ows-abin/csadmin?FORM_CODE=CERT_REALM_MAIN
OpenGIF        = folder_open.gif
CloseGIF       = folder_closed.gif
;
[O_A_S_S_I_T_E_N_A_M_E.wrb.security.certificate.servers]
DisplayName    = "Servers"
ConfigURL      = /ows-abin/csadmin?FORM_CODE=CERT_SERVER_MAIN
OpenGIF        = folder_open.gif
CloseGIF       = folder_closed.gif
;
[O_A_S_S_I_T_E_N_A_M_E.wrb.security.certificate.acls]
DisplayName    = "ACLs"
ConfigURL      = /ows-abin/csadmin?FORM_CODE=CERT_ACL_MAIN
OpenGIF        = folder_open.gif
CloseGIF       = folder_closed.gif
;
[O_A_S_S_I_T_E_N_A_M_E.wrb.orb]
DisplayName    = "ORB Configuration"
ConfigURL      = /ows-abin/orbmgr?file=gencfg
OpenGIF        = propsheet.gif
CloseGIF       = propsheet.gif
;
[O_A_S_S_I_T_E_N_A_M_E.wrb.oassrv]
DisplayName    = "Oracle Application Server"
ComponentType  = Wrb
InternalName   = oassrv
Nodes          = H_O_S_T_N_A_M_E
;
[O_A_S_S_I_T_E_N_A_M_E.wrb.oassrv.H_O_S_T_N_A_M_E]
Instances      = 1
;
[O_A_S_S_I_T_E_N_A_M_E.wrb.otsfacsrv]
DisplayName    = "Transaction Server Factory"
ComponentType  = Wrb
InternalName   = otsfacsrv
Nodes          = H_O_S_T_N_A_M_E
;
[O_A_S_S_I_T_E_N_A_M_E.wrb.otsfacsrv.H_O_S_T_N_A_M_E]
Instances      = 1
;
[O_A_S_S_I_T_E_N_A_M_E.wrb.wrbmon]
DisplayName    = "Monitoring Daemon"
ComponentType  = Wrb
InternalName   = wrbmon
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
Nodes           = H_O_S_T_N_A_M_E
;
[O_A_S_S_I_T_E_N_A_M_E.wrb.wrbmon.H_O_S_T_N_A_M_E]
Instances       = 1

;
[O_A_S_S_I_T_E_N_A_M_E.wrb.wrblog]
DisplayName     = "Log Server"
ComponentType   = Wrb
InternalName    = wrblog
Nodes           = H_O_S_T_N_A_M_E ;
[O_A_S_S_I_T_E_N_A_M_E.wrb.wrblog.H_O_S_T_N_A_M_E]
Instances       = 1

;
[O_A_S_S_I_T_E_N_A_M_E.wrb.wrksf]
DisplayName     = "Cartridge Server Factory"
ComponentType   = Wrb
InternalName    = wrksf
Nodes           = H_O_S_T_N_A_M_E ;
[O_A_S_S_I_T_E_N_A_M_E.wrb.wrksf.H_O_S_T_N_A_M_E]
Instances       = 1

;
[O_A_S_S_I_T_E_N_A_M_E.wrb.wrbroker]
DisplayName     = "Resource Manager"
ComponentType   = Wrb
InternalName    = wrbroker
Nodes           = H_O_S_T_N_A_M_E ;
[O_A_S_S_I_T_E_N_A_M_E.wrb.wrbroker.H_O_S_T_N_A_M_E]
Instances       = 1

;
[O_A_S_S_I_T_E_N_A_M_E.wrb.wrbrmpxy]
DisplayName     = "Resource Manager Proxy"
ComponentType   = Wrb
InternalName    = wrbrmpxy
Nodes           = H_O_S_T_N_A_M_E ;
[O_A_S_S_I_T_E_N_A_M_E.wrb.wrbrmpxy.H_O_S_T_N_A_M_E]
Instances       = 1

;
[O_A_S_S_I_T_E_N_A_M_E.wrb.wrbcfg]
DisplayName     = "Configuration Provider"
ComponentType   = Wrb
InternalName    = wrbcfg
Nodes           = H_O_S_T_N_A_M_E ;
[O_A_S_S_I_T_E_N_A_M_E.wrb.wrbcfg.H_O_S_T_N_A_M_E]
Instances       = 1

;
[O_A_S_S_I_T_E_N_A_M_E.wrb.wrbasrv]
DisplayName     = "Authentication Server"
ComponentType   = Wrb
tnternalName    = wrbasrv
Nodes           = H_O_S_T_N_A_M_E ;
[O_A_S_S_I_T_E_N_A_M_E.wrb.wrbasrv.H_O_S_T_N_A_M_E]
Instances       = 1

;
[O_A_S_S_I_T_E_N_A_M_E.wrb.wrbahsrv]
DisplayName     = "Authentication Host Server"
ComponentType   = Wrb
InternalName    = wrbahsrv
Nodes           = H_O_S_T_N_A_M_E ;
[O_A_S_S_I_T_E_N_A_M_E.wrb.wrbahsrv.H_O_S_T_N_A_M_E]
Instances       = 1

;
[O_A_S_S_I_T_E_N_A_M_E.wrb.wrbvpm]
;DisplayName    = "Virtual Path Manager"
;ComponentType  = wrb
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
;InternalName    = wrbvpm
;Nodes           = H_O_S_T_N_A_M_E
;
;[O_A_S_S_I_T_E_N_A_M_E.wrb.wrbvpm.H_O_S_T_N_A_M_E]
;Instances       = 1
;
[O_A_S_S_I_T_E_N_A_M_E.dispatchers]
Components       = dispproc
DisplayName      = "HTTP Listeners"
InternalName     = dispatchers
ConfigURL        = /ows-abin/oasadmin?FORM_CODE=MAIN&COMPONENT=LIST&NAME=dispatchers
OpenGIF          = listener_node_open.gif
CloseGIF         = listener_node_closed.gif
;
[O_A_S_S_I_T_E_N_A_M_E.dispatchers.dispproc]
Components       = Net,Srv,UsrGrp,Dir,Lang,Mime,Enc,CaRoot,Sec
ComponentType    = Disp
ConfigURL        = /ows-abin/oasadmin?FORM_CODE=MAIN&COMPONENT=LIST&NAME=dispatchers/
OpenGIF          = listener.gif
CloseGIF         = listener.gif
;
[O_A_S_S_I_T_E_N_A_M_E.dispatchers.dispproc.Net]
DisplayName      = "Network"
ConfigURL        = /ows-abin/wladmin?CONFIG_CODE=NETWORK&orig_name=
OpenGIF          = propsheet.gif
CloseGIF         = propsheet.gif
;
[O_A_S_S_I_T_E_N_A_M_E.dispatchers.dispproc.Srv]
DisplayName      = "Server"
ConfigURL        = /ows-abin/wladmin?CONFIG_CODE=SERVER&orig_name=
OpenGIF          = propsheet.gif
CloseGIF         = propsheet.gif
;
[O_A_S_S_I_T_E_N_A_M_E.dispatchers.dispproc.UsrGrp]
DisplayName      = "User/Group"
ConfigURL        = /ows-abin/wladmin?CONFIG_CODE=UG&orig_name=
OpenGIF          = propsheet.gif
CloseGIF         = propsheet.gif
;
[O_A_S_S_I_T_E_N_A_M_E.dispatchers.dispproc.Dir]
DisplayName      = "Directory"
ConfigURL        = /ows-abin/wladmin?CONFIG_CODE=DIR&orig_name=
OpenGIF          = propsheet.gif
CloseGIF         = propsheet.gif
;
[O_A_S_S_I_T_E_N_A_M_E.dispatchers.dispproc.Lang]
DisplayName      = "Language"
ConfigURL        = /ows-abin/wladmin?CONFIG_CODE=LANG&orig_name=
OpenGIF          = propsheet.gif
CloseGIF         = propsheet.gif
;
[O_A_S_S_I_T_E_N_A_M_E.dispatchers.dispproc.Mime]
DisplayName      = "MIME"
ConfigURL        = /ows-abin/wladmin?CONFIG_CODE=MIME&orig_name=
OpenGIF          = propsheet.gif
CloseGIF         = propsheet.gif
;
[O_A_S_S_I_T_E_N_A_M_E.dispatchers.dispproc.Enc]
DisplayName      = "Encoding"
ConfigURL        = /ows-abin/wladmin?CONFIG_CODE=ENCODING&orig_name=
OpenGIF          = propsheet.gif
CloseGIF         = propsheet.gif
;
[O_A_S_S_I_T_E_N_A_M_E.dispatchers.dispproc.CaRoot]
DisplayName      = "SSL CA Roots"
ConfigURL        = /ows-abin/wladmin?CONFIG_CODE=SSLCA&orig_name=
OpenGIF          = propsheet.gif
CloseGIF         = propsheet.gif
;
[O_A_S_S_I_T_E_N_A_M_E.dispatchers.dispproc.Sec]
Components       = Basic,Digest,IP,Domain,SSL
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
DisplayName     = "Security"
ConfigURL       = /ows-abin/wladmin?CONFIG_CODE=SECURITY&orig_name=
OpenGIF         = folder_open.gif
CloseGIF        = folder_closed.gif
;
[O_A_S_S_I_T_E_N_A_M_E.dispatchsrs.dispproc.Sec.Basic]
DisplayName     = "Basic"
ConfigURL       = /ows-abin/wladmin?CONFIG_CODE=BASIC&orig_name=
OpenGIF         = propsheet.gif
CloseGIF        = propsheet.gif
;
[O_A_S_S_I_T_E_N_A_M_E.dispatchers.dispproc.Sec.Digest]
DisplayName     = "Digest"
ConfigURL       = /ows-abin/wladmin?CONFIG_CODE=DIGEST&orig_name=
OpenGIF         = propsheet.gif
CloseGIF        = propsheet.gif
;
[O_A_S_S_I_T_E_N_A_M_E.dispatchers.dispproc.Sec.IP]
DisplayName     = "IP"
ConfigURL       = /ows-abin/wladmin?CONFIG_CODE=IP&orig_name=
OpenGIF         = propsheet.gif
CloseGIF        = propsheet.gif
;
[O_A_S_S_I_T_E_N_A_M_E.dispatchers.dispproc.Sec.Domain]
DisplayName     = "Domain"
ConfigURL       = /ows-abin/wladmin?CONFIG_CODE=DOMAIN&orig_name=
OpenGIF         = propsheet.gif
CloseGIF        = propsheet.gif
;
[O_A_S_S_I_T_E_N_A_M_E.dispatchers.dispproc.Sec.SSL]
DisplayName     = "SSL"
ConfigURL       = /ows-abin/wladmin?CONFIG_CODE=SSL&orig_name=
OpenGIF         = propsheet.gif
CloseGIF        = propsheet.gif
;
[O_A_S_S_I_T_E_N_A_M_E.wrb.dad]
DisplayName     = "DB Access Descriptor"
ConfigURL       = /ows-abin/dadadmin
OpenGIF         = dad_node_closed.gif
CloseGIF        = dad_node_closed.gif
;
[O_A_S_S_I_T_E_N_A_M_E.wrb.frecovery]
DisplayName     = "Failure Recovery"
ConfigURL       = /ows-abin/csadmin?FORM_CODE=FAILURE_RECOVERY
OpenGIF         = propsheet.gif
CloseGIF        = propsheet.gif
;
[O_A_S_S_I_T_E_N_A_M_E.cartx]
DisplayName     = "Applications"
InternalName    = wrb/cartxSrv
ConfigURL       = /ows-abin/oasadmin?FORM_CODE=MAIN&COMPONENT=APP
OpenGIF         = app_node_open.gif
CloseGIF        = app_node_closed.gif
;
---TEMPLATE: \web\svadmin.cfg
[Multiport]
ANY O_A_S_B_A_S_E14 NORM  H_O_S_T_N_A_M_E.D_O_M_A_I_N    /
O_R_A_C_L_E_O_A_S_B_A_S_E/admin/ows/O_A_S_S_I_T_E_N_A_M_E/httpd_H_O_S_T_N_A_M_E/admin/
NONE
ANY O_A_S_B_A_S_E14 NORM  H_O_S_T_N_A_M_E    /
O_R_A_C_L_E_O_A_S_B_A_S_E/admin/ows/O_A_S_S_I_T_E_N_A_M_E/httpd_H_O_S_T_N_A_M_E/admin/
NONE
[NetInfo]
MaxConnectCount = 500
;DNSResolution  = NEVER
DNSResolution   = ALWAYS
ServerPID       =
O_R_A_C_L_E_O_A_S_B_A_S_E/admin/ows/O_A_S_S_I_T_E_N_A_M_E/httpd_H_O_S_T_N_A_M_E/admin/sva
dmin.pid
;
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; Log Information
;
; Set values for . . .
;       LogInfoFile    . . . Information (Audit) Log file
;       AdminFile      . . . Error Log File
;       TimeStyle      . . . Time Style
;
[LogParams]
AdminRollover        = never
TimeStyle            = LOCAL
AdminFile            =
O_R_A_C_L_E_O_A_S_B_A_S_E/admin/ows/O_A_S_S_I_T_E_N_A_M_E/httpd_H_O_S_T_N_A_M_E/admin/sva
dmin.err
;
; Uncomment the ConnectionLogs section if logging is to be done
; Specify the correct filename in place of 'FILENAME'
;
;[ConnectionLogs]
;FILENAME        CLF     {clf}
;
; Server Parameters
;
; Set values for . . .
;       RequestTimeout   . . . Time out for incoming requests
;       ResponseTimeout  . . . Time out for outgoing responses
;       ScriptTimeout    . . . Time Out for Script response time
;
[Server]
InitialFile          = adminIndex.html
DefaultMIMEType      = application/octet-stream
; UserDir             = public_html
; UserDirInitialFile  = myinitial.html
DefaultCharset       = iso-8859-1
PreferredLanguage    = en
ImageMap             = map
UseDirIndexing       = FALSE
CGITimeout           = 900
FileCaching          = ON
;
; Secure Information Parameters
;
; Set values for . . .
;       UserID          . . . Acquire privileges for User ID
;       GroupID         . . . Acquire privileges for Group ID
;
[SecureInfo]
UserID               = L_C_S
GroupID              = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/4.0/doc needs to be here to keep
; the virtual path ordering correct.
O_R_A_C_L_E_O_A_S_P_R_O_D_B_A_S_E/ows/4.0/admin/doc/       NR     /
O_R_A_C_L_E_O_A_S_P_R_O_D_B_A_S_E/ows/4.0/doc/            NR     /ows-doc/
O_R_A_C_L_E_O_A_S_P_R_O_D_B_A_S_E/ows/4.0/admin/doc/ NR   /ows-adoc/
O_R_A_C_L_E_O_A_S_P_R_O_D_B_A_S_E/ows/4.0/admin/cgi/      CR     /ows-abin/
O_R_A_C_L_E_O_A_S_P_R_O_D_B_A_S_E/ows/4.0/admin/classes/  NR     /ows-aclass/
O_R_A_C_L_E_O_A_S_P_R_O_D_B_A_S_E/ows/4.0/bin/            CR     /ows-bin/
O_R_A_C_L_E_O_A_S_P_R_O_D_B_A_S_E/ows/4.0/admin/img/      NR     /ows-img/
O_R_A_C_L_E_O_A_S_P_R_O_D_B_A_S_E/ows/4.0/admin/img/      NR     /ows-aimg/
;O_R_A_C_L_E_O_A_S_P_R_O_D_B_A_S_E/ows/4.0/doc/           NR     /
;O_R_A_C_L_E_O_A_S_P_R_O_D_B_A_S_E/ows/4.0/demo/     NR    /demo/
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
;O_R_A_C_L_E_O_A_S_P_R_O_D_B_A_S_E/ows/4.0/demo/bin/      CR    /demo/bin/
;O_R_A_C_L_E_O_A_S_P_R_O_D_B_A_S_E/ows/4.0/demo/res/      NR    /demo/img/
;O_R_A_C_L_E_O_A_S_P_R_O_D_B_A_S_E/ows/4.0/demo/     NR   /demo/src/
;O_R_A_C_L_E_O_A_S_P_R_O_D_B_A_S_E/ows/4.0/demo/img/      NR    /tr-img/
;
; Language Extensions
;
; List for each combination of language type
; and character set one or more unique
; extensions.
;
[LangExt]
en       iso-8859-1           eng
en       unicode-1-1          engU uc
fr-CA    iso-8859-1           frc
fr-FR    iso-8859-1           fr
jp-JP    iso-2022-jp          jp
jp-JP    unicode-1-1-utf-8    jpU
;
;
; MIME Types
;
; List for each combination of MIME Type
; and representation one or more unique
; extensions.
;
[MIMETypes]
application/octet-stream             bin
application/astound                  asd asn
application/fastman                  lcc
application/java-archive             jar
application/java-serialized-object   ser
application/java-vm                  class
application/mac-binhex40             hqx
application/x-stuffit                sit
application/mbedlet                  mbd
application/msword                   doc
application/oda                      oda
application/pdf                      pdf
application/postscript               ai eps ps
application/rtf                      rtf
application/studiom                  smp
application/timbuktu                 tbt
application/vnd.ms-excel             xls xlw xla xlc xlm xlt
application/vnd.ms-powerpoint        ppt pps pot
application/vnd.ms-project           mpp
application/winhlp                   hlp
application/x-javascript             js
application/x-javascript;charset-UTF-8   jsu
application/x-asap                   asp
application/x-csh                    csh
application/x-dot                    dot
application/x-dvi                    dvi
application/x-earthtime              etc
application/x-envoy                  evy
application/x-excel                  xls xlc xll xlm xlw
application/x-gtar                   gtar
application/x-cpio                   cpio
application/x-hdf                    hdf
application/x-latex                  latex
application/x-javascript-config      jsc
application/x-maker                  fm
application/x-mif                    mif mi
application/x-mocha                  mocha moc
application/x-msaccess               mdb
application/x-mscardfile             crd
application/x-msclip                 clp
application/x-msmediaview            m13 m14
application/x-msmetafile             wmf
application/x-msmoney                mny
application/x-mspublisher            pub
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

| | |
|---|---|
| application/x-msschedule | scd |
| application/x-msterminal | trm |
| application/x-mswrite | wri |
| application/x-NET-Install | ins |
| application/x-netcdf | nc cdf |
| application/x-ns-proxy-autoconfig | proxy |
| application/x-pointplus | css |
| application/x-salsa | slc |
| application/x-sh | sh |
| application/x-shar | shar |
| application/x-sprite | spr sprite |
| application/x-tar | tar |
| application/x-tcl | tcl |
| application/x-perl | pl |
| application/x-tex | tex |
| application/x-texinfo | texinfo texi |
| application/x-timbuktu | tbp |
| application/x-tkined | tki tkined |
| application/x-troff-man | man |
| application/x-troff-me | me |
| application/x-troff-ms | ms |
| application/x-troff | t tr roff |
| application/x-wais-source | src |
| application/zip | zip |
| application/pre-encrypted | enc |
| application/x-pkcs7-crl | crl |
| application/x-fortezza-ckl | ckl |
| audio/basic | au snd |
| audio/echospeech | es esl |
| audio/midi | midi mid |
| audio/x-aiff | aif aiff aifc |
| audio/x-wav | wav |
| audio/x-pn-realaudio | ra ram |
| audio/x-pac | pac |
| audio/x-epac | pae |
| audio/x-liveaudio | lam |
| drawing/x-dwf | dwf |
| image/fif | fif |
| image/gif | gif |
| image/ief | ief |
| image/ifs | ifs |
| image/jpeg | jpeg jpg jpe jfif pjpeg pjp |
| image/png | png |
| image/tiff | tiff tif |
| image/vnd | dwg svf |
| image/wavelet | wi |
| image/bmp | bmp |
| image/x-photo-cd | pcd |
| image/x-cmu-raster | ras |
| image/x-portable-anymap | pnm |
| image/x-portable-bitmap | pbm |
| image/x-portable-graymap | pgm |
| image/x-portable-pixmap | ppm |
| image/x-rgb | rgb |
| image/x-xbitmap | xbm |
| image/x-xpixmap | xpm |
| image/x-xwindowdump | xwd |
| text/html | htm html |
| text/plain | txt c lst java |
| text/richtext | rtx |
| text/tab-separated-values | tsv |
| text/x-setext | etx |
| text/x-speech | talk |
| video/isivideo | fvi |
| video/mpeg | mpeg mpg mpe mpv vbs mpegv |
| video/x-mpeg2 | mpv2 mp2v |
| video/msvideo | avi |
| video/quicktime | qt mov moov |
| video/vivo | viv vivo |
| video/wavelet | wv |
| video/x-sgi-movie | movie |

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
x-world/x-svr              svr
x-world/x-vrml             wrl
x-world/x-vrt              vrt
appl/text         doc
model/vrml    wrl vrml
x-conference/x-cooltalk    ice
x-gzip                     gz
x-compress                 z
x-uuencode                 uu uue
application/x-x5O9-ca-cert          cacert
application/x-x509-server-cert      scert
application/x-x509-user-cert        ucert
application/x-x509-email-cert       ecert
;
[Encodings]
compress          Z
gzip              gz
;
[Security]
;SSL {
;CertFile =        O_R_A_C_L_E_O_A_S_P_R_O_D_B_A_S_E/ows/4.0/osskeys/cert.der
;DistNameFile    = O_R_A_C_L_E_O_A_S_P_R_O_D_B_A_S_E/ows/4.0/osskeys/servname.der
;KeyFile =         O_R_A_C_L_E_O_A_S_P_R_O_D_B_A_S_E/ows/4.0/osskeys/privkey.der
;CADir =           O_R_A_C_L_E_O_A_S_P_R_O_D_B_A_S_E/ows/4.0/ca
;CRLDir =          O_R_A_C_L_E_O_A_S_P_R_O_D_B_A_S_E/ows/4.0/cacrls
;}
Basic {
(Users)
admin: JPPMDBLOKGHDOJMC
(Groups)
dba: admin
(Realms)
Admin Utility Server: dba
}
;
;
[Protection]
/               R Basic(Admin Utility Server)
/ows-adoc/      R Basic(Admin Utility Server)
/ows-abin/      R Basic(Admin Utility Server)
/ows-bin/       R Basic(Admin Utility Server)
/ows-doc/       R Basic(Admin Utility Server)
;/demo/         R Basic(Admin Utility Server)
;/demo/bin/     R Basic(Adnin Utility Server)
;/demo/src/     R Basic(Admin Utility Server)
;
[DynApps]
O_R_A_C_L_E_O_A_S_P_R_O_D_B_A_S_E/ows/4.0/lib/ndwfss.so oracle_adp_init
---TEMPLATE: \web\svcdeply.cfg
;; Oracle Internet Commerce listener information file
;; Copyright © 1997 Oracle Corporation. All rights reserved.
[Multiport]
ANY     O_A_S_B_A_S_E22     NORM     H_O_S_T_N_A_M_E.D_O_M_A_I_N     /
O_R_A_C_L_E_O_A_S_B_A_S_E/admin/ows/O_R_A_C_L_E_S_I_D/httpd_H_O_S_T_N_A_M_E/cdeply/
NONE
;
[NetInfo]
MaxConnectCount         = 338
DNSResolution           = NEVER
ServerPID        =
O_R_A_C_L_E_O_A_S_B_A_S_E/admin/ows/O_R_A_C_L_E_S_I_D/httpd_H_O_S_T_N_A_M_E/cdeply/svcdep
ly.pid
;
;
; Log Information
;
; Set values for . . .
;      LogDir            . . . Place for all log files
;      LogInfoFile       . . . Information (Audit) Log file
;      LogErrorFile      . . . Error Log File
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[LogParams]
AdminRollover    = never
TimeStyle        = GMT
AdminFile        =
O_R_A_C_L_E_O_A_S_B_A_S_E/admin/ows/O_R_A_C_L_E_S_I_D/httpd_H_O_S_T_N_A_M_E/cdeply/svcdep
ly.err
;
;
; Server Parameters
;
; Set values for . . .
;       RequestTimeout   . . . Time out for incoming requests
;       ResponseTimeout  . . . Time out for outgoing responses
;       ScriptTimeout    . . . Time out for Script response time
;
[Server]
InitialFile          = cdeploy.en.htm
DefaultMIMEType      = text/html
; UserDir             = public_html
; UserDirInitialFile  = myinitial.html
DefaultCharset       = iso-8859-1
PreferredLanguage    = en
ImageMap             = map
UseDirIndexing       = FALSE
CGITimeout           = 900
;
; Secure Information Parameters
;
; Set values for . . .
;       UserID     . . . Acquire privileges for User ID
;       GroupID    . . . Acquire privileges for Group ID
;
[SecureInfo]
UserID       = I_C_S
GroupID      = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
;O_R_A_C_L_E_O_A_S_P_R_O_D_B_A_S_E/deploy/store/templates/           NR    /
;O_R_A_C_L_E_O_A_S_P_R_O_D_B_A_S_E/ows/4.0/bin/              CN    /ows-bin/
;O_R_A_C_L_E_O_A_S_P_R_O_D_B_A_S_E/ows/4.0/doc/              NR    /ows-doc/
;O_R_A_C_L_E_O_A_S_P_R_O_D_B_A_S_E/ows/4.0/admdoc/           NR    /ows-adoc/
;O_R_A_C_L_E_O_A_S_P_R_O_D_B_A_S_E/ows/4.0/img/              NR    /ows-img/
;O_R_A_C_L_E_O_A_S_P_R_O_D_B_A_S_E/ows/4.0/sample/     NR          /sample/
;O_R_A_C_L_E_O_A_S_P_R_O_D_B_A_S_E/ows/4.0/sample/bin/ CR          /sample/bin/
;O_R_A_C_L_E_O_A_S_P_R_O_D_B_A_S_E/ows/4.0/demo/       NR          /demo/
;O_R_A_C_L_E_O_A_S_P_R_O_D_B_A_S_E/ows/4.0/demo/bin/         CR    /demo/bin/
;O_R_A_C_L_E_O_A_S_P_R_O_D_B_A_S_E/ows/4.0/demo/res/         NR    /demo/img/
;O_R_A_C_L_E_O_A_S_P_R_O_D_B_A_S_E/ows/4.0/demo/       NR    /demo/src/
;O_R_A_C_L_E_O_A_S_P_R_O_D_B_A_S_E/ows/4.0/demo/img/         NR    /tr-img/
;
;
; File Cache
;
; List the full virtual filename path or wild-card
; expression denoting one or more files in theÆ
; virtual file system.
;
; [FileCache]
;/products/*
;/products/xr25/Version*.c
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
;/employees/list/phones
;
;
; Language Extensions
;
; List for each combination of language type
; and character set one or more unique
; extensions.
;
[LangExt]
en        iso-8859-1          eng
en        unicode-1-1         engU uc
fr-CA     iso-8859-1          frc
fr-FR     iso-8859-1          fr
jp-JP     iso-2022-jp         jp
jp-JP     unicode-1-1-utf-8   jpU
;
;
; MIME Types
;
; List for each combination of MIME Type
; and representation one or more unique
; extensions.
;
[MIMETypes]
text/html          htm html
image/jpeg         jpg jpeg
image/gif          gif
appl/text          doc
text/plain         txt ksh lst
application/pdf pdf
application/postscript ps
x-world/x-vrml     wrl vrml
;
[Encodings]
compress           Z
gzip               gz
;
;
;The ordering of the DynApps should not be changed
[DynApps]
O_R_A_C_L_E_O_A_S_P_R_O_D_B_A_S_E/ows/4.0/lib/ndwfss.so oracle_adp_init
---TEMPLATE: \web\svcstage.cfg
;; Oracle Internet Commerce listener information file
;; Copyright © 1997 Oracle Corporation. All rights reserved.
[Multiport]
ANY     O_A_S_B_A_S_E21     NORM     H_O_S_T_N_A_M_E.D_O_M_A_I_N     /
O_R_A_C_L_E_O_A_S_B_A_S_E/admin/ows/O_R_A_C_L_E_S_I_D/httpd_H_O_S_T_N_A_M_E/cstage/
NONE
;
[NetInfo]
MaxConnectCount   = 338
DNSResolution     = NEVER
ServerPID         =
O_R_A_C_L_E_O_A_S_B_A_S_E/admin/ows/O_R_A_C_L_E_S_I_D/httpd_H_O_S_T_N_A_M_E/svcstage.pid
;
;
; Log Information
;
; Set values for . . .
;       LogDir        . . . Place for all log files
;       LogInfoFile   . . . Information (Audit) Log file
;       LogErrorFile  . . . Error Log File
;
[LogParams]
AdminRollover   = never
TimeStyle       = GMT
AdminFile       =
O_R_A_C_L_E_O_A_S_B_A_S_E/admin/ows/O_R_A_C_L_E_S_I_D/httpd_H_O_S_T_N_A_M_E/svcstage.err
;
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; Server Parameters
;
; Set values for . . .
;       RequestTimeout    . . . Time out for incoming requests
;       ResponseTimeout   . . . Time out for outgoing responses
;       ScriptTimeout     . . . Time out for Script response time
;
[Server]
InitialFile          = cstage.en.htm
DefaultMIMEType      = text/html
; UserDir            = public__html
; UserDirInitialFile = myinitial.html
DefaultCharset       = iso-8859-1
PreferredLanguage    = en
ImageMap             = map
UseDirIndexing       = FALSE
CGITimeout           = 900
;
; Secure Information Parameters
;
; Set values for . . .
;       UserID        . . . Acquire privileges for User ID
;       GroupID       . . . Acquire privileges for Group ID
;
[SecureInfo]
UserID        = I_C_S
GroupID       = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
O_R_A_C_L_E_O_A_S_P_R_O_D_B_A_S_E/stage/store/templates/   NR         /
;O_R_A_C_L_E_O_A_S_P_R_O_D_B_A_S_E/ows/4.0/bin/            CN         /ows-bin/
;O_R_A_C_L_E_O_A_S_P_R_O_D_B_A_S_E/ows/4.0/doc/            NR         /ows-doc/
;O_R_A_C_L_E_O_A_S_P_R_O_D_B_A_S_E/ows/4.0/admdoc/         NR         /ows-adoc/
;O_R_A_C_L_E_O_A_S_P_R_O_D_B_A_S_E/ows/4.0/img/            NR         /ows-img/
;O_R_A_C_L_E_O_A_S_P_R_O_D_B_A_S_E/ows/4.0/sample/         NR         /sample/
;O_R_A_C_L_E_O_A_S_P_R_O_D_B_A_S_E/ows/4.0/sample/bin/ CR             /sample/bin/
;O_R_A_C_L_E_O_A_S_P_R_O_D_B_A_S_E/ows/4.0/demo/       NR             /demo/
;O_R_A_C_L_E_O_A_S_P_R_O_D_B_A_S_E/ows/4.0/demo/bin/       CR         /demo/bin/
;O_R_A_C_L_E_O_A_S_P_R_O_D_B_A_S_E/ows/4.0/demo/res/       NR         /demo/img/
;O_R_A_C_L_E_O_A_S_P_R_O_D_B_A_S_E/ows/4.0/demo/       NR             /demo/src/
;O_R_A_C_L_E_O_A_S_P_R_O_D_B_A_S_E/ows/4.0/demo/img/              NR /tr-img/
;
;
; File Cache
;
; List the full virtual filename path or wild-card
; expression denoting one or more files in the Æ
; virtual file system.
;
; [FileCache]
;/products/*
;/products/xr25/Version*.c
;/employees/list/phones
;
;
; Language Extensions
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; List for each combination of language type
; and character set one or more unique
; extensions.
;
[LangExt]
en        iso-8859-1         eng
en        unicode-1-1        engU uc
fr-CA     iso-8859-1         frc
fr-FR     iso-8859-1         fr
jp-JP     iso-2022-jp        jp
jp-JP     unicode-1-1-utf-8  jpU
;
;
; MIME Types
;
; List for each combination of MIME Type
; and representation one or more unique
; extensions.
;
[MIMETypes]
text/html          htm html
image/jpeg         jpg jpeg
image/gif          gif
appl/text          doc
text/plain         txt ksh lst
application/pdf pdf
application/postscript ps
x-world/x-vrml     wrl vrml
;
[Encodings]
compress           Z
gzip               gz
;
;
; The ordering of the DynApps should not be changed
[DynApps]
O_R_A_C_L_E_O_A_S_P_R_O_D_B_A_S_E/ows/4.0/lib/ndwfes.so oracle_adp_init
---TEMPLATE: \web\svmstage.cfg
;; Oracle Internet Commerce listener information file
;; Copyright © 1997 Oracle Corporation. All rights reserved.
[MultiPort]
ANY    O_A_S_B_A_S_E20    NORM    H_O_S_T_N_A_M_E.D_O_M_A_I_N    /
O_R_A_C_L_E_O_A_S_B_A_S_E/admin/ows/O_R_A_C_L_E_S_I_D/httpd_H_O_S_T_N_A_M_E/mstage/
NONE
;
[NetInfo]
MaxConnectCount  = 338
DNSResolution    = NEVER
ServerPID        =
O_R_A_C_L_E_O_A_S_B_A_S_E/admin/ows/O_R_A_C_L_E_S_I_D/httpd_H_O_S_T_N_A_M_E/mstage/svmsta
ge.pid
;
;
; Log Information
;
; Set values for . . .
;      LogDir           . . . Place for all log files
;      LogInfoFile      . . . Information (Audit) Log file
;      LogErrorFile     . . . Error Log File
;
[LogParams]
AdminRollover    = never
TimeStyle        = GMT
AdmFile          =
O_R_A_C_L_E_O_A_S_B_A_S_E/admin/ows/O_R_A_C_L_E_S_I_D/httpd_H_O_S_T_N_A_M_E/mstage/svmsta
ge.err
;
;
; Server Parameters
;
; Set values for . . .
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
;       RequestTimeout       . . . Time out for incoming requests
;       ResponseTimeout      . . . Time out for outgoing responses
;       ScriptTimeout        . . . Time out for Script response time
;
[Server]
InitialFile           = storDsgr.htm
DefaultMIMEType       = text/html
; UserDir             = public_html
; UserDirInitialFile  = myinitial.html
DefaultCharset        = iso-8859-1
PreferredLanguage     = en
ImageMap              = map
UseDirIndexing        = FALSE
CGITimeout            = 900
;
; Secure Information Parameters
;
; Set values for . . .
;       UserID               . . . Acquire privileges for User ID
;       GroupID              . . . Acquire privileges for Group ID
;
[SecureInfo]
UserID           = I_C_S
GroupID          = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
O_R_A_C_L_E_O_A_S_P_R_O_D_B_A_S_E/oec/storemgr/templates/            NR    /
O_R_A_C_L_E_O_A_S_P_R_O_D_B_A_S_E/stage/store/templates/multimedia/         NR
/multimedia dir/
O_R_A_C_L_E_O_A_S_P_R_O_D_B_A_S_E/oec/demo/bin/          CN    /oec-bin/
;O_R_A_C_L_E_O_A_S_P_R_O_D_B_A_S_E/ows/4.0/bin/          CN     /ows-bin/
;O_R_A_C_L_E_O_A_S_P_R_O_D_B_A_S_E/ows/4.0/doc/          NR    /ows-doc/
;O_R_A_C_L_E_O_A_S_P_R_O_D_B_A_S_E/ows/4.0/admdoc/       NR    /ows-adoc/
;O_R_A_C_L_E_O_A_S_P_R_O_D_B_A_S_E/ows/4.0/img/          NR    /ows-img/
;O_R_A_C_L_E_O_A_S_P_R_O_D_B_A_S_E/ows/4.0/sample/       NR     /sample/
;O_R_A_C_L_E_O_A_S_P_R_O_D_B_A_S_E/ows/4.0/sample/bin/ CR       /sample/bin/
;O_R_A_C_L_E_O_A_S_P_R_O_D_B_A_S_E/ows/4.0/demo/     NR        /demo/
;O_R_A_C_L_E_O_A_S_P_R_O_D_B_A_S_E/ows/4.0/demo/bin/        CR     /demo/bin/
;O_R_A_C_L_E_O_A_S_P_R_O_D_B_A_S_E/ows/4.0/demo/res/        NR    /demo/img/
;O_R_A_C_L_E_O_A_S_P_R_O_D_B_A_S_E/ows/4.0/demo/     NR  /demo/src/
;O_R_A_C_L_E_O_A_S_P_R_O_D_B_A_S_E/ows/4.0/demo/img/        NR    /tr-img/
;
;
; File Cache
;
; List the full virtual filename path or wild-card
; expression denoting one or more files in theÆ
; virtual file system.
;
;[FileCache]
;/products/*
;/products/xr25/Version*.c
;/employess/list/phones
;
;
; Language Extensions
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
; List for each combination of language type
; and character set one or more unique
; extensions.
;
[LangExt]
en        iso-8859-1          eng
en        unicode-1-1         engU uc
fr-CA     iso-8859-1          frc
fr-FR     iso-8859-1          fr
jp-JP     iso-2022-jp         jp
jp-JP     unicode-1-1-utf-8   jpU
;
;
; MIME Types
;
; List for each combination of MIME Type
; and representation one or more unique
; extensions.
;
[MIMETypes]
text/html         htm html
image/jpeg        jpg jpeg
image/gif         gif
appl/text         doc
text/plain        txt ksh lst
application/pdf pdf
application/postscript ps
x-world/x-vrml    wrl vrml

[Encodings]
compress          Z
gzip              gz
;
;
; The ordering of the DynApps should not be changed
[DynApps]
O_R_A_C_L_E_O_A_S_P_R_O_D_B_A_S_E/ows/4.0/lib/ndwfss.so oracle_adp_init
---TEMPLATE: \web\svnode.cfg
;
[Multiport]
ANY            O_A_S_N_O_D_E_P_O_R_T            NORM
H_O_S_T_N_A_M_E.D_O_M_A_I_N /
O_R_A_C_L_E_O_A_S_B_A_S_E/admin/ows/O_R_A_C_L_E_S_I_D/httpd_H_O_S_T_N_A_M_E/node/ NONE
ANY            O_A_S_N_O_D_E_P_O_R_T            NORM   H_O_S_T_N_A_M_E
/
O_R_A_C_L_E_O_A_S_B_A_S_E/admin/ows/O_R_A_C_L_E_S_I_D/httpd_H_O_S_T_N_A_M_E/node/ NONE
;
[NetInfo]
MaxConnectCount   = 500
DNSResolution     = ALWAYS
ServerPID         =
O_R_A_C_L_E_O_A_S_B_A_S_E/admin/ows/O_A_S_S_I_T_E_N_A_M_E/httpd_H_O_S_T_N_A_M_E/node/svno
de.pid
;
[LogParams]
AdminRollover     = never
Timestyle         = LOCAL
AdminFile         =
O_R_A_C_L_E_O_A_S_B_A_S_E/admin/ows/O_A_S_S_I_T_E_N_A_M_E/httpd_H_O_S_T_N_A_M_E/node/svno
de.err
;
[ConnectionLogs]
svnode.log        CLF       {CLF}
;
[Server]
InitialFile       = welcome.html
DefaultMIMEType   = application/octet-stream
DefaultCharset    = iso-8859-1
PreferredLanguage = en
ImageMap          = map
UseDirIndexing    = FALSE
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
CGITimeout      = 900
FileCaching     = ON
;
[SecureInfo]
UserID          = I_C_S
GroupID         = G_R_O_U_P_N_A_M_E
;
[DirMaps]
O_R_A_C_L_E_O_A_S_P_R_O_D_B_A_S_E/ows/4.0/admin/doc/ NR           /
O_R_A_C_L_E_O_A_S_P_R_O_D_B_A_S_E/ows/cartx/jweb/ NR               /jweb/
O_R_A_C_L_E_O_A_S_P_R_O_D_B_A_S_E/orb/4.0/admin/cgi/ CR            /orb40-abin/
O_R_A_C_L_E_O_A_S_P_R_O_D_B_A_S_E/orb/4.0/doc/ NR       /orb40-adoc/
O_R_A_C_L_E_O_A_S_P_R_O_D_B_A_S_E/ows/4.0/admin/cgi/ CR            /ows-abin/
O_R_A_C_L_E_O_A_S_P_R_O_D_B_A_S_E/ows/4.0/admin/classes/ NR           /ows-aclass/
O_R_A_C_L_E_O_A_S_P_R_O_D_B_A_S_E/ows/4.0/admin/doc/ NR            /ows-adoc/
O_R_A_C_L_E_O_A_S_P_R_O_D_B_A_S_E/ows/4.0/admin/img/ NR            /ows-aimg/
O_R_A_C_L_E_O_A_S_P_R_O_D_B_A_S_E/ows/ NR               /ows-apps/
O_R_A_C_L_E_O_A_S_P_R_O_D_B_A_S_E/ows/4.0/admin/cgi/ CR            /ows-deploy/
O_R_A_C_L_E_O_A_S_P_R_O_D_B_A_S_E/ows/4.0/doc/ NR       /ows-doc/
O_R_A_C_L_E_O_A_S_P_R_O_D_B_A_S_E/ows/4.0/admin/img/ NR            /ows-img/
;
[LangExt]
en              iso-8859-1      eng
en              unicode-1-1     engU        uc
fr-CA           iso-8859-1      frc
fr-FR           iso-8859-1      fr
jp-JP           iso-2022-jp     jp
jp-JP           unicode-1-1-utf-8  jpU
;
[MIMETypes]
application/octet-stream bin
application/astound asd           asn
application/fastman lcc
application/java-archive jar
application/java-serialized-object ser
application/java-vm class
application/mac-binhex40 hqx
application/x-stuffit sit
application/nbedlet mbd
application/msword doc
application/oda     oda
application/pdf     pdf
application/postscript   ai       eps       ps
application/rtf     rtf
application/studiom smp
application/tinbuktu tbt
application/vnd.ms-excel  xls     xlw       xla       xlc
                    xlm     xlt
application/vnd.ms-powerpoint   ppt     pps       pot
application/vnd.ms-project mpp
application/winhlp hlp
application/x-javascript js
application/x-javascript;charset=UTF-8 jsu
application/x-asap   asp
application/x-csh    csh
application/x-dot    dot
application/x-dvi    dvi
application/x-earthtime etc
application/x-envoy  evy
application/x-excel  xls     xlc       xll       xlm
        xlw
application/x-gtar   gtar
application/x-cpio   cpio
application/x-hdf    hdf
application/x-latex latex
application/x-javascript-config jsc
application/x-maker  fm
application/x-mif    mif       mi
application/x-mocha  mocha     moc
application/x-msaccess mdb
application/x-mscardfile crd
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
application/x-msclip clp
application/x-msmediaview  m13          m14
application/x-msmetafile wmf
application/x-msmoney mny
application/x-mspublisher pub
application/x-msschedule scd
application/x-msterminal trm
application/x-mswrite wri
application/x-NET-Install ins
application/x-netcdf   nc          cdf
application/x-ns-proxy-autoconfig proxy
application/x-pointplus css
application/x-salsa    slc
application/x-sh       sh
application/x-shar     shar
application/x-sprite   spr          sprite
application/x-tar      tar
application/x-tcl      tcl
application/x-perl     pl
application/x-tex      tex
application/x-texinfo texinfo      texi
application/x-timbuktu tbp
application/x-tkined tki            tkined
application/x-troff-man man
application/x-troff-me me
application/x-troff-ms ms
application/x-troff t              tr          roff
application/x-wais-source src
application/zip        zip
application/pre-encrypted enc
application/x-pkcs7-crl crl
application/x-fortezza-ckl ckl
audio/basic            au          snd
audio/echospeech       es          esl
audic/midi             midi        mid
audio/x-aiff           aif         aiff        aifc
audio/x-wav            wav
audio/x-pn-realaudio ra            ram
audio/x-pac            pac
audio/x-epac           pae
audio/x-liveaudio      lam
drawing/x-dwf          dwf
image/fif              fif
image/gif              gif
image/ief              ief
image/ifs              ifs
image/jpeg             jpeg        jpg         jpe         jfif
     pjpeg             pjp
image/png              png
image/tiff             tiff        tif
image/vnd              dwg         svf
image/wavelet          wi
image/bmp              bmp
image/x-photo-cd       pcd
image/x-cmu-raster     ras
image/x-portable-anymap pnm
image/x-portable-bitmap pbm
image/x-portable-graymap pgm
image/x-portable-pixmap ppm
image/x-rgb            rgb
image/x-xbitmap        xbm
image/x-xpixmap        xpm
image/x-xwindowdump    xwd
text/html              htm         html
text/plain             txt         c           lst         java
text/richtext          rtx
text/tab-separated-values tsv
text/x-setext          etx
text/x-speech          talk
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
video/isivideo           fvi
video/mpeg               mpeg      mpg       mpe       mpv
    vbs                  mpegv
video/x-mpeg2            mpv2      mp2v
video/msvideo            avi
video/quicktime          qt        mov       moov
video/vivo               viv       vivo
video/wavelet            wv
video/x-sgi-movie        movie
x-world/x-svr            svr
x-world/x-vml            wrl
x-world/x-vrt            vrt
appl/text                doc
model/vrml               wrl       vrml
x-conference/x-cooltalk ice
x-gzip                   gz
x-compress               z
x-uuencode               uu        uue
application/x-x509-ca-cert cacert
application/x-x509-server-cert scert
application/x-x509-user-cert ucert
application/x-x509-email-cert ecert
;
[Encodings]
compress     Z
gzip         gz
;
[Security]
Basic {
(Users)
admin: JPPMDBLOKGHDOJMC
(Groups)
dba: admin
(Realms)
Node Manager Server: dba
}
;
;
[Protection]
/          R     Basic(Node Manager Server)
---TEMPLATE: \web\svots.cfg
;; Oracle Telephony listener information file
;; Copyright © 1998 Oracle Corporation. All rights reserved.
[Multiport]
ANY    O_A_S_B_A_S_E23    NORM    H_O_S_T_N_A_M_E.D_O_M_A_I_N    /
O_R_A_C_L_E_O_A_S_B_A_S_E/admin/ows/O_R_A_C_L_E_S_I_D/httpd_H_O_S_T_N_A_M_E/ots/    NONE
;
[NetInfo]
MaxConnectCount      = 338
DNSResolution        = NEVER
ServerPID            =
O_R_A_C_L_E_O_A_S_B_A_S_E/admin/ows/O_R_A_C_L_E_S_I_D/httpd_H_O_S_T_N_A_M_E/ots/svots.pid
;
;
; Log Information
;
; Set values for . . .
;      LogDir              . . . Place for all log files
;      LogInfoFile         . . . Information (Audit) Log file
;      LogErrorFile        . . . Error Log File
;
[LogParams]
AdminRollover        = never
TimeStyle            = GMT
AdminFile            =
O_R_A_C_L_E_O_A_S_B_A_S_E/admin/ows/O_R_A_C_L_E_S_I_D/httpd_H_O_S_T_N_A_M_E/ots/svots.err
;
;
; Server Parameters
;
; Set values for . . .
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
;       RequestTimeout      . . . Time out for incoming requests
;       ResponseTimeout     . . . Time out for outgoing responses
;       ScriptTimeout       . . . Time out for Script response time
;
[Server]
;InitialFile        = ots.en.htm
DefaultMIMEType     = text/html
; UserDir           = public_html
; UserDirInitialFile = myinitial.html
DefaultCharset      = iso-8859-1
PreferredLanguage   = en
ImageMap            = map
UseDirIndexing      = FALSE
CGITimeout          = 900
;
; Secure Information Parameters
;
; Set values for . . .
;       UserID          . . . Acquire privileges for User ID
;       GroupID         . . . Acquire privileges for Group ID
;
[SecureInfo]
UserID          = I_C_S
GroupID         = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
O_R_A_C_L_E_O_A_S_P_R_O_D_B_A_S_E/ows/4.0/doc/              NR      /
O_R_A_C_L_E_O_A_S_P_R_O_D_B_A_S_E/ows/4.0/bin/              CN      /ows-bin/
O_R_A_C_L_E_O_A_S_P_R_O_D_B_A_S_E/ows/4.0/doc/              NR      /ows-doc/
;O_R_A_C_L_E_O_A_S_P_R_O_D_B_A_S_E/ows/4.0/admdoc/          NR      /ows-adoc/
;O_R_A_C_L_E_O_A_S_P_R_O_D_B_A_S_E/ows/4.0/img/             NR      /ows-img/
O_R_A_C_L_E_O_A_S_P_R_O_D_B_A_S_E/ows/4.0/sample/    NR            /sample/
O_R_A_C_L_E_O_A_S_P_R_O_D_B_A_S_E/ows/4.0/sample/bin/  CR          /sample/bin/
;O_R_A_C_L_E_O_A_S_P_R_O_D_B_A_S_E/ows/4.0/demo/       NR           /demo/
;O_R_A_C_L_E_O_A_S_P_R_O_D_B_A_S_E/ows/4.0/demo/bin/         CR     /demo/bin/
;O_R_A_C_L_E_O_A_S_P_R_O_D_B_A_S_E/ows/4.0/demo/res/         NR     /demo/img/
;O_R_A_C_L_E_O_A_S_P_R_O_D_B_A_S_E/ows/4.0/demo/       NR    /demo/src/
;O_R_A_C_L_E_O_A_S_P_R_O_D_B_A_S_E/ows/4.0/demo/img/         NR     /tr-img/
;
;
; File Cache
;
; List the full virtual filename path or wild-card
; expression denoting one or more files in the Æ
; virtual file system.
;
;[FileCache]
;/products/*
;/products/xr25/Version*.c
;/employees/list/phones
;
;
; Language Extensions
;
; List for each combination of language type
; and character set one or more unique
; extensions.
;
[LangExt]
en              iso-8859-1          eng
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
en              unicode-1-1        engU uc
fr-CA           iso-8859-1         frc
fr-FR           iso-8859-1         fr
jp-JP           iso-2022-jp        jp
jp-JP           unicode-1-1-utf-8  jpU
;
;
; MIME Types
;
; List for each combination of MIME Type
; and representation one or more unique
; extensions.
;
[MIMETypes]
text/html          htm html
image/jpeg         jpg jpeg
image/gif          gif
appl/text          doc
text/plain         txt ksh lst
application/pdf pdf
application/postscript ps
x-world/x-vrml     wrl vrml
;
[Encodings]
compress           Z
gzip               gz
;
;
;The ordering of the DynApps should not be changed
[DynApps]
O_R_A_C_L_E_O_A_S_P_R_O_D_B_A_S_E/ows/4.0/lib/ndwfss.so oracle_adp_init
---TEMPLATE: \web\svwww.cfg
[Multiport]
ANY    O_A_S_B_A_S_E11   NORM   H_O_S_T_N_A_M_E.D_O_M_A_I_N   /
O_R_A_C_L_E_O_A_S_B_A_S_E/admin/ows/O_A_S_S_I_T_E_N_A_M_E/httpd_H_O_S_T_N_A_M_E/www/
NONE
ANY    O_A_S_B_A_S_E11   NORM   H_O_S_T_N_A_M_E   /
O_R_A_C_L_E_O_A_S_B_A_S_E/admin/ows/O_A_S_S_I_T_E_N_A_M_E/httpd_H_O_S_T_N_A_M_E/www/
NONE
;
[NetInfo]
MaxConnectCount     = 500
DNSResolution       = NEVER
ServerPID           =
O_R_A_C_L_E_O_A_S_B_A_S_E/admin/ows/O_A_S_S_I_T_E_N_A_M_E/httpd_H_O_S_T_N_A_M_E/www/svwww
.pid
;
;
; Log Information
;
; Set values for . . .
;      LogDir          . . . Place for all log files
;      LogInfoFile     . . . Information (Audit) Log file
;      LogErrorFile    . . . Error Log File
;
[LogParams]
AdminRollover       = never
TimeStyle           = LOCAL
AdminFile           =
O_R_A_C_L_E_O_A_S_B_A_S_E/admin/ows/O_A_S_S_I_T_E_N_A_M_E/httpd_H_O_S_T_N_A_M_E/www/svwww
.err
;
;
; Server Parameters
;
; Set values for . . .
;      RequestTimeout   . . . Time out for incoming requests
;      ResponseTimeout  . . . Time out for outgoing responses
;      ScriptTimeout    . . . Time out for Script response time
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[Server]
InitialFile          = wwwIndex.html
DefaultMIMEType      = application/octet-stream
; UserDir            = public_html
; UserDirInitialFile = myinitial.html
DefaultCharset       = iso-8859-1
PreferredLanguage    = en
ImageMap             = map
UseDirIndexing       = FALSE
CGITimeout           = 900
FileCaching          = ON
;
; Secure Information Parameters
;
; Set values for . . .
;      UserID         . . . Acquire privileges for User ID
;      GroupID        . . . Acquire privileges for Group ID
;
[SecureInfo]
UserID               = I_C_S
GroupID              = G_R_O_U_P_N_A_M_E
;
;
; Directory Mappings
;
; List each mapping from a physical directory to a
; virtual directory, including the indicator whether
; the directory contains scripts or whether the
; subdirectories should be mapped recursively (R) or
; non-recursively (N).
;
[DirMaps]
; This first line which has ?/ows/doc needs to be here to keep
; the virtual path ordering correct.
O_R_A_C_L_E_O_A_S_P_R_O_D_B_A_S_E/ows/4.0/doc/            NR    /
O_R_A_C_L_E_O_A_S_P_R_O_D_B_A_S_E/ows/4.0/bin/            CN    /ows-bin/
O_R_A_C_L_E_O_A_S_P_R_O_D_B_A_S_E/ows/4.0/doc/            NR    /ows-doc/
O_R_A_C_L_E_O_A_S_P_R_O_D_B_A_S_E/ows/4.0/admin/doc/      NR    /ows-adoc/
O_R_A_C_L_E_O_A_S_P_R_O_D_B_A_S_E/ows/4.0/admin/img/      NR    /ows-img/
O_R_A_C_L_E_O_A_S_P_R_O_D_B_A_S_E/ows/4.0/admin/img/      NR    /ows-aimg/
O_R_A_C_L_E_O_A_S_P_R_O_D_B_A_S_E/ows/4.0/classes/        NR    /ows-vbclasses/
;O_R_A_C_L_E_O_A_S_P_R_O_D_B_A_S_E/ows/4.0/demo/     NR         /demo/
;O_R_A_C_L_E_O_A_S_P_R_O_D_B_A_S_E/ows/4.0/demo/bin/       CR    /demo/bin/
;O_R_A_C_L_E_O_A_S_P_R_O_D_B_A_S_E/ows/4.0/demo/res/       NR    /demo/img/
;O_R_A_C_L_E_O_A_S_P_R_O_D_B_A_S_E/ows/4.0/demo/     NR    /demo/src/
;O_R_A_C_L_E_O_A_S_P_R_O_D_B_A_S_E/ows/4.0/demo/img/       NR    /tr-img/
;
;
; File Cache
;
; List the full virtual filename path or wild-card
; expression denoting one or more files in the Æ
; virtual file system.
;
;[FileCache]
;/products/*
;/products/xr25/Version*.c
;/employees/list/phones
;
;
; Language Extensions
;
; List for each combination of language type
; and character set one or more unique
; extensions.
;
[LangExt]
en                   iso-8859-1           eng
en                   unicode-1-1          engUuc
fr-CA                iso-8859-1           frc
fr-FR                iso-8859-1           fr
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
jp-JP            iso-2022-jp          jp
jp-JP            unicode-1-1-utf-8    jpU
;
;
; MIME Types
;
; List for each combination of MIME Type
; and representation one or more unique
; extensions.
;
[MIMETypes]
application/octet-stream                bin
application/astound                     asd asn
application/fastman                     lcc
application/java-archive                jar
application/java-serialized-object      ser
application/java-vm                     class
application/mac-binhex40                hqx
application/x-stuffit                   sit
application/mbedlet                     mbd
application/msword                      doc
application/oda                         oda
application/pdf                         pdf
application/postscript                  ai eps ps
application/rtf                         rtf
application/studiom                     smp
application/tinbuktu                    tbt
application/vnd.ms-excel                xls xlw xla xlc xlm xlt
application/vnd.ms-powerpoint           ppt pps pot
application/vnd.ms-project              mpp
application/winhlp                      hlp
application/x-javascript                js
application/x-javascript;charset=UTF-8  jsu
application/x-asap                      asp
application/x-csh                       csh
application/x-dot                       dot
application/x-dvi                       dvi
application/x-earthtime                 etc
application/x-envoy                     evy
application/x-excel                     xls xlc xll xlm xlw
application/x-gtar                      gtar
application/x-cpio                      cpio
application/x-hdf                       hdf
application/x-latex                     latex
application/x-javascript-config         jsc
application/x-maker                     fm
application/x-mif                       mif mi
application/x-mocha                     mocha moc
application/x-msaccess                  mdb
application/x-mscardfile                crd
application/x-msclip                    clp
application/x-msmediaview               m13 m14
application/x-msmetafile                wmf
application/x-msmoney                   mny
application/x-mspublisher               pub
application/x-msschedule                scd
application/x-msterminal                trm
application/x-mswrite                   wri
application/x-NET-Install               ins
application/x-netcdf                    nc cdf
application/x-ns-proxy-autoconfig       proxy
application/x-pointplus                 css
application/x-salsa                     slc
application/x-sh                        sh
application/x-shar                      shar
application/x-sprite                    spr sprite
application/x-tar                       tar
application/x-tcl                       tcl
application/x-perl                      pl
application/x-tex                       tex
application/x-texinfo                   texinfo texi
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

| | |
|---|---|
| application/x-timbuktu | tbp |
| application/x-tkined | tki tkined |
| application/x-troff-man | man |
| application/x-troff-me | me |
| application/x-troff-ms | ms |
| application/x-troff | t tr roff |
| application/x-wais-source | src |
| application/zip | zip |
| application/pre-encrypted | enc |
| application/x-pkcs7-crl | crl |
| application/x-fortezza-ckl | ckl |
| audio/basic | au snd |
| audio/echospeech | es esl |
| audio/midi | midi mid |
| audio/x-aiff | aif aiff aifc |
| audio/x-wav | wav |
| audio/x-pn-realaudio | ra ram |
| audio/x-pac | pac |
| audio/x-epac | pae |
| audio/x-liveaudio | lam |
| drawing/x-dwf | dwf |
| image/fif | fif |
| image/gif | gif |
| image/ief | ief |
| image/ifs | ifs |
| image/jpeg | jpeg jpg jpe jfif pjpeg pjp |
| image/png | png |
| image/tiff | tiff tif |
| image/vnd | dwg svf |
| image/wavelet | wi |
| image/bmp | bmp |
| image/x-photo-cd | pcd |
| image/x-cmu-raster | ras |
| image/x-portable-anymap | pnm |
| image/x-portable-bitmap | pbm |
| image/x-portable-graymap | pgm |
| image/x-portable-pixmap | ppm |
| image/x-rgb | rgb |
| image/x-xbitmap | xbm |
| image/x-xpixmap | xpm |
| image/x-xwindowdump | xwd |
| text/html | htm html |
| text/plain | txt c lst java |
| text/richtext | rtx |
| text/tab-separated-values | tsv |
| text/x-setext | etx |
| text/x-speech | talk |
| video/isivideo | fvi |
| video/mpeg | mpeg mpg mpe mpv vbs mpegv |
| video/x-mpeg2 | mpv2 mp2v |
| video/msvideo | avi |
| video/quicktime | qt mov moov |
| video/vivo | viv vivo |
| video/wavelet | wv |
| video/x-sgi-movie | movie |
| x-world/x-svr | svr |
| x-world/x-vrml | wrl |
| x-world/x-vrt | vrt |
| appl/text      doc | |
| model/vrml    wrl vrml | |
| x-conference/x-cooltalk | ice |
| x-gzip | gz |
| x-compress | z |
| x-uuencode | uu uue |
| application/x-x509-ca-cert | cacert |
| application/x-x509-server-cert | scert |
| application/x-x509-user-cert | ucert |
| application/x-x509-email-cert | ecert |

;
[Encodings]
compress          Z

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
gzip              gz
;
;
;The ordering of the DynApps should not be changed
[DynApps]
O_R_A_C_L_E_O_A_S_P_R_O_D_B_A_S_E/ows/4.0/lib/ndwfss.so oracle_adp_init
---TEMPLATE: \web\wrb.app
;
[SYSTEM]
SiteName                = O_A_S_S_I_T_E_N_A_M_E
DisplaySiteName         = O_A_S_S_I_T_E_N_A_M_E Site
WRB_primary_host        = H_O_S_T_N_A_M_E.D_O_M_A_I_N
WRB_crypt               = v1.0
WRB_type                = cb5b9f52c5422e349578738a22731d5e
HostList                = H_O_S_T_N_A_M_E
CollapseProcessModel    = TRUE
PriorityScheduling      = yes
NextResourceId          = 1001
OASEdition              = Enterprise Edition
OASVersion              = 4.0.8.1.0
OASCompatibleVersion    = 4.0.8.1.0
RuntimeList             = CWEB, CCORBA, ECO4JAVA, EJB, JavaCorba, JAVAWEB, JSERVLET, LiveHTML,
PERL, PLSQL
AppsList                = owsapps,DB_Utilities, mstage, cstage, mdeploy, ots, cdeploy
;
[SYSTEM.HA]
ConfigProvider          = Disabled
AuthServer              = Disabled
Broker                  = Disabled
Logger                  = Disabled
CartridgeServerFac      = Disabled
Dispatcher              = Enabled
MonitorDaemon           = Disabled
RMProxy                 = Disabled
Timeout                 = 30
BrokerTimeout           = 60
;
[Basic]
Realm.Admin Server      = Administrators
Group.Administrators    = admin
User.admin              = 1d0258c2440a8d19e716292b231e3190
;
[AuthService]
Service.Mode            = INMEMORY
Schemes.INMEMORY        = Basic, Digest, IP, Domain
Schemes.ORB             = Basic_Oracle, Cert, Crypt
Schemes.ORBHOST         = Basic_Oracle, Cert, Crypt
Scheme.Basic.Lib        = %ORAWEB_HOME%/lib/libwrasbasic.so, wrASPBDI_dyn_init
Scheme.Digest.Lib       = %ORAWEB_HOME%/lib/libwrasdigest.so, wrASPGDI_dyn_init
Scheme.IP.Lib           = %ORAWEB_HOME%/lib/libwrasip.so, wrASPIDI_dyn_init
Scheme.Domain.Lib       = %ORAWEB_HOME%/lib/libwrasdomain.so, wrASPDDI_dyn_init
Scheme.Basic_Oracle.Lib = %ORAWEB_HOME%/lib/libwrasoracle.so, wrASPODI_dyn_init
Scheme.Cert.Lib         = %ORAWEB_HOME%/lib/libwrascert.so, wrASPCDI_dyn_init
Scheme.Crypt.Lib        = %ORAWEB_HOME%/lib/libwrascrypt.so, wrASPRDI_dyn_init
Scheme.IP.Impl          = WRAS_IP
Scheme.Basic.Impl       = WRAS_BASIC
Scheme.Digest.Impl      = WRAS_DIGEST
Scheme.Domain.Impl      = WRAS_DOMAIN
Scheme.Basic_Oracle.Impl = WRAS_BASIC_ORACLE
Scheme.Cert.Impl        = WRAS_CERT
Scheme.Crypt.Impl       = WRAS_CRYPT
;
[Logger]
logger_dad_name         = DBA
logger_batch            = ON
logger_rollover         = Never
logger_logxlf           = ON
logger_logxlf_desttype  = FS
logger_logxlf destdir   = %ORAWEB_ADMIN%/O_A_S_S_I_T_E_N_A_M_E/log
logger_logxlf_destfname = xlfO_R_A_C_L_E_S_I_D.log
logger_logxlf_maxfsize  = 10000000
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
logger_logxlf_archivedir = %ORAWEB_ADMIN%/O_A_S_S_I_T_E_N_A_M_E/log
logger_logxlf_fields = clf
logger_logsys          = ON
logger_logsys_desttype = FS
logger_logsys_destdir = %ORAWEB_ADMIN%/O_A_S_S_I_T_E_N_A_M_E/log
logger_logsys_destfname = wrbO_R_A_C_L_E_S_I_D.log
logger_logsys_maxfsize = 10000000
logger_logsys_archivedir = %ORAWEB_ADMIN%/O_A_S_S_I_T_E_N_A_M_E/log
logger_logsys_mask = 0XFFFFFFFF
logger_logsys_level = 15
logger_logattrib        = ON
logger_logattrib_desttype = FS
logger_logattrib_destfname = attribO_R_A_C_L_E_S_I_D.log
logger_logattrib_destdir = %ORAWEB_ADMIN%/O_A_S_S_I_T_E_N_A_M_E/log
logger_logattrib_maxfsize = 10000000
logger_logattrib_archivedir = %ORAWEB_ADMIN%/O_A_S_S_I_T_E_N_A_M_E/log
;
[RUNTIME.CWEB]
RuntimeVersion    = 4.0
DisplayName       = "C Web"
AppFile           = O_R_A_C_L_E_O_A_S_P_R_O_D_B_A_S_E/ows/4.0/inatall/CWEB.app
AddAppURL         = /ows-abin/apadmin?FORM_CODE=APP_TYPE&AppType=CWEB&ConfigMode=manual
AddCartxURL       = /ows-abin/apadmin?FORM_CODE=CARTX_ADD
DelAppURL         = /ows-abin/apadmin?FORM_CODE=APP_DEL
DelCartxURL       = /ows-abin/apadmin?FORM_CODE=CARTX_DEL
;
[APPLICATION.owsapps]
ServerInterface   = WEB
ServerRuntime     = CWEB
CartTimeout       = 86400
Hosts             = H_O_S_T_N_A_M_E
ExecString        = wrks -s
Priority          = medium
DisplayName       = "Server Status Monitor App"
Cartridges        = owsapps/owsstat
;
[APPLICATION.owsapps.WEB]
AppMimeTypes      = - jpeg,gif
GetClientCert     = Disabled
Session           = Disabled
SessionIdle       = 15
;
[AppDirs]
/owsapps/owsstat         owsapps/owsstat         %ORAWEB_HOME%/bin
/owsstat                 owsapps/owsstat         %ORAWEB_HOME%/bin
/DB_Utilities/DB_Browser DB_Utilities/DB_Browser %ORAWEB_HOME%/bin
/DB_Utilities/Log_Analyzer DB_Utilities/Log_Analyzer %ORAWEB_HOME%/bin
/oec                     mstage/mstage           %ORACLE_HOME%/oec/java/cartx
/cec                     cstage/cstage           %ORACLE_HOME%/oec/java/cartx
/mec                     mdeploy/mdeploy         %ORACLE_HOME%/oec/java/cartx
/ots                     ots/ots                 %ORACLE_HOME%/oec/java/tpi
/cust                    cdeploy/cdeploy         %ORACLE_HOME%/oec/java/cartx
;
[SYSTEM_owsapps/owsstat]
Stateless         FALSE
ThreadSafe        = no
Prestart          = 0
MinInstances      = 1
MaxInstances      = 10
MinThreads        = 1
MaxThreads        = 1
Application       = owsapps
DisplayName       = "Web Server Status Monitor"
;
[Apps]
owsapps/owsstat          %ORAWEB_HOME%/lib/wstat.so testentry
DB_Utilities/DB_Browser %ORAWEB_HOME%/../cartx/plsql/lib/libndwoa.so ndwoadinit
DB_Utilities/Log_Analyzer %ORAWEB_HOME%/../cartx/plsql/lib/libndwoa.so ndwoadinit
mstage/mstage            %ORACLE_HOME%/ows/cartx/jweb/lib/libjcartx.so ojsdinit
cstage/cstage            %ORACLE_HOME%/ows/cartx/jweb/lib/libjcartx.so ojsdinit
mdeploy/mdeploy          %ORACLE_HOME%/ows/cartx/jweb/lib/libjcartx.so ojsdinit
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
ots/ots                 %ORACLE_HOME%/ows/cartx/jweb/lib/libjcartx.so ojsdinit
cdeploy/cdeploy         %ORACLE_HOME%/ows/cartx/jweb/lib/libjcartx.so ojsdinit
;
[RUNTIME.CCORBA]
RuntimeVersion          = 4.0.8
DisplayName             = "C++ Corba"
AppFile                 = O_R_A_C_L_E_O_A_S_P_R_O_D_B_A_S_E/ows/4.0/install/CCORBA.app
AddAppURL               = /ows-abin/jcgi.bat?FORM_CODE=j_cpp_ccorba_install
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
AppsDir                 = ../cpp
;
[RUNTIME.ECO4JAVA]
RuntimeVersion          = 4.0
DisplayName             = "Enterprise Corba Objects for Java"
AppFile                 = O_R_A_C_L_E_O_A_S_P_R_O_D_B_A_S_E/ows/4.0/install/ECO4JAVA.app
AddAppURL               = /ows-abin/jcgi.bat?FORM_CODE=j_eco_add
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
AppsDir                 = ../apps/eco4j
;
[RUNTIME.EJB]
RuntimeVersion          = 4.0
DisplayName             = "Enterprise JavaBeans"
AppFile                 = O_R_A_C_L_E_O_A_S_P_R_O_D_B_A_S_E/ows/4.0/install/EJB.app
AddAppURL               = /ows-abin/jcgi.bat?FORM_CODE=j_ejb_add
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
AppsDir                 = ../apps/ejb
;
[RUNTIME.JavaCorba]
RuntimeVersion          = 4.0
DisplayName             = "JCorba"
AppFile                 = O_R_A_C_L_E_C_A_S_P_R_O_D_B_A_S_E/ows/4.0/install/JavaCORBA.app
AddAppURL               = /ows-abin/jcgi.bat?FORM_CODE=j_jco_add
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
AppsDir                 = ../apps/jco
;
[RUNTIME.JAVAWEB]
RuntimeVersion          = 4.0
DisplayName             = "JWeb"
AppFile                 =
O_R_A_C_L_E_O_A_S_P_R_O_D_B_A_S_E/ows/4.0/../cartx/jweb/install/javaweb.app
AddAppURL               =
/ows-abin/apadmin?FORM_CODE=APP_TYPE&AppType=JAVAWEB&ConfigMode=manual
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
;
[RUNTIME.JSERVLET]
RuntimeVersion          = 4.0
DisplayName             = "JServlet"
AppFile                 =
O_R_A_C_L_E_O_A_S_P_R_O_D_B_A_S_E/ows/4.0/../cartx/jweb/install/jservlet.app
AddAppURL               =
/ows-abin/apadmin?FORM_CODE=APP_TYPE&AppType=JSERVLET&ConfigMode=manual
AddCartxURL             = /ows-abin/apadmin?FORM_CODE=CARTX_ADD
DelAppURL               = /ows-abin/apadmin?FORM_CODE=APP_DEL
DelCartxURL             = /ows-abin/apadmin?FORM_CODE=CARTX_DEL
;
[RUNTIME.LiveHTML]
RuntimeVersion          = 4.0
DisplayName             = "LiveHTML"
AppFile                 =
O_R_A_C_L_E_O_A_S_P_R_O_D_B_A_S_E/ows/4.0/../cartx/livehtml/install/livehtml.app
AddAppURL               =
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
/ows-abin/apadmin?FORM_CODE=APP_TYPE&AppType=LiveHTMLL&ConfigMode=manual
AddCartxURL        = /ows-abin/apadmin?FORM_CODE=CARTX_ADD
DelAppURL          = /ows-abin/apadmin?FORM_CODE=APP_DEL
DelCartxURL        = /ows-abin/apadmin?FORM_CODE=CARTX_DEL
;
[RUNTIME.PERL]
RuntimeVersion     = 4.0
DisplayName        = "Perl"
AppFile            = O_R_A_C_L_E_O_A_S_P_R_O_D_B_A_S_E/ows/cartx/perl/install/perl.app
AddAppURL          = /ows-abin/apadmin?FORM_CODE=APP_TYPE&AppType=PERL&ConfigMode=manual
AddCartxURL        = /ows-abin/apadmin?FORM_CODE=CARTX_ADD
DelAppURL          = /ows-abin/apadmin?FORM_CODE=APP_DEL
DelCartxURL        = /ows-abin/apadmin?FORM_CODE=CARTX_DEL
;
[RUNTIME.PLSQL]
RuntimeVersion     = 4.0
DisplayName        = "PL/SQL"
AppFile            =
O_R_A_C_L_E_O_A_S_P_R_O_D_B_A_S_E/ows/4.0/../cartx/plsql/install/runtime_plsql.app
AddAppURL          = /ows-abin/apadmin?FORM_CODE=APP_TYPE&AppType= PLSQL&ConfigMode=manual
AddCartxURL        = /ows-abin/apadmin?FORM_CODE=CARTX_ADD
DelAppURL          = /ows-abin/apadmin?FORM_CODE=APP_DEL
DelCartxURL        = /ows-abin/apadmin?FORM_CODE=CARTX_DEL
;
[APPLICATION.DB_Utilities]
Hosts              = H_O_S_T_N_A_M_E
ExecString         = wrks -s
ServerInterface    = WEB
CartTimeout        = 86400
Priority           = medium
DisplayName        = "DB Utilities"
ServerRuntime      = PLSQL
Cartridges         = DB_Utilities/Log_Analyzer, DB_Utilities/DB_Browser
;
[APPLICATION.DB_Utilities.WEB]
AppMimeTypes       = - jpeg,gif
GetClientCert      = Disabled
Session            = Disabled
SessionIdle        = 15
;
[SYSTEM_DB_Utilities/DB_Browser]
Stateless          = FALSE
ThreadSafe         = TRUE
Prestart           = 0
MinInstances       = 0
MaxInstances       = 10
MinThreads         = 1
MaxThreads         = 1
Application        = DB_Utilities
DisplayName        = "DB Browser"
;
[SYSTEM_DB_Utilities/Log_Analyzer]
Stateless          = FALSE
ThreadSafe         = TRUE
Prestart           = 0
MinInstances       = 0
MaxInstances       = 10
MinThreads         = 1
MaxThreads         = 1
Application        = DB_Utilities
DisplayName        = "Log Analyzer"
;
[DB_Utilities/Log_Analyzer_DB_Utilities/Log_Analyzer]
owa_error_page     = error.html
owa_pkg_protect    = TRUE
owa_error_level    = 2
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[DB_Utilities/DB_Browser_DB_Utilities/DB_Browser]
owa_error_page        = error.html
owa_pkg_protect       = TRUE
owa_error_level       = 2
;
[APPLICATION.mstage]
ServerInterface       = WEB
ServerRuntime         = JAVAWEB
CartTimeout           = 86400
Hosts                 = H_O_S_T_N_A_M_E
ExecString            = wrks -s
Priority              = medium
DisplayName           = "OIC - mstage"
Cartridges            = mstage/mstage
;
[APPLICATION.mstage.ENV]
JAVA_HOME             = %ORAWEB_HOME%/jdk
CLASSPATH             =
%ORACLE_HOME%/orb/4.0/classes/session.jar:%ORACLE_HOME%/orb/4.0/classes/cache.jar:%ORAWEB
_HOME%/jdk/lib/classes.zip:%ORAWEB_HOME%/classes/services.jar:%ORACLE_HOME%/ows/cartx/jwe
b/classes/jweb.jar:%ORACLE_HOME%/orb/4.0/classes/yoj.jar:%ORACLE_HOME%/oec/java/tpi:%ORAC
LE_HOME%/oec/java/oec.zip:%ORACLE_HOME%/oec/storemgr/templates/applet/StrMgr2.zip:%ORACLE
_HOME$/oec/java/NetPerceptionsI.jar:%ORACLE_HOME%/oec/java/OrbixWeb_3.0.4.jar:%ORACLE_HOM
E%/oec/java:%CLASSPATH%
PATH                  = %ORAWEB_HOME%/jdk/bin/sparc/native_threads:%PATH%
LD_LIBRARY_PATH       =
%ORAWEB_HOME%/jdk/lib/sparc/native_threads:%ORACLE_HOME%/ows/cartx/jweb/lib:%ORACLE_HOME%
/oec/lib:%LD_LIBRARY_PATH%
THREADS_FLAG          = native
;
[APPLICATION.mstage.WEB]
AppMimeTypes          = - jpeg,gif
GetClientCert         = Disabled
Session               = Disabled
SessionIdle           = 15
;
[APPLICATION.mstage.JAVA]
SYSTEM_PROPERTY       = ORAWEB_HOME=%ORAWEB_HOME%
SYSTEM_PROPERTY       = ORACLE_HOME=%ORACLE_HOME%
MAX_HEAP              = 64M
SYSTEM_PROPERTY       =
java.naming.factory.initial=oracle.oas.naming.jndi.CartxInitCtxFactory
;
[APPLICATION.mstage.LOG]
logger_logsys         = ON
logger_logsys_destdir = /tmp
logger_logsys_destfname = mstageO_R_A_C_L_E_S_I_D.log
logger_logsys_level   = 0
;
[SYSTEM_mstage/mstage]
JavaWebInterface      = 3.0
Stateless             = FALSE
ThreadSafe            = TRUE
Prestart              = 0
MinInstances          = 0
MaxInstances          = 1
MinThreads            = 1
MaxThreads            = 1
DisplayName           = "OIC - mstage"
Application           = mstage
;
[APPLICATION.cstage]
ServerInterface       = WEB
ServerRuntime         = JAVAWEB
CartTimeout           = 86400
Hosts                 = H_O_S_T_N_A_M_E
ExecString            = wrks -s
Priority              = medium
DisplayName           = "OIC - cstage"
Cartridges            = cstage/cstage
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[APPLICATION.cstage.ENV]
JAVA_HOME          = %ORAWEB_HOME%/jdk
CLASSPATH          =
%ORACLE_HOME%/oec/java/OrbixWeb_3.0.4.jar:%ORACLE_HOME%/orb/4.0/classes/session.jar:%ORAC
LE_HOME%/orb/4.0/classes/cache.jar:%ORAWEB_HOME%/jdk/lib/classes.zip:%ORAWEB_HOME%/classe
s/services.jar:%ORACLE_HOME%/ows/cartx/jweb/classes/jweb.jar:%ORACLE_HOME%/orb/4.0/classe
s/yoj.jar:%ORACLE_HOME%/oec/java/tpi:%ORACLE_HOME%/oec/java/oec.zip:%ORACLE_HOME%/oec/jav
a/tpi:%ORACLE_HOME%/oec/java/opay.jar:%ORACLE_HOME%/oec/java/NetPerceptionsI.jar:%ORACLE_
HOME%/oec/java:%NP_HOME%/iona:%CLASSPATH%
PATH               = %ORAWEB_HOME%/jdk/bin/sparc/native_threads:%PATH%
LD_LIBRARY_PATH    =
%ORAWEB_HOME%/jdk/lib/sparc/native_threads:%ORACLE_HOME%/ows/cartx/jweb/lib: %ORACLE_HOME%
/oec/lib:%LD_LIBRARY_PATH%
THREADS_FLAG       = native
;
[APPLICATION.cstage.WEB]
AppMimeTypes       = - jpeg,gif
GetClientCert      = Disabled
Session            = Disabled
SessionIdle        = 15
;
[APPLICATION.cstage.JAVA]
SYSTEM_PROPERTY    = ORAWEB_HOME=%ORAWEB_HOME%
SYSTEM_PROPERTY    = ORACLE_HOME=%ORACLE_HOME%
MAX_HEAP           = 64M
SYSTEM_PROPERTY    =
java.naming.factory.initial=oracle.oas.naming.jndi.CartxInitCtxFactory
;
[APPLICATION.cstage.LOG]
logger_logsys              = ON
logger_logsys_destdir      = /tmp
logger_logsys_destfname    = cstage_O_A_S_S_I_T_E_N_A_M_Eics.log
logger_logsys_level        = 15
;
[SYSTEM_cstage/cstage]
JavaWebInterface   = 3.0
Stateless          = FALSE
ThreadSafe         = TRUE
Prestart           = 0
MinInstances       = 0
MaxInstances       = 10
MinThreads         = 3
MaxThreads         = 10
DisplayName        = "OIC - cstage"
Application        = cstage
;
[APPLICATION. mdeploy]
ServerInterface    = WEB
ServerRuntime      = JAVAWEB
CartTimeout        = 86400
Hosts              = H_O_S_T_N_A_M_E
ExecString         = wrks -s
Priority           = medium
DisplayName        = "OIC - mdeploy"
Cartridges         = mdeploy/mdeploy
;
[APPLICATION.mdeploy.ENV]
JAVA_HOME          = %ORAWEB_HOME%/jdk
CLASSPATH          =
%ORACLE_HOME%/orb/4.0/classes/session.jar:%ORACLE_HOME%/orb/4.0/classes/cache.jar:%ORAWEB
_HOME%/jdk/lib/classes.zip:%ORAWEB_HOME%/classes/services.jar:%ORACLE_HOME%/ows/cartx/jwe
b/classes/jweb.jar:%ORACLE_HOME%/orb/4.0/classes/yoj.jar:%ORACLE_HOME%/oec/java/tpi:%ORAC
LE_HOME%/oec/java/oec.zip:%ORACLE_HOME%/oec/storemgr/templates/applet/StrMgr2.zip:%ORACLE
_HOME%/oec/java/NetPerceptionsI.jar:%ORACLE_HOME%/oec/java/OrbixWeb_3.0.4.jar:%ORACLE_HOM
E%/oec/java:%CLASSPATH%
PATH               = %ORAWEB_HOME%/jdk/bin/sparc/native_threads:%PATH%
LD_LIBRARY_PATH    =
%ORAWEB_HOME%/jdk/lib/sparc/native_threads:%ORACLE_HOME%/ows/cartx/jweb/lib:%ORACLE_HOME%
/oec/lib:%LD_LIBRARY_PATH%
THREADS_FLAG       = native
;
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
[APPLICATION.mdeploy.WEB]
AppMimeTypes       = - jpeg,gif
GetClientCert      = Disabled
Session            = Disabled
SessionIdle        = 15
;
[APPLICATION.mdeploy.JAVA]
SYSTEM_PROPERTY    = ORAWEB_HOME=%ORAWEB_HOME%
SYSTEM_PROPERTY    = ORACLE_HOME=%ORACLE_HOME%
MAX_HEAP           = 64M
SYSTEM_PROPERTY    =
java.naming.factory.initial=oracle.oas.naming.jndi.CartxInitCtxFactory
;
[APPLICATION.mdeploy.LOG]
logger_logsys          = ON
logger_logsys_destdir  = /tmp
logger_logsys_destfname = mdeployO_R_A_C_L_E_S_I_D.log
logger_logsys_level    = 0
;
[SYSTEM_mdeploy/mdeploy]
JavaWebInterface   = 3.0
Stateless          = FALSE
ThreadSafe         = TRUE
Prestart           = 0
MinInstances       = 0
MaxInstances       = 1
MinThreads         = 1
MaxThreads         = 1
DisplayName        = "OIC - mdeploy"
Application        = mdeploy
;
[APPLICATION.ots]
ServerInterface    = WEB
ServerRuntime      = JAVAWEB
CartTimeout        = 86400
Hosts              = H_O_S_T_N_A_M_E
ExecString         = wrks -s
Priority           = medium
DisplayName        = "OIC - ots"
Cartridges         = ots/ots
;
[APPLICATION.ots.ENV]
JAVA_HOME          = %ORAWEB_HOME%/jdk
CLASSPATH          =
%ORACLE_HOME%/orb/4.0/classes/session.jar:%ORACLE_HOME%/orb/4.0/classes/cache.jar:%ORAWEB
_HOME%/jdk/lib/classes.zip:%ORAWEB_HOME%/classes/services.jar:%ORACLE_HOME%/ows/cartx/jwe
b/classes/jweb.jar:%ORACLE_HOME%/orb/4.0/classes/yoj.jar:%ORACLE_HOME%/oec/java/tpi/otsBr
idge.zip:%ORACLE_HOME%/oec/java/tpi/ots.zip:%ORACLE_HOME%/oec/java/NetPerceptionsI.jar:%O
RACLE_HOME%/oec/java/OrbixWeb_3.0.4.jar:%ORACLE_HOME%/oec/java:%CLASSPATH%
PATH               = %ORAWEB_HOME%/jdk/bin/sparc/native_threads:%PATH%
LD_LIBRARY_PATH    =
%ORAWEB_HOME%/jdk/lib/sparc/native_threads:%ORACLE_HOME%/ows/cartx/jweb/lib:%LD_LIBRARY_P
ATH%
THREADS_FLAG       = native
;
[APPLICATION.ots.WEB]
AppMimeTypes       = - jpeg,gif
GetClientCert      = Disabled
Session            = Disabled
SessionIdle        = 15
;
[APPLICATION.ots.JAVA]
SYSTEM_PROPERTY    = ORAWEB_HOME=%ORAWEB_HOME%
SYSTEM_PROPERTY    = ORACLE_HOME=%ORACLE_HOME%
MAX_HEAP           = 64M
SYSTEM_PROPERTY    =
java.naming.factory.initial=oracle.oas.naming.jndi.CartxInitCtxFactory
SYSTEM_PROPERTY    = LOCAL_AREA_CODE=650
SYSTEM_PROPERTY    = INTERNATIONAL_PREFIX=011
SYSTEM_PROPERTY    = LONG_DISTANCE_PREFIX=1
SYSTEM_PROPERTY    = LOCAL_COUNTRY_CODE=1
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
SYSTEM_PROPERTY    = OTS_HOST=otsserver.D_O_M_A_I_N
SYSTEM_PROPERTY    = OTS_PORT=7777
;
[APPLICATION.ots.LOG]
logger_logsys              = ON
logger_logsys_destdir  = /tmp
logger_logsys_destfname = otsO_R_A_C_L_E_S_I_D.log
logger_logsys_level    = 0
;
[SYSTEM_ots/ots]
JavaWebInterface       = 3.0
Stateless              = FALSE
ThreadSafe             = TRUE
Prestart               = 0
MinInstances           = 0
MaxInstances           = 5
MinThreads             = 1
MaxThreads             = 5
DisplayName            = "OIC - ots"
Application            = ots
;
[APPLICATION.cdeploy]
ServerInterface        = WEB
ServerRuntime          = JAVAWEB
CartTimeout            = 86400
Hosts                  = H_O_S_T_N_A_M_E
ExecString             = wrks -s
Priority               = medium
DisplayName            = "OIC - cdeploy"
Cartridges             = cdeploy/cdeploy
;
[APPLICATION.cdeploy.ENV]
JAVA_HOME              = %ORAWEB_HOME%/jdk
CLASSPATH              =
%ORACLE_HOME%/orb/4.0/classes/session.jar:%ORACLE_HOME%/orb/4.0/classes/cache.jar:%ORAWEB
_HOME%/jdk/lib/classes.zip:%ORAWEB_HOME%/classes/services.jar:%ORACLE_HOME%/ows/cartx/jwe
b/classes/jweb.jar:%ORACLE_HOME%/orb/4.0/classes/yoj.jar:%ORACLE_HOME%/oec/java/tpi:%ORAC
LE_HOME%/oec/java/oec.zip:%ORACLE_HOME%/oec/java/opay.jar:%ORACLE_HOME%/oec/java/NetPerce
ptionsI.jar:%ORACLE_HOME%/oec/java/OrbixWeb_3.0.4.jar:%ORACLE_HOME%/oec/java:%CLASSPATH%
PATH                   = %ORAWEB_HOME%/jdk/bin/sparc/native_threads:%PATH%
LD_LIBRARY_PATH        =
%ORAWEB_HOME%/jdk/lib/sparc/native_threads:%ORACLE_HOME%/ows/cartx/jweb/lib:%ORACLE_HOME%
/oec/lib:%LD_LIBRARY_PATH%
THREADS_FLAG           = native
;
[APPLICATION.cdeploy.WEB]
AppMimeTypes           = - jpeg,gif
GetClientCert          = Disabled
Session                = Disabled
SessionIdle            = 15
;
[APPLICATION.cdeploy.JAVA]
SYSTEM_PROPERTY        = ORAWEB_HOME=%ORAWEB_HOME%
SYSTEM_PROPERTY        = ORACLE_HOME=%ORACLE_HOME%
MAX_HEAP               = 64M
SYSTEM_PROPERTY        =
java.naming.factory.initial=oracle.oas.naming.jndi.CartxInitCtxFactory
;
[APPLICATION.cdeploy.LOG]
logger_logsys          = ON
logger_logsys_destdir  = /tmp
logger_logsys_destfname = cdeployO_R_A_C_L_E_S_I_D.log
logger_logsys_level    = 0
;
[SYSTEM_cdeploy/cdeploy]
JavaWebInterface       = 3.0
Stateless              = FALSE
ThreadSafe             = TRUE
Prestart               = 0
MinInstances           = 0
MaxInstances           = 10
```

-continued

Appendix to Specification
for
Methods and Apparatus for Implementing Internet
Storefronts to Provide Integrated Functions
Invented by
Tarek Fadel, David Feuerstein, Sean Noyes and Robert Wessa
Attorney Docket A-004, Law Offices of Charles G. Call, Reg. No. 20,406

```
MinThreads    = 3
MaxThreads    = 10
DisplayName   = "OIC - cdeploy"
Application   = cdeploy
```

APPENDIX I

User and Group Names

This section provides a summary listing of all usernames and groups ports used by the iPrototype on the UNIX.
We recommend that you should the same UNIX group for all users. Typically, this ends up being the group "dba". You may use "dba" even if that exists on your system already. If you are concerned users in the "dba" group should not be able to read files related to the iPrototype Storefront, set the privileges accordingly, or choose another group.
Each application is owned by a different user. We recommend that each username selected include the ORACLE_SID as part of its name. On large system with many users, this helps organize the usernames so that it is easy to identify their purpose.
We recommend that you choose new usernames that do not yet exist on your UNIX system. The cloning process will create the user directory and place a ".profile" file and other files in the home directory for the user. Choosing a username that exists could result in files for that user being overwritten.
The following table shows some typical choices for usernames. These choices were made assuming you have chosen and ORACLE_SID = ipr1

| Username | applications owned |
|---|---|
| ipr1ora | Oracle database files and code |
| ipr1ics | All OAS and iStore code |
| ipr1sp | Selling Point* |
| ipr1vg | All Vignette related code |
| ipr1ap | All Apache related code |
| ipr1np | All Net Perceptions related code |
| ipr1eg | All Engage Ad Manager code |

*Note that Selling Point templates for iStore are in the iStore templates directory and would be owned by ipr1ics.

APPENDIX II

Port Usage

This section provides a summary listing of all ports used by the iPrototype on the UNIX server. There are approximately 20 ports required by the iPrototype, depending on the configuration chosen. Note that when the cloning scripts are executed, you are prompted for a base port number which will be used as a starting sequence for all ports numbers. This helps system administrators better keep track of the ports in use on their machines. All ports used by the iPrototype storefront will be in a consecutive range of numbers from 01 to about 40, prefixed with the base port number. Note that not every number in that range is used. The base port number entered serves as a prefix for all port numbers used. The selected base port number will be followed by a 2 digit number which needs to specifically identify a port number to be used on the UNIX system. For example, if you answer 245, then all ports will start with 245, to be followed with two more digits. The result is that you will use ports 24501, 24502, . . . , up to approximately 24537.

| Port Number (prefixed by base port) | Component Application | Purpose |
|---|---|---|
| _01 | Apache/Vignette | Apache Listener for Vignette CAS |
| _05 | Apache/Vignette | Apache Listener for Vignette |
| _06 | Apache/Vignette | Apache Listener for Vignette CMD |
| _07 | Apache/Vignette | Apache Listener for Vignette CTLD |
| _08 | Apache/Vignette | Apache Listener for Vignette TMD |
| _09 | Apache/Vignette | Apache Listener for Vignette PAD |
| _10 | Apache/Vignette | Apache Listener for Vignette PM (CMS) |
| _11 | OAS | www Port |
| _12 | OAS | Node Manager Port |
| _14 | OAS | ORB Port |
| _18 | OAS | admin Port |
| _20 | OAS | mstage Port |
| _21 | OAS | cstage Port |
| _22 | OAS | cdeploy Port |
| _23 | OAS | ots Port |
| _36 | Vignette | VHS Port |
| _37 | Oracle | TNS DB Listener |

APPENDIX III

Base Port Number Restrictions

This section describes restrictions on selecting a base port number. Due to certain UNIX conventions, and also to methods used by some of the various software applications, ports set to certain numbers will not work, or will require special attention in order to make them work properly. For these reasons, we recommend that you do not use certain numbers.
You may select a zero to three digit number as the base port number.
Note that UNIX requires that any port number under a certain number requires root access to start the application which uses that number. Some of the applications have a maximum port number value above which they will not work. Therefore, there are certain minimum and maximum base port numbers which are recommended.
The cutoff point requiring root access on UNIX system is 1024. If you choose, 10 as the base port number, then you would require root access to start all applications. This is because you would end up using ports 1001, 1002, . . . etc., which are under the 1024 cutoff point. For this reason, we generally recommend that you choose a number greater than or equal to 11 for the base port number.
Note that Vignette requires that you start it from root. It is the only application which requires root access. All other applications can be started from a non privileged account.
Vignette has a maximum port number requirement. You should not go over 32000. Therefore you should not exceed 320 as the maximum base port number.
The recommended value for the base port number is in the range 11 . . . 320.

Making your iPrototype Storefront the default application for your machine

Note that you may want your storefront to be the default application served when a web browser makes a request to your server.
For example, you want to be able to request http://www.myserver.com and receive the home page of the storefront, instead of having to include a port number and making a request like

APPENDIX III-continued http://www.myserver.com:24501. This can be done easily although it is not supported as an automatic feature of the scripts. The default port number is 80 for any request to a server which does not include a port number. This means that http://www.myserver.com is essentially a request to http://www.myserver.com:80. In the iPrototype Storefront configuration, to make your server send the storefront when no port number is included, you must set the cstage listener defined in OAS listen on port 80. This implies you can't already have another application responding to port 80. You must make this change after the installation is completed.
- Edit the cstage.cfg file
- Change the port number reference to use the value of 80
- Stop and restart OAS
- [10] (using the stop and start procedures in the iprlics user from the example)

If you reconfigure your store to use another listener, that listener must be set to listen on port 80.

APPENDIX IV

Required Setup Information

The following table contains all the information requested by the setup script. The first choice is to determine the type of setup to be performed. In most cases, you will want to choose option F to perform the complete setup. You have the option of selecting the individual components one at a time if you would like to place one of them on a different server, or vary the standard setup associated with a complete installation.

Columns designed with a value of TBD will have values that are subject to change and therefore could not be defined in this document. A default value will exist when you actually run the script, and the value provided will be appropriate for each release. In most cases, this value should not be changed. The production release of the cloning scripts may hide these prompts.

| Setup Prompt | Default Value | Value Options | Description |
|---|---|---|---|
| Please specify 1 of the 4 installation types to be performed | F | V, I, D, F, X | F = install the complete solution<br>V = install Vignette and Apache only<br>I = install iStore, OAS, and iMarketing only<br>D = install database only<br>X = exit setup without performing any actions |
| Will Vignette be part of the solution set (Y or N) [Y] | y | Y, N | Y = install Vignette<br>N = do not install Vignette<br>This question is only needed if you choose to perform a full install, but you are not including Vignette in the solution set |
| Would you like to see debugging information | N | Y, N | Y = include extended debugging info in the installation log files<br>N = include standard debugging info in the installation log files |
| Enter the installation home directory | current directory | | directory where setup sh is located. If have set your directory to where the setup sh is located, it is automatically determined for you |
| Enter the base user directory | /users | any valid directory (existing or one that could be created) | Location under which the home directory for the users will be created. The home directories will be created if they don't already exist (recommended). You would typically choose an existing directory under which user home directories exist and you would choose new usernames which result in new directories created under the existing /users directory, e.g., /users/ipr1ora |
| Enter the base applications directory | [/u01/app] | any valid directory (existing or one that could be created) | Directories will be created if they don't exist (recommended). The names will be the same as the username chosen to own each application, e.g., /u01/app/ipr1ora |
| Enter the old hostname | TBD | Do no change | Since this method is a clone of a working storefront built in Oracle's eBusiness Center, the installation needs to know the previous machine name so that it can be updated on your new machine. You must accept the default value. |
| Enter the old ORACLE_SID | TBD | Do no change | Since this method is a clone of a working storefront built in Oracle's eBusiness Center, the installation needs to know the previous |

APPENDIX IV-continued

Required Setup Information

| | | | |
|---|---|---|---|
| Enter the old Apache Base number | TBD | Do not change | ORACLE_SID name so that it can be updated on your new machine. You must accept the default value. Since this method is a clone of a working storefront built in Oracle's eBusiness Center, the installation needs to know the previous Apache base number so that it can be updated on your new machine. You must accept the default value. |
| Enter the Oracle OS username | ipr1ora | any valid username | Please refer to the Appendix section on User and Group names |
| Enter the Apache OS username | ipr1ap | any valid username | Please refer to the Appendix section on User and Group names |
| Enter the iStore OS username | ipr1ics | any valid username | Please refer to the Appendix section on User and Group names |
| Enter the Net Perceptions OS username | ipr1np | any valid username | Please refer to the Appendix section on User and Group names |
| Enter the Vignette OS username | ipr1vg | any valid username | Please refer to the Appendix section on User and Group names |
| Enter the old Vignette CAS Port | TBD | Do not change | Since this method is a clone of a working storefront built in Oracle's eBusiness Center, the installation needs to know the previous Apache base number so that it can be updated on your new machine. You must accept the default value. |
| Enter the old Vignette base directory | TBD | Do not change | Since this method is a clone of a working storefront built in Oracle's eBusiness Center, the installation needs to know the previous Apache base number so that it can be updated on your new machine. You must accept the default value. |
| Enter the new Group name for these users | dba | any valid groupname | Please refer to the Appendix section on User and Group names |
| Enter the new ORACLE_SID | ipr1 | any valid SID | ORACLE_SID is the system identifier which uniquely identifies the database |
| Enter the location for your ORACLE_BASE | based on base applications directory | any valid directory | You should generally accept the default value based on the base applications directory you entered earlier. It will automatically assume /bd/username where bd is the base directory from above and username is the username owning the application |
| Enter the location for your ORACLE_HOME | OARCLE_BASE/ product/ 805 | Do not change | You must accept the default location. This is a fixed value once you determine the ORACLE_BASE location |
| Enter the location for your ORACLE_OAS_BASE | based on base applications directory | any valid directory | You should generally accept the default value based on the base applications directory you entered earlier. It will automatically assume /bd/username where bd is the base directory from above and username is the username owning the iStore and OAS application |
| Enter the location for your ORACLE_OAS_PROD_BASE | ORACLE_BASE/ product/ OAS4081 | Do not change | You must accept the default location. This is a fixed value once you determine the ORACLE_OAS_BASE location |
| Enter your new OAS_SITE_NAME | ORACLE_SID | Any valid site name | This is the site name for OAS. This can be changed, but it is recommended that you use the default value of the ORACLE_SID |
| Enter your old OAS_SITE_NAME | TBD | Do not change | Since this method is a clone of a working storefront built in Oracle's eBusiness Center, the installation needs to know the previous Apache base number so that it can be updated on your new machine. You must accept the default value. |
| Enter the location for your Vignette base directory | based on base applications directory | any valid directory | You should generally accept the default value based on the base applications directory you entered earlier. It will automatically assume /bd/username where bd is the base directory from above and username is the username owning the iStore and OAS application |
| Enter the location for your Apache base directory | based on base applications directory | any valid directory | You should generally accept the default value based on the base applications directory you entered earlier. It will automatically assume /bd/username where bd is the base directory from above and username is the username owning the iStore and OAS application |

APPENDIX IV-continued

Required Setup Information

| | | | |
|---|---|---|---|
| Enter the Apache Ports Base | 245 | up to a 3 digit number* | Please refer to the Appendix section on Base Port numbers |
| Enter the location for your Net Perceptions base directory | based on base applications directory | any valid directory | You should generally accept the default value based on the base applications directory you entered earlier. It will automatically assume /bd/username where bd is the base directory from above and username is the username owning the Net Perceptions application |
| Enter the new Net Perceptions port | 24535 | valid port number | You should accept the default value |
| Enter the parent Oracle database file directory | /u01/oradata | any valid directory (existing or one that could be created) | Directories will be created if they don't exist (recommended). The names will be the same as the username chosen to own each application, e.g., /u01/app/ipr1ora |
| Enter the base Oracle database file directory | based on the parent Oracle directory | any valid directory | You should generally accept the default value based on the parent Oracle directory you entered earlier. It will automatically assume /pd/SID where pd is the parent Oracle directory from above and SID is the ORACLE_SID from above |
| Enter the database server hostname if different | current server | valid server name | This is required if you plan on using a multitier approach and you are installing the iStore/OAS/iMarketing option on the middle tier. You must supply the database server name |
| Enter the new domain | TBD | any valid domain name | You should enter your domain, or the domain where the server will reside, typically "company.com" |
| Enter the new proxy server | TBD | the machine and domain name of the proxy server | You must supply the correct proxy server name and domain for you environment, e.g., proxy.company.com |
| Enter the new proxy port | 80 | proper port number | Enter the proper port number for you proxy server |
| Enter the OAS Ports Base | 245 | up to a 3 digit number | Refer to the Appendix section on Base Port number |
| Enter the directory location containing the TAR files | TBD | existing directory where tar file are located | This is the directory where the tar files are located, either on CD, in which case it is already known, or on disk, where you would have to specify where you placed the files |
| Enter the directory in which to place startup scripts | TBD | enter a valid directory | Valid directory where you want to place your startup scripts. If you do not use the standard UNIX directory, you must copy this script to the location so that the application starts up automatically at boot time |
| Enter the directory to write installation log files | /tmp | enter a valid directory | Valid directory where you want to place installation log files. |
| Enter the summary file name | summary.log | any valid filename | enter a filename for the summary log file |
| Enter the installation log file name | install.log | any valid filename | enter a filename for the log file |

APPENDIX V

Shell Script Reference

This section gives an overview of the iPrototype Cloning scripts. They actually consist of a number of individual scripts performing various functions. It is not necessary to completely understand what each script does. You may execute the scripts without having read this section, but must be familiar with all other parts of this document before performing the installation.

The following table explains the main shell scripts which comprise the cloning scripts. Note that in many cases, for each application, there is a separate version of each script performing lower level functions. For example, to create users, there is a createUsers.sh script referenced. There are actually about five scripts for creating users. In the interest of brevity, the table shall list one script for each purpose. A name followed by the symbol "*" indicates there are multiple versions of this file.

APPENDIX V-continued

Shell Script Reference

As mentioned above, there is only one script which must be executed, and all other scripts will be called by that script, or a script which was called by the initial script. The initial script is called setup.sh.

The purpose of setup.sh is to prompt you for all the required information in order to clone the iPrototype Storefront and then to call the appropriate supporting scripts to perform actual installation.

Note that you must be logged in as root in order to execute the cloning scripts.

| Script Name | Called By | Purpose |
|---|---|---|
| setup.sh | executed by you | This is the first and only script you must execute. It takes no parameters; prompts you for all required |

APPENDIX V-continued

Shell Script Reference

| | | |
|---|---|---|
| | | information, and calls the appropriate scripts to perform the desired installation |
| main.sh | setup.sh | Verifies certain information and calls the appropriate installation script |
| check_access.sh | main.sh | Checks for proper privileges by verifying you are logged in as root |
| check_sid.sh | main.sh | Verifies we are not using the same ORACLE_SID as the old one |
| check_setup.sh | main.sh | Displays the value of all parameters storing the answer to the setup questions |
| install.sh* | main.sh | Main installation procedure (separate version for each installation option) |
| unTar.sh* | install.sh* | Untars the appropriate tar file (separate version for each installation option) |
| setLinks.sh | install.sh* | Define proper UNIX directory and file links |
| createUsers.sh* | install.sh* | Create the appropriate user (separate version for each installation option) |
| setOwners.sh* | install.sh* | Sets the ownership of files just untarred to the username just created |
| setInit.sh | install.sh* | Creates the startup and stop scripts for starting and stopping the applications |
| configureApache.sh | install.sh* | Configure the Apache files for the new server |
| configureVignette.sh | install.sh* | Configure the Vignette files for the new server |
| updateNetp.sh | install.sh* | Updates Net Perceptions database |
| reconfigureVignette.sh | install.sh* | Reconfigures the new Vignette CAS on the new server. The database and Vignette must be up and running for this step |
| configureOAS.sh | install.sh* | Configures the OAS files for the new machine |
| setNet.sh* | install.sh* | Creates the proper TNSNAMES and LISTENER files |
| configureNetp.sh | install.sh* | Configures the Net Perceptions files for the new machine |
| configureICS.sh | install.sh* | Configures the iStore files for the new machine |
| setOratab.sh | install.sh* | Create the necessary oratab entry |
| configureDB.sh | install.sh* | Configures the Oracle database files |

What is claimed is:

1. An integrated online sales system which comprises, in combination, a web database server connected to the Internet for storing product, customer and sales transaction data, and means for installing and managing the integrated operation of a cooperating set of separate application program modules comprising:

a storefront application which executes on said web database server, a content management application for creating and updating product data stored on said database server, a recommendation system for analyzing said customer and sales transaction data for predicting the preferences of individual customers and making specific real-time recommendations during a shopping session, an advertising management application for selectively presenting advertising to each customers during a shopping session, and a reporting system for analyzing said sales transaction data to generate reports.

2. An integrated online sales system as set forth in claim 1 wherein said means for installing and managing the integrated operation of said application program modules includes pre-written operating system scripts for rapidly deploying said sales system onto one or more target computers by automatically issuing prompts and accepting data values during the course of the installation of said application program modules to modify said integrated system in accordance with the needs of an individual installation.

3. An integrated online sales system as set forth in clam 2 wherein said means for installing comprises a set of template configuration files and wherein said scripts when executed issue prompts and accept data for modifying the content of said template configuration files in accordance with the needs of an individual installation.

4. An integrated online sales system as set forth in claim 1 wherein said means for installing and managing the integrated operation of said application program modules includes an administration system that provides a Web interface for permitting authorized users to perform centralized system administration functions.

5. The integrated online sales system as set forth in claim 4 wherein said administration system performs a password protected log-in procedure to permit only authorized persons to perform administration functions.

6. A method for rapidly deploying an integrated online sales system for performing online sales transactions which comprises, in combination, the steps of:

providing a web database server connected to the Internet for storing product, customer and sales transaction data in database tables, and providing an integrated set of one or more pre-written operating system installation scripts to perform the steps of:

installing a storefront application for execution on said web database server, installing a content management application for creating and updating product data stored in said database tables, installing a profiling application for accumulating customer profile data describing the activity of individual customers during shopping sessions, installing a recommendation application for analyzing said customer profile data and said sales transaction data to predicting the preferences of individual customers and for making specific real-time recommendation to customers during a shopping session, installing an advertising management application for selectively presenting advertising to each customers during a shopping session, and installing a reporting application for analyzing said sales transaction data to generate reports.

7. The method as set forth in claim 6 wherein said pre-written operating system scripts automatically perform the steps of issuing prompts and accepting data values during the course of the installation of said application program modules to modify the operation of applications in accordance with the needs of an individual installation.

8. The method as set forth in clam 7 wherein each of said applications accesses a configuration file and wherein the steps of issuing prompts and accepting data modify the content of each of said configuration files in accordance with the needs of an individual installation.

9. The method as set forth in claim 7 further comprising the steps of installing an administration application and employing said administration application to present a centralized menu system to an authorized user for performing centralized system administration functions.

10. The method as set forth in claim 9 wherein said administration system performs a password protected log-in procedure to permit only authorized persons to perform said centralized administration functions using said centralized menu system.

* * * * *

UNITED STATES PATENT AND TRADEMARK OFFICE
CERTIFICATE OF CORRECTION

PATENT NO. : 7,069,271 B1
APPLICATION NO. : 09/706098
DATED : June 27, 2006
INVENTOR(S) : Fadel et al.

It is certified that error appears in the above-identified patent and that said Letters Patent is hereby corrected as shown below:

On face page, in field 75, in column 1, in "Inventors", line 1, delete "Campbridge," and insert -- Cambridge, --, therefor.

On face page, in field 57, in column 2, in "Abstract", line 9, after "and" insert -- a --.

On face page, in field 57, in column 2, in "Abstract", line 10, after "of" delete "a".

In column 3, line 22, delete "visitors" and insert -- visitor's --, therefor.

In column 5, line 4, delete "b" and insert -- by --, therefor.

In column 5, line 4, after "Genesis" delete "to".

In column 6, line 46, delete "arc" and insert -- are --, therefor.

In column 7, line 47, after "specific" delete ".".

In column 7, line 48, after "environment" insert -- . --.

In column 8, line 33, delete "installer.when" and insert -- installer when --, therefor.

In column 9-10, line 21, delete "etc." and insert -- etc., --, therefor.

In column 9-10, line 39, delete "iStore. OAS" and insert -- iStore, OAS, --, therefor.

In column 9-10, line 39, delete "iMarkting" and insert -- iMarketing --, therefor.

In column 9-10, line 77, delete "vignet" and insert -- vignette --, therefor.

In column 11-12, line 8, delete "#castmplrmgr3" and insert -- #castmplmgr3 --, therefor.

In column 11-12, line 8, delete "vignett" and insert -- vignette --, therefor.

In column 11-12, line 43, delete "=echo" and insert -- ='echo --, therefor.

In column 11-12, line 43, delete ""[A-Z]"" and insert -- "[A-Z]" --, therefor.

CERTIFICATE OF CORRECTION (continued)
U.S. Pat. No. 7,069,271 B1

In column 13-14, line 67, delete "case" and insert -- Base --, therefor.

In column 15-16, line 50, delete "Vignete" and insert -- Vignette --, therefor.

In column 15-16, line 57, delete "Vignete" and insert -- Vignette --, therefor.

In column 15-16, line 73, delete ""A-Z]""" and insert -- "[A-Z]" --, therefor.

In column 17-18, line 9, delete ""[a-z[""" and insert -- "[a-z]" --, therefor.

In column 17-18, line 16, delete "[$anS]" and insert -- [$ans] --, therefor.

In column 17-18, line 42, delete "[OAS" and insert -- [$OAS --, therefor.

In column 23-24, line 9, delete "-$ans" and insert -- =$ans --, therefor.

In column 23-24, line 56, delete "[DB" and insert -- [$DB --, therefor.

In column 25-26, line 26, delete "$1}'" and insert -- $1}" --, therefor.

In column 25-26, line 34, delete ""a-z]""" and insert -- "[a-z]" --, therefor.

In column 29-30, line 37, delete ""[$START.INSTALL""" and insert -- "[$START_INSTALL" --, therefor.

In column 35-36, line 26, delete "incorrectly." and insert -- incorrectly: --, therefor.

In column 35-36, line 55, after "$INSTALL" delete "._" and insert -- _ --, therefor.

In column 37-38, line 13, delete "iSpeed" and insert -- ispeed --, therefor.

In column 37-38, line 46, delete ".exit 2" and insert -- exit 2 --, therefor.

In column 41-42, line 38, delete "far" and insert -- for --, therefor.

In column 41-42, line 53, delete "/tmtp/" and insert -- /tmp/ --, therefor.

In column 43-44, line 10, delete "EOP" and insert -- EOF --, therefor.

In column 43-44, line 18, delete "}${domain})" and insert -- }.${domain}) --, therefor.

In column 53-54, line 32, delete "/cshprofile"" and insert -- /shprofile" --, therefor.

In column 55-56, line 56, after "dest" delete "{/" and insert -- }/ --, therefor.

In column 55-56, line 63, delete "¢$" and insert -- "$ --, therefor.

In column 55-56, line 74, delete "H__S" and insert -- H_O_S --, therefor.

In column 59-60, line 58, delete "form" and insert -- from --, therefor.

In column 61-62, line 52, before "startup" delete "the".

In column 63-63, line 19, delete "form" and insert -- from --, therefor.

In column 65-66, line 63, delete ""{DB" and insert -- "${DB --, therefor.

In column 81-82, line 9, delete "tarfile" and insert -- tar file --, therefor.

In column 87-88, line 38, delete "Sept. 1, 1999" and insert -- Aug. 1, 1999 --, therefor.

In column 87-88, line 60, delete "}/httpd_"" and insert -- }/httpd_* --, therefor.

In column 91-92, line 14, delete "+{OAS" and insert -- +${OAS --, therefor.

In column 97-98, line 10, delete "/echcdbg.sh" and insert -- /echodbg.sh --, therefor.

In column 97-98, line 65, delete "4?" and insert -- 4" --, therefor.

In column 97-98, line 67, after "5"" insert -- | \ --.

In column 99-100, line 9, delete "Servers"" and insert -- Server5" --, therefor.

In column 101-102, line 60, delete "VMS" and insert -- VHS --, therefor.

In column 101-102, line 75, delete "continue." and insert -- continues. --, therefor.

In column 101-102, line 76, after "will" insert -- not --.

In column 103-104, line 10, after "exists" insert -- ? --.

In column 103-104, line 26, after "ICS" delete "-s /bin/ksh $ICS".

In column 103-104, line 56, after "already" insert -- , --.

In column 103-104, line 76, delete "problen" and insert -- problem --, therefor.

In column 105-106, line 10, delete "echc" and insert -- echo --, therefor.

CERTIFICATE OF CORRECTION (continued)
U.S. Pat. No. 7,069,271 B1

In column 105-106, line 30, delete "meesage" and insert -- message --, therefor.

In column 105-106, line 37, delete "thie" and insert -- this --, therefor.

In column 105-106, line 68, delete "#change" and insert -- #Change --, therefor.

In column 107-108, line 9, delete "ThiS" and insert -- This --, therefor.

In column 107-108, line 21, delete "$GRDUPNAME." and insert -- $GROUPNAME. --, therefor.

In column 107-108, line 53, delete "/echodhg.sh" and insert -- /echodbg.sh --, therefor.

In column 107-108, line 70, delete "{ORACLE≡/" and insert -- {ORACLE}/ --, therefor.

In column 109-110, line 50, delete "u$USER" and insert -- "$USER --, therefor.

In column 109-110, line 57, delete "$GROUPMAME" and insert -- $GROUPNAME --, therefor.

In column 111-112, line 20, after "aborting..." insert -- " --.

In column 111-112, line 22, delete "echoobg" and insert -- echodbg --, therefor.

In column 111-112, line 22, delete "paraneters" and insert -- parameters --, therefor.

In column 111-112, line 59, delete "Filenane:" and insert -- Filename: --, therefor.

In column 111-112, line 61, delete "wessa" and insert -- Wessa --, therefor.

In column 111-112, line 66, delete "tbe" and insert -- the --, therefor.

In column 113-114, line 13, delete "hone" and insert -- home --, therefor.

In column 113-114, line 15, delete ""*$" and insert -- "$ --, therefor.

In column 113-114, line 36, delete "In" and insert -- ln --, therefor.

In column 113-114, line 56, delete "should,have" and insert -- should have --, therefor.

In column 115-116, line 12, delete "/echodhg.ah" and insert -- /echodbg.sh --, therefor.

In column 115-116, line 22, delete "ssp" and insert -- sspm --, therefor.

In column 115-116, line 27, delete ""./ssps" and insert -- "./sspm --, therefor.

In column 115-116, line 53, delete "parameter" and insert -- Parameter --, therefor.

In column 115-116, line 74, delete "datahase." and insert -- database. --, therefor.

In column 117-118, line 9, delete "CAS." and insert -- OAS. --, therefor.

In column 117-118, line 31, delete "\$" and insert -- "$ --, therefor.

In column 117-118, line 31, delete "/tnanames." and insert -- /tnsnames. --, therefor.

In column 117-118, line 36, delete ".Bh" and insert -- .sh --, therefor.

In column 117-118, line 54, delete ".Bh" and insert -- .sh --, therefor.

In column 117-118, line 62, delete "#mV" and insert -- #mv --, therefor.

In column 117-118, line 63, delete "$DS" and insert -- SDB --, therefor.

In column 117-118, line 76, delete "NA56" and insert -- NA} --, therefor.

In column 119-120, line 8, delete "NA56" and insert -- NA} --, therefor.

In column 119-120, line 65, delete "L·3E" and insert -- L_E --, therefor.

In column 119-120, line 68, delete "{DS" and insert -- {DB --, therefor.

In column 119-120, line 74, after "svrmgrl" insert -- " --.

In column 121-122, line 14, delete "circumtances." and insert -- circumstances. --, therefor.

In column 121-122, line 32, delete "conbination" and insert -- combination --, therefor.

In column 121-122, line 34, delete ""Multiviews"" and insert -- "MultiViews" --, therefor.

In column 121-122, line 41, delete "conbination" and insert -- combination --, therefor.

In column 121-122, line 41, delete ""options"," and insert -- "Options", --, therefor.

In column 121-122, line 44, delete "fron" and insert -- from --, therefor.

In column 121-122, line 46, delete "fron" and insert -- from --, therefor.

In column 121-122, line 54, delete "//servernane/" and insert -- //servername/ --, therefor.

In column 123-124, line 9, delete "*</" and insert -- #</ --, therefor.

In column 123-124, line 23, delete "l997/08/23" and insert -- 1997/08/23 --, therefor.

In column 123-124, line 41, delete "END" and insert -- START --, therefor.

In column 127-128, line 49, delete "copyright" and insert -- Copyright --, therefor.

In column 127-128, line 63, delete "nentioning" and insert -- mentioning --, therefor.

In column 129-130, line 10, delete "\This" and insert -- "This --, therefor.

In column 129-130, line 24, delete "TME" and insert -- THE --, therefor.

In column 129-130, line 74, delete "APACME" and insert -- APACHE --, therefor.

In column 131-132, line 8, delete "CDNTRACT," and insert -- CONTRACT, --, therefor.

In column 131-132, line 19, delete "(http.." and insert -- <http: --, therefor.

In column 131-132, line 43, delete "B_A_S_B" and insert -- B_A_S_E --, therefor.

In column 131-132, line 60, delete "{1}" and insert -- (1) --, therefor.

In column 133-134, line 9, delete "metacharater" and insert -- metacharacter --, therefor.

In column 133-134, line 10, delete "occurance" and insert -- occurrence --, therefor.

In column 135-136, line 14, delete "("gn:" and insert -- ("qn: --, therefor.

In column 135-136, line 17, delete "__g" and insert -- __q --, therefor.

In column 135-136, line 30, delete "(@cnds)" and insert -- (@cmds) --, therefor.

In column 135-136, line 41, delete "SANPLE" and insert -- SAMPLE --, therefor.

In column 135-136, line 49, delete "-\m" and insert -- -\n --, therefor.

In column 135-136, line 71, delete "(gw(" and insert -- (qw( --, therefor.

In column 137-138, line 30, delete "=~n" and insert -- =~m --, therefor.

In column 139-140, line 31, delete "LoadMododule" and insert -- LoadModule --, therefor.

In column 139-140, line 45, delete "synbolnane" and insert -- symbolname --, therefor.

In column 139-140, line 56, delete "-ZA-" and insert -- -zA- --, therefor.

In column 139-140, line 63, delete "([1-zA" and insert -- ([a-zA --, therefor.

In column 139-140, line 65, delete "$filenane" and insert -- $filename --, therefor.

In column 139-140, line 66, delete "$filenane" and insert -- $filename --, therefor.

In column 139-140, line 73, after "exit(1) ;" insert -- } --.

In column 139-140, line 74, delete "($filenane" and insert -- ($filename --, therefor.

In column 141-142, line 33, delete "|\n#!" and insert -- n#? --, therefor.

In column 141-142, line 41, delete "{" and insert -- } --, therefor.

In column 141-142, line 42, delete "{" and insert -- } --, therefor.

In column 141-142, line 48, delete "s| (." and insert -- s|^(. --, therefor.

In column 143-144, line 13, delete "'*%NAME%'" and insert -- '%NAME%' --, therefor.

In column 145-146, line 30, delete "tile" and insert -- file --, therefor.

In column 145-146, line 38, delete "tranasction" and insert -- transaction --, therefor.

In column 145-146, line 47, delete "Glcbal" and insert -- Global --, therefor.

In column 145-146, line 50, delete "circumstances." and insert -- circumstances. --, therefor.

In column 145-146, line 69, delete ""Multiviews"." and insert -- "MultiViews". --, therefor.

In column 145-146, line 70, delete ""Multiviews"" and insert -- "MultiViews" --, therefor.

In column 145-146, line 72, delete "FollowSynLinks" and insert -- FollowSymLinks --, therefor.

In column 147-148, line 18, delete "#/Directory>" and insert -- </Directory> --, therefor.

In column 149-150, line 35, delete "-o" and insert -- -0 --, therefor.

In column 151-152, line 45, delete "configaration" and insert -- configuration --, therefor.

CERTIFICATE OF CORRECTION (continued)
U.S. Pat. No. 7,069,271 B1

In column 153-154, line 18, delete "1995-1996" and insert -- 1995-1998 --, therefor.

In column 153-154, line 53, delete "FITNRSS" and insert -- FITNESS --, therefor.

In column 153-154, line 55, delete "OR" and insert -- BE --, therefor.

In column 153-154, line 76, delete "1999" and insert -- 1998 --, therefor.

In column 155-156, line 60, delete "extension" and insert -- eXtension --, therefor.

In column 157-158, line 12, delete "$CFG·₃" and insert -- $CFG_ --, therefor.

In column 157-158, line 23, delete "∫n";" and insert -- |n"; --, therefor.

In column 157-158, line 46, delete "metacharater" and insert -- metacharacter --, therefor.

In column 157-158, line 47, delete "occurance" and insert -- occurrence --, therefor.

In column 157-158, line 73, delete ""[$]opt" and insert -- "\$opt --, therefor.

In column 159-160, line 51, delete "("gn:" and insert -- ("qn: --, therefor.

In column 159-160, line 51, delete "@ARGV};" and insert -- @ARGV);" --, therefor.

In column 161-162, line 45, delete "¢\$CFG" and insert -- "\$CFG --, therefor.

In column 163-164, line 77, after "exit (1)" insert -- ; --.

In column 165-166, line 39, after "exit (1)" insert -- ; --.

In column 165-166, line 46, after "?||" insert -- ; --.

In column 165-166, line 48, delete ""$[name]" and insert -- "${name} --, therefor.

In column 169-170, line 15, before "Location" insert -- < --.

In column 169-170, line 66, delete "fron" and insert -- from --, therefor.

In column 171-172, line 14, delete "Dynanic" and insert -- Dynamic --, therefor.

In column 171-172, line 29, delete "1023;" and insert -- 1023, --, therefor.

In column 171-172, line 53, delete "NOTE|" and insert -- NOTE! --, therefor.

CERTIFICATE OF CORRECTION (continued)
U.S. Pat. No. 7,069,271 B1

In column 171-172, line 59, after ""*"" insert -- , --.

In column 171-172, line 60, delete "slso" and insert -- also --, therefor.

In column 173-174, line 52, delete "with" and insert -- With --, therefor.

In column 173-174, line 61, delete "docunent." and insert -- document. --, therefor.

In column 173-174, line 71, delete "reccomend" and insert -- recommend --, therefor.

In column 175-176, line 39, delete "cacheing" and insert -- caching --, therefor.

In column 175-176, line 50, delete "79:80" and insert -- 78:80 --, therefor.

In column 175-176, line 59, after "www" delete "/doca/" and insert -- /docs/ --, therefor.

In column 175-176, line 62, delete ".con-" and insert -- .com- --, therefor.

In column 177-178, line 23, delete "recieved." and insert -- received. --, therefor.

In column 177-178, line 28, delete "Fancy-Indexing" and insert -- FancyIndexing --, therefor.

In column 177-178, line 40, after "gif" delete ".wr1" and insert -- .wrl --, therefor.

In column 177-178, line 46, delete ".p1" and insert -- .pl --, therefor.

In column 177-178, line 52, delete "/bonb." and insert -- /bomb. --, therefor.

In column 177-178, line 75, after ".?" delete "?*~*#" and insert -- ?* *~ *# --, therefor.

In column 177-178, line 76, delete "AccessFilName:" and insert -- AccessFileName: --, therefor.

In column 179-180, line 26, after "compress" delete "z" and insert -- Z --, therefor.

In column 179-180, line 32, delete "*AddLanguage pl .po#" and insert -- "AddLanguage pl .po" --, therefor.

In column 179-180, line 56, delete "ScripAlias/" and insert -- ScriptAlias/ --, therefor.

In column 179-180, line 56, after "cgi-bin/" delete "*" and insert -- " --, therefor.

In column 179-180, line 71, delete "-acript" and insert -- -script --, therefor.

In column 179-180, line 73, delete ".shml" and insert -- .shtml --, therefor.

CERTIFICATE OF CORRECTION (continued)
U.S. Pat. No. 7,069,271 B1

In column 181-182, line 28, delete "(*)" and insert -- (") --, therefor.

In column 181-182, line 39, delete "_mine_" and insert -- _mime_ --, therefor.

In column 181-182, line 49, delete "4\.0b2;" and insert -- 4\.0b2; --, therefor.

In column 183-184, line 43, delete "nohody" and insert -- nobody --, therefor.

In column 183-184, line 54, delete "you" and insert -- You --, therefor.

In column 183-184, line 62, delete "control" and insert -- Control --, therefor.

In column 183-184, line 70, after "->" delete ",".

In column 185-186, line 11, after "PidFile" delete ";" and insert -- : --, therefor.

In column 185-186, line 68, delete "reccommend" and insert -- recommend --, therefor.

In column 187-188, line 36, delete "cacheing" and insert -- caching --, therefor.

In column 187-188, line 47, before "#" delete "b".

In column 187-188, line 55, delete ".con" and insert -- .com --, therefor.

In column 187-188, line 75, delete ".comf" and insert -- .conf --, therefor.

In column 189-190, line 18, delete "recieved." and insert -- received. --, therefor.

In column 189-190, line 43, delete "/d vi.gif" and insert -- /dvi.gif --, therefor.

In column 189-190, line 50, delete "/icone/" and insert -- /icons/ --, therefor.

In column 191-192, line 68, delete "*shtml" and insert -- .shtml --, therefor.

In column 191-192, line 69, delete "*shtml" and insert -- .shtml --, therefor.

In column 193-194, line 40, delete "Explorer4.0b2" and insert -- Explorer 4.0b2 --, therefor.

In column 195-196, line 8, after "Verify" delete "password" and insert -- Password --, therefor.

In column 195-196, line 20, delete "Prom" and insert -- From --, therefor.

In column 195-196, line 59, delete "firsmame" and insert -- firstname --, therefor.

In column 197-198, line 15, delete "maximun" and insert -- maximum --, therefor.

In column 197-198, line 32, delete "ordemailflag" and insert -- ordermailflag --, therefor.

In column 197-198, line 33, delete "ordemailpmpt" and insert -- ordermailpmpt --, therefor.

In column 197-198, line 41, delete "orderauthpaseword" and insert -- orderauthpassword --, therefor.

In column 197-198, line 52, delete "bas" and insert -- has --, therefor.

In column 199-200, line 12, after "Registration" delete "-,".

In column 199-200, line 63, delete "please" and insert -- Please --, therefor.

In column 199-200, line 69, delete "welcone" and insert -- welcome --, therefor.

In column 199-200, line 76, delete "internet" and insert -- Internet --, therefor.

In column 201-202, line 42, delete ".<n1s>." and insert -- .<nls>. --, therefor.

In column 201-202, line 44, delete ".<n1s>." and insert -- .<nls>. --, therefor.

In column 201-202, line 64, delete "_rice_" and insert -- _price_ --, therefor.

In column 201-202, line 68, delete "recalculutate" and insert -- recalculate --, therefor.

In column 203-204, line 22, delete ";Affilate" and insert -- ;Affiliate --, therefor.

In column 203-204, lines 34-35, delete "tru e" and insert -- true --, therefor.

In column 203-204, line 41, delete "tor" and insert -- for --, therefor.

In column 205-206, line 32, after "mode" insert -- of --.

In column 205-206, line 36, delete "ecaccttelephome," and insert -- ecaccttelephone, --, therefor.

In column 205-206, line 41, delete "perceptions," and insert -- Perceptions, --, therefor.

In column 205-206, line 41, delete "remo^ve" and insert -- remove --, therefor.

In column 205-206, line 51, delete "perceptions" and insert -- Perceptions --, therefor.

In column 205-206, line 55, delete "perceptions" and insert -- Perceptions --, therefor.

In column 205-206, line 64, delete "ISO-8959-1" and insert -- ISO-8859-1 --, therefor.

In column 207-208, line 15, delete "SDDSfits" and insert -- SDOSfits --, therefor.

In column 207-208, line 61, delete "_cfg" and insert -- .cfg --, therefor.

In column 209-210, line 10, delete "enviromment" and insert -- environment --, therefor.

In column 209-210, line 21, after "threads" delete "O_R_A_C_L_B" and insert -- O_R_A_C_L_E --, therefor.

In column 209-210, line 46, delete "MAHPATH" and insert -- MANPATH --, therefor.

In column 211-212, line 17, delete "i;" and insert -- 1; --, therefor.

In column 211-212, line 60, delete "5/8args" and insert -- @args --, therefor.

In column 211-212, line 61, delete "(@arga)" and insert -- (@)args) --, therefor.

In column 213-214, line 10, after ""."" insert -- ; --.

In column 213-214, line 12, delete "5/8args" and insert -- @args --, therefor.

In column 213-214, line 13, after "@javacargs" delete "." and insert -- , --, therefor.

In column 213-214, line 22, delete "H_O_S_T_N_A_M_E_D_O_M_A_I_N" and insert -- H_O_S_T_N_A_M_E.D_O_M_A_I_N --, therefor.

In column 215-216, line 70, delete "/ing/" and insert -- /img/ --, therefor.

In column 215-216, line 73, delete "O_R_A_C_L_R_" and insert -- O_R_A_C_L_E_ --, therefor.

In column 215-216, line 78, delete "ServerEs" and insert -- ServerÆs --, therefor.

In column 217-218, line 13, delete "/phomes" and insert -- /phones --, therefor.

In column 217-218, line 38, after "text" delete "/hml" and insert -- /html --, therefor.

In column 219-220, line 63, after "3.0.4" insert -- . --.

In column 221-222, line 20, delete "enviromment" and insert -- environment --, therefor.

In column 221-222, lines 27-28, delete "DOMA N" and insert -- DOMAIN --, therefor.

In column 221-222, line 60, delete "DETECT" and insert -- DIRECT --, therefor.

CERTIFICATE OF CORRECTION (continued)
U.S. Pat. No. 7,069,271 B1

In column 223-224, line 49, delete "/uch/" and insert -- /ucb/ --, therefor.

In column 227-228, line 17, delete "-$" and insert -- =$ --, therefor.

In column 227-228, line 60, delete "update" and insert -- Update --, therefor.

In column 227-228, line 63, delete "update" and insert -- Update --, therefor.

In column 227-228, line 68, delete "/Netperceptio" and insert -- /NetPerceptio --, therefor.

In column 231-232, line 12, delete "/Netperceptio" and insert -- /NetPerceptio --, therefor.

In column 231-232, line 65, delete "GLRDOOT" and insert -- GLROOT --, therefor.

In column 231-232, line 75, delete "DR" and insert -- DB --, therefor.

In column 233-234, line 9, delete "(_B" and insert -- (D_B --, therefor.

In column 233-234, line 29, delete "MAXLOGMEMRERS 2" and insert -- MAXLOGMEMBERS 2 --, therefor.

In column 233-234, line 35, before "SIZE" insert -- ' --.

In column 233-234, line 37, before "SIZE" insert -- ' --.

In column 233-234, line 39, before "SIZE" insert -- ' --.

In column 233-234, line 47, delete "'D_R" and insert -- 'D_B --, therefor.

In column 233-234, line 48, delete "'D_R" and insert -- 'D_B --, therefor.

In column 233-234, line 49, delete "'D_R" and insert -- 'D_B --, therefor.

In column 233-234, line 51, delete "'D_R" and insert -- 'D_B --, therefor.

In column 235-236, line 16, delete "6900X" and insert -- 6800K --, therefor.

In column 235-236, line 17, delete "8900K" and insert -- 8800K --, therefor.

In column 237-238, line 40, delete "/opc/" and insert -- /opt/ --, therefor.

In column 237-238, line 44, after "#" insert -- . --.

In column 237-238, line 62, delete "EOP" and insert -- EOF --, therefor.

CERTIFICATE OF CORRECTION (continued)
U.S. Pat. No. 7,069,271 B1

In column 239-240, line 25, delete "svmgrl" and insert -- svrmgrl --, therefor.

In column 239-240, line 51, delete "A C" and insert -- A__C --, therefor.

In column 239-240, line 63, delete "SEQ" and insert -- BEQ --, therefor.

In column 241-242, line 38, delete "PATE" and insert -- PATH --, therefor.

In column 241-242, line 76, delete "9" and insert -- 8 --, therefor.

In column 245-246, line 29, after "verify" insert -- | updatepe --, therefor.

In column 249-250, line 21, after "[ ]" insert -- ; --.

In column 249-250, line 21, delete "then" and insert -- them --, therefor.

In column 251-252, line 28, delete "WMOANI" and insert -- WHOAMI --, therefor.

In column 253-254, line 25, delete "vdomsg" and insert -- vdbmsg --, therefor.

In column 253-254, line 43, delete "1p" and insert -- 1/p --, therefor.

In column 253-254, line 61, before "visit" delete "." and insert -- , --, therefor.

In column 255-256, line 28, before "cookie" delete "the".

In column 255-256, line 66, delete "thig" and insert -- this --, therefor.

In column 257-258, line 12, delete "TIMETABLE" and insert -- TMTENABLE --, therefor.

In column 261-262, line 39, before "E49" delete "_B_" and insert -- _S_ --, therefor.

In column 267-268, line 17, delete ".wrbron." and insert -- .wrbmon. --, therefor.

In column 273-274, line 61, delete "cwsapps/" and insert -- owsapps/ --, therefor.

In column 275-276, line 66, delete "property"" and insert -- Property" --, therefor.

In column 279-280, line 52, delete ".APP" and insert -- .App --, therefor.

In column 281-282, line 33, delete "AppConfLog." and insert -- AppConfLog, --, therefor.

In column 283-284, line 57, delete "AppConfJava." and insert -- AppConfJava, --, therefor.

CERTIFICATE OF CORRECTION (continued)
U.S. Pat. No. 7,069,271 B1

In column 287-288, line 45, delete ""TX" and insert -- "Tx --, therefor.

In column 291-292, line 30, delete "AppCartxConfVP." and insert -- AppCartxConfVP, --, therefor.

In column 291-292, line 36, delete "Close&IF" and insert -- CloseGIF --, therefor.

In column 293-294, line 58, delete "wrbasrv." and insert -- wrbasrv, --, therefor.

In column 293-294, line 63, delete "Reloadorder" and insert -- ReloadOrder --, therefor.

In column 297-298, line 28, delete "wrb" and insert -- Wrb --, therefor.

In column 297-298, line 47, before ""Monitoring" insert -- = --, therefor.

In column 299-300, line 65, delete "Srv." and insert -- Srv, --, therefor.

In column 307-308, line 61, delete "tnternalName" and insert -- InternalName --, therefor.

In column 307-308, line 78, delete "wrb" and insert -- Wrb --, therefor.

In column 311-312, line 13, delete ".dispatchsrs." and insert -- .dispatchers. --, therefor.

In column 313-314, line 33, delete "Out" and insert -- out --, therefor.

In column 315-316, line 56, delete "-UTF-8" and insert -- =UTF-8 --, therefor.

In column 319-320, line 17, delete "x5O9" and insert -- x509 --, therefor.

In column 319-320, line 51, delete "(Adnin" and insert -- (Admin --, therefor.

In column 321-322, line 73, delete "Æ" and insert -- ServerÆs --, therefor.

In column 325-326, line 65, delete "Æ" and insert -- ServerÆs --, therefor.

In column 327-328, line 44, delete "/ndwfes.so" and insert -- /ndwfss.so --, therefor.

In column 327-328, line 71, delete "AdmFile" and insert -- AdminFile --, therefor.

In column 329-330, line 65, delete "Æ" and insert -- ServerÆs --, therefor.

In column 329-330, line 71, delete ";/employess/" and insert -- ;/employees/ --, therefor.

In column 333-334, line 46, delete "/nbedlet" and insert -- /mbedlet --, therefor.

CERTIFICATE OF CORRECTION (continued)
U.S. Pat. No. 7,069,271 B1

In column 333-334, line 53, delete "/tinbuktu" and insert -- /timbuktu --, therefor.

In column 335-336, line 42, delete "audic/midi" and insert -- audio/midi --, therefor.

In column 337-338, line 18, delete "/x-vml" and insert -- /x-vrml --, therefor.

In column 337-338, line 51, delete "[Multiport]" and insert -- [MultiPort] --, therefor.

In column 339-340, line 62, delete "Æ" and insert -- ServerÆs --, therefor.

In column 341-342, line 40, delete "[Multiport]" and insert -- [MultiPort] --, therefor.

In column 343-344, line 59, delete "Æ" and insert -- ServerÆs --, therefor.

In column 345-346, line 34, delete "/tinbuktu" and insert -- /timbuktu --, therefor.

In column 351-352, line 16, delete "0X" and insert -- 0x --, therefor.

In column 351-352, line 28, delete "/inatall/" and insert -- /install/ --, therefor.

In column 351-352, line 62, before "FALSE" insert -- = --, therefor.

In column 353-354, line 44, after "E" delete "_C_" and insert -- _O_ --, therefor.

In column 368, lines 10-11, delete "[10](using the stop and start procedures in the iprlics user from the example)" and insert -- (using the stop and start procedures in the iprlics user from the example) --, after "OAS" as the continuation of the same.

In column 367-368, Appendix IV, line 28, delete "setup sh" and insert -- setup.sh --, therefor.

In column 367-368, Appendix IV, line 29, delete "setup sh" and insert -- setup.sh --, therefor.

In column 367-368, Appendix IV, line 45, delete "no" and insert -- not --, therefor.

In column 367-368, Appendix IV, line 50, delete "no" and insert -- not --, therefor.

In column 369-370, Appendix IV, line 35, delete "OARCLE" and insert -- ORACLE --, therefor.

In column 371-372, Appendix IV, line 47, after "place" insert -- your --, therefor.

In column 372, line 65, after "parameters" delete ";" and insert -- , --, therefor.

In column 373, line 60, in claim 1, delete "customers" and insert -- customer --, therefor.

In column 374, line 7, in claim 3, delete "clam" and insert -- claim --, therefor.

In column 374, line 60, in claim 8, delete "clam" and insert -- claim --, therefor.

Signed and Sealed this

Twenty-third Day of March, 2010

David J. Kappos
*Director of the United States Patent and Trademark Office*